FILE STORAGE SYSTEM

INVENTORS
JAMES G. BRENZA
PERRY O. CRAWFORD, JR.
ARTHUR A. KUSNICK
ORVILLE R. LAMAIRE
BY [signature]
ATTORNEY July 25, 1967 J. G. BRENZA ETAL 3,333,251

FILE STORAGE SYSTEM

Filed Nov. 13, 1964 37 Sheets-Sheet 13

July 25, 1967 J. G. BRENZA ETAL 3,333,251

FILE STORAGE SYSTEM

Filed Nov. 13, 1964 37 Sheets-Sheet 15

July 25, 1967 J. G. BRENZA ETAL 3,333,251

FILE STORAGE SYSTEM

Filed Nov. 13, 1964 57 Sheets-Sheet 21

July 25, 1967 J. G. BRENZA ET AL 3,333,251

FILE STORAGE SYSTEM

Filed Nov. 13, 1964 37 Sheets-Sheet 22

X RING

MASTER PRIORITY RING (X)

July 25, 1967 J. G. BRENZA ET AL 3,333,251

FILE STORAGE SYSTEM

Filed Nov. 13, 1964 37 Sheets-Sheet 31

July 25, 1967 J. G. BRENZA ET AL 3,333,251

FILE STORAGE SYSTEM

Filed Nov. 13, 1964 37 Sheets-Sheet 33

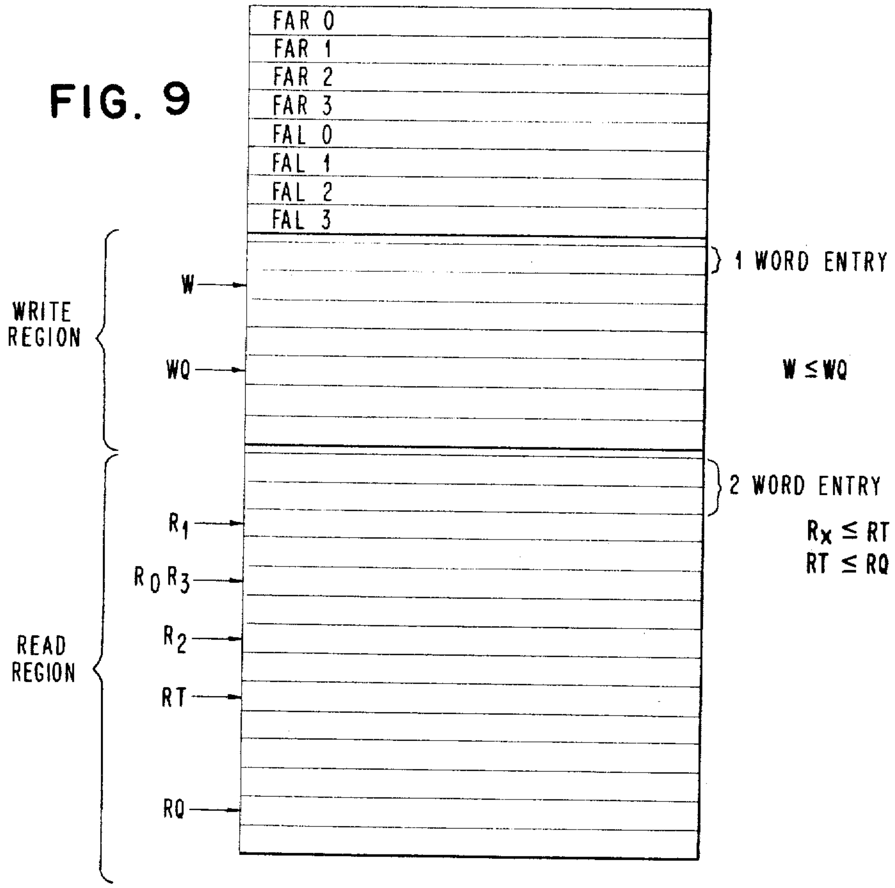

FIG. 9

| OPER-ATION | INITIALIZE WORD 1 | INITIALIZE WORD 2 | WRITE WORD | READ WORD 1 | READ WORD 2 |
|---|---|---|---|---|---|
| CBR 1 | — | VALUE OF dHx | RECORD NAME | RECORD NAME | RECORD ADDRESS (ON LOOP) |
| CBR 2 | ADDRESS OF WORD 2 IN HOST CORE MEMORY | ADDRESS IN K MEMORY OF dHx | HOST CORE MEMORY LOCATION | HOST CORE MEMORY LOCATION | HIERARCHY # |
| CBR 3 | OPERATION CODE | — | OPERATION CODE | OPERATION CODE | LOOP POSITION |

READ WORD 2 FILLED IN DURING CYCLE 13

FIG. 10

United States Patent Office 3,333,251

Patented July 25, 1967

3,333,251

FILE STORAGE SYSTEM

James G. Brenza, Putnam Valley, Perry O. Crawford, Jr. Croton-on-Hudson, Arthur A. Kusnick, Peekskill, and Orville R. La Maire, Yorktown Heights, N.Y., assignors to International Business Machines Corporation, New York, N.Y., a corporation of New York Filed Nov. 13, 1964, Ser. No. 410,899

18 Claims. (Cl. 340—172.5)

This invention relates to a file storage system and more particularly to a file storage system in which records are stored in a plurality of hierarchy levels and in which the level in the hierarchy at which a given record is stored at any given time is determined either wholly or in part on an empirical basis.

Many applications of electronic data processing machines such as, for example, employee and customer records of large businesses and insurance company subscriber files require the storage of huge amounts of data. In order for the data processing system to operate efficiently, this data must be available to the data processor as rapidly as possible. However, the cost per bit of high speed memories, such as magnetic core matrix arrays, is high so that it is not economically feasible to store these files in such an array. The larger, less expensive, memories have relatively low through-put rates. To balance cost against desired through-puts, most file storage systems include a hierarchy of memories with data which is required more frequently being placed in small high speed memory devices to achieve the desired through-put and data which is used less frequently in larger lower speed memory devices. By judicious selection of what data is to be placed in the high speed memories and what is to be placed in the low speed memories, a programmer can generally achieve the desired through-put rate without requiring a memory system which is prohibitively expensive.

However, a hierarchy storage system of the type mentioned above suffers from a number of serious drawbacks. Most serious of these drawbacks is that it requires the programmer to determine ahead of time the relative activity of the data which is to be stored in the system so as to be able to select the proper level in the hierarchy in which to place it. While, in some limited instances such knowledge is readily available, in most instances little if anything is known of the activity which will be required of a given bit of data when it is placed in the system, and therefore, a more or less arbitrary determination is initially made as to where to place it in the hierarchy system.

The lack of initial information as to the relative activity of a given bit of data leads to further problems. For one thing, statistics must be maintained on the data in the system to determine the relative activity thereof and periodic file mantenance operations must be performed to reposition the data into proper levels. When addressing a particular unit of data, the programmer must know ahead of time in which level of the hierarchy it is stored, greatly complicating the programmer's job. Not only must the statistics be maintained on new data which has been stored in the system to determine the proper hierarchy level in which to ultimately place it, but statistics must also be mainained on old data to be sure that its activity level has not changed. Therefore, in order to maintain through-put at anywhere near a maximum level, it is necessary that the records in the file be repositioned at frequent intervals.

To solve the problems indicated above, a hierarchy file storage system should have the capacity to accept incoming data and to automatically place it in the proper hierarchy level at any given time on the basis of its relative activity as empirically determined. Such a system would reposition various data units on a more or less continuous basis so as to eliminate the need for periodic file maintenance operations. The programmer with such a system would not have to know where in the system a desired record was stored but would merely apply an identifier tag (for example, the record name) to the system and the system would then retrieve the record automatically.

There are a number of other desirable characteristics which a hierarchy file storage system should possess. As the amount of data in the system varies, it is often necessary to increase or decrease the capacity of a given level in the hierarchy in order to maintain the desired through-put or in the alternative to alter the through-put to accommodate the existing data load. The system should be capable of performing this function without changing the basic addressing scheme of the system. It is also desirable that the system provide a means for retrieving a complete file history on a given account, individual, event, etc. Still another desirable feature is that the system be highly reliable, particularly for frequently used or recently used records. One means of achieving this reliability is to provide capacity to store frequently used or recently used information in two or more hierarchy levels.

A primary object of this invention is therefore to provide an improved hierarchy file storage system.

A more specific object of this invention is to provide a hierarchy storage system which automatically places records in the proper level in the hierarchy at any given time.

A still more specific object of this invention is to provide a system of the type indicated above which places records in the proper level in the hierarchy on a more or less continuous basis in response to empirically determined activity levels of the records.

Another object of this invention is to provide a hierarchy storage system which provides maximum through-put rate at minimum cost.

Another object of this invention is to provide a hierarchy storage system which requires no preanalysis to determine where in the system to place a given record.

A still further object of the invention is to provide a system of the type described above which, while not requiring a preanalysis to determine where to store a record in the system, permits knowledge of activity statistic for a given record to be utilized when it is known.

Still another object of this invention is to provide a hierarchy file storage system which requires no file maintenance routines to be performed.

A further object of this invention is to provide a hierarchy file storage system which does not require the programmer to keep track of where in the hierarchy a desired record is stored.

A still further object of the invention is to provide a hierarchy storage system wherein any level of the hierarchy may have its capacity varied to maintain the desired through-put or to alter the through-put without altering the addressing scheme employed.

Another object of the invention is to provide a hierarchy storage system which maintains a complete journal or history of what has occurred with reference to any particular record and has the capacity to make this information available on request.

Still another object of the invention is to provide a hierarchy storage system which provides high reliability for frequently used or recently used data by storing it in more than one hierarchy level.

Another object of this invention is to provide a hierarchy storage system which handles file queuing problems, relieving the computer from the job of performing these functions.

In accordance with these objects, this invention provides a file storage system which includes a plurality of hierarchy levels. In one embodiment of the invention, a record is initially placed in one or more of the highest order hierarchy levels while in another embodiment of the invention information is initially placed in any desired level of the hierarchy. In the following description, higher order hierarchy levels are defined as those having lower access times and conversely, lower order hierarchy levels are defined as those having higher access times. A record, when stored, drifts back with time from the lowest level in the hierarchy in which it is initially placed to progressively lower levels. In either embodiment of the invention, the relative address for a desired record is obtained from a directory. This relative address is not a position designation, but is merely a number which is assigned to the record when it is stored. These numbers are assigned in ascending order. In one embodiment of the invention, the position of the record to be retrieved in the hierarchy is obtained from a computation involving the difference between the relative address being assigned to new records being stored and the relative address of the record being retrieved. In the second embodiment of the invention, a second directory is provided to obtain the position of a record from its relative address.

When it is desired to add capacity to a particular level of the hierarchy, an initialize routine is performed which does not affect the relative address of any of the records but merely alters the calculation parameters to compute the storage position.

These and other objects, features, and advantages of the invention will be apparent from the following more particular description of preferred embodiments of the invention as illustrated in the accompanying drawings.

Figure 2:
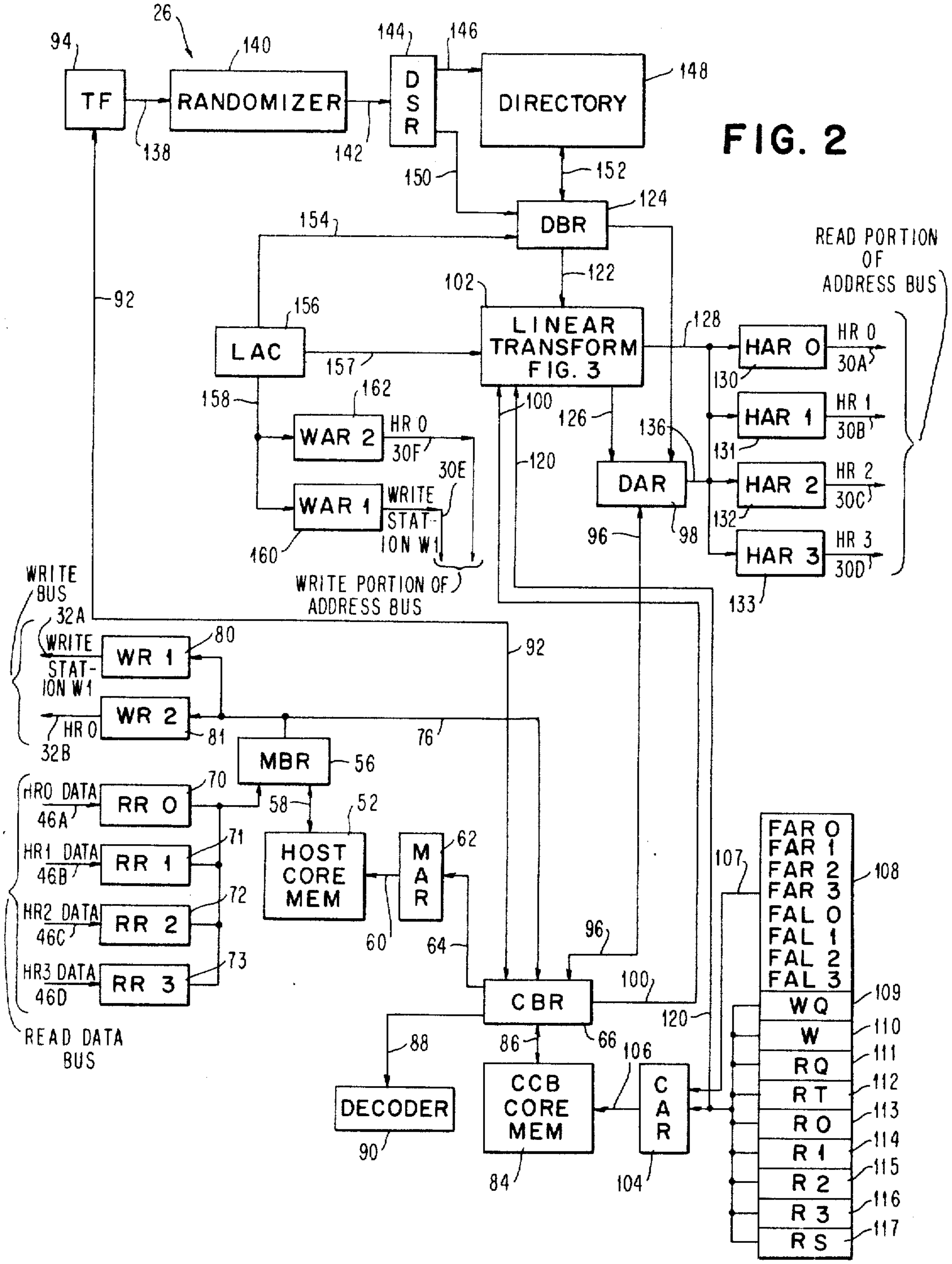
FIG. 2 is a general block diagram of the hierarchy processor and directory shown in FIG. 1.
Figures 6, 6A:
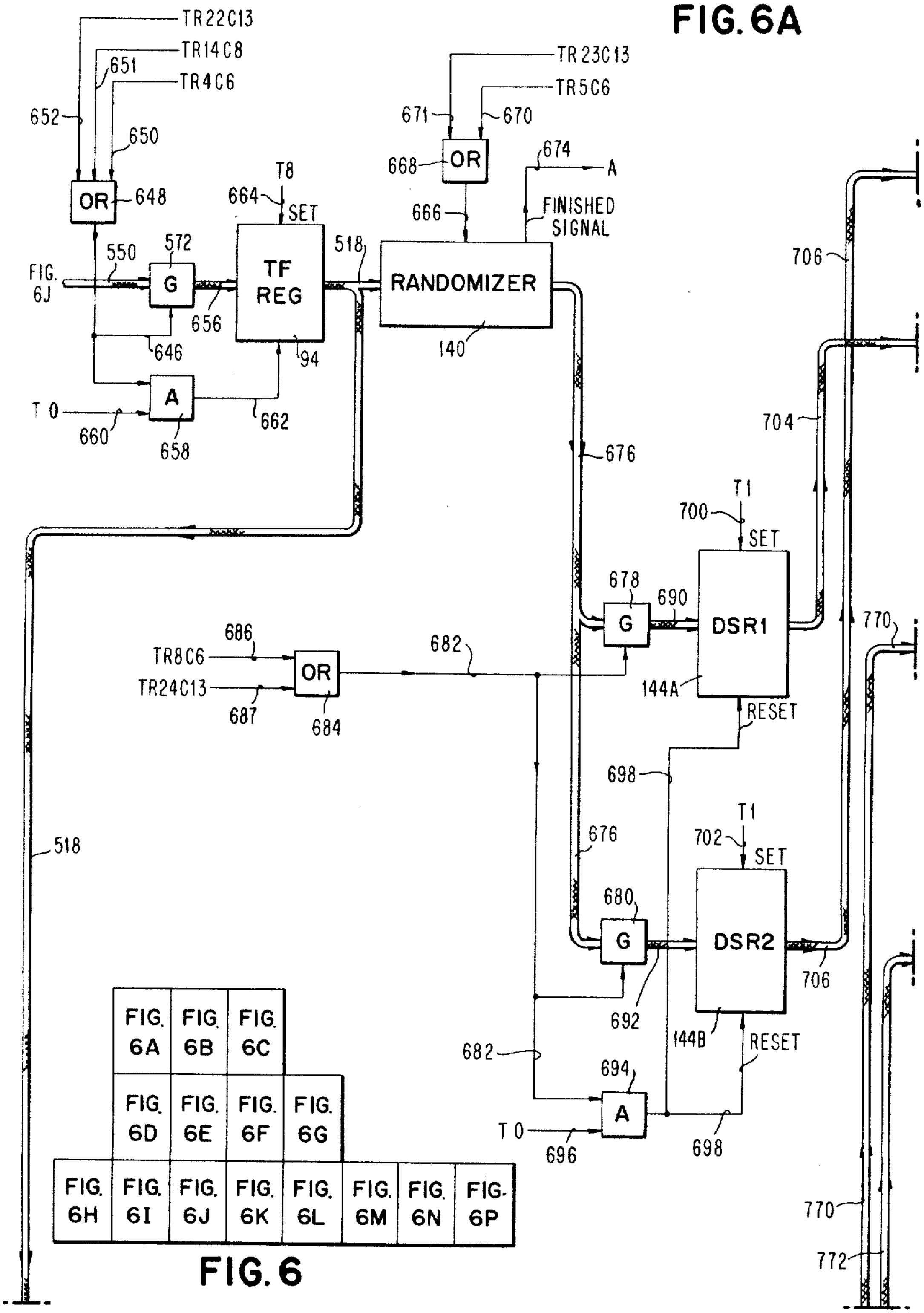
FIG. 6 is a diagram illustrating how
FIGS. 6A–6P are combined to form a detailed block diagram of the hierarchy processor and directory shown in FIG. 2.
Figure 6B:
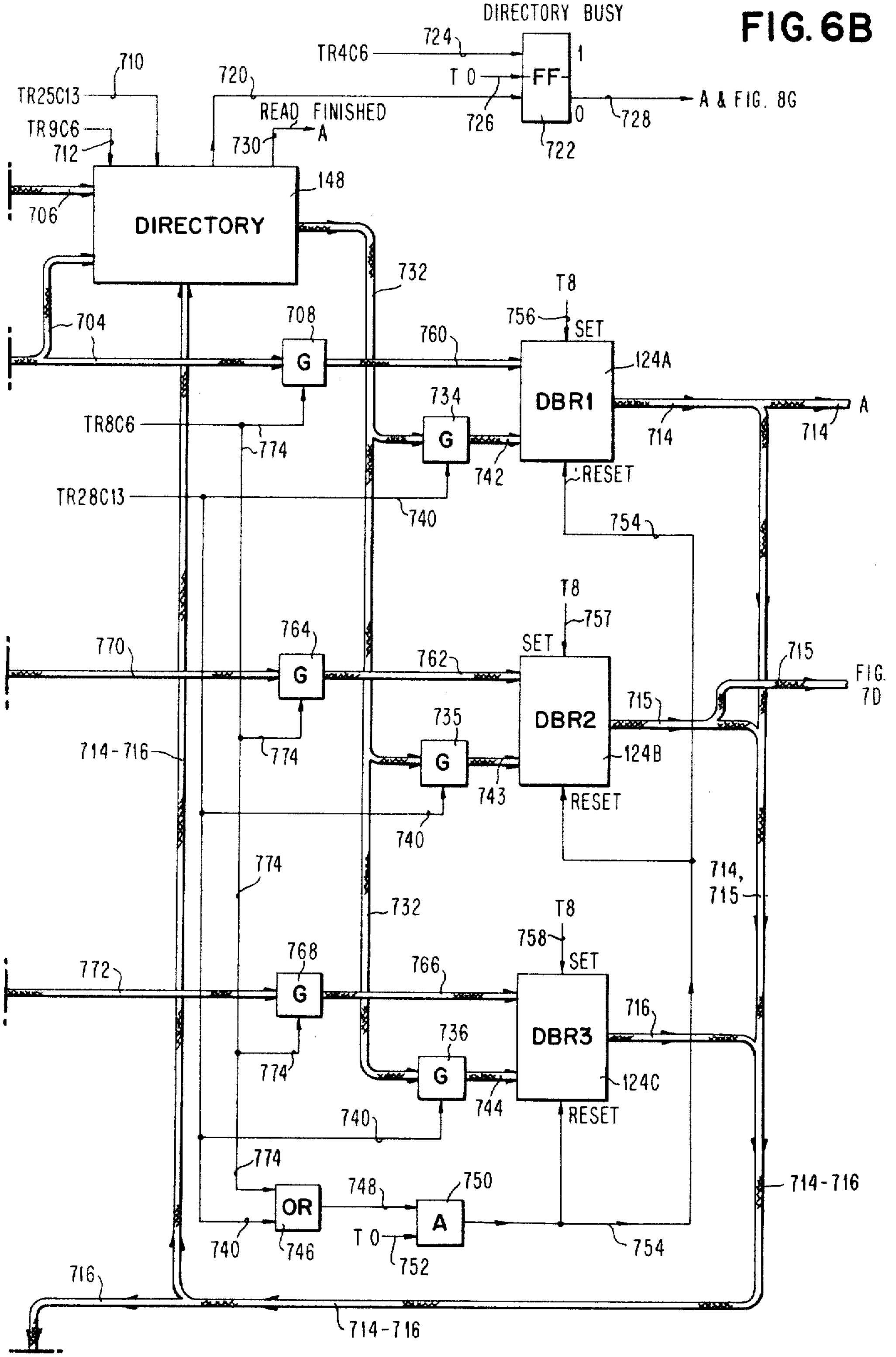
Figure 6C:
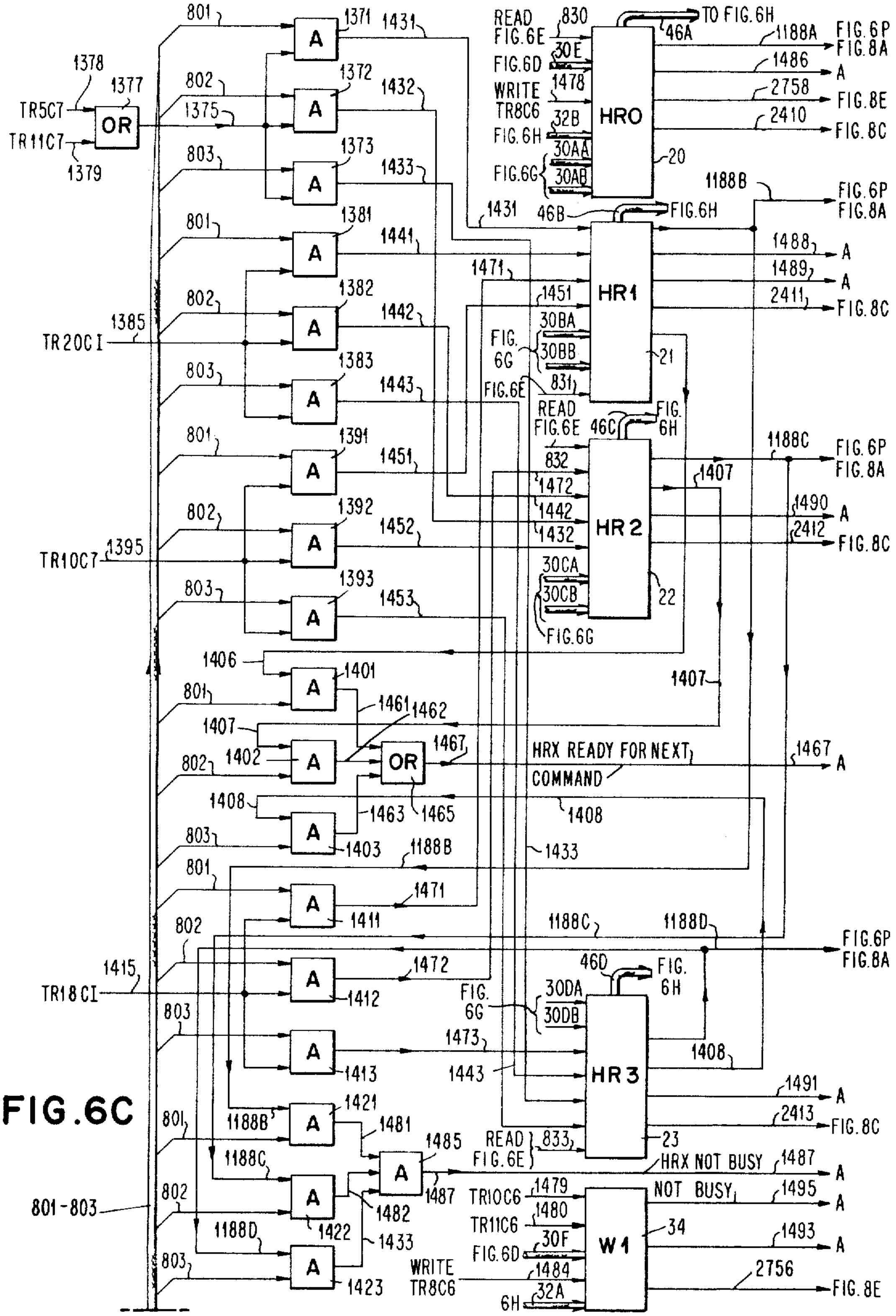
Figure 6D:
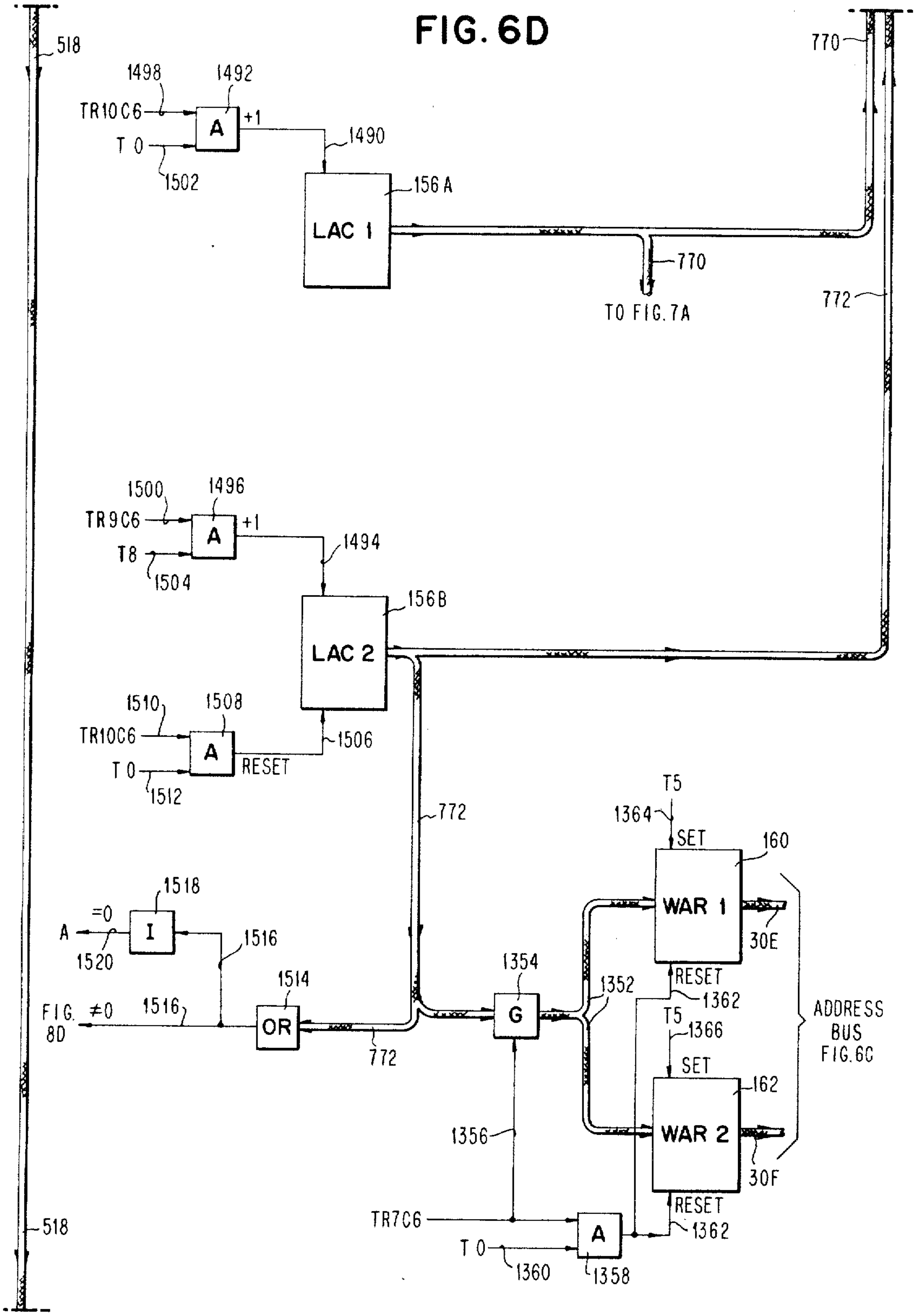
Figure 6E:
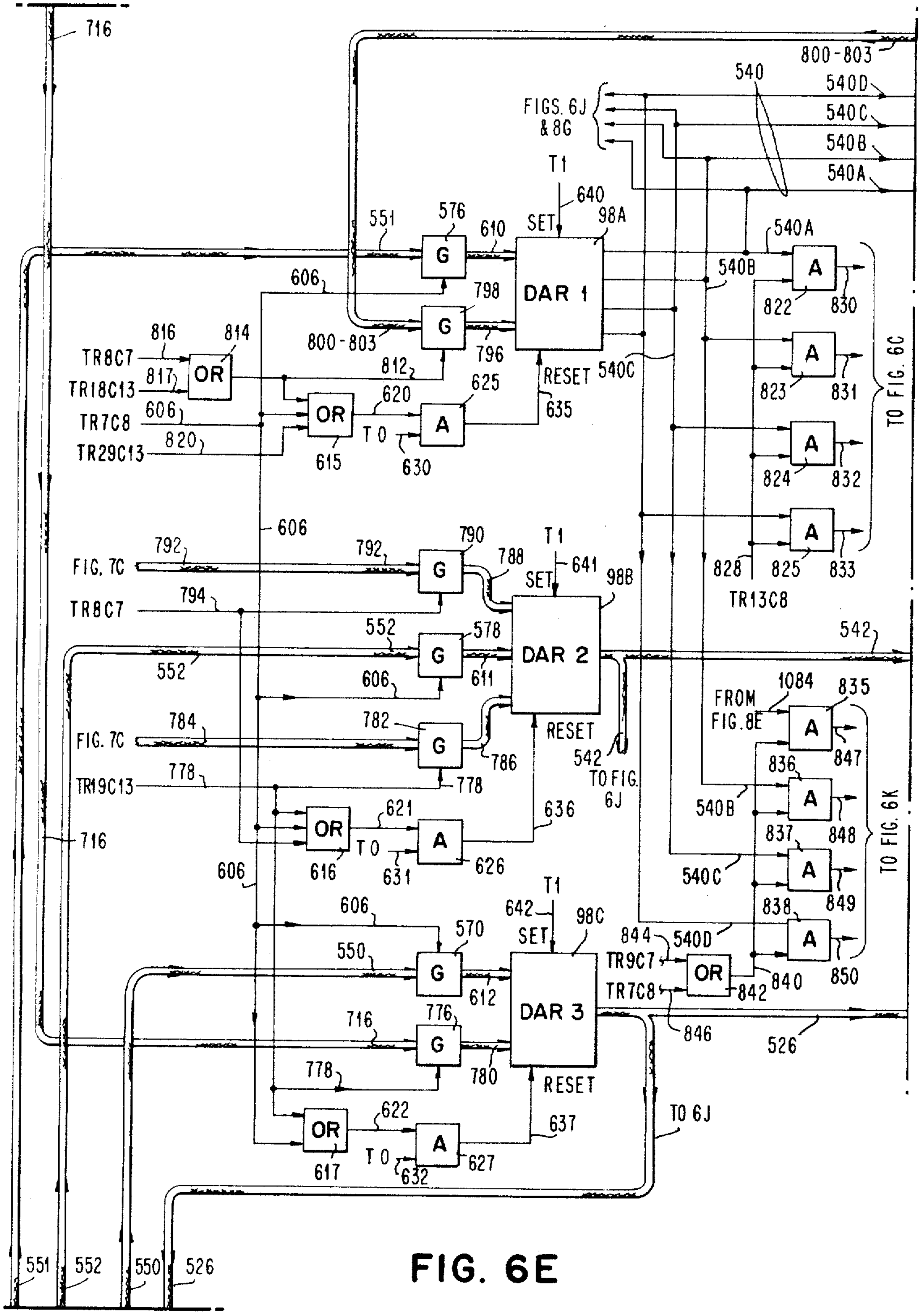
Figure 6F:
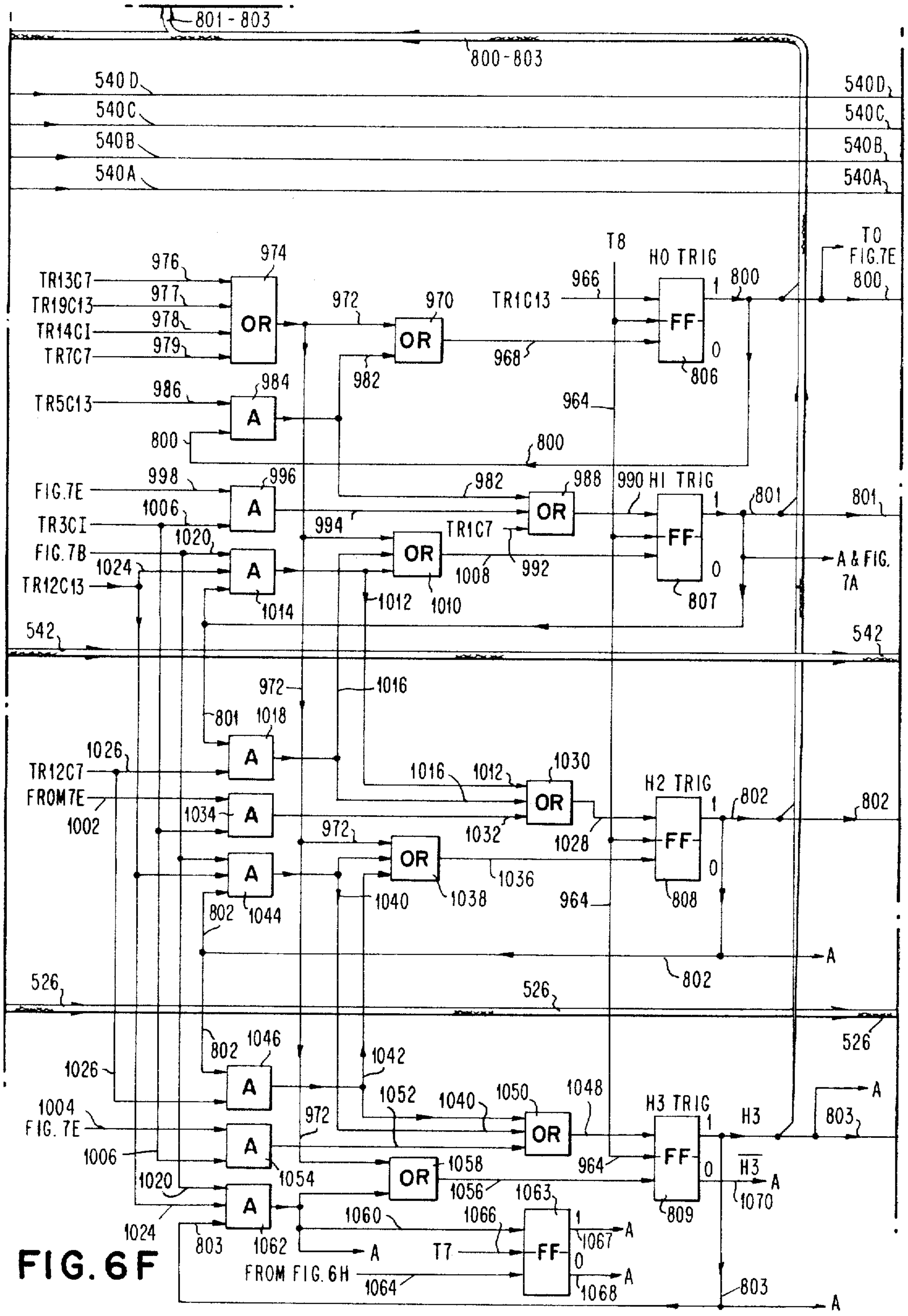
Figure 6G:
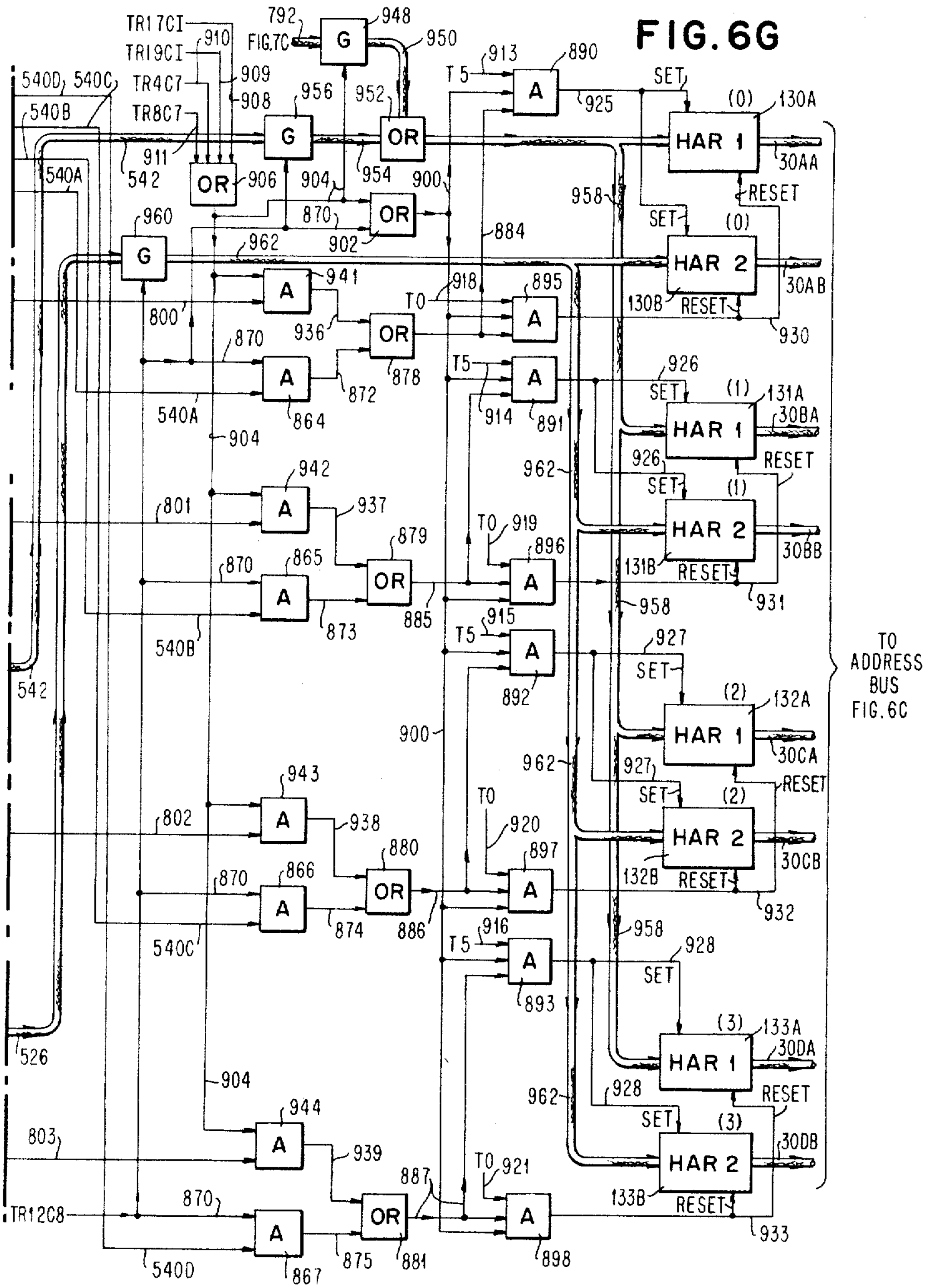
Figure 6H:
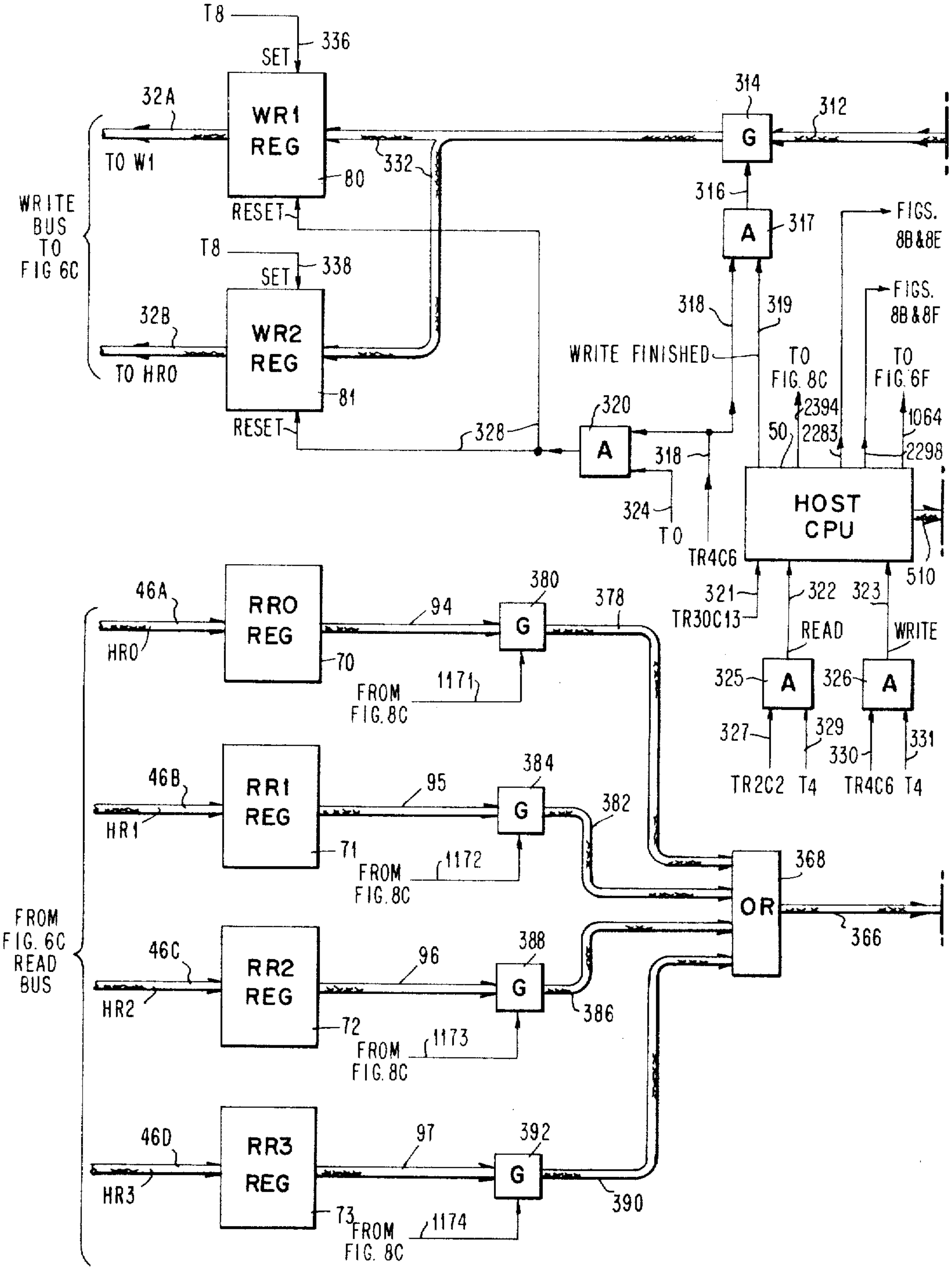
Figure 6I:
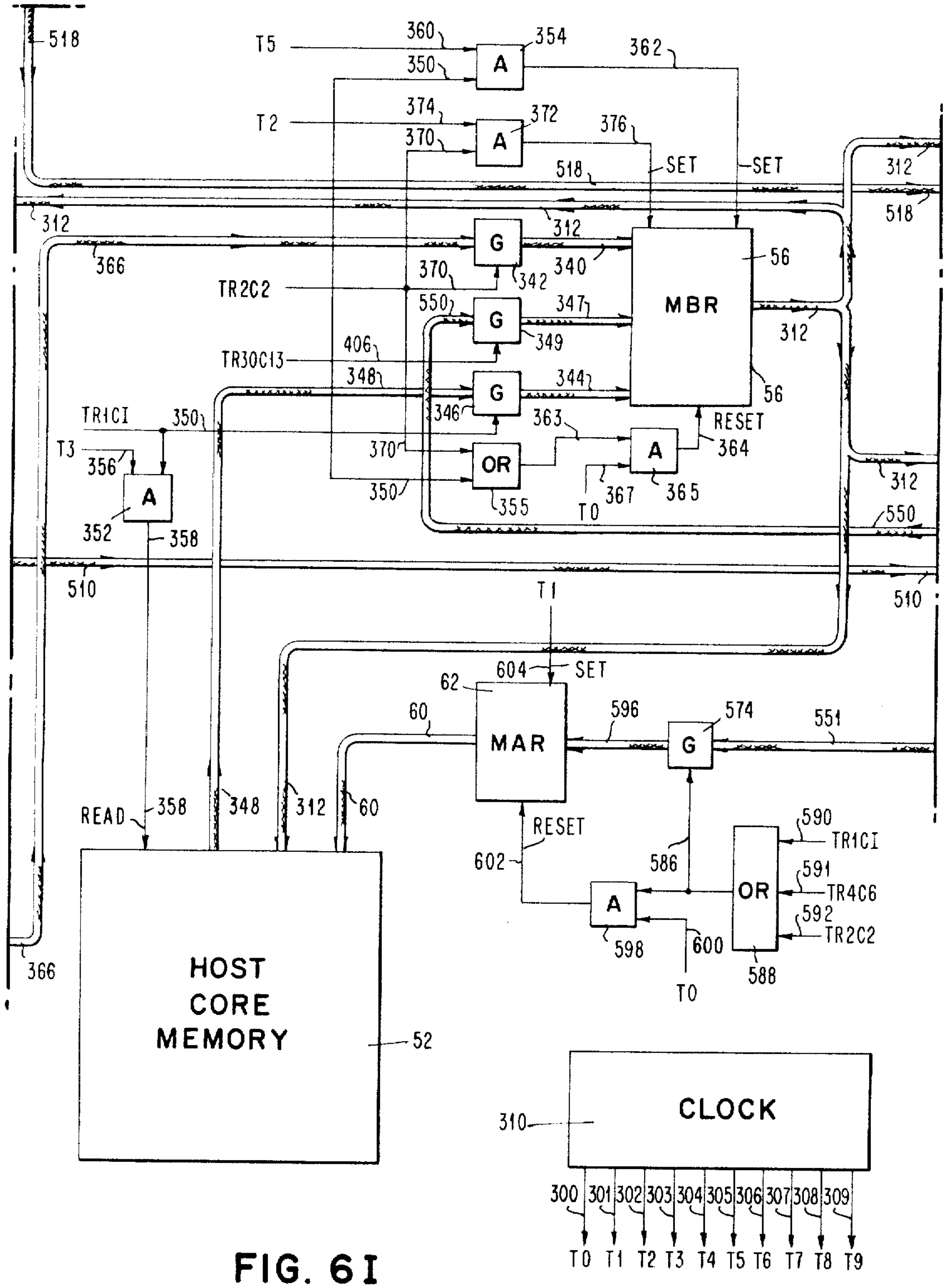
Figure 6J:
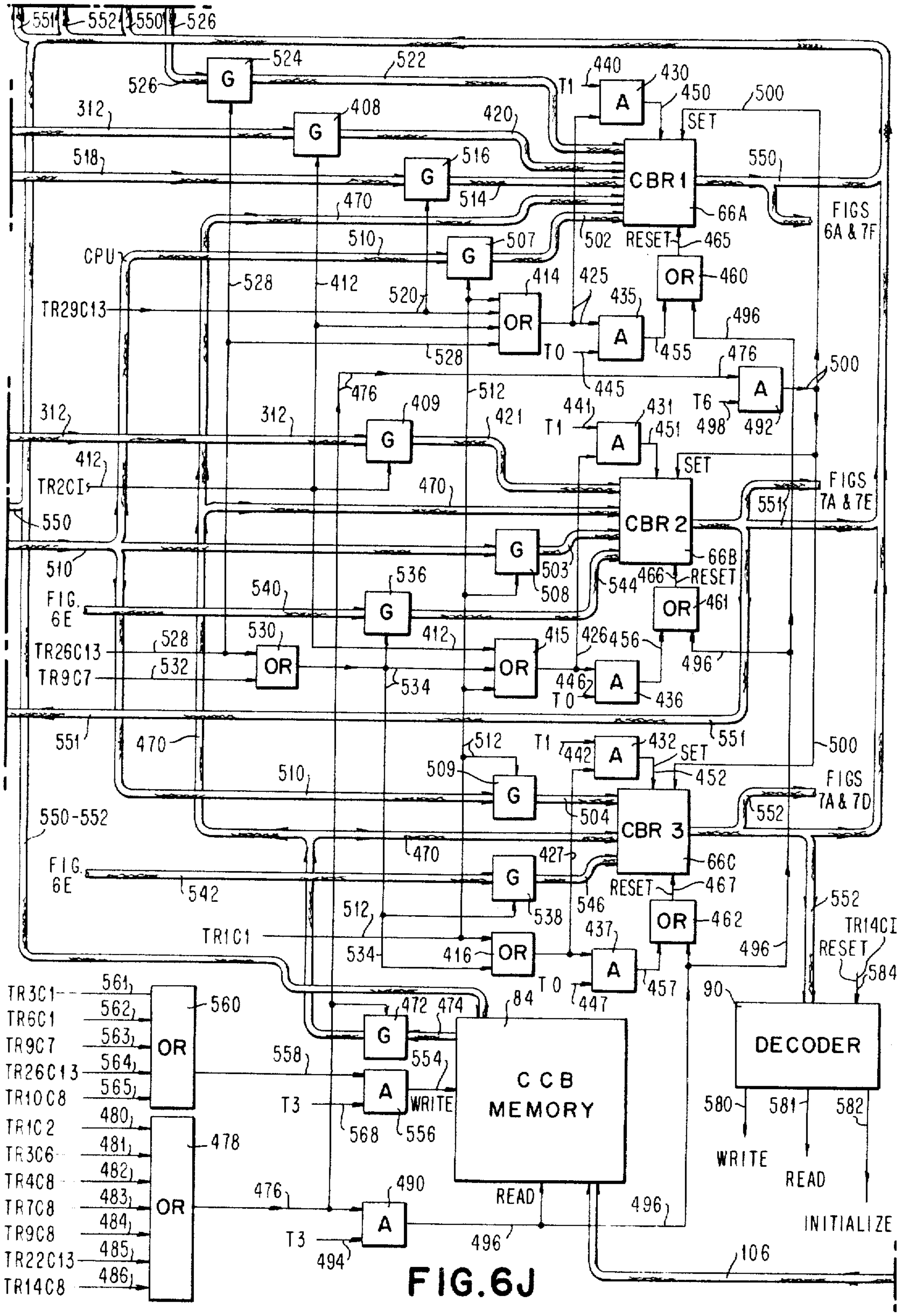
Figure 6K:
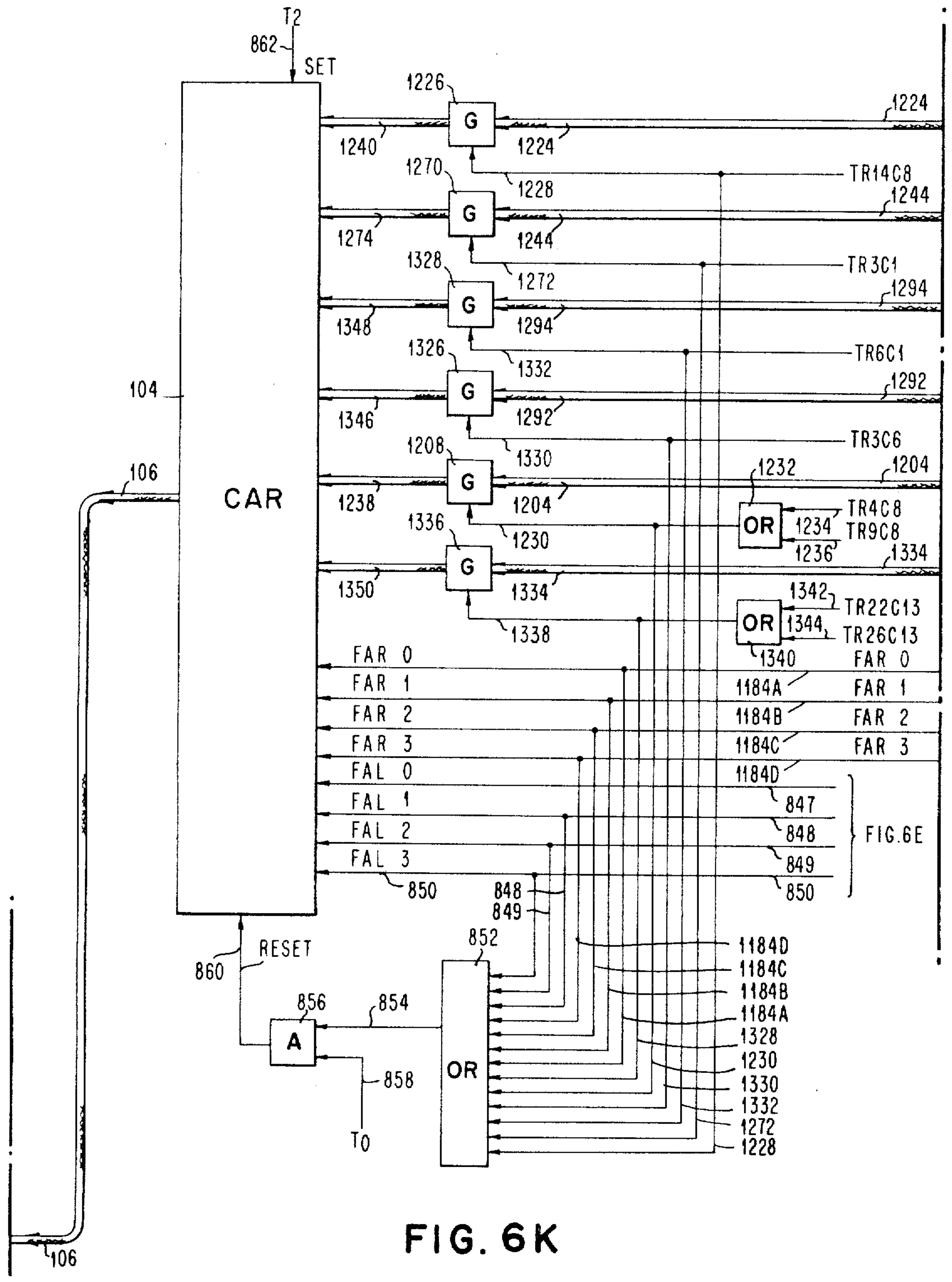
Figure 6L:
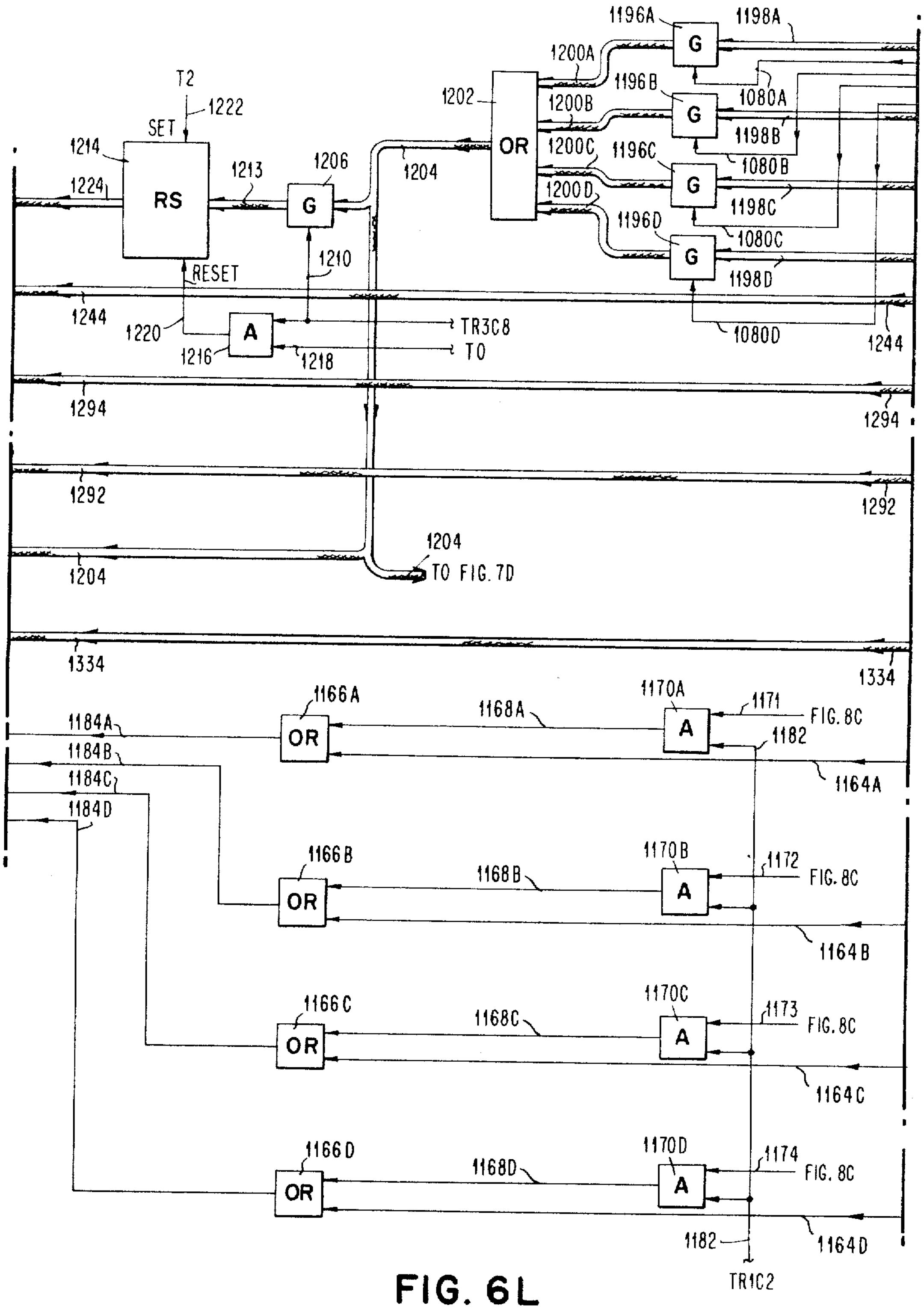
Figure 6M:
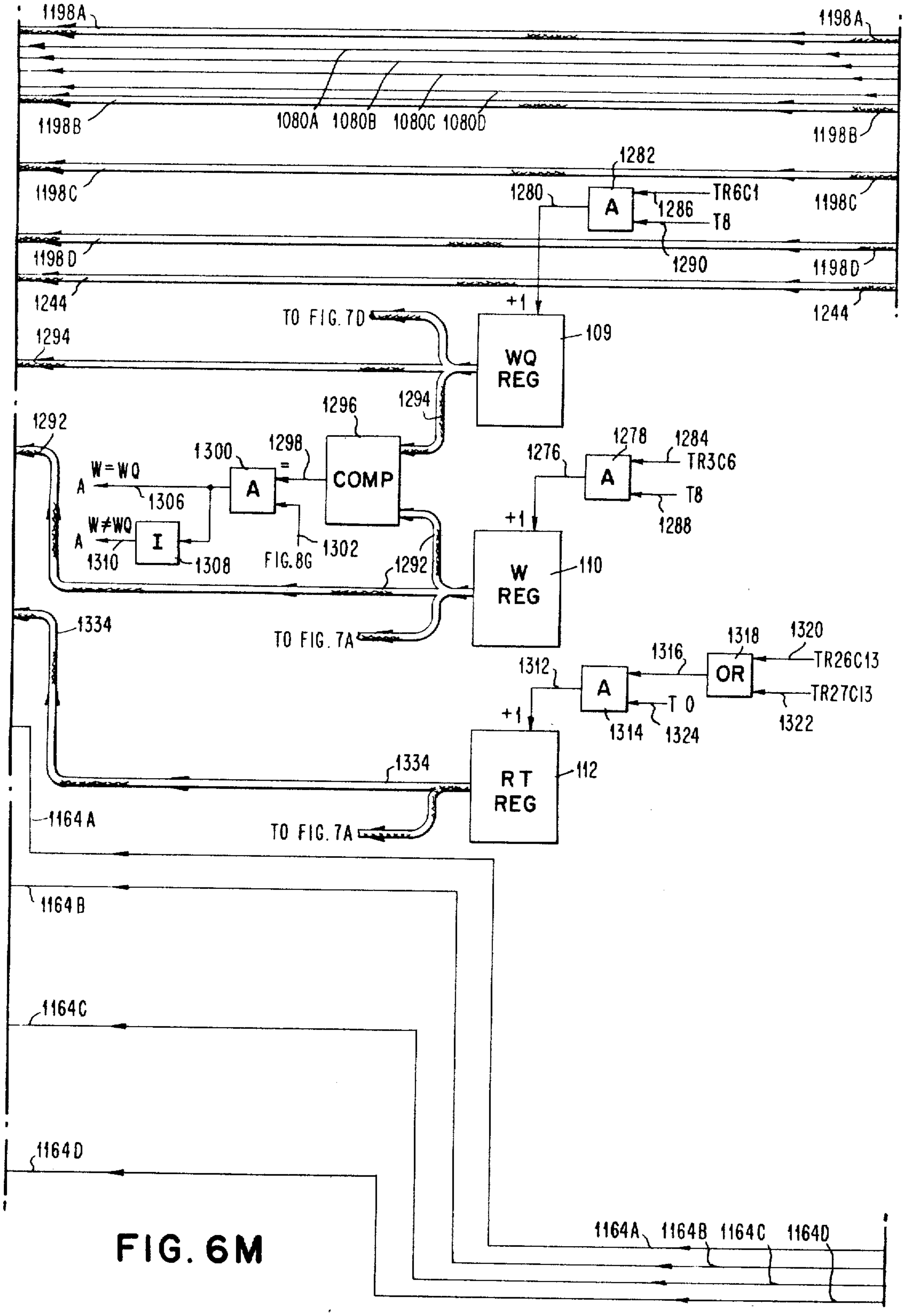
Figure 6N:
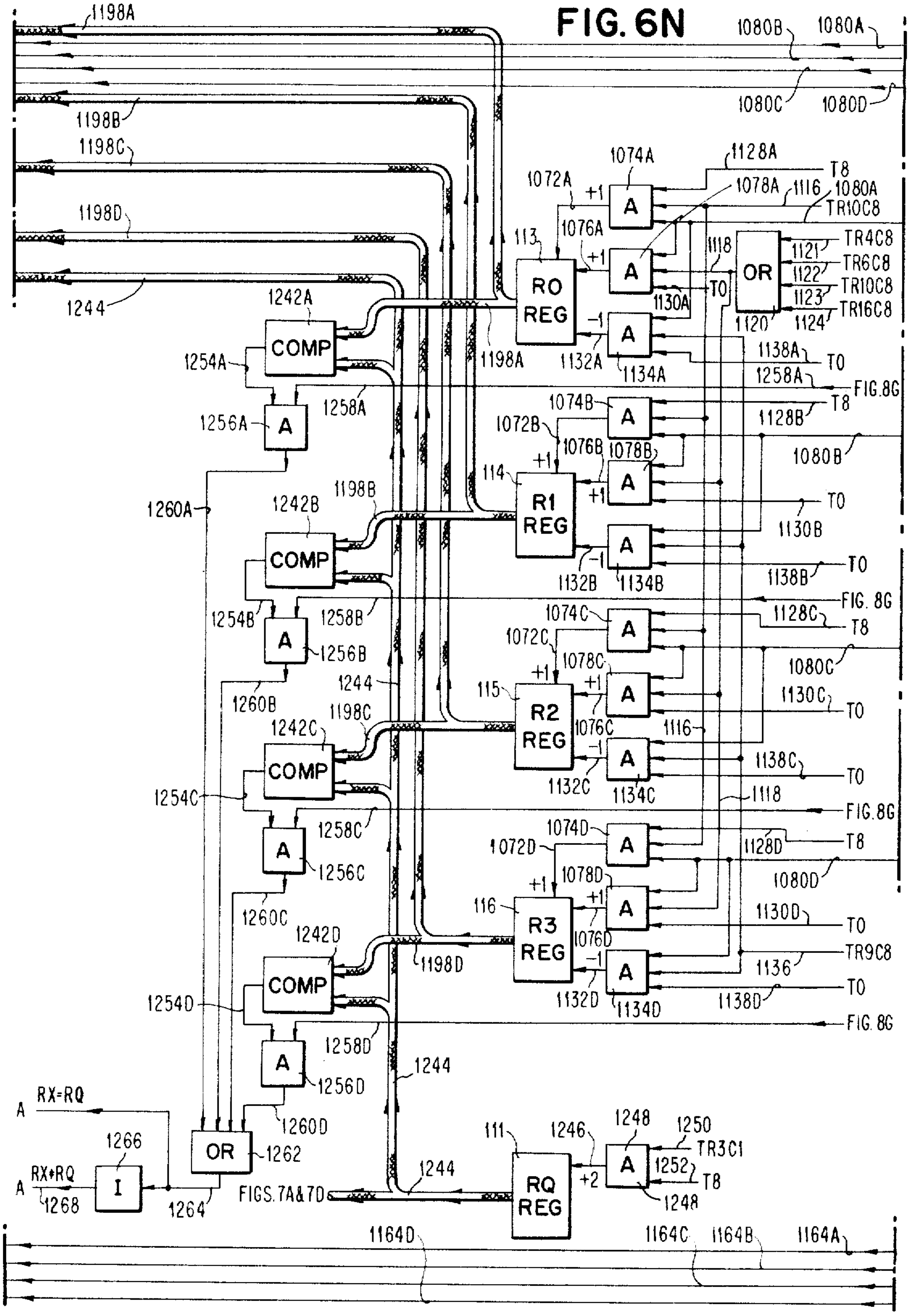
Figure 6P:
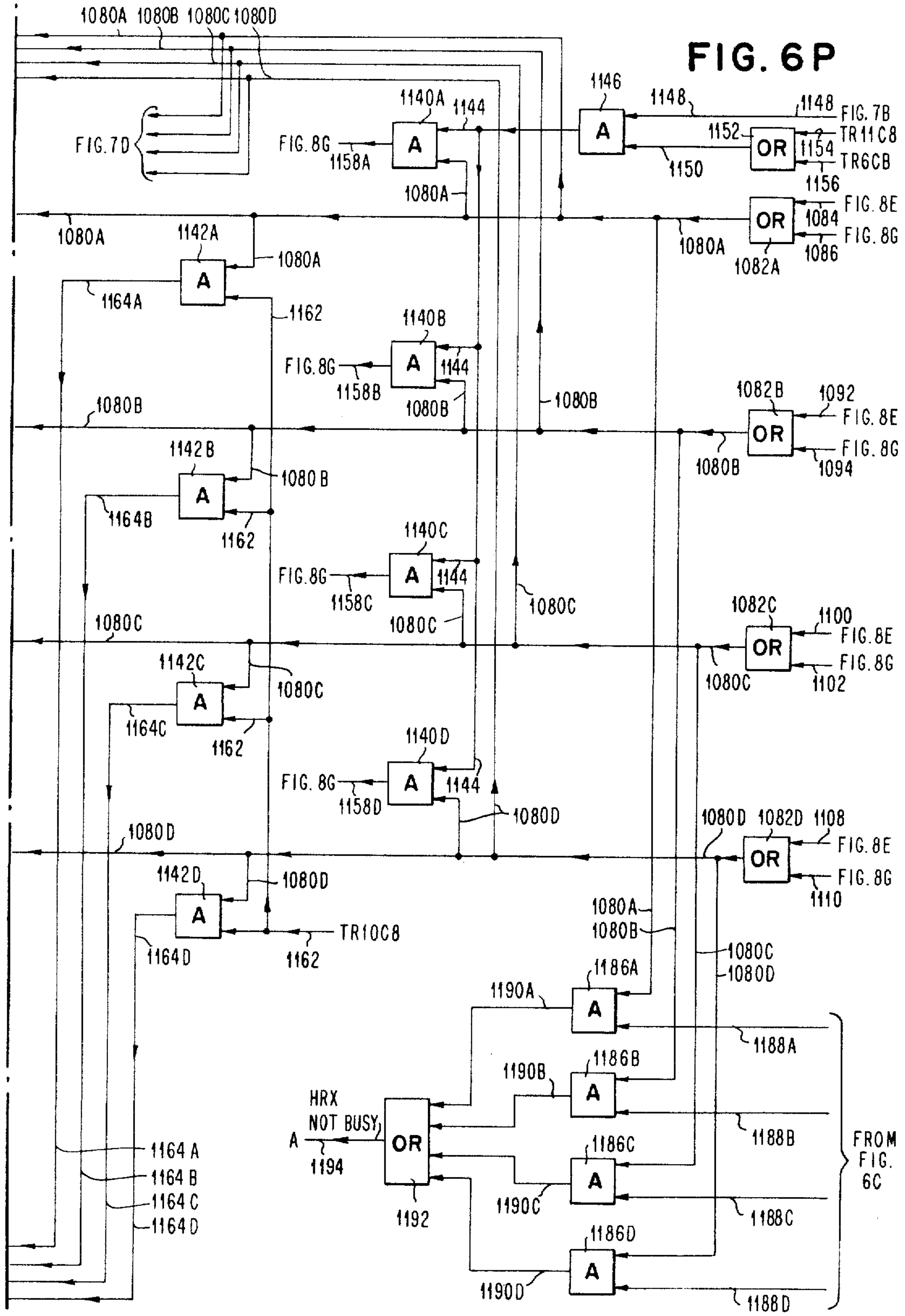

FIGS. 6A to 6N and 6P, when taken together, form a detailed block diagram of the hierarchy processor and directory shown in FIG. 2.

Figure 3:
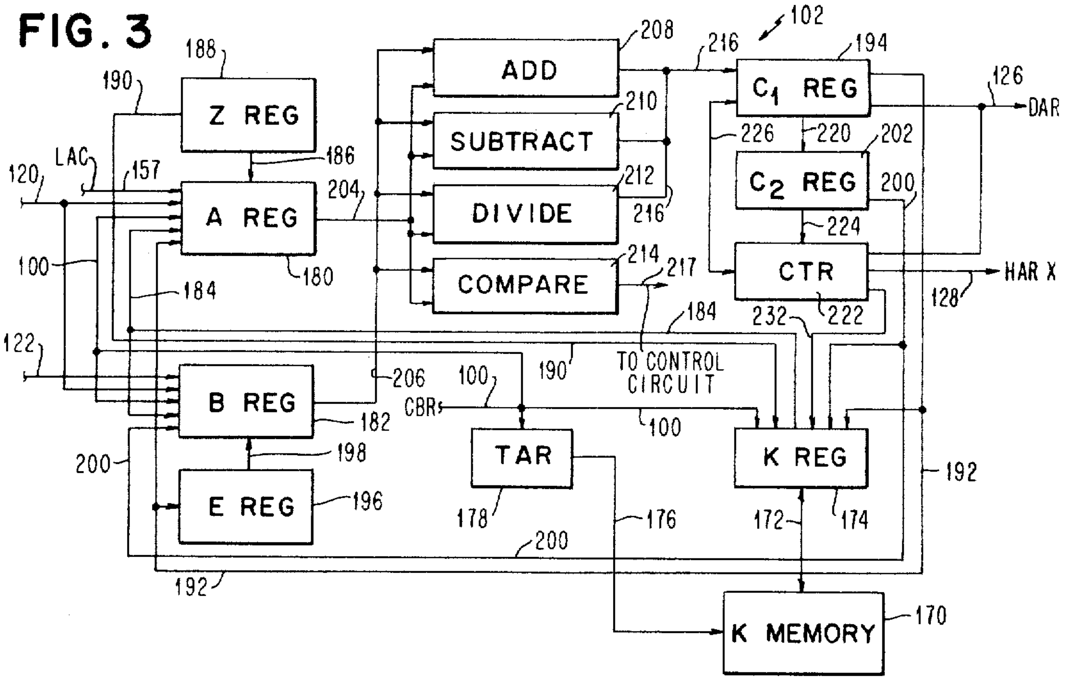
FIG. 3 is a general block diagram of the linear transform block shown in FIG. 2.
Figures 7, 7A:
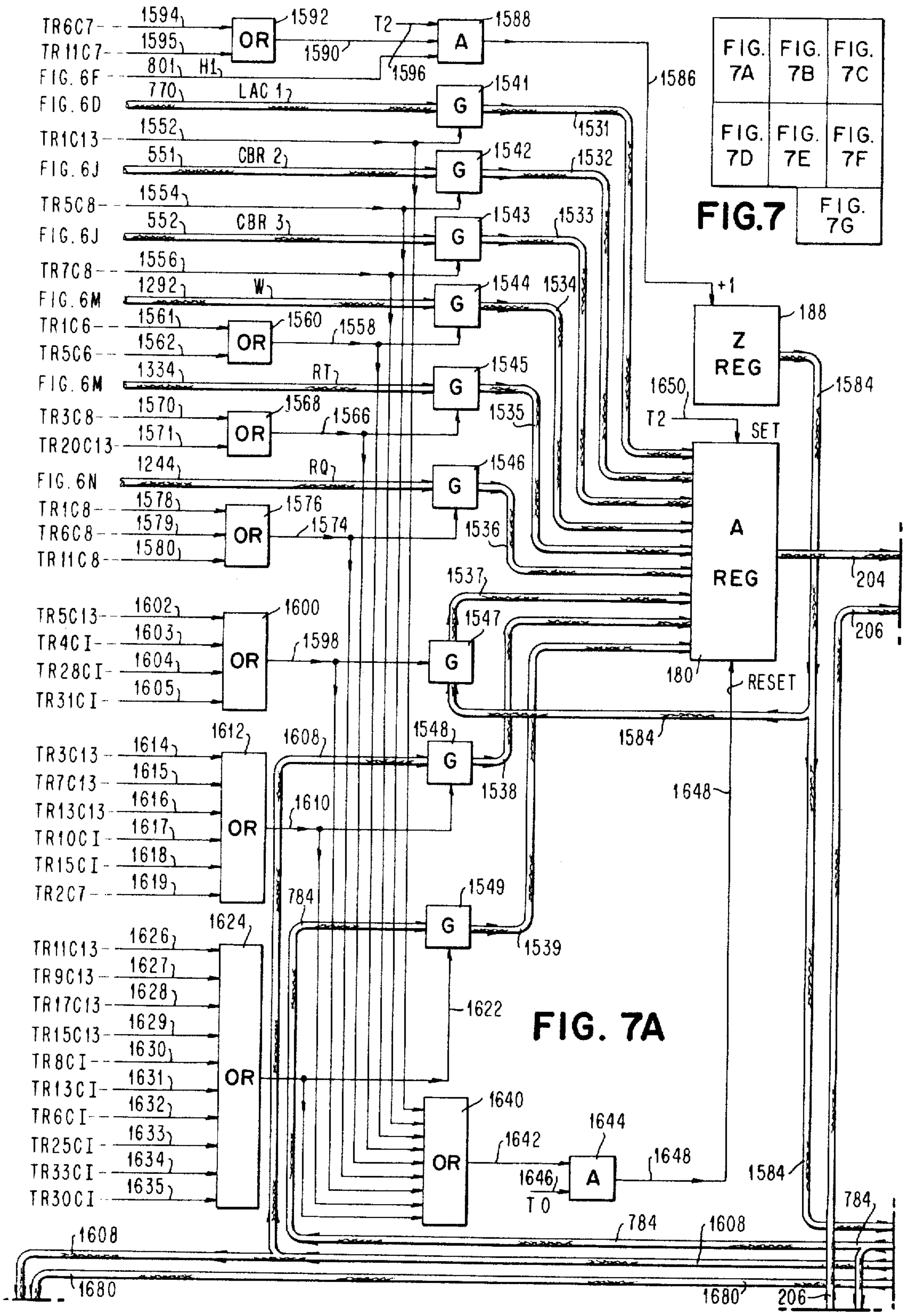

FIG. 7 is a diagram illustrating how FIGS. 7A–7G are combined to form a detailed block diagram of the linear transform circuit shown in FIG. 3.

FIG. 7A–7G, when taken together, form a detailed block diagram of the linear transform circuit shown in FIG. 3.

Figure 4:
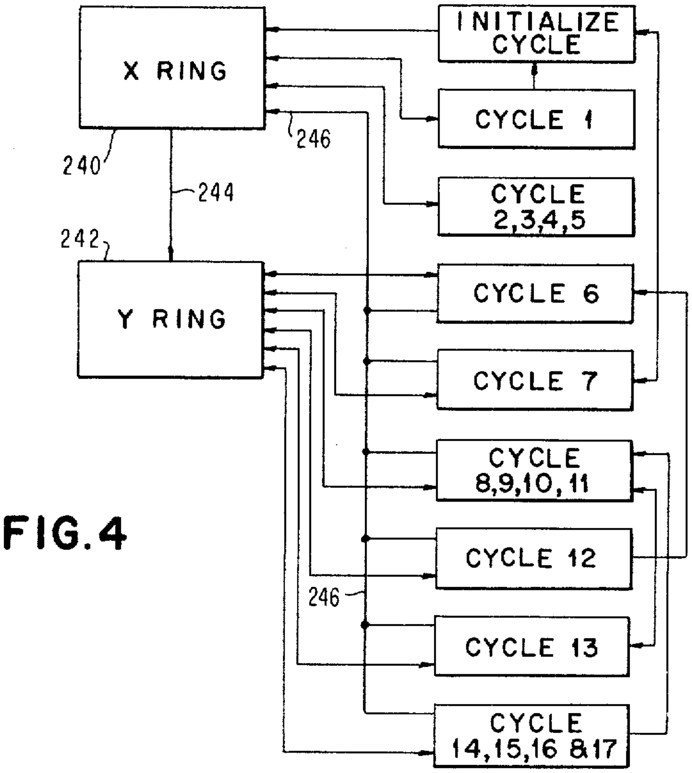
FIG. 4 is a general block diagram of the sequencing and control circuit shown in FIG. 1.
Figures 8, 8A:
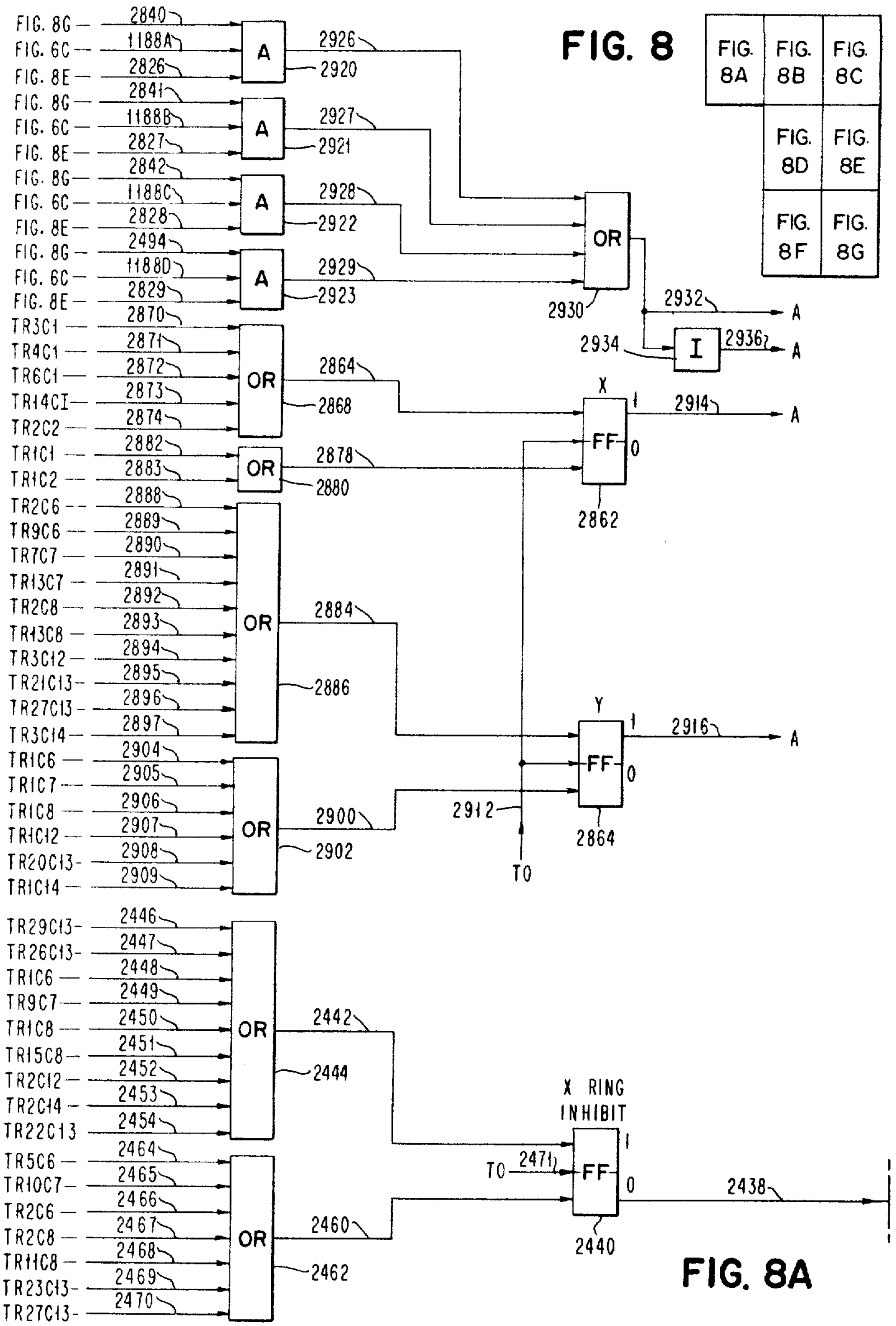

FIG. 8 is a diagram illustrating how FIGS. 8A–8G are combined to form a detailed block diagram of a portion of the control circuitry shown in FIG. 4.

FIGS. 8A–8G, when taken together, form a detailed block diagram of a portion of the control circuitry shown in FIG. 4.

FIG. 9 is a diagram illustrating the organization of the CCB (control core buffer) memory shown in FIGS. 2 and 6J.

FIG. 10 is a chart showing the control word formats for the read, write, and initialize operations.

Figure 7B:
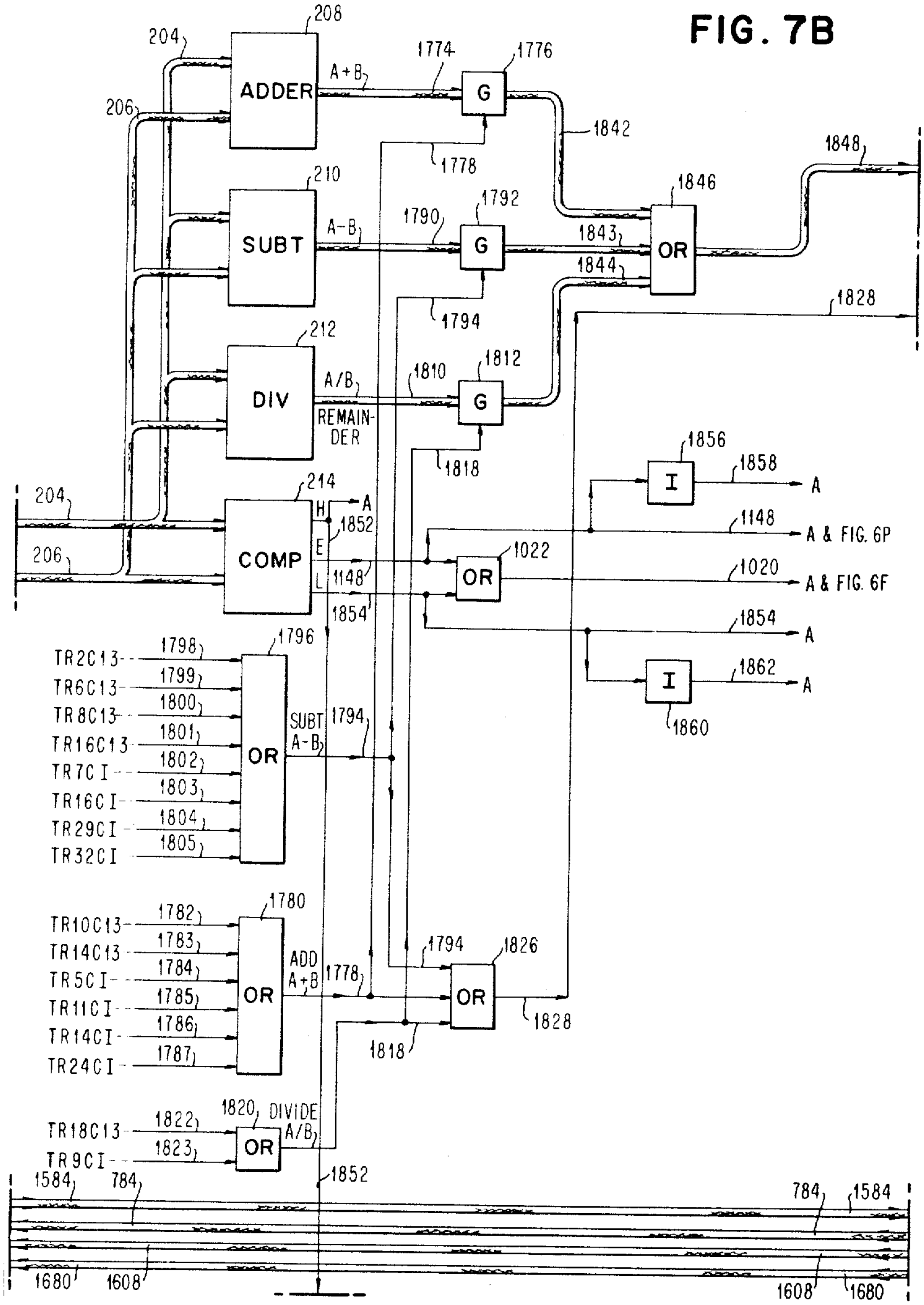
Figure 7C:
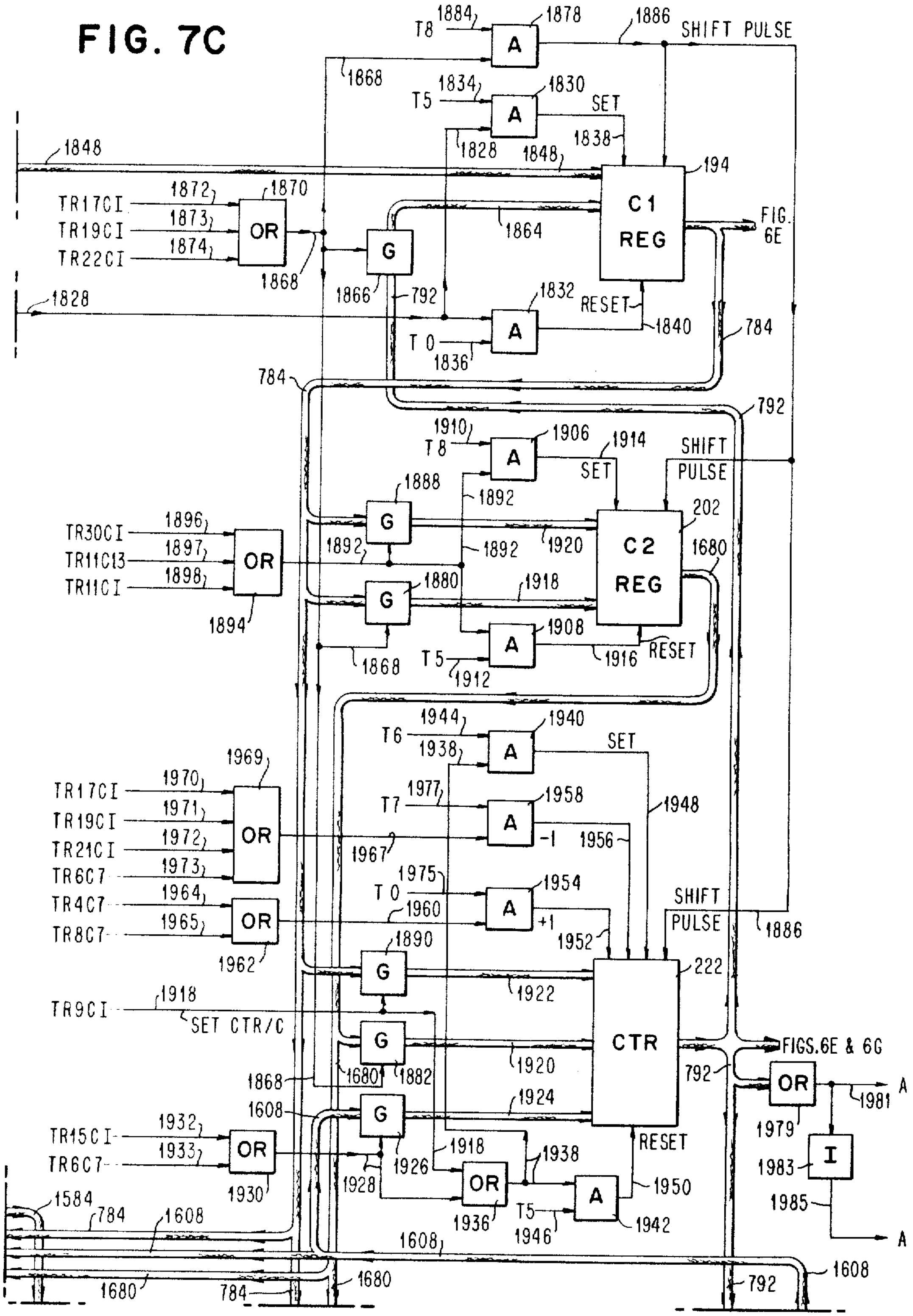
Figure 7D:
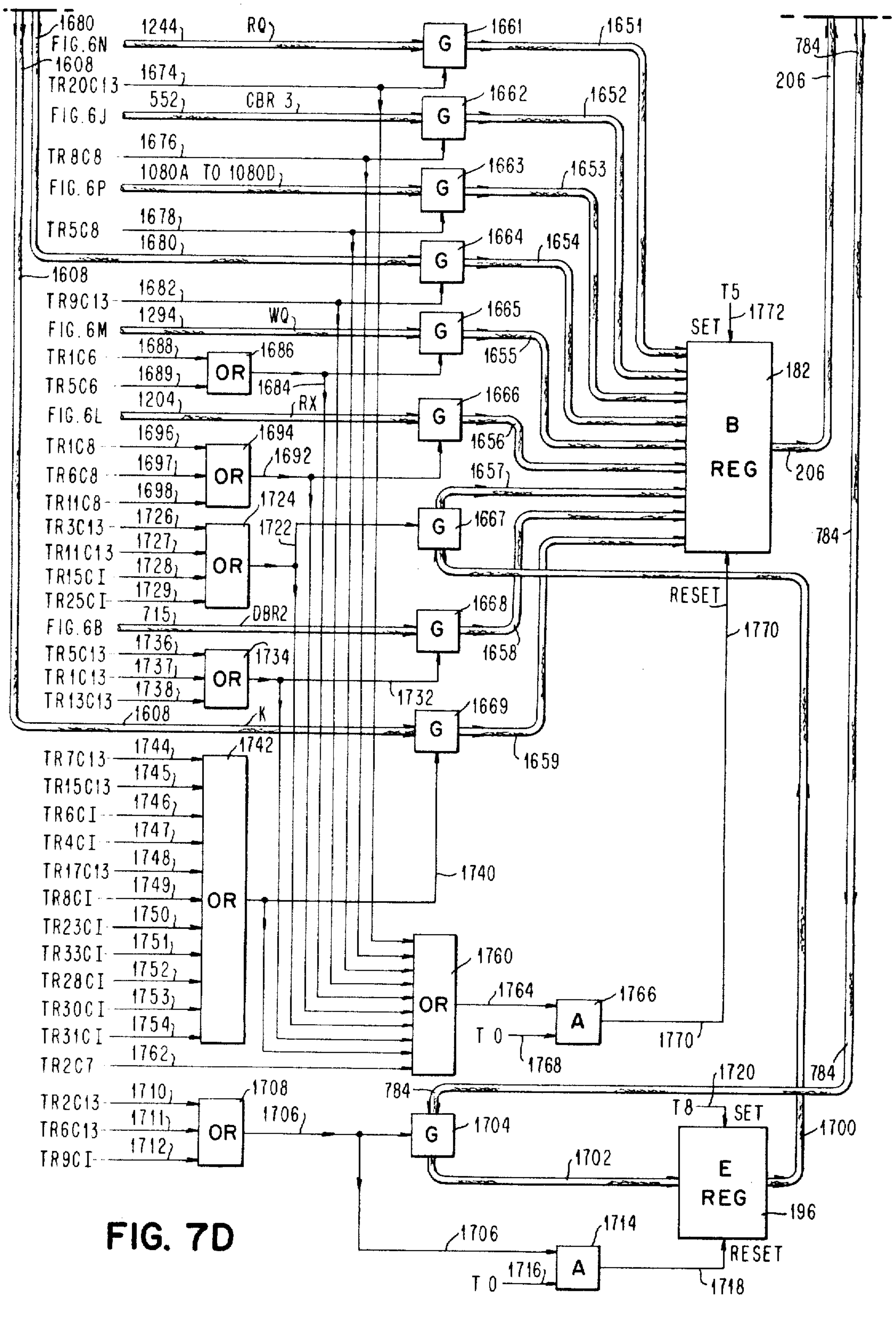
Figure 7E:
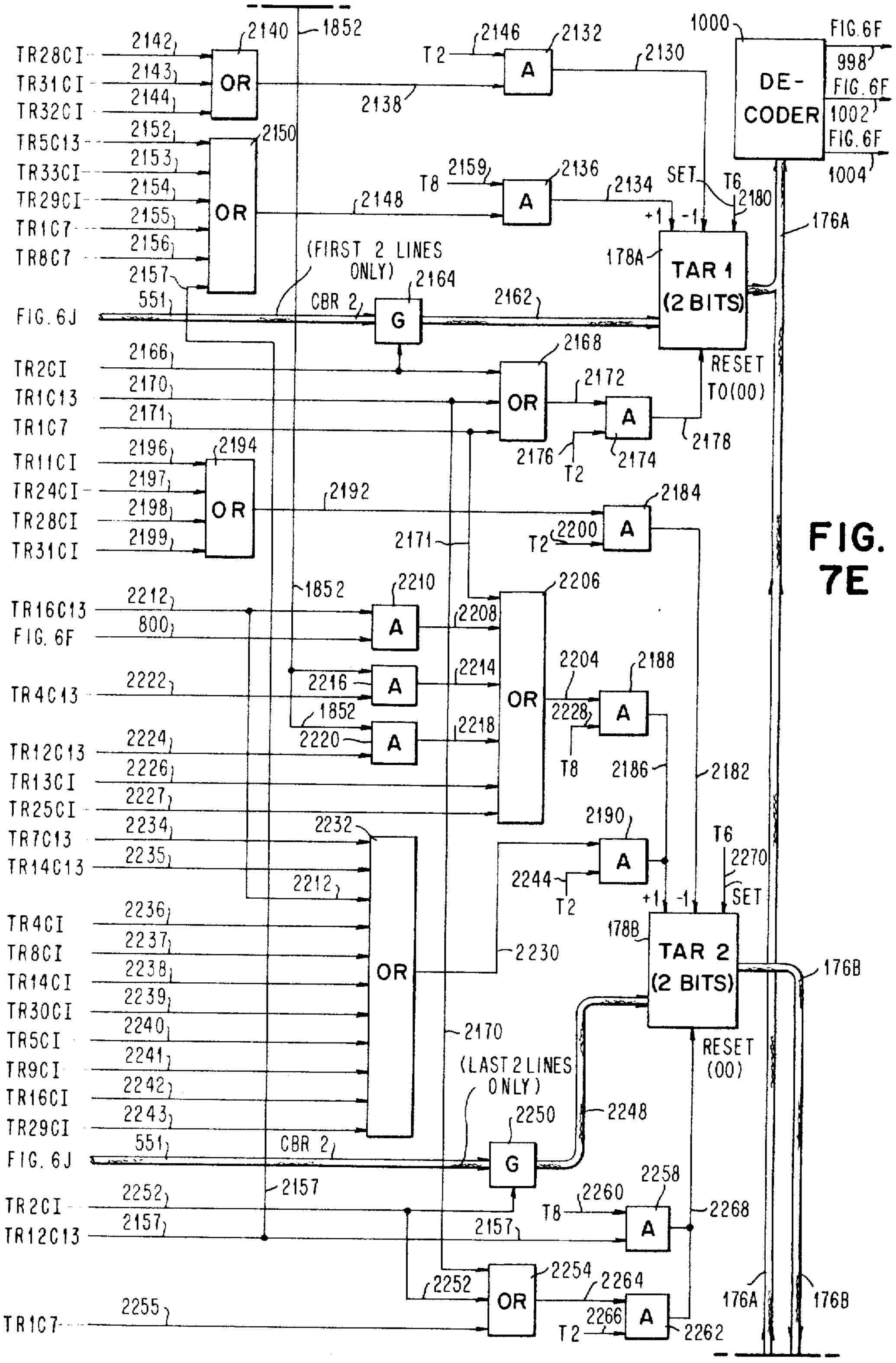
Figure 7F:
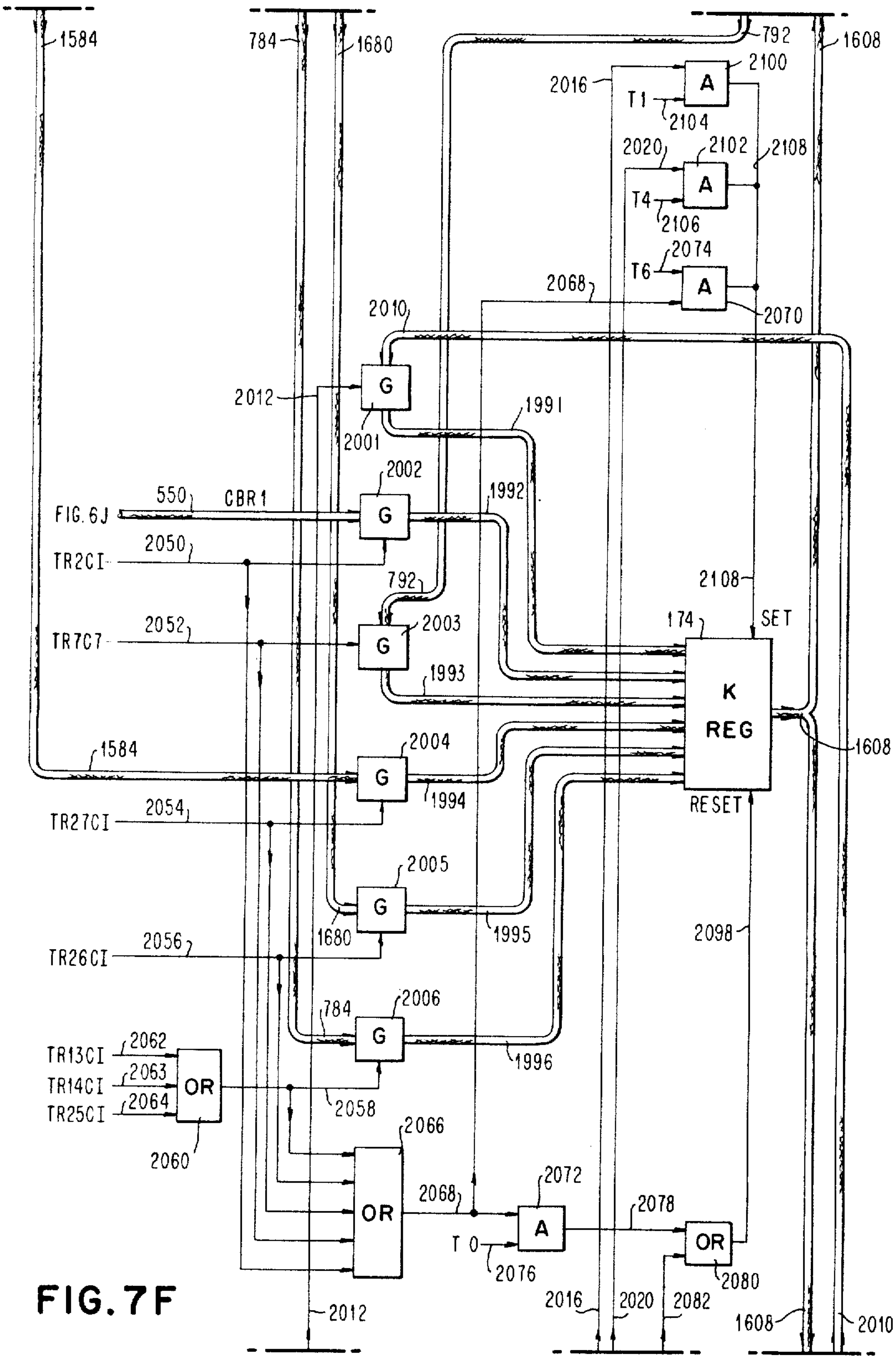
Figure 7G:
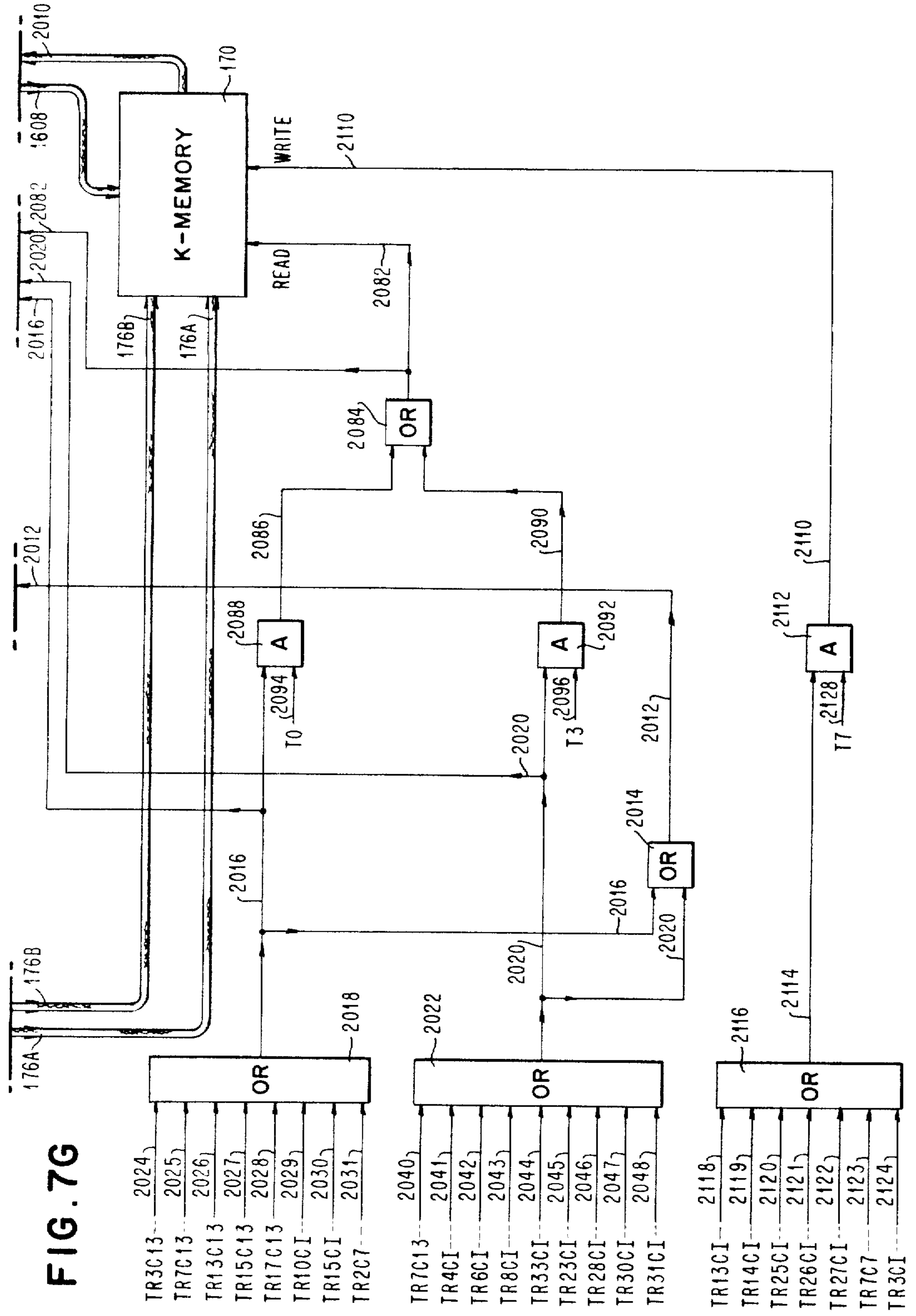
Figures 11, 13:
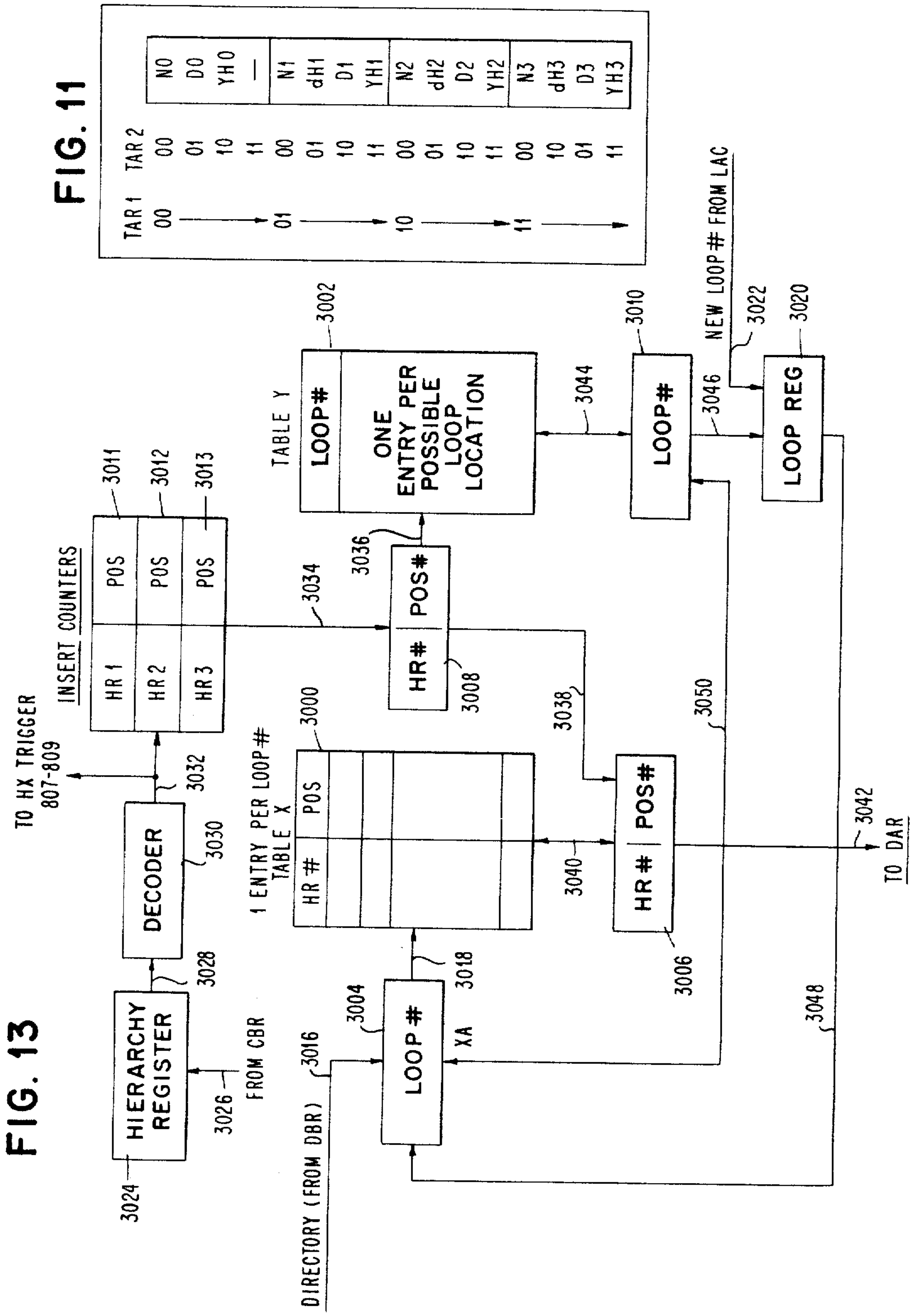

FIG. 11 is a diagram illustrating the content and organization of the K memory shown in FIGS. 3 and 7G.

Figure 12A:
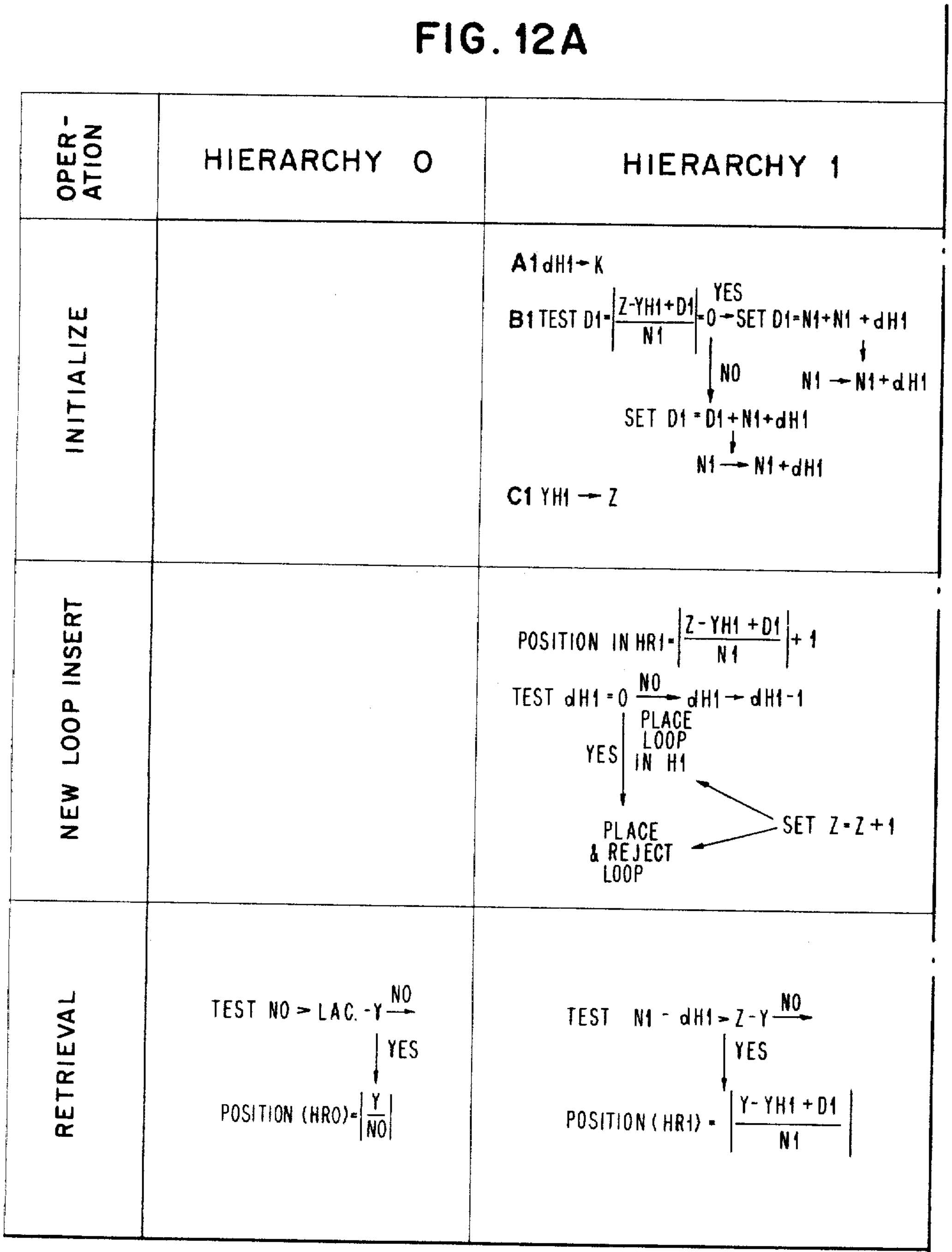
Figure 12:
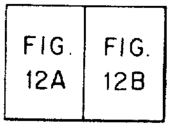
Figure 12B:
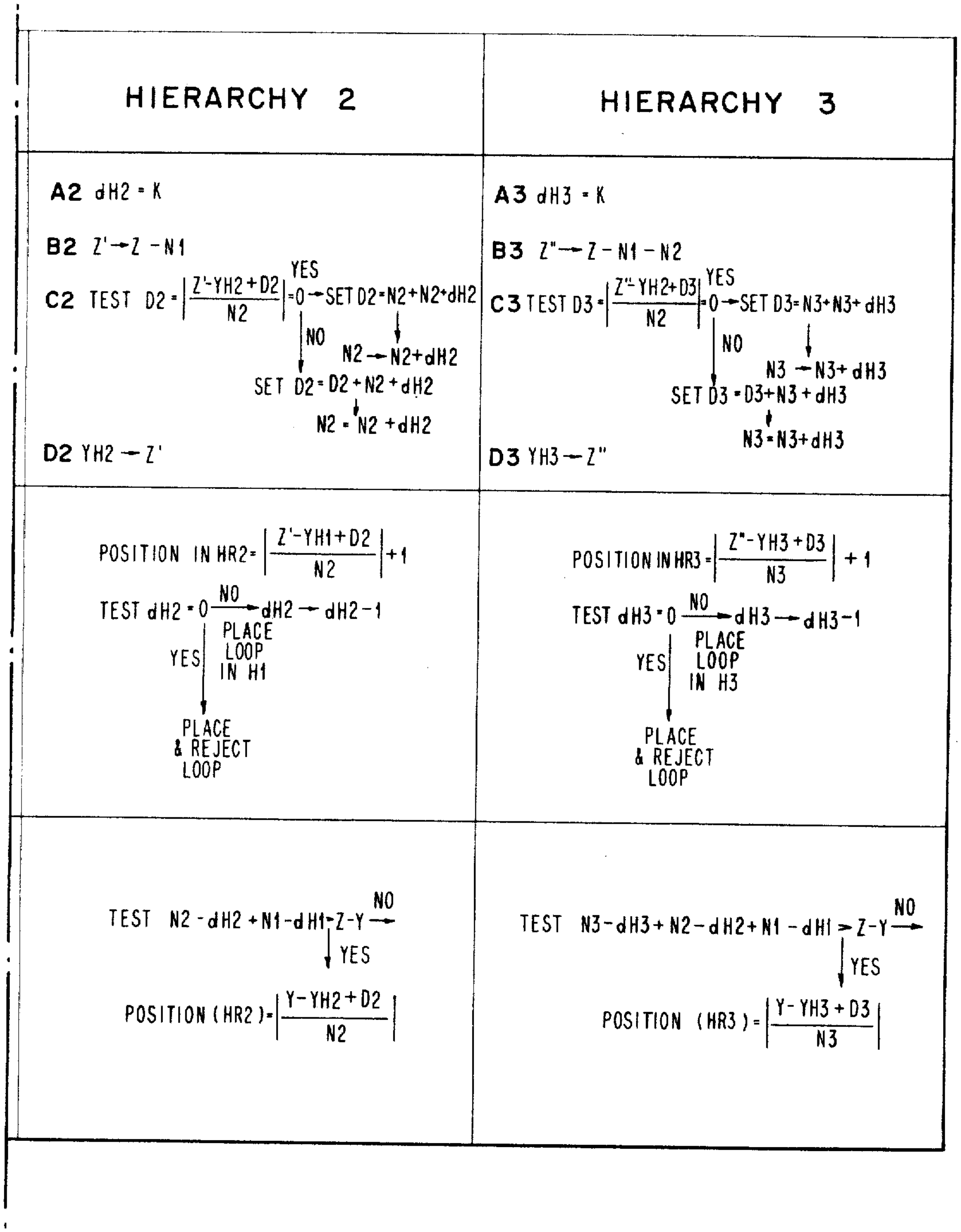

FIGS. 12A and 12B are a chart showing the equations used in the initialize loop insertion and retrieval operations.

FIG. 13 is a general block diagram of the linear transform portion of an alternative embodiment of the invention.

In addition to the figures described above, pages A1–A56 of the specification contain an appendix which shows, in chart form, the turn-on condition, the turn-off condition, the functions performed while in its ON state, and the next trigger to be turned on for each of the triggers in the portion of the control circuit not shown in FIGS. 8A–8G.

GENERAL DESCRIPTION

Figure 1:
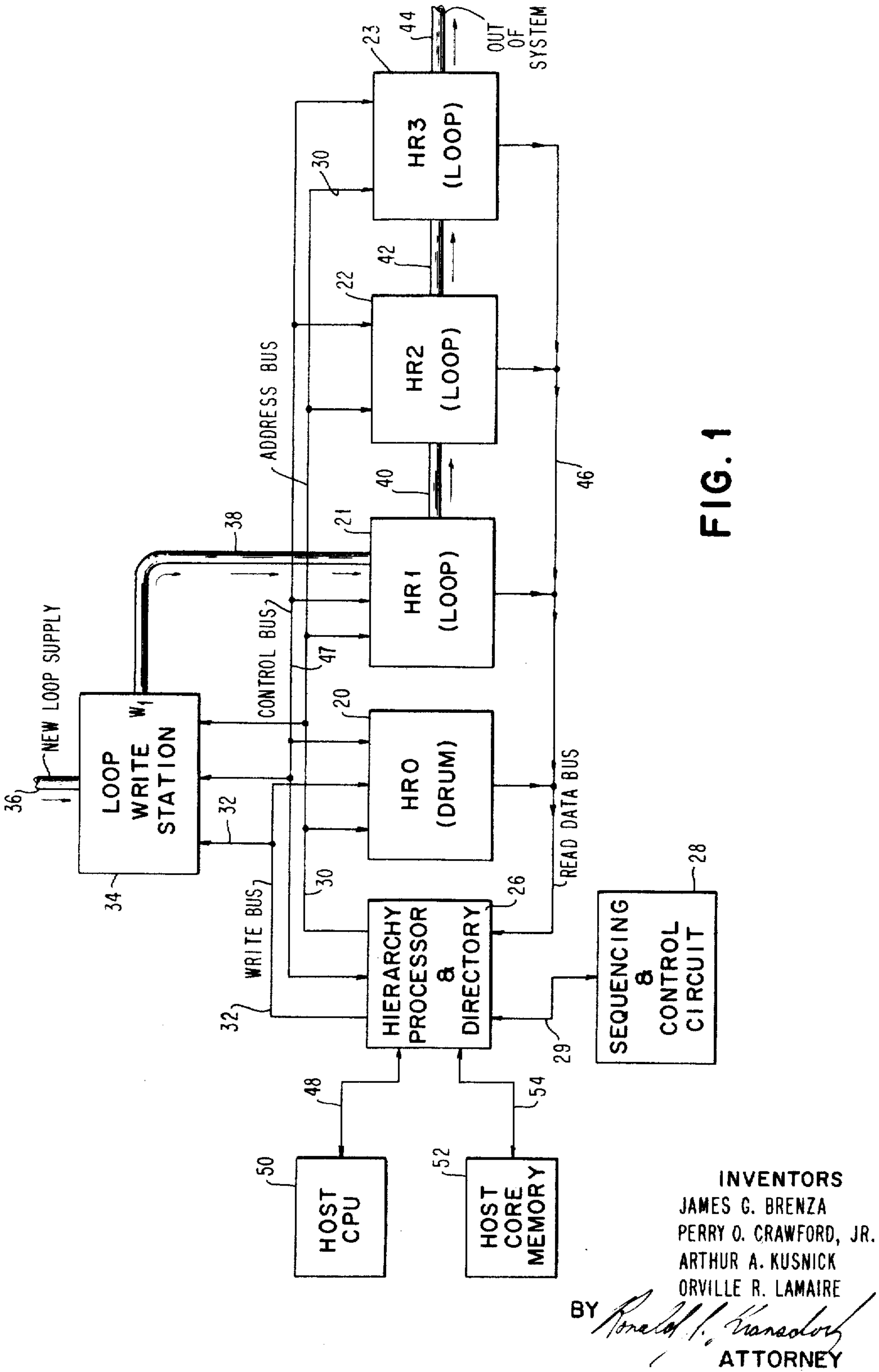
FIG. 1 is a general block diagram of a preferred embodiment of the hierarchy file storage system of this invention.

Referring to FIG. 1, it is seen that the illustrative embodiment of the invention includes four levels of hierarchy storage. The high level in the hierarchy is a magnetic drum 20. This level is generally referred to as the HR0 level. The remaining three levels of hierarchy storage 21–23 are of the type shown in co-pending application Ser. No. 333,918, entitled "Pneumatic Belt Device," filed on behalf of P. J. Badum, H. K. Baumeister, and V. Nejezchleb, and assigned to the assignee of the instant application. These hierarchy levels are generally referred to as HR1, HR2, and HR3 respectively, with HR1 being the highest order of these levels and HR3 being the lowest order. As indicated previously, the highest order level is the one having the lowest access time.

Information is stored in and read out of hierarchy storage devices 20–23 through, and under control of, hierarchy processor and directory circuit 26. This circuit, operating under control of sequencing and control circuit 28, determines where a record is stored in the system, and determines, in a manner to be described later, where a given record is in the system at any given time. Lines 29 interconnect circuits 28 and 26. Address bus 30 out of circuit 26 has signals applied to it indicating where in the system a given record is to be stored or retrieved. Write bus 32 out of circuit 26 contains information which is to be written into the system. This information is applied simultaneously to drum 20, and to a loop-write station 34. New loops are supplied to loop-write station 34 from a source (not shown) through tube 36. When a loop has been filled, it is applied through tube 38 to HR1 level 21. As will be seen later, the loop applied through tube 38 is stored in the first vacant position in HR1. If there are no vacant positions in HR1, the oldest loop in HR1 is applied through tube 40 to HR2, and the loop applied through tube 38 is stored in its position. If HR2 is full at this time, the process is repeated with the oldest loop in HR2 being transferred through tube 42 to HR3. Similarly, if HR3 is full at this time, the oldest loop in HR3 is transferred through tube 44 to an archive storage device (not shown).

Data to be read from a selected level of the hierarchy (this level being indicated by address bus 30) is applied through read data bus 46 to hierarchy processor and directory circuit 26. Signals indicating what operations are to be performed by hierarchy devices 20–23 and write station 34 and indicating to circuit 26 what operations have been performed at these devices are applied through control bus 47.

Bus 48 connects circuit 26 to host CPU50. Circuit 26 and the host CPU exchange information and instruction signals over this bus. Data and control instructions are transferred between core storage 52 of the CPU and circuit 26 over bus 54.

GENERAL OPERATION

Assume first that it is desired to write information into the hierarchy. A write instruction, which includes the record name (or other record identifier) and the address in host core storage 52 at which the record to be written is stored, is transferred through bus 54 to circuit 26. Circuit 26 knows the last address at which information was written on a loop at write station 34 and the last address at which a record was made on drum 20. It applies the next address for each of these elements to address bus 30. Circuit 26 then goes to the address indicated in the write instruction and retrieves the desired record from host core memory 52. This record is applied simultaneously by write bus 32 to write station 34 and to drum 20. The system therefore stores a record in the two highest levels of the hierarchy providing a degree of redundancy which may subsequently be used for error-checking purposes. This gives high reliability for recently used records. However, it should be noted that the information written at station W1 cannot be read until this loop has been transferred to HR1.

After the write operation has been completed, a check is made to see if the loop in write station W1 is full. If it is not, this loop is left in write station W1 and no further action is taken. If the loop is full, it is transferred through tube 38 to HR1. As indicated previously, if HR1 is full at this time, the oldest loop in HR1 is transferred through tube 40 to HR2 and the new loop stored in the position vacated in this manner. Similarly, if HR2 is full, the oldest loop in HR2 is transferred through tube 42 to HR3 and if HR3 is full, the oldest loop in HR3 is transferred out of the system through tube 44. When an entry is written in the system, the record name and a relative address for the record are stored in a directory in circuit 26 so as to allow for subsequent retrieval of data. The manner in which this is accomplished will be described later.

A read instruction applied through bus 54 to circuit 26 also includes the record name and the address in host core memory where the retrieved record is to be stored. The record name is applied to the directory in circuit 26 and a relative address retrieved which, by a series of operations to be described later, is transformed to derive the location in the hierarchy at which the desired record is presently stored. The hierarchy number, loop position, and record address on the loop are applied through address bus 30 to cause the desired record to be read out from the hierarchy in which it is stored through bus 46 to circuit 26. This record is then transferred through bus 54 to the indicated position in host core storage 52.

MORE DETAILED CIRCUIT DESCRIPTION

FIG. 2 is a more detailed block diagram of host core memory 52, the registers associated therewith, and hierarchy processor and directory circuit 26. This figure shows the major registers and elements in the circuit and the manner in which these registers and elements are interconnected but does not show any of the gating circuits for controlling the transfer of data between the registers.

Referring to FIG. 2, it is seen that information is read into and out of host core memory 52 through memory buffer register 56. Memory buffer register 56 is connected to the host core memory through lines 58. The address at which information is to be read or written in host core memory 52 is determined by signals applied through address lines 60 from memory address register (MAR) 62. Information is applied to MAR62 through lines 64 from control buffer register (CBR) 66. Information is applied to MBR56 from host core memory 52 and also from read registers 70–73. These registers will generally be referred to as registers RR0, RR1, RR2, and RR3 respectively or as RRX when referring to any of them. Information is applied to registers 70–73 through lines 46A–46D respectively. Lines 46A–46D form the read data bus 46 shown in FIG. 1. Output lines 76 from MBR are connected as a second set of inputs to CBR66 and as the information inputs to write registers 80 and 81. These registers are designated WR1 and WR2 respectively or WRX when referring to one of them generally. Output lines 32A and 32B from registers 80 and 81 respectively form write bus 32 shown in FIG. 1. Registers 70–73 and 80–81 each have the capacity to store an entire record.

CBR66 is the buffer register through which inputs to and outputs from control core buffer memory (CCB) 84 pass. Lines 86 interconnect CBR and CCB. One set of output lines from CBR66 is lines 88 which apply the operation code from a control word applied to CBR by host core memory 52 to decoder 90. Decoder 90 determines whether a read, write, or initialize operation is to be performed. Lines 92 interconnect CBR with transform (TF) register 94 and lines 96 interconnect CBR with data address register (DAR) 98. The contents of CBR are also applied through lines 100 to linear transform circuit 102. This circuit, which is shown in more detail in FIG. 3, is capable of performing various mathematical operations on data applied to it.

CCB84 is actually a queue storing device for read and write instructions. Control address register (CAR) 104 applies signals through lines 106 to determine what address in memory CCB is being accessed at any given time. A series of fixed addresses may be applied to CAR104 from circuitry 108 through lines 107. Various registers 109–117 are also capable of applying addresses to CAR104. These registers are designated WQ, W, RQ, RT, R0, R1, R2, R3, and RS respectively.

The significance of the various addresses can be more easily understood by referring to FIG. 9 which shows the address format for CCB84. The first four address positions in this memory are designated FAR0, FAR1,, FAR2, and FAR3, and always contain the control word for the record which has just been read into register RR0, RR1, RR2, or RR3 respectively. The manner in which this is assured will be seen later. The next four positions in CCB84 are likewise fixed, and are designated FAL0, FAL1, FAL2, and FAL3. The last three of these positions always contain, in a portion thereof, the old position of the last loop moved in hierarchy HR1, HR2, or HR3 (FIG. 1) respectively. The fixed position FAL0, contains an invalid address, for example, all one bits. The reason for storing an invalid address in the FAL0 position will be seen later.

For the purpose of illustration, it has been assumed that CCB supplies a seven-word write queue and a seven-word read queue. Therefore, the next seven postions in CCB are allocated to storing write instruction words. Register WQ, 109, contains the address at which a new write instruction from host core memory is to be stored. W register 110 contains the address from which the next write instruction is to be taken from CCB to be performed. WQ must therefore always contain an address either ahead of or the same as that contained by the W register. Since the write portion of the memory operates in wrap-around fashion, the address in WQ may in fact be a lower address than that in W, even though it is ahead, and when W equals WQ, it means that the write portion of the memory is either full or empty.

While a single entry word is required to store a write instruction, it can be seen from FIG. 10 that two entry words are required to store a read instruction. Therefore, a seven-word read queue requires fourteen memory addresses. As would be expected, RQ register 111 contains the address in the read region of CCB at which the next read instruction from host core memory is to be stored. R0, R1, R2, and R 3 registers 122–116 store the address following that in which the last read instruction executed for hierarchy levels HR0, HR1, HR2, and HR3 respectively was stored. This is the address at which a search for a new read instruction for the associated hierarchy level is initiated. RT register 112 stores the address of the next read instruction in CCB which is to be transformed. As will be seen later, the purpose of the transform is to derive from the record name the position in the hierarchy at which the record is presently stored. RX must be behind or equal to RT and RT behind or equal to RQ. Since the read portion of CCB is also addressed in a wrap-around fashion, when RX equals RQ it means that the read portion of CCB is either full or empty.

Output lines 120 from registers 109–117 in addition to being connected as an input to CAR104 are also connected as an input to linear transform circuit 102. The third input to linear transform circuit 102 is output lines 122 from directory buffer register (DBR) 124. Outputs from linear transform circuit 102 include lines 126 which are connected as an input to DAR98 and lines 128 which are connected as one set of inputs to hierarchy address registers 130–133. These registers are individually referred to as HAR0, HAR1, HAR2, and HAR3 respectively or are generally referred to as HARX. Output lines 30A–30D from registers 130–133 form the read portion of address bus 30 (FIG. 1). Output line 136 from DAR98 is the other input to registers 130–133.

The contents of TF register 94 are applied through lines 138 to randomizer 140. Randomizer 140 transforms the record name applied to it from TF register 94 into a bucket address and a tag which are applied through lines 142 to directory search register (DSR) 144. Randomizer 140 may, for example, be of the type shown and described in IBM Journal of Research & Development, volume VII, No. II, April 1963, pp. 121–129. The bucket address in DSR144 is applied through lines 146 as the address input to directory 148 and the tag in DSR is applied through lines 150 to DBR124. Directory 148 is a storage device such as a drum which contains the relative address for each record stored in the hierarchy system. Since randomizer 140 generates a unique bucket address for each record name applied to it, it is possible to retrieve the desired relative address for any record name applied to TF register 94 by starting a search in directory 148 at the bucket address indicated in DSR for a tag matching that in DBR.

Lines 152 interconnect directory 148 and DBR124. The final input to DBR124 are output lines 154 from loop address counter (LAC) 156. This counter always contains the relative address of the last record stored in the system. The address in LAC156 is applied through lines 157 to linear transform circuit 102 and through lines 158 to WAR1 and WAR2 registers 160 and 162. WAR1 is the address register for write station W1 (FIG. 1) and WAR2 is the address register for writing on drum 20 (HR0). Output lines 30E and 30F from registers 160 and 162 respectively form the write portion of address bus 30.

FIG. 3 shows in more detail the circuitry contained within linear transform box 102 in FIG. 2. It includes a core memory, designated K memory 170, in which various constants shown in FIG. 11 are stored. The significance of these various constants will be apparent later. Information is read out of and written into K memory 170 through lines 172 and buffer register 174. Buffer register 174 is referred to as the K register. The address accessed in K memory 170 is determined by signals applied to output lines 176 from table address register (TAR) 178.

Output line 100 from CBR66 (FIG. 2) forms an information input to TAR178, K register 174, and registers 180 and 182. Registers 180 and 182 are designated the A register and B register respectively. A second input to registers 180 and 182 is output lines 184 from K register 174. A third set of inputs to A register 180 and B register 182 is output lines 120 from registers 109–117 (FIG. 2). A fourth input to A register 180 is output line 157 from LAC156 (FIG. 2). A fifth input to A register 180 is output line 186 from Z register 188. Z register 188 always contains the number of the last loop stored in hierarchy level HR1. Output lines 190 from Z register 188 form another input to K register 174. The final input to A register 180 is output lines 192 from register 194 which register is designated C1 register. Lines 192 are also connected as an input to E register 196. Output lines 198 from E register 196 are connected as the fourth input to B register 182. A fifth input to B register 182 is output lines 122 from DBR register 124 (FIG. 2). The final input to B register 182 is output line 200 from C2 register 202.

Output lines 204 and 206 from A register 180 and B register 182 respectively are connected as the inputs to add circuit 208, subtract circuit 210, divide circuit 212, and compare circuit 214. The sum output from adder 208, the difference output from subtracter 210, and the remainder output from divider 212, are connected through lines 216 to form one set of inputs to C1 register 194. Outputs 217 from compare circuit 214 are connected, as will be seen later, to various places in sequencing and control circuit 28 (FIG. 1).

The contents of C1 register 194 are applied to C2 register 202 through lines 220. The contents of C2 register 202 are applied to counter 222 through lines 224. C1 register 194 and counter 222 are interconnected through lines 226. Output lines 192 from C1 register 194, 200 from C2 register 202, and 232 from counter 222 are connected as the remaining sets of inputs to K register 174. Output lines 126 from C1 register 194 and counter 222 form a set of inputs to DAR98 (FIG. 2). Output lines 128 from CTR222 form a set of inputs of HARX registers 130–133 (FIG. 2).

GENERAL DESCRIPTION OF CONTROL CIRCUIT AND OPERATION

Sequencing and control circuit 28 (FIG. 1) is shown in more detail in FIG. 4. It includes two sequencing rings 240 and 242 designated the X ring and Y ring respectively. These two sequencing circuits operate more or less independently of each other, the only interaction occurring when X ring 240 applies a signal to line 244 to cause the setting of a particular trigger in the Y ring in a manner and for a reason to be described later, and when, at various times in their cycles, the cycle 6–17 circuits apply signals to line 246 to inhibit or to uninhibit the operation of the X ring.

X ring 240 controls the sequencing of cycle 1 and cycles 2–5. During cycle 1, a new instruction is received in CBR66 (FIG. 2) from host core memory 52, and a determination is made in decoder 90 (FIG. 2) as to whether it is a read, write, or initialize instruction. If it is a read or write instruction, a determination is made as to whether the appropriate portion of CCB84 is full, and if it is not full, the instruction word is stored at the address indicated by the appropriate register WQ109 or RO111.

If during cycle 1 it is found that CPU50 has issued an initialize command to the hierarchy storage system, the control circuit branches into an initialize cycle. An initialize operation is a rather unusual one which occurs when it is determined that, for one reason or another, the capacity of a particular level in the hierarchy must be increased. It involves up-dating various constants in K memory 170 (FIG. 3) so that during subsequent retrieval operations the determined relative address will be transformed into the proper hierarchy position. The theory and operation of the initialize cycle will be described later.

From cycle 1, the circuit proceeds to cycles 2, 3, 4, and 5. These cycles are identical except that each is performed for a different one of the RRX registers 70–73 (FIG. 2). During this cycle, the record stored in the appropriate RRX register is transferred to the address in host core memory indicated by the instruction stored at fixed address FARX (FIG. 9). When this operation is complete, a trigger is set in Y ring 242 under control of line 244.

While the above operations are going on, cycles 6–17 are being performed under control of the Y ring. During cycle 6, a write operation is performed. This involves determining if there is a write instruction in the write portion of CCB84 (FIG. 2 and FIG. 9), transferring the record to be written from the indicated position in host core memory 52 to WR1 and WR2 registers 80 and 81 (FIG. 2) transferring the contents of LAC156 to WAR1 and WAR2 160 and 162, putting the record name in TF94, randomizing it, applying the resulting bucket address in the directory and the resulting tag to DSR144 storing the tag and the relative address at which the record is being written in DBR124, making the appropriate entry in directory 148, writing the record on the drum (HR0) (FIG. 1) and on the loop in write station W1, determining if the loop in write station W1 is full, and initiating a new loop loading operation if the loop in W1 is full.

During cycle 7, the new loop load operation is completed. This involves the moving of loops to subsequent levels of the hierarchy when the levels being loaded are full. During this cycle, appropriate entries are also made in fixed addresses FAL1, 2, and 3 of CCB84 (FIG. 9).

Cycles 8, 9, 10 and 11 are record read cycles during which a determination is made as to whether there is a read instruction in the read portion of CCB84 for hierarchy levels HR0, HR1, HR2, or HR3 respectively, whether the read instruction has been transformed, whether a loop has been moved in the particular level of the hierarchy since the transform (necessitating the computation of a new hierarchy position) and applying a read signal to the appropriate level in the hierarchy to cause the desired record to be read into the appropriate RRX register. Various other operations which are performed during this cycle will be described during more detailed portions of the description.

Cycle 12 is a write cycle during which a determination is made as to whether there is a write instruction in the write portion of CCB84 (FIG. 9). If there is, the control circuit returns to cycle 6. The reason that this cycle is necessary is because of an idiosyncrasy of the circuit whereby the circuit cannot get back into cycle 6 by ordinary means once a determination is made that the write queue is empty. Between cycle 6 and cycle 9, a cycle 1 operation may have occurred under control of the X ring causing a write instruction to be stored in the queue.

Cycle 13 is the cycle during which the record name portion of the read instruction stored at the address in CCB indicated by the RT register 112 (FIG. 2) is applied to randomizer 140 and its relative address obtained from directory 148. A record retrieval subcycle is then initiated during which this relative address is acted upon by linear transform circuit 102 in a manner to be described later to obtain the hierarchy number, loop position, and record address on the loop where the record is presently being stored. For the present discussion, it suffices to say that the linear transform circuit generates the desired information by subtracting the relative address obtained from the directory from the relative address presently being assigned stored in LAC and then using this figure and the known capacity of each level of the hierarchy to generate the desired absolute address. This information is then read back into the second word of the entry for the particular instruction. RT is then incremented to the next read instruction entry.

Cycles 14, 15, 16, and 17 are similar to cycle 12 and are performed for the same reason. They determine whether there are any read instructions for hierarchy levels HR0, HR1, HR2, or HR3 respectively in the read portion of CCB. If so, the circuit branches back to the appropriate cycle 8, 9, 10, or 11. The reason that this cycle is required is due to a similar idiosyncrasy in the circuit which prevents the circuit from normally returning to cycles 8, 9, 10, or 11 once a determination is made that the read queue is empty.

DETAILED DESCRIPTION OF HIERARCHY STORAGE DEVICES

Figure 5:
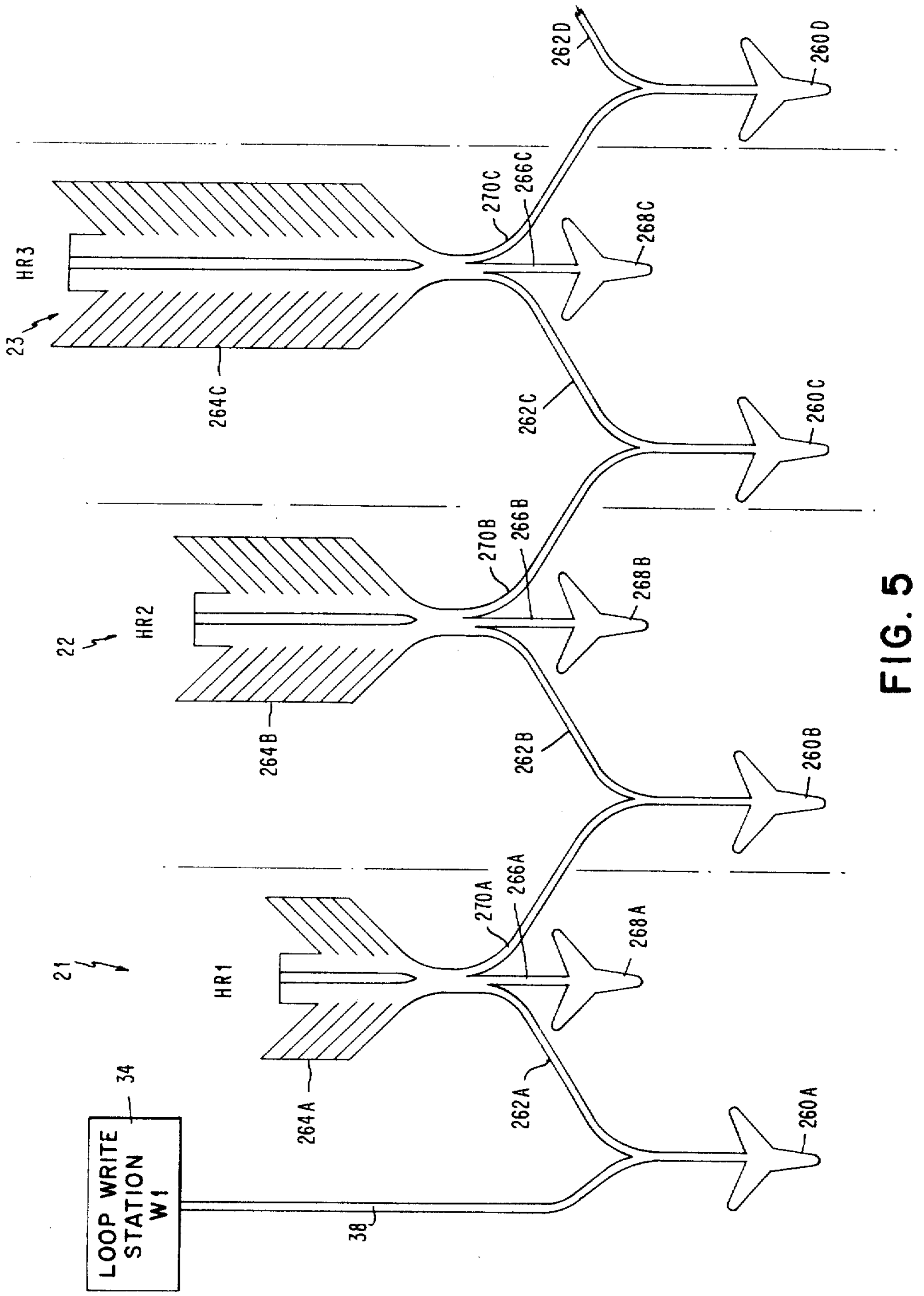
FIG. 5 is a more detailed diagram of some of the hierarchy storage elements employed in the preferred embodiment of the invention.

The HR0 level of the hierarchy is a magnetic drum of standard variety and requires no further description. As indicated previously, the remaining levels of the hierarchy are magnetic loop storage devices of the type generally shown in co-pending application Ser. No. 333,918. The manner in which the elements are interconnected to achieve the desired hierarchy storage system is shown in FIG. 5. Referring to FIG. 5, it is seen that loop-write station W1 is connected by a tube 38 to buffer chamber 260A of hierarchy level HR1. Tube 262A connects buffer chamber 260A to loop storage bin 264A of hierarchy level HR1. The capacity of this bin could, for example, be equal to the number of records applied to the system during a single day. Storage bin 264A is connected by tube 266A to read-write chamber 268A. Tube 270A connects storage bin 264A to buffer chamber 260B of hierarchy level HR2. The buffer chamber 260, storage bin 264, and read-write chamber 268 for hierarchy levels HR2 and HR3 are similarly interconnected. Tube 270C connects storage bin 264C of hierarchy level HR3 to buffer chamber 260D. From buffer chamber 260D, loops are transferred through tube 262D to, for example, an archive storage device outside the system. Tubes 270A–270C perform a function which is substantially the same as that performed by tubes 40, 42, and 44 respectively in FIG. 1. The capacity of storage bin 264B of hierarchy level HR2 is greater than that of storage bin 264A, having, for example, sufficient capacity to store the records applied to the system during a full week; and storage bin 264C has a capacity greater than that of storage bin 264B, having, for example, the capacity to store a full month's records.

As indicated in the beforementioned co-pending application Ser. No. 333,918, a selected loop is withdrawn from its storage position in storage bin 264, transferred to a chamber 260 or 268 and caused to conform to the shape of the chamber by applying pressure to the rear of the selected storage position and applying vacuum to the extremities of the chamber. A capstan may, for example, be supplied to rotate a loop in the chamber, and chambers 268 would also have a read head positioned adjacent to one of the legs. Conversely, when it is desired to transfer a loop from a chamber 260 or 268 to a selected position in a storage bin 264, pressure is applied to the extremities of the chamber to partially collapse the belt, and vacuum is applied to the rear of the selected storage position causing the belt to be drawn from the chamber into the storage position. The valving circuits for accomplishing these transfers are shown in the beforementioned co-pending application and is not repeated here. In the description to follow, when a signal is generated to cause a particular transfer to occur, it is assumed that this signal is applied to suitable valves to cause the indicated transfer to occur.

DETAILED DESCRIPTION OF HIERARCHY PROCESSOR AND DIRECTORY

FIGS 6A–6P, when taken together, form a detailed block diagram of the hierarchy processor and directly shown in less detailed form in FIG. 2.

Referring FIG. 6I, it is see nthat the circuit includes a clock 310 having ten output lines 300–309. This is a continuously running clock which applies signals to lines 300–309 in succession and then repeats the cyle starting with a signal on line 300 again. The signals on lines 300–309 are designated T0, T1, T2, T3, T4, T5, T6, T7, T8, and T9 respectively. No attempt has been made to connect these various clock lines to the points in the circuit where they are employed. Instead, at each point in the circuit where one of these timing signals is employed, the proper T number appears.

Referring again to FIG. 6I, it is seen that host core memory 52 has address information applied to it through lines 60 from memory address register (MAR) 62. Information is transferred into host core memory through lines 312 from memory buffer register (MBR) 56. Lines 312 are also connected as the information inputs to gate 314 (FIG. 6H). The conditioning input to gate 314 is output line 316 from AND gate 317. The inputs to AND gate 317 are lines 318 and 319. Line 318 is also a conditioning input to AND gate 320, the other input to this AND gate being line 324. A signal is applied to line 324 at T0 time. Output line 328 from AND gate 320 connected to reset registers WR1 and WR2.

A signal appears on line 318 when the fourth trigger in cycle 6 (designated TR4C6) is in its ON state. While the triggers employed in the various cycles are not shown in any figure, they are listed in the appendix starting in column A–1 of the specification in order by cycle. In the appendix, the turn-on and turn-off condition for each of the triggers is stated, and the functions performed while the trigger is in its ON state are also stated. In the figures, numerous lines are shown as going to A. The signal on these lines is applied to partially condition a trigger in the appendix to be either set or reset. A signal appears on output line 319 from host CPU50 when a full record to be written has been transferred from host core memory 52 (FIG. 6I) to MBR.

Output lines 332 from gate 314 are connected as the information inputs to WR1 and WR2 registers 80 and 81. Lines 336 is connected as the set input to the WR1 register and lines 338 is connected as the set input to the W2 register. A signal is applied to lines 336 and 338 at T8 time. Registers WR1 and WR2, and the remaining registers in the circuit, are of a type which have the information applied to their data input lines set into them when a signal is applied to their set line, but which cause no change in the data stored in them if there is no data on the data input line when a signal is applied to their set line. Output lines 32A and 32B from registers WR1 and WR2 respectively are the write bus lines which are applied to loop-write station W1 (FIG. 6C) and the write head of HR0 drum 20 respectively.

Host CPU50 (FIG. 6H) has three inputs from the circuit. The first is line 321. A signal appears on line 321 when trigger TR30C13 is in its ON state. A signal on line 321 indicates to the CPU that a record cannot be found in directory 148 (FIG. 6B). After the fact has been noted, the CPU generates an output signal on line 1064. The other inputs to the CPU are output lines 322 and 323 from AND gates 325 and 326 respectively. The inputs to AND gate 325 are lines 327 and 329 and the inputs to AND gate 326 are lines 330 and 331. Signals appear on lines 327 and 330 when triggers TR2C2 and TR4C6 respectively are in their ON states and signals appear on lines 329 and 331 at T4 time. The signal on line 322 tells the CPU that there is a full record in MBR56 (FIG. 6I) and causes this record to be stored in host core memory 52 in a manner not shown. A signal on line 323 causes the CPU to transfer a record in a manner not shown from host core memory 52 to MBR56 and to generate an output signal on line 319 when the transfer is completed. The output from the CPU will be described in conjunction with the elements they are connected to.

MBR56 (FIG. 6I) has three sets of information inputs. The first are output lines 340 from gate 342, the second are output lines 344 from gate 346 and the third are output lines 347 from gate 349. The information inputs to gate 346 are output lines 348 from the sense amplifiers of host core memory 62. The conditioning input to gate 346 is line 350. A signal appears on line 350 when the first trigger of the initialize cycle (TR1CI) is in its ON state. Line 350 is also connected as a conditioning input to AND gates 352 and 354 and as one input to OR gate 355. The other input to AND gate 352 is line 356. A signal appears on line 356 at T3 time. Output line 358 from AND gate 352 is connected to cause a read operation to be performed by host core memory 52. The other input to AND gate 354 is line 360. A signal appears on line 360 at T5 time. Output line 362 from AND gate 354 is connected as one of the set inputs to MBR56. Output line 363 from OR gate 355 is connected as one input to AND gate 365. The other input to AND gate 365 is line 367. A signal appears on line 367 at T0 time. Output line 364 from AND gate 365 is connected as the reset input to MBR.

The information inputs to gate 342 are RRX output lines 366 from OR gate 368 (FIG. 6H). The conditioning input to gate 342 is line 370. A signal is applied to line 370 when TR2C2 is in its ON state. Line 370 is also connected as the other input to reset-OR gate 355 and as an input to AND gate 372. The other input to AND gate 372 is line 374. A signal is applied to line 374 at T2 time. Output line 376 from AND gate 372 is the other set input to MAR.

The four sets of inputs to OR gate 368 (FIG. 6H) are output lines 378 from gate 380, output lines 382 from gate 384, output lines 386 from gate 388, and output lines 390 from gate 392. The information inputs to gates 380, 384, 388, and 392 are output lines 94–97 from RRX registers 70–73 respectively. The conditioning inputs to gates 380, 384, 388, and 392 are lines 1171–1174 respectively. A signal appears on line 1171 when cycle 2 trigger 1176 (FIG. 8B) is in its ON state. A signal appears on line 1172 when cycle 3 trigger 1177 is in its ON state. A signal appears on line 1173 when cycle 4 trigger 1178 is in its ON state, and a signal appears on line 1174 when cycle 5 trigger 1179 is in its ON state. As will be seen later, triggers 1176, 1177, 1178, and 1179 are in their ON states during cycles 2, 3, 4, and 5 respectively. Records are applied to registers 70–73 through read-bus lines 46A–46D respectively from hierarchy levels HR0–HR3 (FIG. 6C).

The information inputs to gate 349 (FIG. 6I) are output lines 550 from CRR1 66A (FIG. 6J). The conditioning input to gate 349 is line 406. A signal appears on line 406 when trigger TR30C13 is in its ON state. Referring again to FIG. 6J, it is seen that some of the output lines 312 from MBR56 are also connected as information inputs to gates 408 and 409. The conditioning input to these gates is line 412. A signal appears on line 412 when TR2CI is in its ON state. Line 412 is also connected as one input to OR gates 414 and 415. Output lines 420 and 421 from gates 408 and 409 respectively are connected as the one set of information inputs to registers 66A and 66B respectively. Registers 66A–66B are two of the buffer registers for CCB and are designated CBR1 and CBR2. The remaining buffer register, 66C, is designated CBR3. Output lines 425 and 426 from OR gates 414 and 415 respectively and output line 427 from OR gate 416 are connected as conditioning inputs to AND gates 430–432 and 435–437 respectively. The other inputs to AND gates 430–432 are lines 440–442 respectively. A signal is applied to lines 440–442 at T1 time. The other inputs to AND gates 435–437 are lines 445–447 respectively. A signal is applied to lines 445–447 at T0 time. Output lines 450–452 from AND gates 0–32 are connected as one set input to registers CBR1–CBR3 respectively. Output lines 455–457 from AND gates 435–437 are connected as one input to OR gates 460–462. Output lines 465–467 from OR gates 460–462 are connected as the reset inputs to registers CBR1–CBR3 respectively.

A second set of information inputs to registers CBR1–CBR3 are output lines 470 from GATE 472. The information inputs to gate 472 are output lines 474 from the sense amplifiers of CCB84. The conditioning input to AND gate 472 is output line 476 from OR gate 478. The inputs to OR gate 478 are lines 480–486. A signal is applied to line 480 when TR1C2 is in its ON state, a signal to line 481 when TR3C6 is in its ON state, a signal to line 482 when TR4C8 is in its ON state, a signal to line 483 when TR7C8 is in its ON state, a signal to line 484 when TR9C8 is in its ON state, a signal to line 485 when TR22C13 is in its ON state, and a signal to line 486 when TR14C8 is in its ON state. Output line 476 from OR gate 478 is also connected as a conditioning input to AND gates 490 and 492. The other input to AND gate 490 is line 494. A signal appears on line 494 at T3 time. Output line 496 from AND gate 490 is connected to cause a read cycle of CCB84 and as the other input to reset-OR gates 460–462. The other input to AND gate 492 is line 498. A signal is applied to line 498 at T6 time. Output line 500 from AND gate 492 is connected as another set input to registers CBR1–CBR3.

Additional information inputs to CBR1–CBR3 are output lines 502, 503, and 504, from gates 507, 508, and 509 respectively. Output lines 510 from an instruction register (not shown) in CPU50 (FIG. 6H) divide to form the information inputs to gates 507–509. The conditioning input to gates 507–509 is line 512. A signal appears on line 512 when TR1C1 is in its ON state. Line 512 is also one input to set-reset OR gates 414–416.

Another information input to CBR1 is output lines 514 from gate 516. The information inputs to gate 516 are output line 518 from TF register 94 (FIG. 6A). The conditioning input to gate 516 is line 520. A signal appears on line 520 when TR29C13 is in its ON state. The signal on line 520 is also applied to set-reset OR gate 414.

The final information input to CBR1 is output lines 522 from gate 524. The information inputs to gate 524 are output lines 526 from DAR3 register 98C. The conditioning input to gate 524 is line 528. A signal appears on line 528 when TR26C13 is in its ON state. Line 528 is also connected as an input to set-reset OR gate 414 and as one input to OR gate 530. The other input to OR gate 530 is line 532. A signal appears on line 532 when TR9C7 is in its ON state. Output line 534 from OR gate 530 is connected as one input to set-reset OR gates 415 and 416 and as a conditioning input to gates 536 and 538. The information inputs to gate 536 are output lines 540 from DAR1 register 98A (FIG. 6E) and the information inputs to gate 538 are output line 542 from DAR2 register 98B. Output lines 544 and 546 from gates 536 and 538 respectively are connected as the final data inputs to CBR2 and CBR3 respectively.

Output lines 550–552 from CBR1–CBR3 are connected as the data inputs to CCB84 and as three of the inputs to linear transform circuit 102 (FIGS. 3 and 7A–7G). The remaining input to CCB84 is line 554 from AND gate 556. A signal on line 554 causes CCB to be set to its write mode. One input to AND gate 556 is output line 558 from OR gate 560. The inputs to OR gate 560 are lines 561–565. A signal appears on line 561 when trigger TR3C1 is in its ON state. A signal appears on line 562 when trigger TR6C1 is in its ON state. A signal appears on line 563 when trigger TR9C7 is in its ON state. A signal appears on line 564 when trigger TR26C13 is in its ON state and a signal appears on line 565 when trigger TR10C8 is in its ON state. The other input to AND gate 556 is line 568. A signal appears on line 568 at T3 time.

In addition to the connections already indicated, output line 550 from CBR1 is also connected as the information input to gate 570 (FIG. 6E) and as the information input to gate 572 (FIG. 6A). In addition to the connections already mentioned, output line 551 from CBR2 is connected as the information inputs to gate 574 (FIG. 6I) and the first four of these lines are connected as the information inputs to gate 576 (FIG. 6E). In addition to the connections previously mentioned output line 552 from CBR3 is connected as the information input to decoder 90 and as the information input to gate 578 (FIG. 6E). Decoder 90 generates output signals on lines 580, 581, or 582, depending on whether the signals applied to it are the code for a write operation, a read operation, or an initialize operation. As the A's on output lines 580–582 indicate, signals on these lines are used to condition triggers in the appendix to be set and reset. The signals on lines 580–582 are used primarily during cycle 1 of the operation. Decoder 90 is of a type such that once an input is applied to it, it continues to generate an output on the appropriate output lines 80–82 until a reset signal is applied to it through line 584. A signal is applied to line 584 when TR14CI is in its ON state.

The conditioning input to gate 574 (FIG. 6I) is output line 586 from OR gate 588. The inputs to OR gate 588 are lines 590, 591, and 592. A signal is applied to line 590 when trigger TR1CI is in its ON state. A signal is applied to line 591 when trigger TR4C6 is in its ON state, and a signal is applied to line 592 when trigger TR2C2 is in its ON state. Output lines 596 from gate 574 are connected as the data input to MAR62. Line 586 is also connected as one input to AND gate 598. The other input to AND gate 598 is line 600. A signal appears on line 600 at T0 time. Output line 602 from AND gate 600 is the reset input to MAR. The set input to MAR is line 604. A signal appears on line 604 at T1 time.

The other input to gates 570, 576, and 578 (FIG. 6E) is line 606. A signal is applied to line 606 when trigger TR7C8 is in its ON state. Output lines 610, 611, and 612 from gates 576, 578, and 570 respectively are connected as one set of information inputs to DAR1, DAR2, and DAR3 respectively. Line 606 is also connected as one input to OR gates 615, 616, and 617. Output lines 620, 621, and 622 from OR gates 615, 616, and 617 respectively are connected as one input to AND gates 625, 626, and 627 respectively. The other input to AND gates 625, 626, and 627 are lines 630–632 respectively. A signal appears on lines 630–632 at T0 time. Output lines 635–637 from AND gates 625–627 are connected as the reset inputs to DAR1–DAR3 respectively. Lines 640–642 are connected as the set inputs to DAR1–DAR3 respectively. A signal appears on lines 640–642 at T1 time.

Referring now to FIG. 6A, it is seen that the conditioning input to gate 572 is output line 646 from OR gate 648. The inputs to OR gate 648 are lines 650, 651, and 652. A signal appears on line 650 when trigger TR4C6 is in its ON state. A signal appears on line 651 when trigger TR14C8 is in its ON state, and a signal appears on line 652 when trigger TR22C13 is in its ON state. Output lines 656 from gate 572 are connected as the data input to TF register 94. Line 646 is also connected as one input to AND gate 658. The other input to AND gate 658 is line 660. A signal appears on line 660 at T0 time. Output line 662 is connected as the reset input to TF register 94. The set input to TF register 94 is line 664. A signal appears on line 664 at T8 time.

In addition to being connected as an input to CBR1, output lines 518 from TF register 94 are also connected as the information input to randomizer 140. The start input to randomizer 140 is output line 666 from OR gate 668. The inputs to OR gates 668 are lines 670 and 671. A signal appears on line 670 when trigger TR5C6 is in its ON state and a signal appears on line 671 when trigger TR23C13 is in its ON state.

When randomizer 140 has completed transforming the data applied to it, it generates an output signal on line 674 which is used during cycles 6 and 10 of the operation. The information outputs from the randomizer are applied through lines 676 as the information inputs to gates 678 and 680. The conditioning input to gates 678 and 680 is output line 682 from OR gate 684. The inputs to OR gate 684 are lines 686 and 687. A signal appears on line 686 when trigger TR8C6 is in its ON state and a signal appears on line 687 when trigger TR24C13 is in its ON state. Output lines 690 from gate 678 are connected as the data input to directory search register (DSR) 1, and output lines 692 from gate 680 are connected as the data input to DSR2. Line 682 is also connected as a conditioning input to AND gate 694. The other input to AND gate 694 is line 696. A signal appears on line 696 at T0 time. Output line 698 from AND gate 694 is connected as the reset input to DSR1 and DSR2. The set input to DSR1 is line 700. The set input to DSR2 is line 702. A signal appears on lines 700 and 702 at T1 time.

Output lines 704 and 706 from DSR1 and DSR2 respectively are connected as the tag and bucket address inputs respectively to directory 148 (FIG. 6B). Lines 704 are also connected as the information inputs to gate 708. A directory read operation is initiated by a signal applied to line 710, and a directory write operation is initiated by a signal applied to line 712. A signal is applied to line 710 when TR25C13 is in its ON state and a signal is applied to line 712 when TR9C6 is in its ON state. The information inputs to directory 148 are output lines 714–716 from DBR1–DBR3 register 124A–124C.

When directory 148 has completed a write operation, it generates an output signal on line 720 which is applied to condition directory-busy trigger 722 (FIG. 6B) to be reset. Line 724 is connected to condition trigger 722 to be set to its ON state. A signal appears on line 724 when trigger TR4C6 is in its ON state. The set input to trigger 722 is line 726. A signal appears on line 726 during T0 time. Trigger 722, and the other triggers in the circuit are set or reset only in response to the coincident occurrence of a signal on their set line (line 726 for trigger 722) and a signal on either their set condition line or reset condition line. A signal applied to the set line or to either of the conditioning lines at any other time is ineffective to alter the state of the trigger. Output line 728 from the OFF side of trigger 722 indicates that the directory is not busy and is used during cycles 6 and 8 of the operation.

A signal is applied to output line 730 from the directory when a directory read operation has been completed. The signal on line 730 is utilized during cycle 10 of the operation.

The outputs from the sense amplifiers of directory 148 are applied through lines 732 to form the information inputs to gates 734, 735, and 736. The conditioning input to gates 734–736 is line 740. A signal appears on line 740 when trigger TR28C16 is in its ON state. Output lines 742–744 from gates 734–736 are connected as one set of data inputs to DBR registers 124A–124C respectively. Line 740 is also connected as one of the inputs to OR gate 746. Output line 748 from OR gate 746 is connected as one of the inputs to AND gate 750, the other input to this AND gate being line 752. A signal appears on line 752 at T0 time. Output line 754 from AND gate 750 is connected as the reset input to DBR1–DBR3. The set inputs to DBR1–DBR3 are lines 756–758 respectively. A signal appears on line 756–758 at T8 time.

The other data input to DBR1 is output lines 760 from beforementioned gate 708. The other data input to DRB2 is output lines 762 from gate 764 and the other data input to DBR3 is output lines 766 from gate 768. The information inputs to gate 764 are output lines 770 from LAC1 register 156A (FIG. 6D) and the information inputs to gate 768 are output lines 772 from LAC2 register 156B. The conditioning input to gates 708, 764, and 768 is line 774. Line 774 is also connected as the second input to OR gate 746. A signal appears on line 774 when trigger TR8C6 is in its ON state.

In addition to the connection as the information input to directory 148 previously mentioned, output lines 715 from DBR2 are also connected as one set of inputs to linear transform circuit 102 (FIG. 7D). Output lines 716 from DBR3 are connected as the information inputs to gate 776. The conditioning input to gate 776 is line 778. A signal appears on line 778 when trigger TR19C13 is in its ON state. Output lines 780 from gate 776 are connected as the other set of data inputs to DAR3. Line 778 is also connected as the other input to reset-OR gate 617, as the second input to reset-OR gate 616, and as the conditioning input to gate 782. The information inputs to gate 782 are output lines 784 from C1 register 194 (FIG. 7C). Output lines 786 from gate 782 are connected as a second set of data inputs to DAR2. The third set of data inputs to DAR2 are output lines 788 from gate 790. The information inputs to gate 790 are output lines 792 from counter 222 (FIG. 7C). The conditioning input to gate 790 is line 794. A signal is applied to line 794 when trigger TR8C7 is in its ON state. Line 794 is also connected as a final input to OR gate 616.

The second data input to DAR1 is output lines 796 from gate 798. The information inputs to gate 798 are output lines 800–803 from the ON side of H triggers 806–809 (FIG. 6F) respectively. The conditioning input to gate 798 is output line 812 from OR gate 814. The inputs to OR gate 814 are lines 816 and 817. A signal appears on line 816 when trigger TR8C7 is in its ON state, and a signal appears on line 817 when trigger TR18C13 is in its ON state. Line 812 is also connected as an input to reset–OR gate 615. The final input to OR gate 615 is line 820. A signal appears on line 820 when trigger TR29C13 is in its ON state.

Output lines 540 from DAR1 are individually designated 540A–540D respectively. A signal on line 540A means that a desired record is in HR0, a signal on line 540B means that a desired record is in HR1, a signal on line 540C means that a desired record is in HR2, and a signal on line 540D means that a desired record is in HR3. Lines 540A–540D are connected as one set of inputs to AND gates 822–825 respectively. The conditioning input to AND gates 822–825 is line 828. A signal appears on line 828 when trigger TR13C8 is in its ON state. Output lines 830–833 from AND gates 822–825 respectively are connected as part of control bus 47 (FIG. 1) to hierarchy levels HR0 (FIG. 6C), HR1, HR2, and HR3 respectively to cause the record stored in the hierarchy at the address indicated on the address bus to be read out into the approximate RRX register 70–73.

Lines 540B–540D are also connected as one set of inputs to AND gates 836–838. Output line 1084 from the ON side of trigger 1088 (FIG. 8D) is connected as one input to AND gate 835. The other input to AND gates 835–838 is output line 840 from OR gate 842. The inputs to OR gates 842 are lines 844 and 846. A signal appears on line 844 when trigger TR9C7 is in its ON state and a signal appears on line 846 when trigger TR7C8 is in its ON state.

Output lines 847–850 from AND gates 835–838 respectively are connected to cause the fixed adresses FAL0–FAL3 respectively to be set into control address register (CAR) 104 (FIG. 6K). Lines 848–850 are also connected as three of the inputs to OR gate 852. Output line 854 from OR gate 852 is connected as one input to AND gate 856. The other input to AND gate 856 is line 858. A signal appears on line 858 at T0 time. Output line 860 from AND gate 858 is connected as the reset input to CAR104. Line 862 is the set input to CAR. A signal appears on line 862 at T2 time.

Lines 540A–540D are also connected as one input to AND gates 864–867 (FIG. 6G). The other input to AND gates 864–867 is line 870. A signal appears on line 870 when trigger TR12C8 is in its ON state. Output lines 872–875 from AND gates 864–867 respectively are connected as one input to OR gates 878–881. Output lines 884–887 from OR gates 878–881 respectively are connected as one input to AND gates 890–893 and 895–898. A second input to AND gates 890–893 and 895–898 is output line 900 from OR gate 902. One input to OR gate 902 is beforementioned line 870. The other input to OR gate 902 is output line 904 from OR gate 906. The inputs to OR gate 906 are lines 908–911. A signal appears on line 908 when trigger TR17CI is in its ON state. A signal appears on line 909 when trigger TR19CI in in its ON state. A signal appears on line 910 when trigger TR4C7 is in its ON state, and a signal appears on line 911 when trigger TR8C7 is in its ON state. The final input to AND gates 890–893 are lines 913–916. A signal appears on lines 913–916 at T5 time. The final input to AND gates 895–898 are lines 918–921. A signal appears on lines 918–921 at T0 time. Output lines 925–928 from AND gates 890–893 respectively are connected as the set lines to HAR1 and HAR2 registers 130–133. Output lines 930–933 from AND gates 895-898 respectively are connected as the reset lines to HAR1 and HAR2 registers 130–133.

The other inputs to OR gates 878–881 are output lines 936–939 from AND gates 941–944. One input to AND gates 941–944 is beforementioned line 904. The other inputs to these AND gates is output lines 800–803 respectively from the ON side of H triggers 806–809.

Line 904 is also connected as the conditioning input to gate 948. The information inputs to gate 948 are output line 792 from counter 222 (FIG. 7C). Output lines 950 from gate 948 are connected as one set of inputs to OR gate 952. The other set of inputs to OR gate 952 is output lines 954 from gate 956. The conditioning input to gate 956 is the beforementioned line 870 and the information inputs to gate 956 is output line 542 from DAR2 (FIG. 6E). Output lines 958 from OR gate 952 are connected as the data inputs to HAR1 registers 130A–133A. Line 870 is also connected as the conditioning input to gate 960, the information inputs to this gate being output lines 526 from DAR3. Output lines 962 from gate 960 are connected as the data inputs to HAR 2 registers 130B–133B. Output lines 30AA–30DA from HAR1 registers 130A–133A and output lines 30AB–30DB from HAR2 registers 130B–133B form the read portion of address bus 30 (FIG. 1). Lines 30A apply address information to HR0 (FIG. 6C), lines 30B apply address information to HR1, lines 30C apply address information to HR2, and lines 30D apply address information to HR3.

Referring to FIG. 6F, it is seen that the set input for H triggers 806–809 is line 964. A signal is applied to line 964 at T8 time. The set-condition input to H0 trigger 806 is line 966. A signal appears on line 966 when trigger TR1C13 is in its ON state. The reset condition input for the H0 trigger is output line 968 from OR gate 970. One input to OR gate 970 is output line 972 from OR gate 974. Lines 976–979 form the inputs to OR gate 974. A signal appears on line 976 when trigger TR13C7 is in its ON state. A signal appears on line 977 when trigger TR19C13 is in its ON state. A signal appears on line 978 when trigger TR14CI is in its ON state, and a signal appears on line 979 when trigger TR7C7 is in its ON state. The other input to OR gate 970 is output line 982 from AND gate 984. One input to AND gate 984 is line 986. A signal appears on line 986 when trigger TR5C13 is in its ON state. The other input to AND gate 984 is output line 800 from the ON side of H0 trigger 806. Line 982 is also connected as one input to OR gate 988, the output line 990 of which is connected as the set condition input to H1 trigger 807. A second input to OR gate 988 is line 992. A signal appears on line 992 when trigger TR1C7 is in its ON state. The third input to OR gate 988 is output line 994 from AND gate 996. One input to AND gate 996 is H1 output line 998 from decoder 1000 (FIG. 7E). Decoder 1000 generates an output signal on line 998 when a 01 combination appears in TAR1 register 178A. Decoder 1000 generates an output signal on line 1002 when a 10 code appears in TAR1 indicating hierarchy HR2 and generates an output signal on line 1004 when a 11 character combination appears in TAR1 indicating hierarchy HR3. The other input to AND gate 996 is line 1006. A signal appears on line 1006 when trigger TR3CI is in its ON state.

The reset condition input to H1 trigger 807 is output line 1008 from OR gate 1010. One input to this OR gate is beforementioned line 972. A second input to this OR gate is output line 1012 from AND gate 1014 and the third input to this OR gate is output line 1016 from AND gate 1018. One output to AND gates 1014 and 1018 is output line 801 from the ON side of H1 trigger 807. A second input to AND gate 1014 is output line 1020 from OR gate 1022 (FIG. 7B). A signal on line 1020 indicates a low or equal output from compare circuit 214. The final input to AND gate 1014 is line 1024 and the final input to AND gate 1018 is line 1026. A signal appears on line 1024 when trigger TR12C13 is in its ON state and a signal appears on line 1026 when trigger TR12C7 is in its ON state.

The set condition input to H2 trigger 808 is output line 1028 from OR gate 1030. One input to this OR gate is beforementioned line 1012 and a second input to this OR gate is beforementioned line 1016. The final input to OR gate 1030 is output line 1032 from AND gate 1034. One input to AND gate 1034 is beforementioned line 1006 and the other input to this AND gate is output line 1002 from decoder 1000 (FIG. 7E).

The reset condition input to H2 trigger 808 is output line 1036 from OR gate 1038. One input to OR gate 1038 is beforementioned line 972. The other inputs to this OR gate are output lines 1040 and 1042 from AND gates 1044 and 1046 respectively. One input to AND gates 1044 and 1046 is output line 802 from the ON side of H2 trigger 808. A second input to AND gate 1044 is beforementioned low or equal line 1020 and the final input to this AND gate is beforementioned line 1024. The final input to AND gate 1046 is beforementioned line 1026.

The set condition input to H3 trigger 809 is output line 1048 from OR gate 1050. Two inputs to this OR gate are the beforementioned lines 1040 and 1042. The final input to this OR gate is output line 1052 from AND gate 1054. One input to AND gate 1054 is beforementioned line 1006 and the other input to this AND gate is output line 1004 from decoder 1000 (FIG. 7E).

The reset condition input to H3 trigger 809 is output line 1056 from OR gate 1058. One input to OR gate 1058 is beforementioned line 972. The other input to this OR gate is output line 1060 from AND gate 1062. One input to AND gate 1062 is output line 803 from the ON side of H3 trigger 809. A second input to this AND gate is beforementioned low or equal line 1020 and the final input to this AND gate is beforementioned line 1024. Output line 1060, also referred to as the not-in-files line, is connected as the set condition input to T trigger 1063. The reset condition input to trigger 1063 is line 1064. CPU50 (FIG. 6H) applies a signal to line 1064 when it has recorded the fact that the desired record is not in the file. The set input to trigger 1063 is line 1066. A signal appears on line 1066 at T7 time. Output line 1067 from the ON side of trigger 1063 and output line 1068 from the OFF side of this trigger are applied to the control circuitry.

In addition to the functions already indicated, output line 801 from the ON side of H1 trigger 807 is utilized in the initialize cycle and in cycle 10. Output lines 802 from the ON side of H2 trigger 808 is likewise utilized in the initialize cycle and in cycle 10. Output line 803 from the ON side of H3 trigger 809 is utilized in the initialize cycle and in cycles 7 and 10. Output line 1070 from the OFF side of H3 trigger 809 is utilized in cycles 7 and 10.

Referring now to FIG. 6N, it is seen that RX registers 113–116 are incremented by signals applied to lines 1072A–1072D from AND gates 1074A–1074D respectively and by signals on lines 1076A–1076D from AND gates 1078A–1078D. One input to AND gates 1074A–1074D and 1078A–1078D are output lines 1080A–1080D from OR gates 1082A–1082D (FIG. 6P) respectively. The inputs to OR gate 1082A are lines 1084 and 1086. A signal appears on line 1084 when trigger 1088 (FIG. 8D) is in its ON state and a signal appears on line 1086 when trigger 1090 (FIG. 8F) is in its ON state. The inputs to OR gate 1082B are lines 1092 and 1094. A signal appears on line 1092 when trigger 1096 (FIG. 8D) is in its ON state and a signal appears on line 1094 when trigger 1098 (FIG. 8F) is in its ON state. The inputs to OR gates 1082C are lines 1100 and 1102. A signal appears on line 1100 when trigger 1104 is in its ON state and a signal appears on line 1102 when trigger 1106 is in its ON state. The inputs to OR gates 1082D are lines 1108 and 1110. A signal appears on line 1108 when trigger 1112 is in its ON state and a signal appears on line 1110 when trigger 1114 is in its ON state.

A second input to AND gates 1074A–1074D is line 1116. A signal appears on line 1116 when trigger TR10C8 is in its ON state. A second input to AND gates 1078A–1078D is output line 1118 from OR gate 1120. The inputs to OR gate 1120 are lines 1121–1124. A signal appears on line 1121 when trigger TR4C8 is in its ON state. A signal appears on line 1122 when trigger TR6C8 is in its ON state. A signal appears on line 1123 when trigger TR10C8 is in its ON state and a signal appears on line 1124 when trigger TR16C8 is in its ON state. The final input to AND gates 1074A–1074D is lines 1128A–1128D respectively, and the final input to AND gates 1078A–1078D are lines 1130A–1130D respectively. A signal appears on line 1128 at T8 time, and a signal on lines 1130 at T0 time.

RX registers 113–116 are decremented by a signal applied to output line 1132A–1132D from AND gate 1134A–1134D respectively. One input to AND gates 1134A–1134D are the beforementioned lines 1080A–1080D respectively. A second input to AND gates 1134A–1134D is line 1136. A signal appears on line 1136 when trigger TR9C8 is in its ON state. The final input to AND gates 1134A–1134D is lines 1138A–1138D respectively. A signal appears on lines 1138 at T0 time.

Figure 8B:
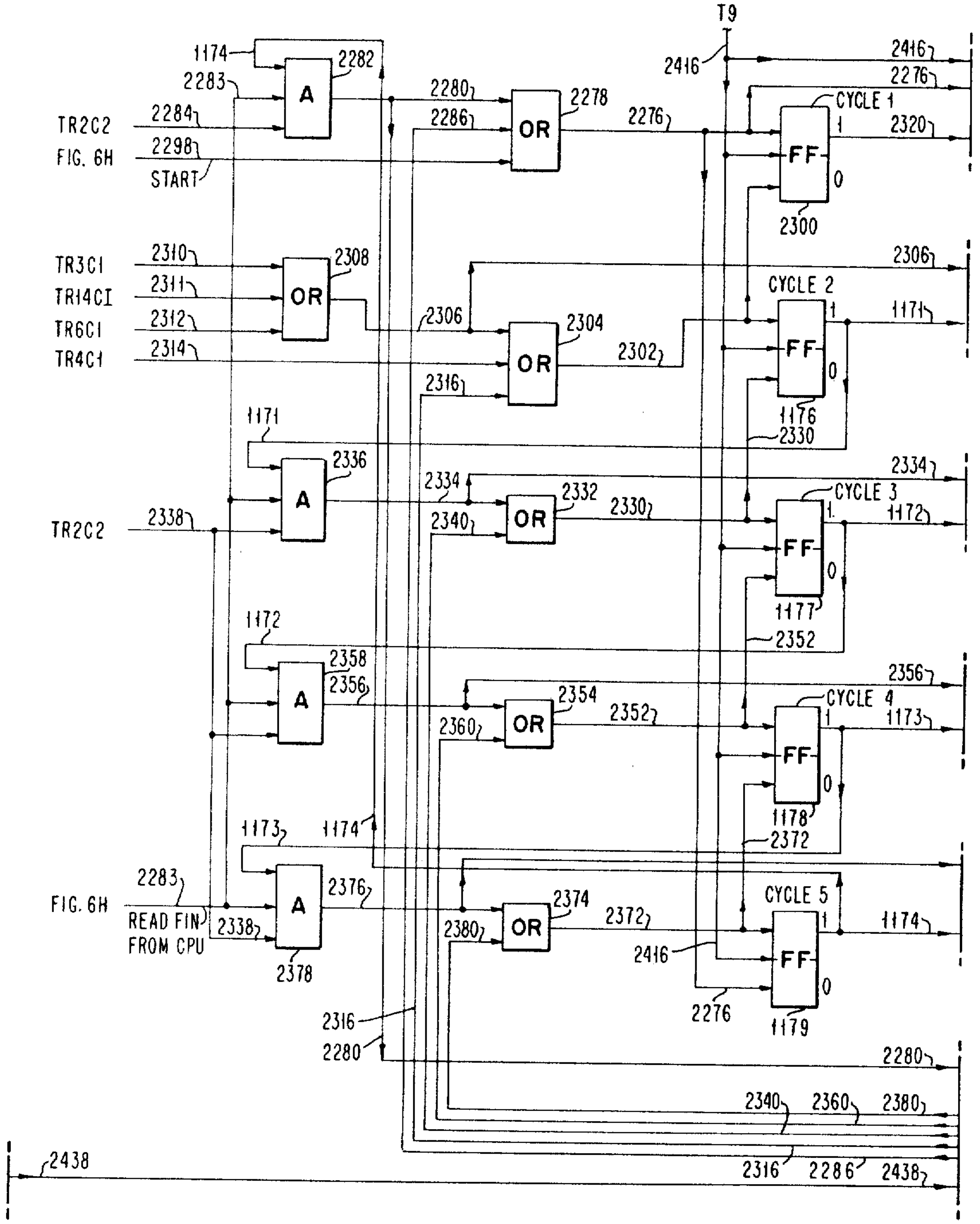
Figure 8C:
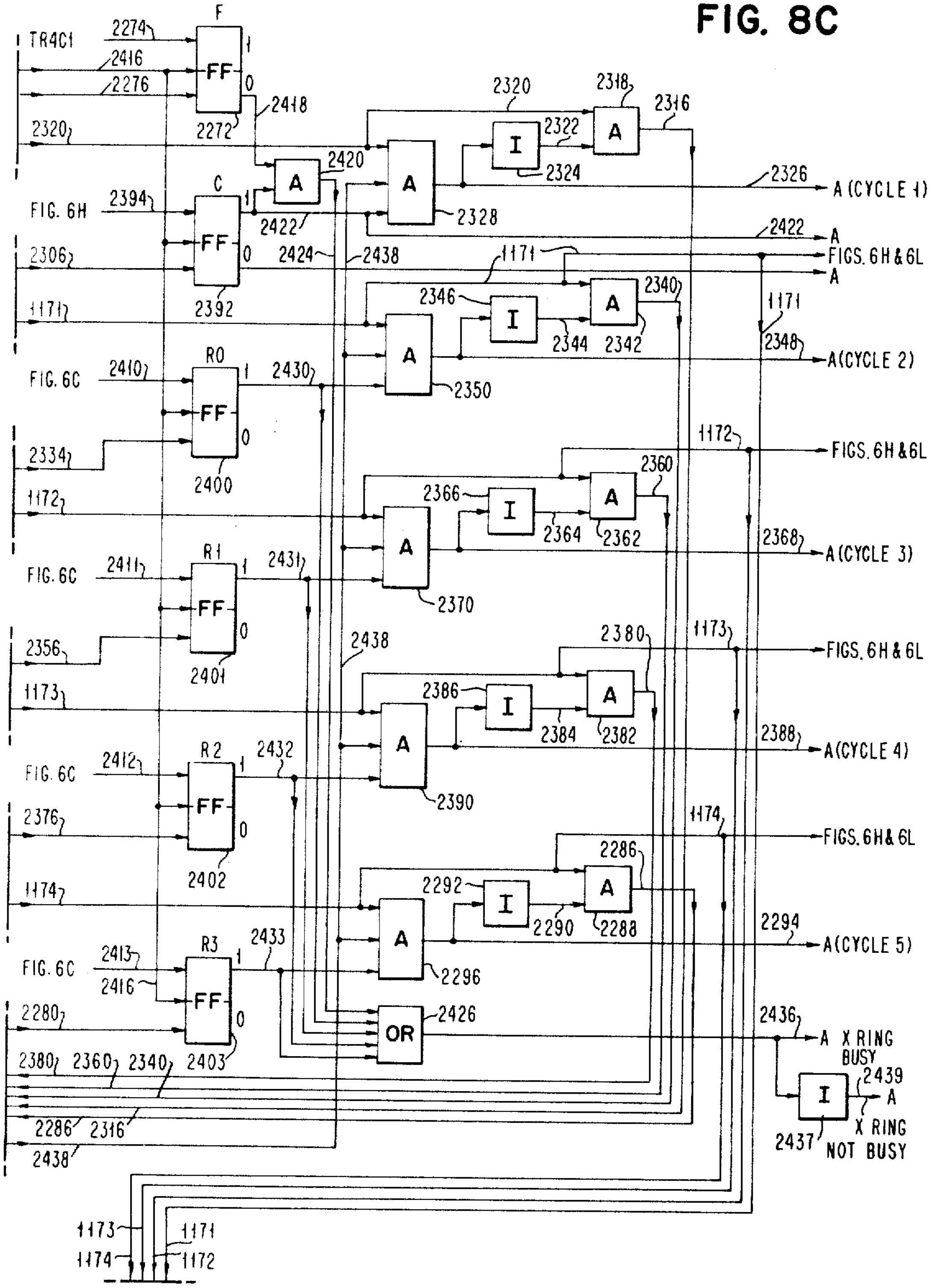
Figure 8D:
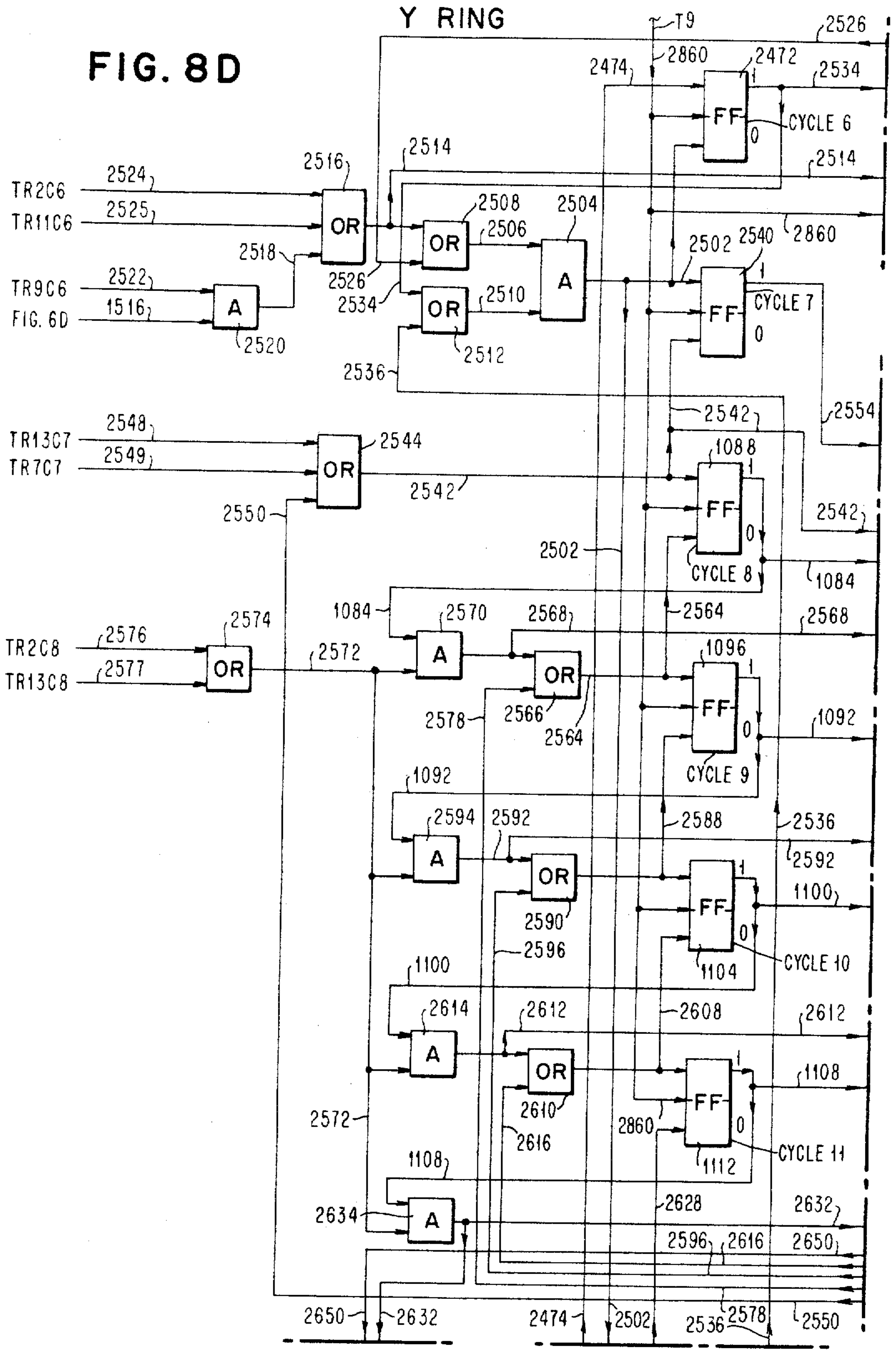
Figure 8E:
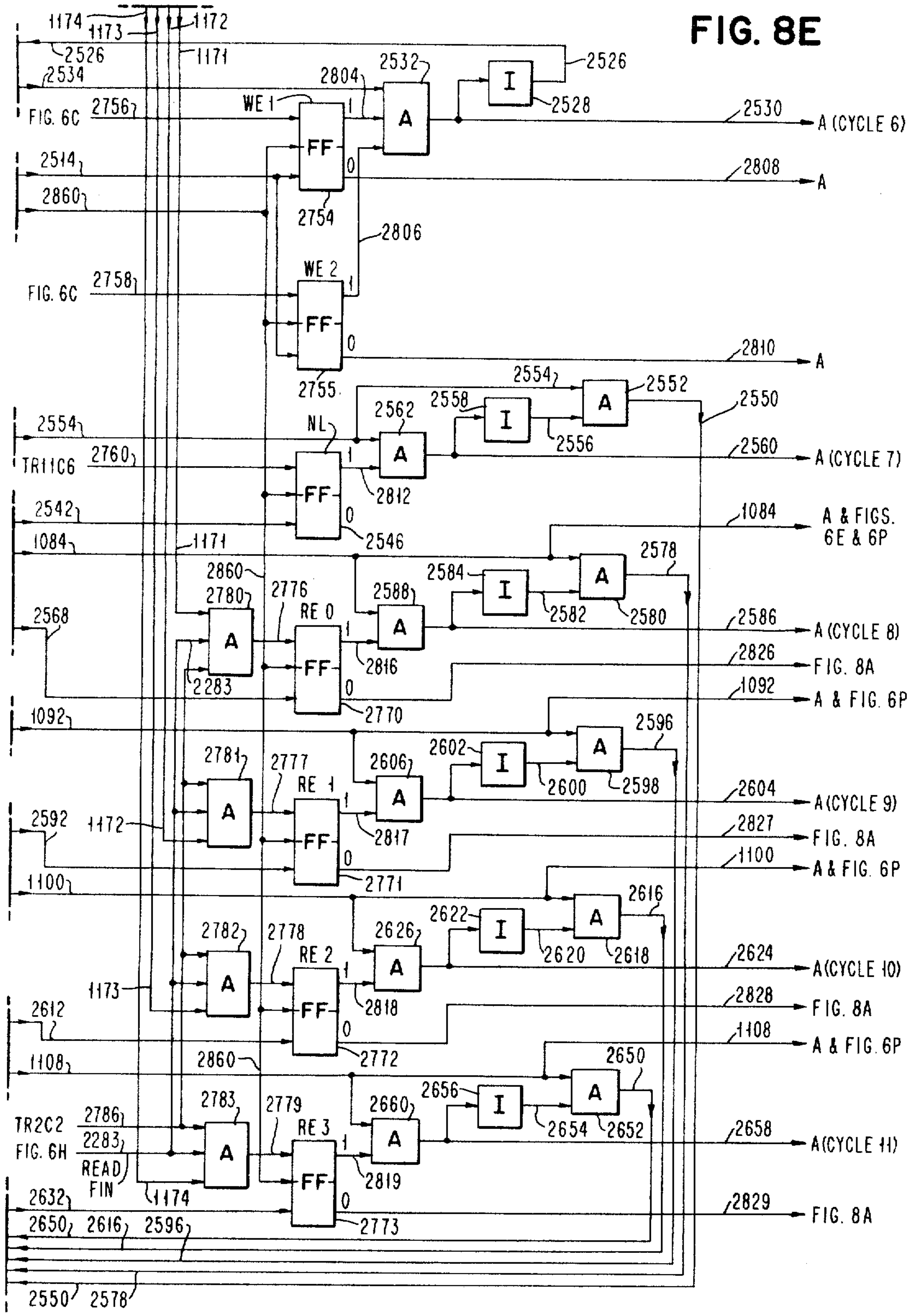

Lines 1080A–1080D are also connected as one input to AND gates 1140A–1140D (FIG. 6P) and 1142A–1142D respectively. The other input to AND gates 1140 is output line 1144 from AND gate 1146. One input to AND gate 1146 is equal output line 1148 from comparator 214 (FIG. 7B) and the other input to AND gate 1146 is output line 1150 from OR gate 1152. The inputs to an OR gate 1152 are lines 1154 and 1156. A signal appears on line 1154 when trigger TR11C8 is in its ON state and a signal appears on line 1156 when trigger TR6C8 is in its ON state. Output lines 1158A–1158D from AND gates 1140A–1140D are connected as the reset inputs to RNX triggers 1160A–1160D (FIG. 8G).

The other input to AND gates 1142A–1142D is line 1162. A signal appears on line 1162 when trigger TR10C8 is in its ON state. Output lines 1164A–1164D from AND gates 1142A–1142D respectively are connected as one set of inputs to OR gates 1166A–1166D (FIG. 6L) respectively. The other input to OR gates 1166A–1166D are output lines 1168A–1168D respectively from AND gates 1170A–1170D. One set of inputs to AND gates 1170A–1170D is output lines 1171–1173 respectively from X ring triggers 1176–1179 (FIG. 8B). The other input to AND gates 1170 is line 1182. A signal appears on line 1182 when trigger TR1C2 is in its ON state. Output lines 1184A–1184D from OR gates 1166A–1166D are connected to set the address FAR0–FAR3 respectively into CAR104 (FIG. 6K).

Lines 1080A–1080D are also connected as one input to AND gates 1186A–1186D (FIG. 6P). The other input to lines 1186A–1186D is HRX not-busy lines 1188A–1188D from hierarchy level HR0–HR3 respectively. Output lines 1190A–1190D from AND gates 1186A–1186D are connected as the inputs to OR gates 1192. A signal on output line 1194 from OR gate 1192 indicates that a selected one of the hierarchy levels is not busy. This indication is used during cycle 8 of the operation.

Lines 1080–1080D are also connected as the conditioning input to gates 1196A–1196D (FIG. 6L). The information input to gates 1196A–1196D are output lines 1198A–1198D from RX registers 113–116 respectively. Output lines 1200A–1200D from AND gates 1196A–1196D are connected as the inputs to OR gates 1202. Output lines 1204 from OR gates 1202 are connected as the information inputs to gates 1206 and 1208. The conditioning input to gate 1206 is line 1210. A signal appears on line 1210 when trigger TR3C8 is in its ON state. Output lines 1213 from gate 1206 are connected as the data input to RS register 1214. Line 1210 is also connected as one input to AND gate 1216, the other input to this AND gate being line 1218. A signal appears on line 1218 to T0 time. Output line 1220 from AND gate 1216 is connected as the reset input to the RS register. The set input to the RS register is line 1222. A signal appears on line 1222 at T2 time. Output lines 1224 from RS register 1214 are connected as the data inputs to gate 1226 (FIG. 6K). The conditioning input to gate 1226 is line 1228. A signal appears on line 1228 when trigger TR14C8 is in its ON state.

The conditioning input to gate 1208 (FIG. 6K) is output line 1230 from OR gate 1232. The inputs to OR gate 1232 are lines 1234 and 1236. A signal appears on line 1234 when trigger TR4C8 is in its ON state and a signal appears on line 1236 when trigger TR9C8 is in its ON state. Output lines 1238 and 1240 from gates 1208 and 1226 respectively are connected as two of the data inputs to CAR register 104.

Output lines 1198A–1198D from RX registers 113–116 (FIG. 6N) are also connected as one input to compare circuits 1242A–1242D respectively. The other inputs to compare circuits 1242A–1242D are output lines 1244 from RQ register 111. RQ register 111 is incremented by two by a signal applied to output line 1246 from AND gate 1248. The inputs to AND gate 1248 are lines 1250 and 1252. A signal appears on lines 1250 when trigger TR3C1 is in its ON state and a signal appears on line 1252 at T8 time.

Output lines 1254A–1254D from compare circuits 1242A–1242D are connected as one input to AND gates 1256A–1256D respectively. A signal appears on a line 1254 when the inputs applied to its comparator 1242 are equal. The other input to AND gates 1256A–1256D are output lines 1258A–1258D from RNX triggers 1160A–1160D respectively (FIG. 8G). Output lines 1260A–1260D from AND gates 1256A–1256D are connected as the inputs to OR gate 1262. A signal appears on output line 1264 from OR gate 1262 when the contents of RX equal RQ. This signal is used during cycle 8 of the operation. Line 1264 is also connected through inverter 1266 to line 1268. A signal appears on line 1268 when the contents of RX are not equal to RQ. A signal on line 1268 is utilized during cycles 2–5 of the operation.

Output lines 1244 from RQ register 111 are also connected as the information inputs to gate 1270 (FIG. 6K). The conditioning input to gate 1270 is line 1272. A signal appears on line 1272 when trigger TR3C1 is in its ON state. The signal on line 1272 is also applied to reset-condition OR gate 852. Output lines 1274 from gate 1270 are connected as another of the data inputs to CAR104.

Referring now to FIG. 6M, it is seen that W register 110 is incremented by a signal applied to output line 1276 from AND gate 1278 and WQ register 109 is incremented by a signal applied to output line 1280 from AND gate 1282. One input to AND gate 1278 is line 1284 and one input to AND gate 1282 is line 1286. A signal is applied to line 1284 when trigger TR3C6 is in its ON state and a signal is applied to line 1286 when trigger TR6C1 is in its ON state. The other input to AND gates 1278 is line 1288 and the other input to AND gate 1282 is line 1290. A signal appears on lines 1288 and 1290 at T8 time.

Output lines 1292 and 1294 from W register 110 and WQ register 109 respectively are connected as the inputs to compare circuit 1296. A signal appears on output line 1298 from compare circuit 1296 when the two inputs applied to it are equal. Line 1298 is connected as one of the inputs to AND gate 1300. The other input to AND gate 1300 is output line 1302 from WN trigger 1304 (FIG. 8G). Output line 1306 from AND gate 1300 is connected through inverter 1308 to line 1310. A signal on line 1306 means that the contents of WQ register 109 and W register 110 are equal whereas a signal on line 1310 means that the contents of these two registers are not equal. These signals are used during cycle 1 of the operation.

Referring still to FIG. 6M, it is seen that RT register 112 is incremented by a signal applied to output line 1312 from AND gate 1314. One input to AND gate 1314 is output line 1316 from OR gate 1318. The inputs to OR gate 1318 are lines 1320 and 1322. A signal appears on line 1320 when trigger TR26C13 is in its ON state and a signal appears on line 1322 when trigger TR27C13 is in its ON state. The other input to AND gate 1314 is line 1324. A signal appears on line 1324 at T0 time.

Output lines 1292 and 1294 from W register 110 and WQ register 109 respectively are connected as the information inputs to gates 1326 (FIG. 6K) and 1328. The conditioning input to gate 1326 is line 1330 and the conditioning input to gate 1328 is line 1332. A signal appears on line 1330 when trigger TR3C6 is in its ON state and a signal appears on line 1332 when trigger TR6C1 is in its ON state. Output lines 1334 from RT register 112 are connected as the information inputs to gate 1336. The conditioning input to gate 1336 is output line 1338 from OR gate 1340. The inputs to OR gate 1340 are lines 1342 and 1344. A signal appears on line 1342 when trigger TR22C13 is in its ON state and a signal appears on line 1344 when trigger TR26C13 is in its ON state. Lines 1330, 1332, and 1338 are connected as additional inputs to reset-condition OR gate 852. Output lines 1346, 1348, and 1350 from gates 1326, 1328, and 1336 respectively are connected as the remaining data inputs to CAR104. Output lines 106 from CAR are connected as the address input to CCB84 (FIG. 6J).

Referring now to FIG. 6D, it is seen that the data inputs to WAR1 and WAR2 registers 160 and 162 are output lines 1352 from gate 1354. The information inputs to gates 1354 are output lines 772 from LAC2 register 156B. The conditioning input to gate 1354 is line 1356. A signal appears on line 1356 when trigger TR7C6 is in its ON state. Line 1356 is also connected as one input to AND gate 1358. The other input to AND gate 1358 is line 1360. A signal appears on line 1360 at T0 time. Output line 1362 from AND gate 1358 is connected as the reset input to WAR1 and WAR2. Line 1364 is connected as the set input to WAR1 and line 1366 is connected as the set input to WAR 2. Signals appear on lines 1364 and 1366 at T5 time. Output lines 30E and 30F from WAR1 and WAR2 respectively form the write portion of the address bus (FIG. 1).

Output lines 801, 802 and 803 from the ON side of H triggers 807–809 respectively are connected as one set of inputs to AND gates 1371–1373 (FIG. 6C), AND gates 1381–1383, AND gates 1391–1393, AND gates 1401–1403, AND gates 1411–1413, and AND gates 1421–1423. The other input to AND gates 1371–1373 is output line 1375 from OR gate 1377. The inputs to OR gate 1377 are lines 1378 and 1379. A signal appears on line 1378 when trigger TR5C7 is in its ON state and a signal appears on line 1379 when trigger TR11C7 is in its ON state. Output lines 1431–1433 from AND gates 1371–1373 respectively are connected to hierarchy levels HR1, HR2, and HR3 respectively to cause a loop to be moved from the buffer cavity 260 for that level into the storage bin 264.

The other input to AND gates 1381–1383 is line 1385. A signal appears on line 1385 when trigger TR20CI is in its ON state. Output lines 1441–1443 from AND gates 1381–1383 are connected to cause a loop to be moved from read cavity 268 (FIG. 5) of hierarchy level HR1, HR2, or HR3 respectively to storage bin 264.

The other input to AND gates 1391–1393 is line 1395. A signal appears on line 1395 when trigger TR10C7 is in its ON state. Output lines 1451–1453 from AND gates 1391–1393 are connected to cause a loop to be moved from storage bin 264 (FIG. 5) of hierarchy level HR1, HR2, or HR3 respectively to the buffer cavity 260 for the next higher level.

The other input to AND gates 1401–1403 is lines 1406–1408. A signal appears on a line 1406–1408 when hierarchy HR1, HR2, or HR3 respectively has completed the last read-write operation given to it and is ready for a new command. Output lines 1461–1463 from AND gates 1401–1403 respectively are connected as the inputs to OR gate 1465. A signal on output line 1467 from OR gate 1465 indicates that a given hierarchy level is ready for a new command. This signal is used during the initialize cycle of the operation.

The other input to AND gates 1411–1413 is line 1415. A signal appears on line 1415 when trigger TR18CI is in its ON state. A signal on an output line 1471–1473 from AND gate 1411–1413 causes a loop to be moved from storage bin 264 (FIG. 5) at hierarchy level HR1, HR2, or HR3 respectively to the corresponding read cavity 268.

The other input to AND gates 1421–1423 is lines 1188B–1188D respectively. A signal appears on a line 1188B–1188D when hierarchy level HR1–HR3 respectively is not busy. Output lines 1481–1483 from AND gates 1421–1423 respectively are connected as the inputs to OR gate 1485. A signal on output line 1487 from OR gate 1485 indicates that an indicated hierarchy level is not busy. This signal is utilized during the initialize cycle and during cycle 7 of the operation.

Referring still to FIG. 6C, it is seen that in addition to the inputs already described, HR0 has an input line 1478 and W1 has input lines 1479, 1480, and 1484. A signal appears on lines 1478 and 1484 when trigger TR8C6 is in its ON state. The signal on these lines is a write signal for the respective write station. A signal appears on line 1479 when trigger TR10C6 is in its ON state and on line 1480 when trigger TR11C6 is in its ON state. The signal on line 1479 causes the loop in write station W1 to be moved to HR1 buffer cavity 260A (FIG. 5). The signal on line 1480 causes a new loop to be loaded into write station W1 through supply line 36 (FIG. 1).

In addition to the outputs already mentioned and those to be mentioned subsequently, HR0 has an output line 1486, HR1 has output lines 1488 and 1489, HR2 has an output line 1490, HR3 has an output line 1491, and write station W1 has output lines 1493 and 1495. A signal appears on lines 1486, 1488, 1490, and 1491 when during a read operation the end of a record being read from the corresponding hierarchy level has been reached. A signal appears on line 1489 when a loop has been moved into hierarchy level 1 buffer cavity 260A (FIG. 5). A signal appears on line 1495 when write station W1 is not busy, and a signal appears on line 1493 when a new loop has been completely loaded into this write station. The signals on all of the output lines described above are applied to various triggers in the cycle control circuitry which circuitry is not shown in any of the figures but which is shown in chart form in the appendix starting on page A1 of the specification.

Referring now to FIG. 6D, it is seen that LAC1 register 156A is incremented by a signal applied to output line 1490 from AND gate 1492 and that LAC2 register 156B is incremented by a signal applied to output line 1494 from AND gate 1496. One input to AND gate 1492 is line 1498 and one input to AND gate 1496 is line 1500. A signal is applied to line 1498 when trigger TR10C6 is in its ON state and a signal is applied to line 1500 when trigger TR9C6 is in its ON state. The other input to AND gate 1492 is line 1502 and the other input to AND gate 1496 is line 1504. A signal is applied to line 1502 at T0 time and to line 1504 at T8 time.

LAC2 is reset by a signal applied to output line 1506 from AND gate 1508. One input to AND gate 1508 is line 1510. A signal is applied to line 1510 when trigger TR10C6 is in its ON state. The other input to AND gate 1508 is line 1512. A signal appears on line 1512 at T0 time.

In addition to connections previously indicated for output lines 770 and 772 from LAC1 and LAC2, output lines 772 are connected as the inputs to OR gate 1514. Output line 1516 from OR gate 1514 is connected through inverter 1518 to output line 1520. A signal appears on line 1516 if the contents of LAC2 are not 0 and on line 1520 if the contents of LAC2 is equal to 0.

Referring now to FIG. 7A, it is seen that A register 180 has nine data inputs. These are output lines 1531–1539 from gates 1541–1549. The information inputs to gate 1541 are output lines 770 from LAC1 (FIG. 6D). The conditioning input to gate 1541 is line 1552. A signal appears on line 1552 when trigger TR1C13 is in its ON state. The information inputs to gate 1542 are output lines 551 from CBR2 (FIG. 6J). The conditioning input to gate 1542 is line 1554. A signal appears on line 1554 when trigger TR5C8 is in its ON state. The information inputs to gate 1543 are output lines 552 from CBR3. The conditioning input to gate 1543 is line 1556. A signal appears on line 1556 when trigger TR7C8 is in its ON state.

The information inputs to gate 1544 are output lines 1292 from W register 110 (FIG. 6M). The conditioning input to gate 1544 is output line 1558 from OR gate 1560. The inputs to OR gate 1560 are lines 1561 and 1562. A signal appears on line 1561 when trigger TR1C6 is in its ON state and a signal appears on line 1562 when trigger TR5C6 is in its ON state. The information inputs to gate 1545 are output lines 1334 from RT register 112 (FIG. 6M). The conditioning input to gate 1545 is output line 1566 from OR gate 1568. The inputs to OR gate 1568 are lines 1570 and 1571. A signal appears on line 1570 when trigger TR3C8 is in its ON state and a signal appears on line 1571 when trigger TR20C13 is in its ON state. The information inputs to gate 1546 are output lines 1244 from RQ register 111 (FIG. 6N). The conditioning input to gate 1546 is output line 1574 from OR gate 1576. The inputs to OR gate 1576 are lines 1578-1580. A signal is applied to line 1578 when trigger TR1C8 is in its ON state. A signal is applied to line 1579 when trigger TR6C8 is in its ON state and a signal to line 1580 when trigger TR11C8 is in its ON state.

The information inputs to gate 1547 are output lines 1584 from Z register 188. Z register 188 is incremented by a signal on output line 1586 from AND gate 1588. One input to AND gate 1588 is output line 1590 from OR gate 1592. The inputs to OR gate 1592 are lines 1594 and 1595. A signal appears on line 1594 when trigger TR6C7 is in its ON state and on 1595 when trigger TR11C7 is in its ON state. The other inputs to AND gate 1588 are lines 801 and 1596. A signal appears on line 801 when H1 trigger 807 (FIG. 6F) is in its ON state. A signal appears on line 1596 at T2 time.

The conditioning input to gate 1547 is output line 1598 from OR gate 1600. The inputs to OR gate 1600 are lines 1602–1605. A signal appears on line 1602 when trigger TR5C13 is in its ON state. A signal appears on line 1603 when trigger TR4C1 is in its ON state. A signal appears on line 1604 when trigger TR28CI is in its ON state and on line 1605 when trigger TR31CI is in its ON state.

The information inputs to gate 1548 are output lines 1608 from K register 174 (FIG. 7F). The conditioning input to gate 1548 is output line 1610 from OR gate 1612. The inputs to OR gate 1612 are lines 1614–1619. A signal appears on line 1614 when trigger TR3C13 is its ON state. A signal appears on line 1616 when trigger TR7C13 is in its ON state. A signal appears on line 1615 when trigger TR7C13 is in its ON state. A signal appears on line 1616 when trigger TR13C13 is in its ON state. A signal appears on line 1617 when trigger TR10CI is in its ON state. A signal appears on line 1618 when trigger TR15CI is in its ON state and on line 1619 when trigger TR2C7 is in its ON state.

The information inputs to gate 1549 is output lines 784 from C1 register 194 (FIG. 7C). The conditioning input to gate 1549 is output line 1622 from OR gate 1624. The inputs to OR gate 1624 are lines 1626–1635. A signal appears on line 1626 when trigger TR11C13 is in its ON state. A signal appears on line 1627 when trigger TR9C13 is in its ON state. A signal appears on line 1628 when trigger TR17C13 is in its ON state. A signal appears on line 1629 when trigger TR15C13 is in its ON state. A signal appears on line 1630 when trigger TR8CI is in its ON state. A signal appears on line 1631 when trigger TR13CI is in its ON state. A signal appears on line 1632 when trigger TR6CI is in its ON state. A signal appears on line 1633 when trigger TR25CI is in its ON state. A signal appears on line 1634 when trigger TR33CI is in its ON state and on line 1635 when trigger TR30CI is in its ON state.

Conditioning lines 1552, 1554, 1556, 1558, 1566, 1574, 1598, 1610, and 1622 are connected as inputs to OR gate 1640. Output line 1642 from OR gate 1640 is connected as one input to AND gate 1644. The other input to AND gate 1644 is line 1646. A signal appears on line 1646 at T0 time. Output line 1648 from AND gate 1644 is connected as the reset input to A register 180. The set input to A register 180 is line 160. A signal is applied to line 1650 at T2 time.

There are also nine data inputs to B register 182. (FIG. 7D) They are output lines 1651–1659 from gates 1661–1669. The information inputs to gate 1661 are output lines 1244 from RQ register 111 (FIG. 6N). The conditioning input to gate 1661 is line 1674. A signal appears on line 1674 when trigger TR20C13 is in its ON state. The information inputs to gate 1662 are output lines 552 from CBR3 (FIG. 6J). The conditioning input to gate 1662 is line 1676. A signal appears on line 1676 when trigger TR8C8 is in its ON state. The information inputs to gate 1663 are output lines 1080A–108D from OR gates 1082A–1082D (FIG. 6P). The conditioning input to gate 1663 is line 1678. A signal appears on line 1678 when trigger TR5C8 is in its on state. The information inputs to gate 1664 are output lines 1680 from C2 register 202 (FIG. 7C). The conditioning input to gate 1664 is line 1682. A signal appears on line 1682 when trigger TR9C13 is in its ON state.

The information inputs to gate 1665 are output lines 1294 from WQ register 109 (FIG. 6M). The conditioning input to gate 1665 is output line 1684 from OR gate 1686. The inputs to OR gate 1686 are lines 1688–1689. A signal appears on line 1688 when trigger TR1C6 is in its ON state and on line 1689 when trigger TR5C6 is in its ON state.

The information inputs to gate 1666 are RX output lines 1204 from OR gate 1202 (FIG. 6L). The conditioning input to gate 1666 is output line 1692 from OR gate 1694. The inputs to OR gate 1694 are lines 1696–1698. A signal appears on line 196 when trigger TR1C8 is in its ON state. A signal appears on line 1697 when trigger TR6C8 is in its ON state and on line 1698 when trigger TR11C8 is in its ON state.

The information inputs to gate 1667 are output lines 1700 from E register 196. The data input to E register 196 is output line 1702 from gate 1704. The information inputs to gate 1704 are output lines 784 from C1 register 194 (FIG. 7C). The conditioning input to gate 1704 is output line 1706 from OR gate 1708. The inputs to OR gate 1708 are lines 1710–1712. A signal appears on line 1710 when trigger TR2C13 is in its ON state. A signal appears on line 1711 when trigger TR6C13 is in its ON state and on line 1712 when trigger TR9CI is in its ON state. Line 1706 is also connected as one input to AND gate 1714, the other input to this AND gate being line 1716. A signal appears on line 1716 at T0 time. Output line 1718 from AND gate 1714 is the reset input to E register 196. The set input to the E register is line 1720. A signal appears on line 1720 at T8 time.

The conditioning input to gate 1667 is output line 1722 from OR gate 1724. The inputs to OR gate 1724 are lines 1726–1729. A signal appears on line 1726 when trigger TR3C13 is in its ON state. A signal appears on line 1727 when trigger TR11C13 is in its ON state. A signal appears on line 1728 when trigger TR15CI is in its ON state and on line 1729 when trigger TR25CI is in its ON state.

The information inputs to gate 1668 are output lines 715 from DBR2 124B (FIG. 6B). The conditioning input to gate 1668 is output line 1732 from OR gate 1734. The inputs to OR gate 1734 are lines 1736–1738. A signal appears on line 1736 when trigger TR5C13 is in its ON state. A signal appears on line 1737 when trigger TR1C13 is in its ON state, and a signal appears on line 1738 when trigger TR13C13 is in its ON state.

The information inputs to gate 1669 are output lines 1608 from K register 174 (FIG. 7F). The conditioning input to gate 1669 is output lines 1740 from OR gate 1742. The inputs to OR gate 1742 are lines 1744–1754. A signal appears on line 1744 when trigger TR7C13 is in its ON state. A signal appears on line 1745 when trigger TR15C13 is in its ON state. A signal appears on line 1746 when trigger TR6CI is in its ON state. A signal appears on line 1747 when trigger TR4CI is in its ON state. A signal appears on line 1748 when trigger TR17C13 is in its ON state. A signal appears on line 1749 when trigger TR8CI is in its ON state. A signal appears on line 1750 when trigger TR23CI is in its ON state. A signal appears on line 1751 when trigger TR33CI is in its ON state. A signal appears on line 1752 when trigger TR28CI is in its ON state. A signal appears on line 1753 when trigger TR30CI is in its ON state and on line 1754 when trigger TR31CI is in its ON state.

Conditioning lines 1674, 1676, 1678, 1682, 1854, 1692, 1722, 1732, and 1740 are connected as inputs to OR gate 1760. The final input to OR gate 1760 is line 1762. A signal appears on line 1762 when trigger TR2C7 is in its ON state. Output line 1764 from OR gate 1760 is connected as one input to AND gate 1766, the other input to this AND gate being line 1768. A signal appears on line 1768 at T0 time. Output line 1770 from AND gate 1766 is connected as the reset input to B register 182. The set input to B register 182 is line 1772. A signal appears on line 1772 at T5 time.

Output lines 204 from A register 180 are connected as one set of inputs to adder 208 (FIG. 7B), subtracter 210, divider 212, and compare circuit 214. The other set of inputs to these four circuits is output lines 206 from B register 182. Output lines 1774 from adder 208 are connected as the information input to gate 1776. The conditioning input to gate 1776 is output line 1778 from OR gate 1780. The inputs to OR gate 1780 are lines 1782–1787. A signal appears on line 1782 when trigger TR10C13 is in its ON state. A signal appears on line 1783 when trigger TR14C13 is in its ON state. A signal appears on line 1784 when trigger TR5CI is in its ON state. A signal appears on line 1785 when trigger TR11CI is in its ON state. A signal appears on line 1786 when trigger TR14CI is in its ON state and on line 1787 when trigger TR24CI is in its ON state.

Output lines 1790 from subtracter 210 are connected as the information input to gate 1792. The conditioning input to gate 1792 is output line 1794 from OR gate 1796. The inputs to OR gate 1796 are lines 1798–1805. A signal apears on line 1798 when trigger TR2C13 is in its ON state. A signal appears on line 1799 when trigger TR6C13 is in its ON state. A signal appears on line 1800 when trigger TR8C13 is in its ON state. A signal appears on line 1801 when trigger TR16C13 is in its ON state. A signal appears on line 1802 when trigger TR7CI is in its ON state. A signal appears on line 1803 when trigger TR16CI is in its ON state. A signal appears on line 1804 when trigger TR29CI is in its ON state, and on line 1805 when trigger TR32CI is in its ON state.

Remainder output lines 1810 from divider 212 is connected as the information inputs to gate 1812. The conditioning input to gate 1812 is output line 1818 from OR gate 1820. The inputs to OR gate 1820 are lines 1822 and 1823. A signal appears on line 1822 when trigger TR18C13 is in its ON state and on line 1823 when trigger TR9CI is in its ON state.

Lines 1794, 1778 and 1818 are connected as the inputs to OR gate 1826. Output line 1828 from OR gate 1826 is connected as one input to AND gates 1830 (FIG. 7C) and 1832. The other input to AND gate 1830 is line 1834 and the other input to AND gate 1832 is line 1836. A signal appears on line 1834 at T5 time and on line 1836 at T0 time. Output line 1838 from AND gate 1830 is one of the set inputs to C1 register 194 and output line 1840 from AND gate 1832 is the reset input to the C1 register.

Output lines 1842–1844 from gates 1776, 1792 and 1812 (FIG. 7B) respectively are connected as the inputs to OR gates 1846. Output lines 1848 from OR gates 1846 are connected as one set of data inputs to C1 register 194 (FIG. 7C).

Compare circuit 214 (FIG. 7B) has a high output line 1852, an equal output line 1148, and a low output line 1854. Equal output line 1148 is connected as one input to OR gate 1022 and through inverter 1856 to not-equal output line 1858. Low output line 1854 is connected as the other input to OR gate 1022 and through inverter 1860 to high or equal output line 1862. Lines 1020, 1148, 1854, 1858 and 1862 are all connected as inputs to the sequence control circuitry described in the appendix.

Referring now to FIG. 7C, it is seen that a second data input to C1 register 194 is output line 1864 from gate 1866. The information inputs to gate 1866 are output lines 792 from counter 222 and the conditioning input to this gate is output line 1868 from OR gate 1870. For reasons which will be apparent later, OR gate 1870 is referred to as the shift gate. The inputs to OR gate 1870 are lines 1872–1874. A signal appears on line 1872 when trigger TR17CI is in its ON state. A signal appears on line 1873 when trigger TR19CI is in its ON state and on line 1874 when trigger TR22CI is in its ON state.

Line 1868 is also connected as one input to AND gate 1878, and as the conditioning input to gates 1880 and 1882. The other input to AND gate 1878 is line 1884. A signal appears on line 1884 at T8 time. Output line 1886 from AND gate 1878 is a set input to C1 register 194, C2 register 202, and counter 222. This line is also referred to as the shift line. Output line 784 from C1 register 194 is connected as the information input to gates 1880, 1888 and 1890. The conditioning input to gate 1888 is output line 1892 from OR gate 1894. The inputs to OR gate 1894 are lines 1896–1898. A signal appears on line 1896 when trigger TR30CI is in its ON state. A signal appears on line 1897 when trigger TR11C13 is in its ON state and on line 1898 when trigger TR11CI is in its ON state. Line 1892 is also connected as one input to AND gates 1906 and 1908. The other input to AND gate 1906 is line 1910 and the other input to AND gate 1908 is line 1912. A signal appears on line 1910 at T8 time and on 1912 at T5 time. Output line 1914 from AND gate 1906 is the other set input to C2 register 202 and output line 1916 from AND fate 1908 is the reset input to this register. Output lines 1918 and 1920 from gates 1880 and 1888 respectively are data inputs to the C2 register.

Output lines 1680 from C2 register 202 are connected as the information inputs to gate 1882. The conditioning input to beforementioned gate 1890 is line 1918. A signal appears on line 1918 when trigger TR9CI is in its ON state. Output lines 1920 and 1922 from gates 1882 and 1890 respectively are connected as two of the data inputs to counter 222. The other data input to counter 222 is output lines 1924 from gate 1926. The information inputs to gate 1926 are output lines 1608 from K register 174. The conditioning input to gate 1926 is output line 1928 from OR gate 1930. The inputs to OR gates 1930 are lines 1932 and 1933. A signal appears on line 1932 when trigger TR15CI is in its ON state and on line 1933 when trigger TR6C7 is in its ON state.

Lines 1918 and 1928 are connected as the inputs to OR gate 1936. Output line 1938 from OR gate 1936 is connected as one input to AND gates 1940 and 1942. The other input to AND gate 1940 is line 1944 and the other input to AND gate 1942 is line 1946. A signal appears on line 1944 at T6 time and on line 1946 at T5 time. Output line 1948 from AND gate 1940 is the other set input to CTR 222 and output line 1950 from AND gate 1942 is the reset input to the counter.

Counter 222 is incremented by a signal applied to output line 1952 from AND gate 1954 and decremented by a signal applied to output line 1956 from AND gate 1958. One input to AND gate 1954 is output line 1960 from OR gate 1962. The inputs to OR gate 1962 are lines 1964 and 1965. A signal appears on line 1964 when trigger TR4C7 is in its ON state and on line 1965 when trigger TR8C7 is in its ON state. One input to AND gate 1958 is output line 1967 from OR gate 1969. The inputs to OR gate 1969 are lines 1970–1973. A signal appears on line 1970 when trigger TR17CI is in its ON state. A signal appears on line 1971 when trigger TR19CI is in its ON state. A signal apepars on line 1972 when trigger TR21CI is in its ON state and on line 1973 when trigger TR6C7 is in its ON state. The other input to AND gate 1954 is line 1975, and the other input to AND gate 1958 is line 1977. A signal appears on line 1975 at T0 time and on line 1977 at T7 time.

Output lines 792 from counter 222 are connected as the inputs to OR gate 1979. Output line 1981 from OR gate 1979 is connected through inverter 1983 to line 1985. A signal appears on line 1981 when the contents of counter 222 are not zero and on line 1985 when the contents of this counter are equal to zero.

Referring now to FIG. 7F, it is seen that K register 174 has six data inputs. These are output lines 1991–1996 from gates 2001–2006 respectively. The information inputs to gate 2001 are output lines 2010 from the sense amplifiers of K memory 170 (FIG. 7G). The conditioning input to gates 2001 is output line 2012 from OR gate 2014. (FIG. 7G). The inputs to OR gate 2014 are output line 2016 from OR gate 2018 and output line 2020 from OR gate 2022. The inputs to OR gate 2018 are lines 2024–2031. A signal appears on line 2024 when trigger TR3C13 is in its ON state. A signal appears on line 2025 when trigger TR7C13 is in its ON state. A signal appears on line 2026 when trigger TR13C13 is in its ON state. A signal appears on line 2027 when trigger TR15C13 is in its ON state. A signal appears on line 2028 when trigger TR17C13 is in its ON state. A signal appears on line 2029 when trigger TR10CI is in its ON state. A signal appears on line 2030 when trigger TR15CI is in its ON state and on line 2031 when trigger TR2C7 is in its ON state. The inputs to OR gate 2022 are lines 2040–2048. A signal appears on ilne 2040 when trigger TR7C13 is in its ON state. A signal appears on line 2041 when trigger TR4CI is in its ON state. A signal appears on line 2042 when trigger TR6CI is in its ON state. A signal appears on line 2043 when trigger TR8CI is in its ON state. A signal appears on line 2044 when trigger TR33CI is in its ON state. A signal appears on line 2045 when trigger TR23CI is in its ON state. A signal appears on line 2046 when trigger TR28CI is in its ON state. A signal appears on line 2047 when trigger TR30CI is in its ON state and on line 2048 when trigger TR31CI is in its ON state.

The information inputs to gate 2002 (FIG. 7F) are output lines 550 from CBR1 (FIG. 6J). The conditioning input to gate 2002 is line 2050. A signal appears on line 2050 when trigger TR2CI is in its ON state.

The information inputs to gate 2003 are output lines 792 from counter 222 (FIG. 7C). The conditioning input to gate 2003 is line 2052. A signal appears on line 2052 when trigger TR7C7 is in its ON state.

The information inputs to gate 2004 are output lines 1584 from Z register 188 (FIG. 7A). The conditioning input to gate 2004 is line 2054. A signal appears on line 2054 when trigger TR27CI is in its ON state.

The information inputs to gate 2005 are output lines 1680 from C2 register 202 (FIG. 7C). The conditioning input to gate 2005 is line 2056. A signal appears on line 2056 when trigger TR26CI is in its ON state.

The information inputs to gate 2006 are output lines 784 from C1 register 194 (FIG. 7C). The conditioning input to gate 2006 is output line 2058 from OR gate 2060. The inputs to OR gate 2060 are lines 2062–2064. A signal appears on line 2062 when trigger TR13CI is in its ON state. A signal appears on line 2063 when trigger TR14CI is in its ON state and on line 2064 when trigger TR25CI is in its ON state.

Conditioning lines 2050, 2052, 2054, 2056, and 2058 form the inputs to OR gate 2066. Output line 2068 from OR gate 2066 is connected as one input to AND gates 2070 and 2072. The other input to AND gate 2070 is line 2074 and the other input to AND gate 2072 is line 2076. A signal appears on line 2074 at T6 time and on line 2076 at T0 time. Output line 2078 from AND gate 2072 is connected as one input to OR gate 2080. The other input to OR gate 2080 is output line 2082 from OR gate 2084. (FIG. 7G). The inputs to OR gate 2084 are output lines 2086 from AND gate 2088 and output line 2090 from AND gate 2092. One input to AND gate 2088 is the beforementioned line 2016 and one input to AND gate 2092 is beforementioned line 2020. The other input to AND gate 2088 is line 2094 and to AND gate 2092 the line 2096. A signal appears on line 2094 at T0 time and on line 2096 at T3 time. Output line 2098 from OR gate 2080 (FIG. 7F) is the reset input to K register 174. Output line 2016 from OR gate 2018 (FIG. 7G) is also connected as one input to AND gate 2100 (FIG. 7F) and output line 2020 from OR gate 2022 is also connected as one input to AND gate 2102. The other input to AND gate 2100 is line 2104 and the other input to AND gate 2102 is line 2106. A signal appears on line 2104 at T1 time and on line 2106 at T4 time. Output line 2108 from AND gates 2070, 2100, and 2102 is the set input to K register 174. Output lines 1608 from the K register are also connected as the information input to K memory 170.

Output line 2082 from OR gate 2084 (FIG. 7G) is also the read input to K memory 170. The write input to K memory is output line 2110 from AND gate 2112. One input to AND gate 2112 is output line 2114 from OR gate 2116. The inputs to OR gate 2116 are lines 2118–2124. A signal is applied to line 2118 when trigger TR13CI is in its ON state. A signal is applied to line 2119 when trigger TR14CI is in its ON state. A signal is applied to line 2120 when trigger TR25CI is in its ON state. A signal is applied to line 2121 when trigger TR26CI is in its ON state. A signal is applied to line 2122 when trigger TR27CI is in its ON state. A signal is applied to line 2123 when trigger TR7C7 is in its ON state and to line 2124 when trigger TR3CI is in its ON state. The other input to AND gate 2112 is line 2128. A signal appears on line 2128 at T7 time.

Referring now to FIG. 7E, it is seen that TRA1 register 178A is decremented by a signal applied to output line 2130 from AND gate 2132 and is incremented by a signal applied to output line 2134 from AND gate 2136. One input to AND gate 2132 is output line 2138 from OR gate 2140. The inputs to OR gate 2140 are lines 2142–2144. A signal is applied to line 2142 when trigger TR28CI is in its ON state. A signal is applied to line 2143 when trigger TR31CI is in its ON state and to line 2144 when trigger TR32CI is in its ON state. The other input to AND gate 2132 is line 2146. A signal appears on line 2146 at T2 time. One input to AND gate 2136 is output line 2148 from OR gate 2150. The inputs to OR gate 2150 are lines 2152–2157. A signal is applied to line 2152 when trigger TR5C13 is in its ON state. A signal is applied to line 2153 when trigger TR33CI is in its ON state. A signal is applied to line 2154 when trigger TR29CI is in its ON state. A signal is applied to line 2155 when trigger TR1C7 is in its ON state. A signal is applied to line 2156 when trigger TR8C7 is in its ON state and to line 2157 when trigger TR12C13 is in its ON state. The other input to AND gate 2136 is line 2159. A signal appears on line 2159 at T8 time.

The data input to TAR1 is output line 2162 from gate 2164. The data input to gate 2164 are the first two of the output lines 551 from CBR2 66B (FIG. 6J). The conditioning input to gate 2164 is line 2166. A signal appears on line 2166 when trigger TR2CI is in its ON state. Line 2166 is also one input to OR gate 2168. The other inputs to this OR gate are lines 2170 and 2171. A signal appears on line 2170 when trigger TR1C13 is in its ON state and on line 2171 when trigger TR1C7 is in its ON state. Output line 2172 from OR plate 2168 is connected as one input to AND gate 2174. The other input to AND gate 2174 is line 2176. A signal appears on line 2176 at T2 time. Output line 2178 from AND gate 2174 is connected as the reset input to TAR1. The set input to TAR1 is line 2180. A signal appears on line 2180 at T6 time.

TAR2 is decremented by a signal applied to output line 2182 from AND gate 2184 and is incremented by a signal applied to output line 2186 from AND gates 2188 and 2190. One input to AND gate 2184 is output line 2192 from OR gate 2194. The inputs to OR gate 2194 are lines 2196–2199. A signal appears on line 2196 when trigger TR11CI is in its ON state. A signal appears on line 2197 when trigger TR24CI is in its ON state. A signal appears on line 2198 when trigger TR28CI is in its ON state and on line 2199 when trigger TR31CI is in its ON state. The other input to AND gate 2184 is line 2200. A signal appears on line 2200 at T2 time.

One input to AND gate 2188 is output line 2204 from OR gate 2206. One input to OR gate 2206 is the beforementioned line 2171 and a second input to this OR gate is output line 2208 from AND gate 2210. The inputs to AND gate 2210 are lines 2212 and 800. A signal appears on line 2212 when trigger TR16C13 is in its ON state. A signal appears on line 800 when H0 trigger 806 (FIG. 6F) is in its ON state. Two more inputs to OR gate 2206 are output line 2214 from AND gate 2216 and output line 2218 from AND gate 2220. One input to AND gates 2216 and 2220 is comparator-high output line 1852 from compare circuit 214 (FIG. 7B). The other input to AND gate 2216 is line 2222 and the other input to AND gate 2220 is line 2224. A signal appears on line 2222 when trigger TR4C13 is in its ON State and on line 2224 when trigger TR12C13 is in its ON state. The remaining inputs to OR gate 2206 are lines 2226 and 2227. A signal appears on line 2226 when trigger TR13CI is in its ON state and on line 2227 when trigger TR25CI is in its ON state. The other input to AND gate 2188 is line 2228. A signal appears on line 2228 at T8 time.

One input to AND gate 2190 is output line 2230 from OR gate 2232. One input to OR gate 2232 is the beforementioned line 2212. The other inputs to this OR gate is lines 2234–2243. A signal appears on line 2234 when trigger TR7C13 is in its ON state. A signal appears on line 2235 when trigger TR14C13 is in its ON state. A signal appears on line 2236 when trigger TR4CI is in its ON state. A signal appears on line 2237 when trigger TR8CI is in its ON state. A signal appears on line 2238 when trigger TR14CI is in its ON state. A signal appears on line 2239 when trigger TR30CI is in its ON state. A signal appears on line 2240 when trigger TR5CI is in its ON state. A signal appears on line 2241 when trigger TR9CI is in its ON state. A signal appears on line 2242 when trigger TR16CI is in its ON state and on line 2243 when trigger TR29CI is in its ON state. The other input to AND gate 2190 is line 2244. A signal appears on line 2244 at T2 time.

The data input to TAR2 is output lines 2248 from gate 2250. The information input to gate 2250 are the third and fourth lines of output lines 551 from CBR2 (FIG. 6J). The conditioning input to gate 2250 is line 2252. A signal appears on line 2252 when trigger TR2CI is in its ON state. Line 2252 is also connected as one input to OR gate 2254. The other inputs to OR gate 2254 are beforementioned line 2170 and line 2255. Output line 2264 from OR 2254 is connected as one input to AND gate 2262. The other input to AND gate 2262 is line 2266. A signal appears on line 2266 at T2 time. AND gate 2258 has as inputs the beforementioned lines 2157 and 2260. A signal appears on line 2260 at T8 time. Output line 2268 from AND gates 2258 and 2262 is the reset input to TAR2. The set input to TAR2 is line 2270. A signal appears on line 2270 at T6 time. Output lines 176A and 176B from TAR1 and TAR2 respectively are connected as the address inputs to K memory 170. In addition, output line 176A is also connected as the information input to previously described decoder 1000.

Referring now to FIG. 8, it is seen that only the control circuitry in X ring 240 (FIG. 4) Y ring 242, and some miscellaneous control circuitry is shown. The control circuitry for the initialize cycle and for cycles 1–14 is shown in graphic form in the appendix starting in column 81. Referring now to FIG. 8C, it is seen that set condition input to F trigger 2272 is line 2274. A signal appears on line 2274 when trigger TR4C1 is in its ON state. Until otherwise indicated, all triggers mentioned are in the X ring. The function of F trigger 2272 will be described later. The reset-condition input to F trigger 2272 is output line 2276 from OR gate 2278. One input to OR gate 2278 is output line 2280 from AND gate 2282. The inputs to AND gate 2282 are lines 1174, 2283 and 2284. A signal appears on line 1174 when cycle 5 trigger 1179 is in its ON state and a signal appears on line 2284 when trigger TR2C2 is in its ON state. Line 2283 is the read finished line from the CPU (FIG. 6H). A second input to OR gate 2278 is output line 2286 from AND gate 2288 (FIG. 8C). One input to AND gate 2288 is output line 1174 from the ON side of cycle 5 trigger 1179. The other input to AND gate 2288 is output line 2290 from inverter 2292. The input to inverter 2292 is cycle 5 output line 2294 from AND gate 2296. A signal appears on line 2294 when the circuit is in cycle 5 of its operation. The inputs to AND gate 2296 will be described later. The final input to OR gate 2278 (FIG. 8B) is line 2298. A signal is applied to line 2298 by host CPU50 (FIG. 6H), at the beginning of the operation. Output line 2276 from OR gate 2278 is also the set condition input to cycle 1 trigger 2300 and the reset condition input to cycle 5 trigger 1179.

The reset condition input to cycle 1 trigger 2300 is output line 2302 from OR gate 2304. One input to OR gate 2304 is output line 2306 from OR gate 2308. The inputs to OR gate 2308 are lines 2310–2312. A signal is applied to line 2310 when trigger TR3C1 is in its ON state. A signal is applied to line 2311 when trigger TR14CI is in its ON state and to line 2312 when trigger TR6C1 is in its ON state. A second input to OR gate 2304 is line 2314. A signal appears on line 2314 when trigger TR4C1 is in its ON state. The final input to OR gate 2304 is output line 2316 from AND gate 2318 (FIG. 8C). One input to AND gate 2318 is output line 2320 from cycle 1 trigger 2300. The other input to AND gate 2318 is output line 2322 from inverter 2324. The input to inverter 2324 is cycle 1 output line 2326 from AND gate 2328. Line 2302 is also connected as the set condition input to cycle 2 trigger 1176.

The reset condition input to cycle 2 trigger 1176 is output line 2330 from OR gate 2332. One input to OR gate 2332 is output line 2334 from AND gate 2336. One input to AND gate 2336 is output line 1171 from the ON side of cycle 2 trigger 1176 and a second input to the AND gate is the beforementioned read finished line 2283 from the CPU50. The final input to AND gate 2336 is line 2338. A signal appears on line 2338 when trigger TR2C2 is in its ON state. The other input to OR gate 2332 is output line 2340 from AND gate 2342. (FIG. 8C.) One input to AND gate 2342 is output line 1171 from the ON side of cycle 2 trigger 1176. The other input to AND gate 2324 is output line 2344 from inverter 2346. The input to inverter 2346 is cycle 2 output line 2348 from AND gate 2350. Line 2330 is also connected as the set condition input to cycle 3 trigger 1177 (FIG. 8B).

The reset condition input to cycle 3 trigger 1177 and the set condition input to cycle 4 trigger 1178 is output line 2352 from OR gate 2354. One input to OR gate 2354 is output line 2356 from AND gate 2358. One input to AND gate 2358 is output line 1172 from the ON side of cycle 3 trigger 1177; a second input is the beforementioned read-finished line 2283 from the CPU, and the final input to AND gate 2358 is beforementioned line 2338. The other input to OR gate 2354 is output line 2360 from AND gate 2362 (FIG. 8C). One input to AND gate 2362 is output line 1172 from the ON side of cycle 3 trigger 1177 and the other input to AND gate 2362 is output line 2364 from inverter 2366. The input to inverter 2366 is output line 2368 from AND gate 2370.

The reset condition input to cycle 4 trigger 1178 and the set condition input to cycle 5 trigger 1179 is output line 2372 from OR gate 2374. One input to OR gate 2374 is output line 2376 from AND gate 2378. One input to AND gate 2378 is output line 1173 from cycle 4 trigger 1178 and the other inputs to AND gate 2378 are the beforementioned lines 2283 and 2338. The other input to OR gate 2374 is output line 2380 from AND gate 2382 (FIG. 8C). One input to AND gate 2382 is output line 1173 from the ON side of cycle 4 trigger 1178 and the other input to AND gate 2382 is output line 2384 from inverter 2386. The input to inverter 2386 is cycle 4 output line 2388 from AND gate 2390.

The set condition input to C trigger 2392 (FIG. 8C) is line 2394. The host CPU50 applies a signal to line 2394 whenever it has an instruction word which it wishes to apply to the file storage system. The reset condition input to C trigger 2392 is output line 2306 from OR gate 2308.

The set condition input to RX triggers 2400–2403 are lines 2410–2413 respectively. A signal is applied to a line 2410–2413 when hierarchy level HR0–HR3 respectively has finished loading a record to be read into the associated read buffer register 70–73 (FIG. 6H).

The reset condition inputs to RX triggers 2400–2403 are the beforementioned lines 2334, 2356, 2376 and 2280 respectively. The set input to all of the triggers in the X ring mentioned so far is line 2416. A signal appears on line 2416 at T9 time.

Output line 2418 from the OFF side of F trigger 2272 (FIG. 8C) is connected as one input to AND gate 2420, the other input to this AND gate being output line 2422 from the ON side of C trigger 2392. Output line 2424 from AND gate 2420 is connected as one input to OR gate 2426. The other inputs to OR gate 2426 are output lines 2430–2433 from RX triggers 2400–2403 respectively. Output line 2436 from OR gate 2426 is referred to as the X-ring-busy line. Line 2436 is connected through inverter 2437 the X-ring-not-busy line 2439. Signals on lines 2436 and 2439 are used in various cycles of the operation.

One input to AND gate 2328 is output line 2320 from cycle 1 trigger 2300 and a second input to this AND gate is output line 2422 from C trigger 2392. The final input to AND gate 2328 is output line 2438 from the OFF side of X-ring-inhibit trigger 2440 (FIG. 8A). The set condition input to trigger 2440 is output line 2442 from OR gate 2444. The inputs to OR gate 2444 are lines 2446–2454. A signal is applied to line 2446 when trigger TR29C13 is in its ON state. A signal is applied to line 2447 when trigger TR26C13 is in its ON state. A signal is applied to line 2448 when trigger TR1C6 is in its ON state. A signal is applied to line 2449 when trigger TR9C7 is in its ON state. A signal is applied to line 2450 when trigger TR1C8 is in its ON state. A signal is applied to line 2451 when trigger TR15C8 is in its ON state. A signal is applied to line 2452 when trigger TR2C12 is in its ON state. A signal is applied to line 2453 when trigger TR2C14 is in its ON state and to line 2454 when trigger TR22C13 is in its ON state. The reset condition input to X-ring-inhibit trigger 2440 is output line 2460 from OR gate 2462. The inputs to OR gate 2462 are lines 2464–2470. A signal appears on line 2464 when trigger TR5C6 is in its ON state. A signal appears on line 2465 when trigger TR10C7 is in its ON state. A signal appears on line 2466 when trigger TR2C6 is in its ON state. A signal appears on line 2467 when trigger TR2C8 is in its ON state. A signal appears on line 2468 when trigger TR11C8 is in its ON state. A signal appears on line 2469 when trigger TR23C13 is in its ON state and on line 2470 when trigger TR27C13 is in its ON state. The set input to trigger 2440 is line 2471. A signal appears on line 2471 to T0 time. Line 2438 is also connected as one input to AND gates 2350, 2370, 2390, and 2296.

Output lines 1171–1174 from the ON side of triggers 1176–1179 respectively form a second input to AND gates 2350, 2370, 2390, and 2296 respectively. The final input to these AND gates is output lines 2430–2433 from RX triggers 2400–2403 respectively.

Figure 8F:
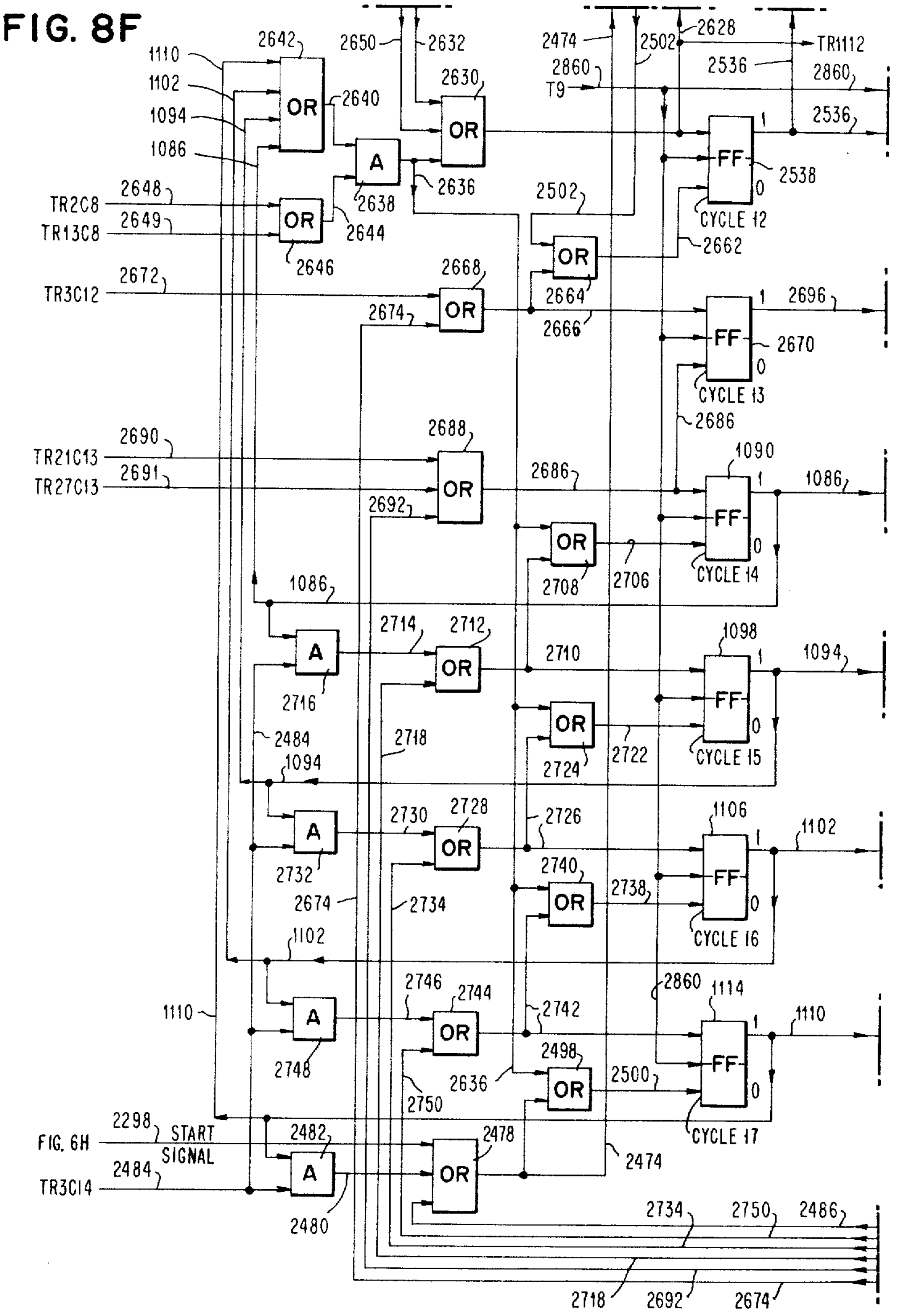
Figure 8G:
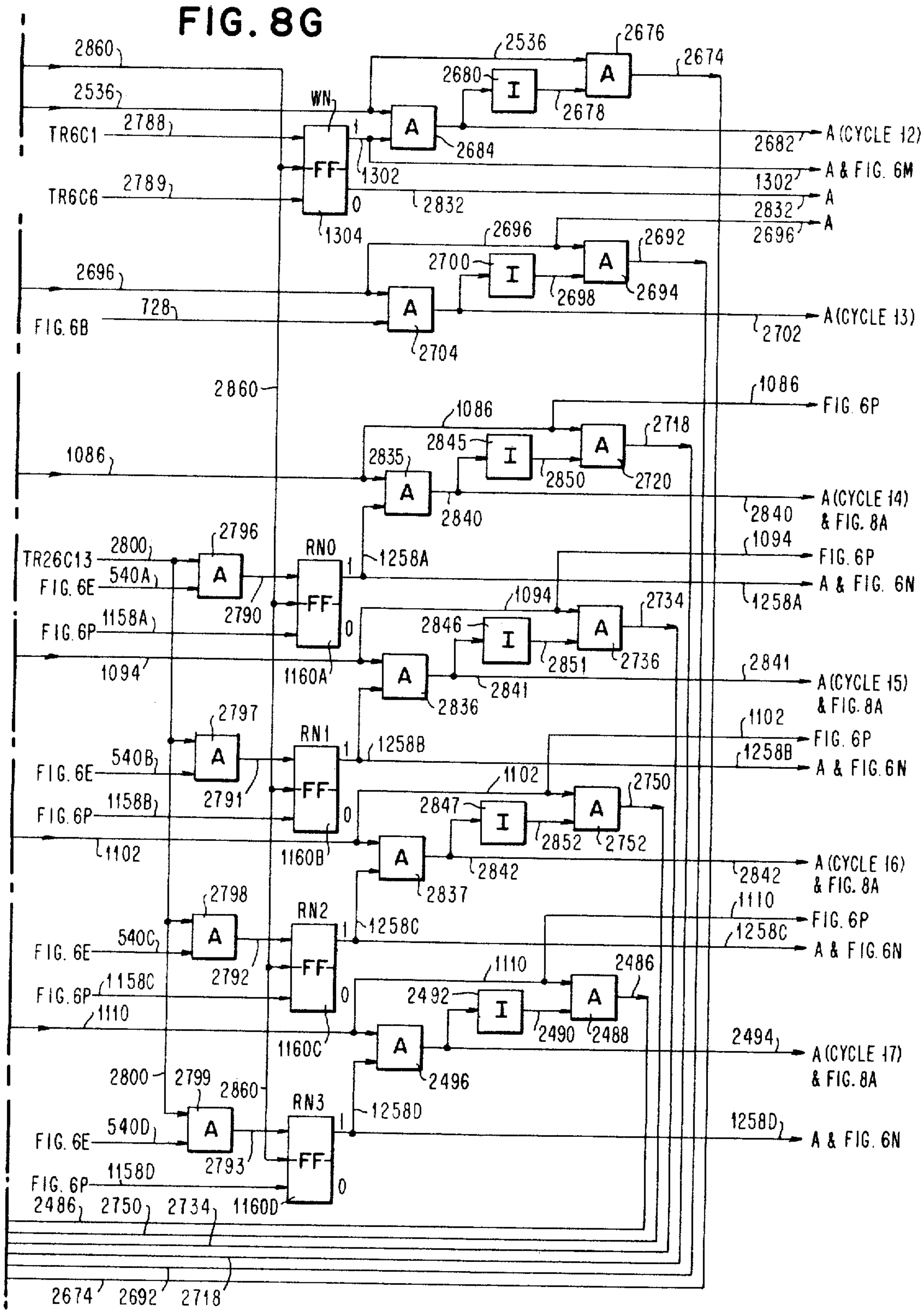

The set condition input to cycle 6 trigger 2472 is output line 2474 from OR gate 2478 (FIG. 8F). Until otherwise indicated, all triggers mentioned now are triggers in the Y ring. One input to OR gate 2478 is start line 2298 from CPU50 (FIG. 6H). A second input to OR gate 2478 is output line 2480 from AND gate 2482. One input to AND gate 2482 is line 2484. A signal appears on line 2484 when trigger TR3C14 is in its ON state. The other input to AND gate 2482 is output line 1110 from cycle 17 trigger 1114. The final input to OR gate 2478 is output line 2486 from AND gate 2488 (FIG. 8G). One input to AND gate 2488 is the beforementioned output line 1110 from cycle 17 trigger 1114. The other input to AND gate 2488 is output line 2490 from inverter 2492. The input to inverter 2492 is cycle 17 output line 2494 from AND gate 2496. Line 2474 is also connected through OR gate 2498 (FIG. 8F) and line 2500 as the reset condition input to cycle 17 trigger 1114.

The reset input to cycle 6 trigger 2472 is output line 2502 from AND gate 2504. One input to AND gate 2504 is output line 2506 from OR gate 2508 and the other input is output line 2510 from OR gate 2512. One input to OR gate 2508 is output line 2514 from OR gate 2516. One input to OR gate 2516 is output line 2518 from AND gate 2520. The inputs to AND gate 2520 are output lines 1516 from OR gate 1514 (FIG. 6D) and line 2522. A signal appears on line 1516 when the contents of LAC2 are not equal to zero. A signal appears on line 2522 when trigger TR9C6 is in its ON state. The other inputs to OR gate 2516 are lines 2524 and 2525. A signal appears on line 2524 when trigger TR2C6 is in its ON state and on line 2525 when trigger TR11C6 is in its ON state.

The other input to OR gate 2508 is output line 2526 from inverter 2528 (FIG. 8E). The input to inverter 2528 is cycle 6 output line 2530 from AND gate 2532.

The inputs to OR gate 2512 are output line 2534 from the ON side of cycle 6 trigger 2472 and output line 2536 from the ON side of cycle 12 trigger 2538 (FIG. 8F). Output line 2502 from AND gate 2504 (FIG. 8D) is also connected as the set condition input to cycle 7 trigger 2540.

Output line 2542 from OR gate 2544 (FIG. 8D) is connected as the reset condition input to cycle 7 trigger 2540, NL trigger 2546 (FIG. 8E), and as the set condition input to cycle 8 trigger 1088. Two inputs to OR gate 2544 are lines 2548 and 2549. A signal appears on line 2548 when trigger TR13C7 is in its ON state and on line 2549 when trigger TR7C7 is in its ON state. The final input to OR gate 2544 is output line 2550 from AND gate 2552 (FIG. 8E). One input to AND gate 2552 is output line 2554 from the ON side of cycle 7 trigger 2540. The other input to AND gate 2552 is output line 2556 from inverter 2558. The input to inverter 2558 is cycle 7 output line 2560 from AND gate 2562.

The reset condition input to cycle 8 trigger 1088 (FIG. 8D) and the set condition input to cycle 9 trigger 1096 is output line 2564 from OR gate 2566. One input to OR gate 2566 is output line 2568 from AND gate 2570. One input to AND gate 2570 is output line 1084 from the ON side of cycle 8 trigger 1088 and the other input to this AND gate is output line 2572 from OR gate 2574. The inputs to OR gate 2574 are lines 2576 and 2577. A signal appears on line 2576 when trigger TR2C8 is in its ON state and on line 2577 when trigger TR13C8 is in its ON state. The other input to OR gate 2566 is output line 2578 from AND gate 2580 (FIG. 8E). One input to AND gate 2580 is output line 1084 from cycle 8 trigger 1088 and the other input to this AND gate is output line 2582 from inverter 2584. The input to inverter 2584 is output line 2586 from AND gate 2588.

The reset condition input to cycle 9 trigger 1096 and the set condition input to cycle 10 trigger 1104 is output line 2588 from OR gate 2590. One input to OR gate 2590 is output line 2592 from AND gate 2594. One input to AND gate 2594 is output line 1092 from the ON side of trigger 1096 and the other input to AND gate 2594 is beforementioned line 2572. The other input to OR gate 2590 is output line 2596 from AND gate 2598. One input to AND gate 2598 is output line 1092 from the ON side of trigger 1096 and the other input to this AND gate is output line 2600 from inverter 2602. The input to inverter 2602 is output line 2604 from AND gate 2606.

Output line 2608 from OR gate 2610 (FIG. 8D) is the reset condition input to cycle 10 trigger 1104 and the set condition input to cycle 11 trigger 1112. One input to OR gate 2610 is output line 2612 from AND gate 2614. One input to AND gate 2614 is output line 1100 from the ON side of trigger 1104 and the other input to this AND gate is beforementioned line 2572. The other input to OR gate 2610 is output line 2616 from AND gate 2618 (FIG. 8E). One input to AND gate 2618 is output line 1100 from the ON side of trigger 1104 and the other input to this AND gate is output line 2620 from inverter 2622. The input to inverter 2622 is output line 2624 from AND gate 2626.

The reset condition input to cycle 11 trigger 1112 and the set condition input to cycle 12 trigger 2538 (FIG. 8F) is output line 2628 from OR gate 2630. One input to OR gate 2630 is output line 2632 from AND gate 2634. The inputs to AND gate 2634 are output line 1108 from the ON side of trigger 1112 and the beforementioned line 2572. The second input to OR gate 2630 is output line 2636 from AND gate 2638. One input to AND gate 2638 is output line 2640 from OR gate 2642. The inputs to OR gate 2642 are output lines 1086, 1094, 1102, and 1110 from the ON side of cycle 14-cycle 17 triggers 1090, 1098, 1106, and 1114 respectively. The final input to AND gate 2638 is output line 2644 from OR gate 2646. The inputs to OR gate 2646 are lines 2648 and 2649. A signal appears on line 2648 when trigger TR2C8 is in its ON state and on line 2649 when trigger TR13C8 is in its ON state.

The final input to OR gate 2630 is output line 2650 from AND gate 2652 (FIG. 8E). One input to AND gate 2652 is output line 1108 from the ON side of cycle 11 trigger 1112 and the other input to this AND gate is output line 2654 from inverter 2656. The input to inverter 2656 is output line 2658 from AND gate 2660.

The reset condition input to cycle 12 trigger 2538 (FIG. 8F) is output line 2662 from OR gate 2664. One input to OR gate 2664 is output line 2502 from AND gate 2504 (FIG. 8D). The other input to OR gate 2664 is output line 2666 from OR gate 2668. Line 2666 is also the set condition input to cycle 13 trigger 2670. One input to OR gate 2668 is line 2672 and the other input to this OR gate is output line 2674 from AND gate 2676 (FIG. 8G). A signal appears on line 2672 when trigger TR3C12 is in its ON state. One input to AND gate 2676 is output line 2536 from the ON side of cycle 12 trigger 2538 and the other input to this AND gate is output line 2678 from inverter 2680. The input to inverter 2680 is cycle 12 output line 2682 from AND gate 2684.

The reset condition input to cycle 13 trigger 2670 and the set condition input to cycle 14 trigger 1090 is output line 2686 from OR gate 2688. Lines 2690 and 2691 form two inputs to OR gate 2688. A signal appears on line 2690 when trigger TR21C13 is in its ON state and on line 2691 when trigger TR27C13 is in its ON state. The final input to OR gate 2688 is output line 2692 from AND gate 2694 (FIG. 8G). One input to AND gate 2694 is output line 2696 from the ON side of cycle 13 trigger 2670 and the other input to this AND gate is output line 2698 from inverter 2700. The input to inverter 2700 is cycle 13 line 2702 from AND gate 2704.

The reset condition input to cycle 14 trigger 1090 is output line 2706 from OR gate 2708. One input to this OR gate is beforementioned line 2636 and the other input to this OR gate is output line 2710 from OR gate 2712. Line 2710 is also the set condition input to cycle 15 trigger 1098. One input to OR gate 2712 is output line 2714 from AND gate 2716. One input to AND gate 2716 is output line 1086 from the ON side of cycle 14 trigger 1090 and the other input to this AND gate is beforementioned line 2484. The other input to OR gate 2712 is output line 2718 from AND gate 2720 (FIG. 8G).

The reset condition input to cycle 15 trigger 1098 is output line 2722 from OR gate 2724. One input to this OR gate is beforementioned line 2636 and the other input is output line 2726 from OR gate 2728. Line 2726 is also the set condition input to cycle 16 trigger 1106. One input to OR gate 2728 is output line 2730 from AND gate 2732. One input to AND gate 2732 is output line 1094 from the ON side of cycle 15 trigger 1098 and the other input to this AND gate is line 2484. The other input to OR gate 2728 is output line 2734 from AND gate 2736 (FIG. 8G).

The reset condition input to cycle 16 trigger 1106 is output line 2738 from OR gate 2740. One input to OR gate 2740 is line 2636 and the other input is output line 2742 from OR gate 2744. Line 2742 is also the set condition input to cycle 17 trigger 1114. One input to OR gate 2744 is output line 2746 from AND gate 2748. One input to AND gate 2748 is line 2484 and the other input to this AND gate is output line 1102 from the ON side of cycle 16 trigger 1106. The other input to OR gate 2744 is output line 2750 from AND gate 2752 (FIG. 8G). Line 2636 also forms the other input to beforementioned OR gate 2498 (FIG. 8F).

The set condition input to WE1 and WE2 triggers 2754 (FIG. 8E) and 2755 is lines 2756 and 2758 respectively. Write station W1 (FIG. 6C) applies a signal to line 2756 when it is finished writing a record on the loop and HR0 applies a signal to line 2758 when it has completed writing a record on the drum. Output line 2514 from OR gate 2516 (FIG. 8D) is the reset condition input to the WE1 and WE2 triggers.

The set condition input to new loop (NL) trigger 2546 is line 2760. A signal appears on line 2760 when trigger TR11C6 is in its ON state.

The set condition input to REX triggers 2770–2773 is output lines 2776–2779 respectively from AND gates 2780–2783. One input to AND gates 2780–2783 is line 2786. A signal appears on line 2786 when trigger TR2C2 is in its ON state. A second input to each of these AND gates is read-finished line 2283 from the CPU (FIG. 6H). The other input to AND gates 2780–2783 is output lines 1171–1174 respectively from cycle 2–cycle 5 triggers 1176–1179. The reset condition inputs to REX triggers 2770–2773 are output lines 2568, 2592, 2612, and 2632 respectively from AND gates 2570, 2594, 2614 and 2634.

The set and reset inputs to WN trigger 1304 (FIG. 8G) are lines 2788 and 2789 respectively. A signal appears on line 2788 when trigger TR6C1 is in its ON state and on line 2789 when trigger TR6C6 is in its ON state.

The set condition inputs to RNX triggers 1160A–1160D are output lines 2790–2793 respectively from AND gates 2796–2799. One input to AND gates 2796–2799 is line 2800. A signal appears on line 2800 when trigger TR26C13 is in its ON state. The other input to AND gates 2796–2799 is output lines 540A–540D respectively from DAR1 register 98A (FIG. 6E). The reset condition inputs to RNX triggers 1160A–1160D are the beforementioned lines 1158A–1158D from AND gates 1140A–1140D (FIG. 6P).

The three inputs to AND gate 2532 (FIG. 8E) are output line 2534 from the ON side of cycle 6 trigger 2472, output line 2804 from the ON side of WE1 trigger 2754 and output line 2806 from the ON side of WE2 trigger 2755. The OFF side output lines from triggers 2754 and 2755 are lines 2808 and 2810 respectively. The two inputs to AND gate 2552 are output line 2554 from the ON side of cycle 7 trigger 2540 and output line 2556 from inverter 2558.

One input to AND gates 2588, 2606, 2626, and 2660 are output lines 1084, 1092, 1100, and 1108 respectively from the ON sides of cycle 8–cycle 11 triggers 1088, 1096, 1104, and 1112. The other input to these AND gates is output lines 2816–2819 respectively from the ON side of REX triggers 2770–2773. Output lines 2586, 2604, 2624, and 2658 from AND gates 2588, 2606, 2626, and 2660 respectively are referred to as the cycle 8–cycle 11 lines respectively. Lines 2826–2829 are the OFF side output lines from REX trigger 2770–2773 respectively.

The two inputs to AND gate 2684 (FIG. 8G) are output line 2536 from the ON side of cycle 12 trigger 2538 and output line 1302 from the ON side of WN trigger 1304. Line 2832 is the output line from the OFF side of WN trigger 1304. The two inputs to AND gate 2704 are output line 2696 from the ON side of cycle 13 trigger 2670 and output line 728 from the OFF side of directory-busy trigger 722 (FIG. 6B).

Output lines 1086, 1094, 1102, and 1110 from the ON side of cycle 14–cycle 17 triggers 1090, 1098, 1106, and 1114 are connected as one input to AND gates 2835, 2836, 2837, and 2496 respectively. The other inputs to these AND gates are output lines 1258A–1258D respectively from the ON side of RNX triggers 1160A–1160D. Output lines 2840–2842 from AND gates 2835–2837 respectively are connected as the inputs to inverters 2845–2847. Output lines 2850–2852 from inverters 2845–2847 are connected as one input to AND gates 2720, 2736, and 2752 respectively. The other input to these AND gates is output lines 1086, 1094, and 1102 from the ON side of cycle 14–cycle 16 triggers 1090, 1098, and 1106. Lines 2840–2842 are also referred to as the cycle 14–cycle 16 lines respectively.

The set input to each of the Y ring triggers mentioned above is line 2860. A signal appears on line 2860 at T9 time.

In addition to the X and Y ring and the control circuitry for the various cycles illustrated in chart form in the appendix starting in column A1, the control circuitry also includes two triggers 2862 (FIG. 8A) and 2864 designated the X trigger and Y trigger respectively. The set-condition input to X trigger 2862 is output line 2864 from OR gate 2868. The inputs to OR gate 2868 are lines 2870–2874. A signal appears on line 2870 when TR3C1 is in its ON state. A signal appears on line 2871 when trigger TR4C1 is in its ON state. A signal appears on line 2872 when trigger TR6C1 is in its ON state. A signal appears on line 2873 when trigger TR14CI is in its ON state and on line 2874 when trigger TR2C2 is in its ON state. The reset condition input to X trigger 2862 is output line 2878 from OR gate 2880. The inputs to OR gate 2880 are lines 2882 and 2883. A signal appears on line 2882 when trigger TR1C1 is in its ON state and on line 2883 when trigger TR1C2 is in its ON state.

The set condition input to Y trigger 2864 is output line 2884 from OR gate 2886. The inputs to OR gate 2886 are lines 2888–2897. A signal appears on line 2888 when trigger TR2C6 is in its ON state. A signal appears on line 2889 when trigger TR9C6 is in its ON state. A signal appears on line 2890 when trigger TR7C7 is in its ON state. A signal appears on line 2891 when trigger TR13C7 is in its ON state. A signal appears on line 2892 when trigger TR2C8 is in its ON state. A signal appears on line 2893 when trigger TR13C8 is in its ON state. A signal appears on line 2894 when trigger TR3C12 is in its ON state. A signal appears on line 2895 when trigger TR21C13 is in its ON state. A signal appears on line 2896 when trigger TR27C13 is in its ON state and on line 2897 when trigger TR3C14 is in its ON state. The reset condition input to Y trigger 2864 is output line 2900 from OR gate 2902. The inputs to OR gate 2902 are lines 2904–2909. A signal appears on line 2904 when trigger TR1C6 is in its ON state. A signal appears on line 2905 when trigger TR1C7 is in its ON state. A signal appears on line 2906 when trigger TR1C8 is in its ON state. A signal appears on line 2907 when trigger TR1C12 is in its ON state. A signal appears on line 2908 when trigger TR20C13 is in its ON state and on line 2909 when trigger TR1C14 is in its ON state.

The set input to triggers 2862 and 2864 is line 2912. A signal appears on line 2912 at T0 time. Line 2914 is the output line from the ON side of X trigger 2862 and line 2916 is the output line from the ON side of Y trigger 2864. Signals on lines 2914 and 2916 are used throughout the various cycles of operation.

FIG. 8A also shows a control gating circuit which is employed during cycles 14–17 of the operation. This circuit includes four AND gates 2920–2923, the output lines 2926–2929 from which are connected as the inputs to OR gate 2930. Output line 2932 is one output line from the circuit and is also connected through inverter 2934 to line 2936, which line is the other output line from the circuit.

One input to AND gates 2920–2923 is HRX not-busy lines 1188A–1188D from hierarchy levels HR0–HR3 respectively. A second input to these AND gates is cycle 14–cycle 17 lines 2840, 2841, 2842, and 2494 respectively. The final inputs to AND gates 2920–2923 are output lines 2826–2829 respectively from the OFF side of REX triggers 2770–2773 respectively.

DETAILED DESCRIPTION OF OPERATION

*Cycle 1 and initialize*

Prior to the start of an operation, all triggers are reset except X trigger 2862 and Y trigger 2864 (FIG. 8A) which are set to their ON state. W register 110 and WQ register 109 are set to the address of the first position in the write portion of CCB84 and RX registers 113–116 (FIG. 6N), RQ register 111, and RT register 112 (FIG. 6M) are all set to the address of the first position in the read portion of CCB. All other registers in the circuit are reset.

Host CPU50 (FIG. 6H) has an instruction register in which a read, write, or initialize instruction to be applied to circuit 26 is stored. When an instruction is stored in this register in the CPU, the CPU applies a signal to line 2394 (FIG. 8C) to condition C trigger 2392 to be set. If the hierarchy storage device is not already in operation at this time, a signal is also applied by the CPU to line 2298 which signal is applied through OR gate 2278 (FIG. 6B) and line 2276 to condition F trigger 2272 to be reset, cycle 1 trigger 2300 to be set, cycle 5 trigger 1179 to be reset, cycle 17 trigger 1114 (FIG. 8F) to be reset, and cycle 6 trigger 2472 (FIG. 8D) to be set. At the next T9 time, a set signal is applied to all of these triggers to cause the indicated setting and resetting operations to be effected. This leaves the circuit with C trigger 2392 in its ON state, cycle 1 trigger 2300 in its ON state, cycle 6 trigger 2472 in its ON state, X trigger 2862 in its ON state, Y trigger 2864 in its ON state, and all other triggers in their OFF state.

Referring to FIG. 8C, it is seen that under these conditions, AND gate 2328 is fully conditioned to generate an output signal on cycle 1 line 2326. Since the WEX (FIG. 8E) triggers are not set to their ON state at this time, there is no output on cycle 6 output line 2530 at this time. Referring to the appendix, it is seen that the combined occurrence of an output signal on cycle 1 output line 2326 and X trigger 2862 being in its ON state causes trigger TR1C1 to be set to its ON state. When trigger TR1C1 is in its ON state, a signal is applied through line 2882 and OR gate 2880 (FIG. 8A) to X trigger reset condition line 2878. At T0 time, a signal is applied to line 2912 to cause X trigger 2862 to be reset to its OFF state. This prevents any other cycle of the X ring from being started while cycle 1 is in process. At the same time, a signal is also being applied through line 512 (FIG. 6J) to one input of OR gates 414 (FIG. 6J), 415, and 416. Output lines 425–427 from these OR gates partially condition AND gates 435–437. At T0 time, a signal is applied to lines 445–447 to fully condition these AND gates causing output signals on lines 455–457 which reset CBR1–CBR3. The signal on line 512 also conditions gates 507–509 to apply the instruction contained in the instruction register (not shown) of CPU50 (FIG. 6H) to one data input of CBR1–CBR3. The signals on line 425–427 are also applied to partially condition AND gates 430–432 which gates are fully conditioned at T1 time by the signal applied to lines 440–442. This causes the instruction from the instruction register to be set into CBR1–CBR3. Referring to the instruction format (FIG. 10), it is seen that for a read, write, or initialize instruction, the operation code is transferred into the CBR3 position at this time. For a read or write operation, the record name is transferred into CBR1 at this time and the host core memory location from which or into which information is to be written or read is stored in CBR2. The contents of CBR3 are applied through lines 552 to decoder 90. From the appendix it can be seen that the next trigger to be switched to its ON state is either TR1CI, TR2C1, or TR5C1, depending on whether an initialize, a read, or a write instruction is indicated by the operation code in CBR3.

Since it is necessary to have an understanding of the initialize operation in order to understand the record retrieval cycle, it will be assumed that the operation code in CBR3 at this time is for an initialize operation and that decoder 90 is therefore generating an output signal on line 582 at this time. Referring to column A1, it is seen that when trigger TR1C1 is in its ON state, and there is an initialize indication on line 582 from decoder 90, trigger TR1CI is conditioned to be set to its ON state and trigger TR1C1 is conditioned to be reset. At T9 time, the indicated set and reset operations occur. Since the desired set and reset operations always occur at T9 time, in the future it will merely be stated that these operations occur at the end of the trigger cycle without specifically indicating that conditioning signals are generated and without mentioning T9 time.

Referring to FIG. 6I, it is seen that when trigger TR1CI is in its ON state, a signal is applied through line 590, OR gate 588, and line 586 to condition gate 574 to apply the address of the second word of the initialize command through lines 596 to the data input of MAR62 and to condition AND gate 598. At T0 time, a signal is applied to line 600, fully conditioning AND gate 598 to generate an output signal on line 602 which resets MAR and at T1 time a signal is applied to line 604 to set the desired address into MAR. A signal is also applied to line 350 to partially condition AND gates 352, 354, and to condition gate 346. The signal on line 350 is also applied through OR gate 355 and line 363 to condition AND gate 365. At T0 time, a signal is applied to line 367, fully conditioning AND gate 365 to cause a reset signal to be applied to MBR56. At T3 time, a signal is applied to line 356, fully conditioning AND gate 352 to generate an output signal on line 358 which causes a read cycle of host core memory causing the contents of the address indicated in MAR, in this case the second word of the initialize instruction, to be read out of host core memory 52 onto lines 348. Since gate 346 is conditioned at this time, the word is applied through lines 344 to a data input of MBR56. At T5 time, a signal is applied to line 360, fully conditioning AND gates 354 to apply a set signal to MBR. The second word of the initialize command is therefore stored in MBR. At T9 time, TR1CI is reset and TR2CI set.

In order to understand the operations which are about to be performed, reference should first be made to FIGS. 11 and 12. FIG. 11 shows the format of K memory 170 (FIG. 7G). Each address in K memory is represented by four binary bits, the two higher order of these bits being contained in TAR1 (FIG. 7E) and indicating, in binary numbers, the hierarchy level which the contents of that address refer to. The lowest order two bits indicate the constant which is stored in that address of K memory and are stored in TAR2. When TAR2 contains the address 00, a constant indicating the capacity of the particular hierarchy level is being accessed. This constant is indicated by the character NX. The 01 address for the hierarchy level H0 and the binary 10 address for the remaining hierarchy levels contain a constant designated DX. The manner in which this constant is computed will be described presently. The 10 position for hierarchy H0 and the 11 position for the remaining hierarchies contain a constant YHX which is the address of the last loop which was stored in that hierarchy level before a previous capacity addition was made. For hierarchy levels 1, 2, and 3, the 01 position contains a constant *d*HX which indicates the number of empty positions in that hierarchy.

If all capacity additions were to be made at a time when the last new loop applied to the hierarchy level had been applied to the last loop storage position, the initialize operation would be a relatively simple one. However, it is anticipated that some of the lower levels of the hierarchy would have a storage capacity of months, years, or even several years. It would therefore not be feasible to wait until such time as the end of the hierarchy is reached once a decision to add capacity has been made. The circuit of this invention is therefore capable of adding capacity at any time in the cycle.

This is accomplished by providing new storage positions on the end of the storage bin and physically moving the oldest loop in the storage bin to the new last position in the storage bin, the next to the oldest loop in the bin to the next higher position, and so on until all records stored during the preceding load cycle of the hierarchy level have been moved down *d*H positions where *d*H is the number of new positions to be added. For example, if the initial capacity of the bin were ten, the first ten loops stored in the bin would be numbered 1 through 10. Loop 11 would be stored in place of loop 1 and loop 1 would be moved on to the next level in the hierarchy. Similarly, loop 12 would be substituted for loop 2 and loop 13 for loop 3. Assume at this time it is decided to add ten new positions to the hierarchy level. At this time, loop 10 would be moved down to new position 20, loop 9 to position 19, and so on, with loop 4 being moved down to new position 14. The empty positions in the bin would be between loop 13 and loop 1.

FIG. 12 shows the calculations which must be performed in order to up-date the constants stored in K memory 170. In these calculations, *d*HX is the number of new positions which must be added. Z is the number of the last loop which has been stored in the hierarchy. YHX, DX and NX are all obtained from K memory. As a result of the calculations performed, a new DX is computed and stored in K memory. The value of Z becomes the new YHX. The reason for adding the new base in the computation of a new D1 is to prevent the occurrence of negative numbers.

Referring now to FIG. 6J, it is seen that when TR2CI is in its ON state, a signal is applied through line 412 to set-reset OR gates 414–415 causing CBR1–CBR2 to be reset at T0 time. The signal applied to line 412 also conditions gates 408 and 409 to cause the first two bytes in MBR, these being the second word of the initialize command, to be applied to the data inputs 420 and 421 of CBR1 and CBR2. At T1 time, these values are set into CBR1 and CBR2. Referring now to FIG. 7E, it is seen that when TR2CI is in its ON state, signals are applied to lines 2166 and 2252 causing AND gates 2174 and 2262 and gates 2164 and 2250 to be conditioned. At T2 time, signals are applied to lines 2176 and 2266, fully conditioning AND gates 2174 and 2262 to generate output signals on lines 2178 and 2268 which reset TAR1 and TAR2. It will be remembered that, referring to FIG. 10, the address in K memory of *d*HX has just been stored in CBR2. The first two bits of this address are applied through lines 551 and gate 2164 to data lines 2162 of TAR1 and the last two bits of this address are applied through lines 551 and gate 2250 to data lines 2248 of TAR2. At T6 time, signals are applied to lines 2180 and 2270 to cause this address to be set into TAR1 and TAR2. Finally, when trigger TR2CI is in its ON state, a signal is applied through lines 2050 (FIG. 7F) to condition gate 2002 to apply the new *d*HX stored in CBR1 to data line 1992 of K register 174. The signal on line 2050 is also applied through OR gate 2066 to condition AND gates 2070 and 2072. At T0 time, a signal is applied to line 2076, fully conditioning AND gate 2072 to generate an output signal which causes K register 174 to be reset. At T6 time, a signal is applied to line 2074, fully conditioning AND gate 2070 to generate a set signal on line 2108 causing the new value of *d*HX to be set into K register 174. At T9 time, TR2CI is reset and TR3CI set.

When trigger TR3CI is in its ON state, a signal is applied to line 2124 causing AND gate 2112 (FIG. 7G) to be conditioned. At T7 time, a signal is applied to line 2128 resulting in an output signal on line 2110 which causes a write cycle of K memory to be performed. This results in the new value of *d*HX stored in K register 174 being read into K memory at the address indicated in TAR1 and 2. The code for the hierarchy level to which capacity is to be added is at this time stored in TAR1. This is decoded by decoder 1000 (FIG. 7E) causing an output signal on the appropriate one of the lines 998, 1002, and 1004. When TR3CI is in its ON state, a signal is applied through line 1006 (FIG. 6F) to partially condition AND gates 996, 1034, and 1054. Depending on the output from decoder 1000, one of these AND gates will be fully conditioned causing an output signal which will condition the appropriate HX trigger 807–809 to be set to its ON state. At T8 time, a signal is applied to line 964 to cause the appropriate setting to occur.

Referring now to FIG. 12, it can be seen that the value of Z used in the calculations differs for the different hierarchy levels; therefore, certain additional calculations are required if a capacity addition is to be made to hierarchy level HR2 or HR3 over and above those required if the addition is to be made to hierarchy level HR1. It will be assumed first that the capacity addition is to be made to hierarchy level HR1. The additional calculations which are required when capacity additions are to be made to other levels of the hierarchy will be described later. Assuming then that the capacity addition is to be made to hierarchy HR1, H1 trigger 807 is set to its ON state at T8 time. With TR3CI in its ON state and the H1 trigger set, it can be seen from the appendix that, at T9 time, trigger TR3CI is reset and trigger TR4CI set.

It is now desired to calculate the modulo value of the ratio (quantity between two vertical lines) shown in FIG. 12. When TR4CI is in its ON state, a signal is applied to line 2236 to partially condition AND gate 2190 (FIG. 7E). At T2 time, a signal is applied to line 2244 causing an output signal on line 2186 which increments TAR2 to the binary value 10, the address at which the D1 value is stored. A signal is also applied to line 2041 (FIG. 7G) causing an output signal from OR gate 2022 on line 2020 which is applied through OR gate 2014 and line 2012 to condition gate 2001 (FIG. 7F) and is also applied as the conditioning input to AND gate 2102, and as a conditioning input to AND gate 2092. At T3 time, a signal is applied to line 2096, fully conditioning AND gate 2092 to generate an output signal on line 2090 which is applied through OR gate 2084 and line 2082 to cause a read cycle of K memory 170 and to cause K register 174 to be reset. The value of D1 is applied through output lines 2010 from the K memory and conditioned gate 2001 to data input 1991 of K register 174. At T4 time, a signal is applied to line 2106, fully conditioning AND gate 2102 to apply a set input to the K register causing the value of D1 to be stored in it.

When trigger TR4CI is in its ON state, a signal is also applied to line 1603 (FIG. 7A) causing AND gate 1644 and gate 1547 to be conditioned. At T0, a signal is applied to line 1646, fully conditioning AND gate 1644 to generate an output signal on line 1648 which resets A register 180. The information inputs to gate 1547 are output lines 1584 from Z register 188. The contents of this register are therefore applied to data input 1537 of the A register. At T2 time a signal is applied to line 1650 to cause the contents of the Z register to be set into the A register. Finally, when trigger TR4CI is in its ON state, a signal is applied to line 1747 causing AND gate 1766 and gate 1669 to be conditioned. At T0 time, a signal is applied to line 1768, fully conditioning AND gate 1766 to generate a reset signal on line 1770 which resets B register 182. The information inputs to gate 1669 are output lines 1608 from K register 174. This quantity is therefore applied to data input 1759 of the B register. At T5 time, a signal is applied to line 1772 causing the contents of the K register, in this case the value D1, to be set into B register 182. At T9 time, trigger TR4CI is reset and trigger TR5CI set.

When trigger TR5CI is in its ON state, a signal applied through line 1784 and OR gate 1780 to line 1778. The signal on line 1778 is applied through OR gate 1826 and line 1828 to condition AND gates 1830 (FIG. 7C) and 1832. At T0 time a signal is applied to line 1836, fully conditioning AND gate 1832 to generate an output signal on line 1840 which resets C1 register 194. The signal on line 178 is also applied to gate the sum of the contents of the A and the B register, in this case the sum Z plus D1, through OR gate 1846 and line 1848 to a data input of C1 register 194. At T5 time, a signal is applied to line 1834, fully conditioning AND gate 1830 to generate a set signal on line 1838 causing this sum to be set into the C1 register. When trigger TR5CI is in its ON state, a signal is also applied to line 2240 (FIG. 7E) causing AND gate 2190 to be conditioned. At T2 time a signal is applied to line 2244, fully conditioning AND gate 2190 to generate an increment signal on line 2186 which causes TAR2 to be set to the address of YH1. At T9 time trigger TR5CI is reset and trigger TR6CI set.

When trigger TR6CI is in its ON state, a signal is applied to line 2042 (FIG. 7G) causing K register 174 to be reset at T3 time, causing a read-out of K memory 170, in this case a read-out of the value YH1 and causing this value to be set into K register 174 at T4 time. When trigger TR6CI is in its ON state, a signal is also applied to line 1632 (FIG. 7A) and to line 1746 (FIG. 7D), the former signal resulting in a resetting of the A register at T0 time and in the setting of the previously computed sum stored in C1 register 194 into the A register and the latter signal resulting in the resetting of B register 182 at T0 time and in the setting of the value YH1 now stored in K register 174 into the B register at T5 time. At T9 time, trigger TR6CI is reset and trigger TR7CI set.

When trigger TR7CI is in its ON state, a signal is applied to line 1802 (FIG. 7B) causing C1 register 194 to be reset at T0 time and causing gates 1792 to be conditioned to pass the difference $Z+D1-YH1$ now contained in subtractor 210 (the contents of the A register minus the contents of the B register) to data input 1848 of the C1 register. At T5 time, this quantity is set into the C1 register. From FIG. 12, it is seen that this term is the numerator of the ratio which is being computed. Referring to FIG. 12 again, it is seen from expressions C1, D2, and D3 that a different value of YHX is stored, depending on which hierarchy level capacity is being added to. Since this is the next step which is performed in the operation, a branching operation occurs at this point. An additional branch is introduced here by the fact that some of this circuitry is also utilized during cycle 7 when this particular operation is not performed. From the appendix, it can be seen that since there is an initialize command output from decoder 90 and TR7CI is in its ON state and trigger H1 is in its ON state, all conditions are satisfied for switching trigger TR27CI to its ON state at T9 time. Therefore, at T9 time, trigger TR27CI is set and trigger TR7CI reset.

It will be remembered that Z register 188 (FIG. 7A) contains the value of the new YH1. When trigger TR27CI is in its ON state, a signal is applied to line 2054 conditioning gate 2004 (FIG. 7F) to pass the contents of Z register 188 to data input 1994 of K register 174. The signal on line 2054 is also applied through OR gate 2066 to AND gate 2072. At T0 time, a signal is applied to line 2076 resulting in K register 174 being reset. The output from OR gate 2066 is also applied to partially condition AND gate 2070. At T6 time, a signal is applied to line 2074, fully conditioning AND gate 2070 to set the contents of the Z register on data line 1994 into K register 174. It will be remembered that TAR1 and TAR2 are now sitting at the address at which the quantity YHl for hierarchy HR1 (the address 0111) is stored. When trigger TR27CI is in its ON state, a signal is also applied to line 2122 (FIG. 7G), causing AND gate 2112 to be partially conditioned. At T7 time, a signal is applied to line 2128, fully conditioning AND gate 2112 to generate an output signal on line 2110 which initiates a write cycle of K memory 170. This results in the new value of YH1 stored in K register 174 being written into the appropriate position in K memory 170. at T9 time, TR27CI is reset and trigger TR8CI set.

It will be remembered that at this time C1 register 194 contains the numerator of the ratio shown in FIG. 12. When TR8CI is in its ON state, a signal is applied to line 1630 (FIG. 7A) causing gate 1549 and AND gate 1644 to be conditioned. At T0 time, a signal is applied to line 1646, fully conditioning AND gate 1644 to apply an A register reset signal to line 1648. The ratio numerator contained in the C1 register is applied through gate 1549 to data input 1539 of the A register. At T2 time, a signal is applied to line 1650 to cause this quantity to be set into A register 180. The denominator of the equation is the quantity N1. From FIG. 11, it is seen that this quantity is stored in the position 0100. TAR1 is therefore set to the right address at this time but TAR2, which contains the binary address 11 at this time, must be incremented. When TR8CI is in its ON state, a signal is applied to line 2237 (FIG. 7E) to partially condition AND gate 2190. At T2 time, a signal is applied to line 2244, fully conditioning AND gate 2190 to generate an increment signal on the line 2186 to increment TAR2 to the proper address. When TR8CI is in its ON state, a signal is also applied to line 2043 (FIG. 7G). At T3 time, this signal causes a signal on line 2082 which is applied to reset K register 174 and to cause a read-out of the quantity N1 from K memory 170. The resulting signals on lines 2012 and 2020 are also applied to condition gate 2001 and AND gate 2102 respectively. The N1 value applied to output lines 2010 from K memory are applied through gate 2001 to data input 1991 of K register 174. At T4 time, a signal is applied to line 2106, fully conditioning AND gate 2102 to cause this value to be set into K register 174. Finally, when trigger TR8CI is in its ON state, a signal is applied to line 1749 (FIG. 7D) causing gate 1669 and AND gate 1766 to be conditioned. At T0 time, a signal is applied to line 1768, fully conditioning AND gate 1766 to generate an output signal on line 1770 which resets B register 182. The contents of K register 174, at this time the value N1, is applied through conditioned gate 1669 to data input 1759 of B register 182. At T5 time, a signal is applied to set-line 1772 causing this value to be set into the B register. At T9 time, trigger TR8CI is reset and trigger TR9CI set.

Since the numerator of the ratio shown in FIG. 12 is in A register 180 at this time and the quantity N1 is in B register 182, the remainder output on line 1810 from divider 212 (FIG. 7B) is the modulo value of this ratio. When TR9CI is in its ON state, a signal is applied to line 1823 causing a signal on line 1828 which causes C1 register 194 to be reset at T0 time and partially conditions set-AND gate 1830. The signal on line 1818 also conditions gate 1812 to apply the remainder output to data input 1848 of C1 register 194. At T5 time, a signal is applied to line 1834, fully conditioning AND gate 1830 to store the desired remainder in C1 register 194. When TR9CI is in its ON state, a signal is also applied to line 1712 (FIG. 7D) to condition AND gate 1704 and AND gate 1714. At T0 time, a signal is applied to line 1716, fully conditioning AND gate 1714 to generate an output signal on line 1718 which resets E register 196. Gate 7704 being conditioned causes the quantity stored in the C1 register to be applied to data input 1702 of the E register. At T8 time, a signal is applied to line 1720 causing the remainder stored in the C1 register to be set into E register 196. When trigger TR9CI is in its ON state a signal is also applied through line 1918 (FIG. 7C) and line 1938 to cause CTR222 to be reset at T5 time and to cause the modulo value in the C1 register to be set into CTR222 at T6 time. The next step is to compute the new value for N1. As a first step toward acomplishing this, when TR9CI is in its ON state, a signal is applied through line 2241 and OR gate 2232 to condition AND gate 2190. At T2 time, a signal is applied to line 244, fully conditioning AND gate 2190 to generate an increment output on line 2186 causing TAR2 to be incremented to the address 01. This is the address in which the new value of *d*H1 is stored. At T9 time, trigger TR9CI is reset and, since the circuit is then in an initialize cycle, trigger TR10CI is set.

When trigger TR10CI is on its ON state, a signal is applied to line 2029 (FIG. 7G) resulting in a signal on line 2016 which causes K register 174 to be reset, a readout of the contents of K memory 170, and the setting of the output from the K memory into K register 174 at T1 time. The manner in which this is accomplished has been previously described. The new value of *d*H1 is in this manner stored in the K register. When trigger TR10CI is in its ON state, a signal is also applied through line 1617 (FIG. 7A) and OR gate 1612 to line 1610 causing A register 170 to be reset at T0 time and conditioning gate 1548 to apply the value of *d*H1 stored in the K register to data input 1538 of the A register. At T2 time, this quantity is set into the A register. At T9 time, trigger TR10CI is reset and trigger TR11CI set.

It will be remembered that the last value set in B register 172 was the old value of N1. The inputs to adder 208 (FIG. 7B) at this time are therefore the old value of N1 and the new value of *d*H1. The sum of these quantities is the new value of N1. When trigger TR11CI is in its ON state, a signal is applied through line 1785 to cause C1 register 194 to be reset at T0 time and to cause this sum, the new value of N1, to be set into the C1 register at T5 time.

When trigger TR11CI is in its ON state, a signal is also applied through line 1898 (FIG. 7C), OR gate 1894, and line 1892 to condition gate 1888 and AND gates 1906 and 1908. At T5 time, a signal is applied to line 1912, fully conditioning AND gate 1908 to cause a reset signal to be applied to C2 register 202. The contents of C1 register 194 are applied through conditioned gate 1888 to data input 1920 of the C2 register. At T8 time, a signal is applied to line 1910, fully conditioning AND gate 1906 to cause a set input to be applied to the C2 register. The new value of N1 is in this way stored to the C2 register. Finally, when TR11CI is in its ON state, a signal is applied through line 2196 (FIG. 7E), OR gate 2194, and line 2192 to condition AND gate 2184. At T2 time, a signal is applied to line 2200, fully conditioning AND gate 2184 to generate an output signal on line 2182 which causes TAR2 to be decremented to the address in which N1 is stored. This is in preparation for a later operation. At T9 time, TR11CI is reset, and TR12CI set.

From FIG. 12, it is seen that once the modulo value of the ratio has been computed, a decision must be made as to whether this value is equal to zero or not before a determination as to the next step in the operation can be made. It will be remembered that when TR9CI was in its ON state, the modulo value of this equation was transferred into counter 222. When trigger TR12CI is in its ON state, a determination is made as to whether there is an output signal on output line 1981 from OR gate 1979, indicating that the contents of this counter are not equal to zero, or whether there is an output signal on line 1985 from inverter 1983 indicating that the contents of this counter are equal to zero. From the appendix, it can be seen that if this quantity is equal to zero, at T9 time, trigger TR13CI is switched to its ON state and trigger TR12CI reset. The significance of this indication is that the initialize operation occurred at the end of the storage bin and therefore no loops must be moved. Under these conditions, various constants are stored while triggers TR13CI and TR14CI are in their ON states and the initialize operation is then completed.

When trigger TR13CI is in its ON state, a signal is applied through line 2062 (FIG. 7F), OR gate 2060, and line 2058 to condition gate 2006 and to partially condition AND gates 2070 and 2072. At T0 time, a signal is applied to line 2076, fully conditioning AND gate 2072 to generate an output signal which resets K register 174. The new value of N1 stored in C1 register 194 is applied through conditioned gates 2006 to data input 1996 of the K register. At T6 time, a signal is applied to line 2074, fully conditioning AND gate 2070 to set this value into the K register. When TR13CI is in its ON state, a signal is also applied to line 2118 (FIG. 7G), partially conditioning AND gate 2112. At T7 time, a signal is applied to line 2128, fully conditioning this AND gate to generate an output signal on line 2110 which causes the new value of N1 stored in the K register to be written into the proper position in K memory 170. Finally, when TR13CI is in its ON state, a signal is applied through line 1631 (FIG. 7A) and OR gate 1624 to line 1622, conditioning gate 1549 to apply the new value of N1 to data input 1539 of A register 180 and conditioning AND gate 1644 to cause A register 180 to be reset at T0 time. At T2 time, the new value of N1 is set into the A register. When TR13CI is in its ON state, a signal is applied to line 2226 (FIG. 7E) to partially condition AND gate 2188. At T8 time, a signal is applied to line 2228, fully conditioning AND gate 2188 to generate an increment signal on line 2186 to increment TAR2. At T9 time, trigger TR13CI is reset and trigger TR14CI set.

B register 182 still contains the old value of N1. The inputs to added 208 are therefore the old value of N1 plus the new value of N1. Referring to FIG. 12, it is seen that these are the quantities which go to make up the new value of D1. The output from adder 208 (FIG. 7B) on lines 1774 at this time is therefore the desired value of D1. When TR14CI is in its ON state, a signal is applied through line 1786, OR gate 1780, and line 1778 to cause C1 register 194 to be reset, the contents of adder 208 on line 1774 to be applied to data input 1848 of C1 register 194, and to condition AND gate 1830. At T5 time, a signal is applied to line 1834, fully conditioning AND gate 1830 to generate an output signal which causes the new value of D1 to be set into the C1 register. When trigger TR14CI is in its ON state, a signal is applied through line 2063 (FIG. 7F), OR gate 2060, and line 2058 to cause K register 174 to be reset, to cause the contents of the C1 register, in this case the value D1, to be applied to data input 1996 of the K register, and to condition AND gate 2070. At T6 time, a signal is applied to line 2074, fully conditioning AND gate 2070 to cause the value D1 to be set into K register 174. Also, when trigger TR14CI is in its ON state, a signal is applied to line 2238 (FIG. 7E) causing TAR2 to be incremented at T2 time. This brings the address in which D1 is to be stored into TAR1 and TAR2 registers. Finally, when trigger TR14CI is in its ON state, a signal is applied through line 2119 (FIG. 7G), OR gate 2116, and line 2114 to condition AND gate 2112. At T7 time, a signal is applied to line 2128, fully conditioning AND gate 2112 to generate an output signal on line 2110 which causes a write cycle of K memory to be performed, resulting in the new value of D1 being stored in the appropriate position in the K memory. A variety of other housekeeping functions are performed when trigger TR14CI is in its ON state. A signal is applied through lines 978, OR gate 974, and line 972 to cause H0–H3 triggers 806–809 (FIG. 6F) to be reset. A signal is applied through line 2873 (FIG. 8A), OR gate 2868, and line 2864 to condition X trigger 2862 to be set. At T0 time, a signal is applied to line 2912 to effect this setting operation. A signal is applied to line 584 to cause decoder 90 (FIG. 6J) to be reset. And, a signal is applied through line 2311 (FIG. 8B), OR gate 2308, and line 2306 to condition C trigger 2392 to be reset, cycle 1 trigger 2300 to be reset, and cycle 2 trigger 1176 to be set. At T9 time, triggers TR14CI, 2300, and 2392 are reset and cycle 2 trigger 1176 is set.

Assume now that when trigger TR12CI was in its ON state it was found that the contents of CTR222 (FIG. 7C) were not equal to zero (i.e. there was an output on line 1981 from OR gate 1979). This would mean that the initialize instruction did no occur when a loop had been stored in the last position of a bin and that some loops would therefore have to be moved to the newly added positions. Under these conditions, at T9 time TR12CI is reset and TR15CI set.

As indicated previously, the transferring operation is effected by taking the loop from the old last position in the bin and moving it to the new last position, taking a loop from the old next-to-last position and moving it to the new next-to-last position, and so on until all the loops which it is desired to move have been moved. As a first step in this operation, when trigger TR15CI is in its ON state, a signal is applied through line 2030 (FIG. 7G) and OR gate 2018 to line 2016 causing K register 174 to be reset and causing the contents of K memory at the address indicated in TAR, in this case the quantity N1, to be stored in K register 174 at T1 time. A signal is also applied through line 1932 (FIG. 7C) and OR gate 1930 to line 1928 causing gate 1926 and AND gates 1940 and 1942 to be conditioned. Gate 1926 being conditioned causes the contents of the K register, in this case the old value of N1, to be applied to data input 1924 of counter 222. At T5, a signal is applied to line 1946, fully conditioning AND gate 1942 to reset counter 222. At T6 time, a signal is applied to line 1944, fully conditioning AND gate 1940 to cause the old value of N1 to be set into counter 222. This is the address from which the first loop to be moved is to be taken. When trigger TR15CI is in its ON state, a signal is applied through line 1618 (FIG. 7A) and OR gate 1612 to line 1610 and through line 1728 and OR gate 1724 to line 1722. This results in A register 180 being reset at T0 time and the old value of N1 stored in the K register being set into the A register at T2 time. This also causes B register 182 to be reset at T0 time and the result of the calculation shown in FIG. 12 now stored in E register 196 to be set into B register 182 at T5 time. At T9 time trigger TR15CI is reset and trigger TR16CI set.

When trigger TR16CI is in its ON state, a signal is applied through line 1803 (FIG. 7B) and OR gate 1796 to subtract line 1794 causing C1 register 194 to be reset at T0 time and causing the difference, contents of A register minus contents of B register, stored in subtracter 210 to be set into the C1 register at T5 time. This quantity is the number of loops which must be moved during the steps to follow. When TR16CI is in its ON state, a signal is also applied through line 2242 (FIG. 7E) and OR gate 2232 to line 2230 causing AND gate 2190 to be partially conditioned. At T2 time, this AND gate is fully conditioned to generate an output signal on line 2186 which increments TAR2 to the address in K memory at which the guantity *d*H1 is stored. If, at T9 time, there is an HRX not-busy signal on line 1487 (FIG. 6C), trigger TR16CI is reset and trigger TR17CI set.

At this time, C1 register 194 contains a number representing the number of loops which must be moved, C2 register 202 contains the address to which the first loop is to be moved, and counter 222 contains the address from which the first loop is to be moved. Since mathematical manipulations can be performed on a quantity only in counter 222, as each operation is performed, a shift is implemented to bring the next one of these three quantities to be operated with into counter 222.

The first quantity to be operated with is the address from which a loop is to be moved, this address presently being stored in counter 222. For the first loop to be moved, this is the old last address in the storage bin. When trigger TR17CI is in its ON state, a signal is applied through line 908 (FIG. 6G) and OR gate 906 to line 904. The signal on line 904 conditions gate 948 to apply the address in counter 222 through lines 950, OR gates 952, and lines 958 to the data input of HAR1 registers 130A–133A. The signal on line 904 is also applied as one input to AND gate 942, the other input to this AND gate being output line 801 from the ON side of H1 trigger 807. Since this trigger was set to its ON state when trigger TR3CI was in its ON state, AND gate 942 is fully conditioned to generate an output signal on line 937 which is applied through OR gate 879 and line 885 to cause HAR1 131A to be reset and to condition AND gate 891. A second input to AND gate 891 is output line 900 from OR gate 902, one input to which is beforementioned line 904. At T5 time, a signal is applied to line 914, fully conditioning AND gate 891 to set the desired address in HAR1 131A. When TR17CI is in its ON state, a signal is also applied through line 1970 (FIG. 7C) and OR gate 1969 to line 1967 to partially condition AND gate 1958. At T7 time, a signal is applied to line 1977, fully conditioning AND gate 1958 to generate an output signal on line 1956 causing counter 222 to be decremented one position. This brings the address of the next position from which a loop is to be taken into the counter. Finally, when TR17CI is in its ON state, a signal is applied through line 1872 (FIG. 7C) and OR gate 1870 to line 1868. The signal on line 1868 is applied to condition gates 1866, 1880, and 1882 and AND gate 1878. This effectively causes the contents of C1 register 194 to be applied as the data input to C2 register 202, the contents of C2 register 202 to be applied as a data input to counter 222, and the contents of counter 222 to be applied as a data input to C1 register 194. At T8 time, a signal is applied to line 1884, fully conditioning AND gate 1878 to generate a signal on shift line 1886, causing a shift operation to be performed. This brings the address to which the first loop is to be moved into counter 222. This is the address of the new last position in the storage bin. At T9 time, trigger TR17CI is reset and trigger TR18CI set.

When trigger TR18CI is in its ON state, a signal is applied to line 1415, partially conditioning AND gate 1411 (FIG. 6C). The other input to this AND gate is output line 801 from the ON side of H1 trigger 807. Output line 1471 from AND gate 1411 is connected to HR1 to cause the loop stored at the address indicated in HAR1 131A in bin 264A (FIG. 5) to be moved to cavity 268A. At T9 time, trigger TR18CI is reset, providing there is a signal on HRX-ready-for-next-command line 1467 (FIG. 6C) indicating that the loop-moving operation has been completed, and TR19CI is set.

When trigger TR19CI is in its ON state, a signal is applied through line 909 (FIG. 6G) and OR gate 906 to 904. As indicated previously, this results in the address in CTR222 being read into HAR1 131A. The address in storage bin 264A at which the last loop is to be stored is in this manner set into HAR1. When TR19CI is in its ON state, a signal is also applied through line 1971 (FIG. 7C) and OR gate 1969 to cause counter 222 to be decremented at T7 time and through line 1873 and OR gate 1870 to line 1868 to cause a shift operation to occur at T8 time. This effectively causes the address at which a new loop is to be stored to be decremented by one and moves the count of the number of loops to be moved into counter 222 where it may be operated upon. At T9 time, TR19CI is reset and trigger TR20CI set to its ON state.

When trigger TR20CI is in its ON state, a signal is applied through line 1385 (FIG. 6C) to AND gate 1381, the other input to which is beforementioned output line 801 from H1 trigger 807. The resulting output signal on line 1441 is applied to energize the proper valve to cause the loop stored in cavity 268A (FIG. 5) to be moved into the storage position in bin 264A indicated by HAR1 register 131A. At T9 time, trigger TR20CI is reset, and trigger TR21CI set.

When trigger TR21CI is in its ON state, a signal is applied through line 1972 (FIG. 7C) and OR gate 1969 to line 1967 to cause counter 222 to be determined at T7 time. A determination is then made as to whether all the loops which it is desired to move have been moved. If all the loops which it is desired to move have not been moved at this time, then the contents of CTR222 after the decrementing action is still not equal to zero and OR gate 1979 is generating an output signal on line 1981. Under these conditions, it is seen from the appendix that at T9 time, trigger TR21CI is reset and trigger TR22CI set.

When trigger TR22CI is in its ON state, a signal is applied through line 1874 (FIG. 7C) and OR gate 1870 to line 1868 to cause a shift operation to occur. The result of this shift operation is to bring the quantities stored in the C1 register, the C2 register, and CTR222 into their intial position with C1 register having the number of loops which not remain to be moved, the C2 register having the address to which the next loop is to be moved, and CTR222 having the address from which the next loop is to be moved. At T9 time, trigger TR222CI is reset and trigger TR17CI set.

The circuit then proceeds to move the next to the last loop from the old next-to-the-last position in the storage bin to the new next-to-the-last position in the storage bin. the number-of-loops-to-be-moved count is then decremented when trigger TR21CI is again on its ON state and a determination again made as to whether there are more loops to be moved. This process is repeated and additional loops moved until all of the loops to be moved have been moved and, after the loop count has been decremented when trigger TR21CI is in its ON state, an output appears on output line 1985 (FIG. 7C) from inverter 1983. Referring again to the appendix, it is seen that under these conditions, at T9 time, trigger TR21CI is reset and trigger TR23CI set.

At this point, all that remains to be done is to again store some new constants. At this time, TAR1 and TAR2 are set to the address at which *d*H1 is stored. When TR23CI is in its ON state, a signal is applied through line 2045 (FIG. 7G) and OR gate 2022 to line 2020 causing K register 174 to be reset at T0 time, causing a read-out of the value *d*H1 from K memory 170 and causing this quantity to be set into K register 174 at T4 time. When TR23CI is in its ON state, a signal is also applied through line 1750 (FIG. 7D) and OR gate 1742 to line 1740 causing B register 182 to be reset at T0 time and causing the value of *d*H1 stored in the K register to be set into the B register at T5 time. At T9 time, trigger TR23CI is reset and trigger TR24CI is set.

When trigger TR24CI is in its ON state, a signal is applied through line 1787 (FIG. 7B) and OR gate 1780 to line 1778 causing the sum of the quantity in the A register (which it will be remembered is the old value of N1) and the quantity in the B register which is the new value of *d*H1 which sum is now contained in adder 208 to be set into C1 register 194 at T5 time, the C1 register having been previously reset at T0 time. The value thus set into C1 register 194 is the new value of N1. When TR24CI is in its ON state, a signal is also applied through line 2197 (FIG. 7E) and OR gate 2194 to line 2192 to condition AND gate 2184. At T2 time, a signal is applied to line 2200, fully conditioning this AND gate to generate an output signal line 2182 which causes TAR2 to be decremented to the address at which N1 is stored. This is in preparation for the storage of the new value of N1 to follow. At T9 time, trigger TR24CI is reset and trigger TR25CI set.

When trigger TR25CI is in its ON state, a signal is applied through line 2064 (FIG. 7F) and OR gate 2060 to line 2058 causing the new value of N1 in C1 register 194 to be applied through gate 2006 to data input 1996 of K register 174. The signal on line 2058 is also applied to cause K register 174 to be reset at T0 time and to cause the new value of N1 to be set into the K register at T6 time. When TR25CI is in its ON state, a signal is also applied through line 2120 (FIG. 7G) and OR gate 2116 to line 2114 to condition AND gate 2112. At T7 time, this AND gate is fully conditioned to generate an output signal on line 2110 which causes the new value of N1 stored in the K register to be written into the appropriate position in K memory 170. When TR25CI is in its ON state, signals are also applied through line 1633 (FIG. 7A) and OR gate 1624 to line 1622 and through line 1729 (FIG. 7D) and OR gate 1724 to line 1722. This results in the A and B registers being reset at T0 time, in the new value of N1 being set into the A register at T2 time, and in the computed value shown in FIG. 12, which value is now stored in E register 196, being set into the B register at T5 time. Finally, when trigger TR25CI is in its ON state, a signal is applied through line 2227 (FIG. 7E) and OR gate 2206 to line 2204 causing TAR2 to be incremented at T8 time. At T9 time, trigger TR25CI is reset and trigger TR14CI set.

From the appendix and previous discussion, it can be seen that when TR14CI is in its ON state, TAR2 is again incremented by one to bring the address of D1 into TAR1 and TAR2, the sum of the quantities in the A and B register is computed, this sum being the new value of D1, and this value is stored in the appropriate position in K memory. When these operations have been completed, the HX triggers 806–809 (FIG. 6F) are reset, X trigger 2862 (FIG. 8A) is set, decoder 90 (FIG. 6J) is reset, triggers TR14CI, cycle 1 trigger 2300 (FIG. 8B), and C trigger 2392 (FIG. 8C) are reset and cycle 2 trigger 1176 is set. The circuit is thus set to continue operation in the X ring.

In the discussion of the initialize operation so far, it has been assumed that the added capacity was to be for hierarchy level HR1. Referring to FIG. 12, it is seen that one additional calculation is required when capacity is being added to hierarchy level HR2 or HR3. Whereas for hierarchy level HR1 the value of Z used in the equation is the value stored in Z register 188, this register containing the number of the last loop stored in the system, the value used in the equation for hierarchy level HR2 is Z′ which is equal to the value of Z minus the value N1. Similarly, for hierarchy level HR3, the value used is Z″ which is equal to Z minus N1 minus N2, or, in other words, is equal to Z′ minus N2. Referring to the appendix, it is seen that when trigger TR3CI is in its ON state, the next step in the operation is to proceed to either TR4CI if capacity is being added to hierarchy level HR1 to trigger TR28CI if capacity is being added to heirarchy level HR2, and to trigger TR31CI if capacity is being added to hierarchy level HR3. The operations performed when operating with hierarchy level HR1 have already been described. Assuming now that capacity is to be added to hierarchy level HR2, the valve of Z′ must be computed. To do this, when trigger TR28CI is in its ON state, TAR1 and TAR2 are set to the address in which N2 is stored and this quantity is read out from K memory into the K register in a manner previously described. The value of N1 in the K register is then set into the B register and the value in the Z register into A register. At T9 time, TR28CI is reset and TR29CI is set. When trigger TR29CI is in its ON state, the difference of these two quantities, which is the value Z′, is transferred from subtracter 210 (FIG. 7B) into C1 register 194 and TAR1 and TAR2 are incremented to bring the address of *d*H2 into them. At T9 time, TR29CI is reset and TR30CI set.

When trigger TR30CI is in its ON state, the value of Z′ is transferred from the C1 register to the C2 register, TAR2 is incremented to bring the address of D2 into it, the quantity D2 is read out from K memory into K register. This value is then set into the B register, and the value of Z′ contained in the C1 register is set into the A register. The circuit is now ready to start computing the numerator of the ratio shown in FIG. 12. Therefore, at T9 time, TR30CI is reset and trigger TR5CI set.

The remainder of the operation is identical to that described with reference to a capacity addition to hierarchy level HR1 with the exception that, since it is now Z′ rather than Z which is being used in the equation, this is the value which is stored as the value YH2. Therefore, at T9 time when trigger TR7CI is in its ON state, instead of trigger TR27CI being set to its ON state, trigger TR26CI is set on its ON state. When trigger TR26CI is in its ON state, the contents of C2 register 202 (FIG. 7C) which at this time has the value Z′ stored in it, is set into the K register rather than the value in the Z register as was previously the case, and this value is stored as the new value of YH2.

As may be seen from FIG. 12, when a capacity addition is to be made to hierarchy level RH3, one additional calculation is required over and above those already indicated. The value N2 must be subtracted from the previously computed value of Z′. To accomplish this, when trigger TR3CI is in its ON state and a capacity addition is being made to hierarchy level HR3, trigger TR31CI is set to its ON state at T9 time. When trigger TR31CI is in its ON state, the value of Z is read into the A register and the value of N2 is read into the B register in a manner similar to that previously described. Trigger TR32CI is then set to its ON state. When trigger TR32CI is in its ON state, the value Z′ minus N2 stored in subtracter 210 (FIG. 7B) is set into the C1 register. Trigger TR33CI is then set to its ON state. When trigger TR33CI is in its ON state, the value Z′ minus N2 stored in the C1 register is set into the A register and the value N1 is set into the B register. Trigger TR29CI is then set to its ON state and the circuit proceeds as it did for a capacity addition to hierarchy level HR2.

Returning now to trigger TR1C1, it is seen that after having set the instruction into CBR1–CBR3 (FIG. 6J), if decoder 90 is indicating that a read instruction is present rather than an initialize instruction and generating an output signal on line 581, then at T9 time, trigger TR1C1 is reset and trigger TR2C1 set. When trigger TR2C1 is reset and trigger TR2C1 set. When trigger TR2C1 is in its ON state, a determination is made as to whether the read queue in CCB is full. Referring to FIG. 6N, it is seen that output lines 1244 from RQ register 111 are applied to one input of compare circuit 1242A–1242D and that the output lines 1198A–1198D from RX registers 113–116 are applied to the other input of these comparators. An equal output on a line 1254A–1254D from one of the comparators means that the queue is either full or empty. These lines are applied as one input to AND gates 1256A–1256D. If the RNX trigger 1160A–1150D (FIG. 8G) for the hierarchy level is in its ON state, it means that there is something the queue for that level and that therefore the queue is not empty. An output from an AND gate 1256A–1256D therefore means that the queue is full. The output lines 1260A–1260D from these AND gates are applied through OR gate 1262 to RX=RQ line 1264. A signal on this line means that the queue is full. An output from inverter 1266, the input to which is line 1264, means that the queue is not full. If the queue is not full, at T9 time, trigger TR2C1 reset and trigger TR3C1 set.

When trigger TR3C1 is in its ON state, a signal is applied through line 1272 (FIG. 6K) to condition gate 1270 and AND gate 856. At T0 time, a signal is applied to line 858, fully conditioning AND gate 856 to apply a reset signal to line 860 to reset CAR104. Gate 1270 being conditioned causes the address in RQ111 to be applied to data input 1274 of CAR. At T2 time, a signal is applied to line 862 causing this quantity to be set into CAR. When TR3C1 is in its ON state, a signal is also applied through line 561 (FIG. 6J) and OR gate 560 to line 558 to partially condition AND gate 556. At T3 time, a signal is applied to line 568, fully conditioning AND gate 556 to generate an output signal on line 554 which causes a write cycle of CCB84. This results in the read instruction contained in CBR1–CBR3 being written into CCB at the address indicated by register RQ. Also, when trigger TR3C1 is in its ON state, a signal is applied through line 1250 (FIG. 6N) to one input of AND gate 1248. At T8 time, a signal is applied to line 1252 to fully condition AND gate 1248 causing it to generate an output signal on line 1246 which increments RQ register 111 by two. The reason why the RQ register is incremented by two can be seen by reference to FIG. 10 where it is seen that there are two words to a read command, the first of which is read in when trigger TR3C1 is in its ON state and the second of which is filled in during cycle 10. When trigger TR3C1 is in its ON state, a signal is also applied through line 2870 (FIG. 8A) and OR gate 2868 to line 2864 to condition X trigger 2862 to be set on its ON state and a signal is applied through line 2310 (FIG. 8B) and OR gate 2308 to line 2306 to cause cycle 1 trigger 2300 to be reset, C trigger 2392 to be reset, and cycle 2 trigger 1176 to be set.

If when trigger TR2C1 was in its ON state it was found that the queue was full (there was an output on line 1264 (FIG. 6N) from OR gate 1262) then, from the appendix, it can be seen that trigger TR4C1 is switched to its ON state at T9 time. Since there is no place to store the instruction, the instruction in CBR1–CBR3 cannot be read into CCB at this time. However, the circuit must continue to function and, if the C trigger is left in its ON state, there is a signal applied to line 2436 (FIG. 8C) indicating that the X ring is busy. To prevent this, when trigger TR4C1 is in its ON state, a signal is applied to line 2274 (FIG. 8C) to condition F trigger 2272 to be set to its ON state. When trigger TR4C1 is in its ON state, a signal is also applied through line 2871 (FIG. 8A) and OR gate 2868 to condition X trigger 2862 to be set to its ON state and a signal is applied through line 2314 (FIG. 8B) and OR gate 2304 to condition cycle 1 trigger 2300 to be reset and cycle 2 trigger 1176 to be set.

Before leaving cycle 1, assume that the instruction applied to CBR1–CBR3 (FIG. 6J) when trigger TR1C1 is in its ON state is a write instruction. Under these conditions, decoder 90 generates an output signal on line 580. From the appendix, it can be seen that when trigger TR1C1 is in its ON state and there is a write output from decoder 90, at T9 time, trigger TR5C1 is set to its ON state. When trigger TR5C1 is in its ON state, a determination is made as to whether the write queue in CCB is full. Referring to FIG. 6M, it is seen that output lines 1292 from W register 110 are applied as one input to compare circuit 1296 and that the other input to this circuit is output lines 1294 from WQ register 109. If the addresses in these registers are equal, there is a signal on line 1298 which is applied as one input to AND gate 1300. If the queue is not empty, there is a signal on output line 1302 from WN trigger 1304 (FIG. 8G), fully conditioning AND gate 1300 to generate a signal on line 1306 which indicates that the queue is full. If there is no signal on line 1306, inverter 1308 generates an output signal on line 1310, indicating that the queue is not full. The combined occurrence of a signal on line 1306 indicating that the queue is full and trigger TR5C1 being in its ON state causes trigger TR4C1 to be switched to its ON state at T9 time. The sequence of events which occurs when trigger TR4C1 is in its ON state has just been described.

If, when trigger TR5C1 is in its ON state, there is a signal on output line 1310 (FIG. 6M) from inverter 1308, then, at T9 time, trigger TR6C1 is set to its ON state. When trigger TR6C1 is in its ON state, a signal is applied to line 1332 (FIG. 6K), conditioning gate 1328 to apply the address in WQ register 109 to data input 1348 of CAR104 and partially conditioning AND gate 856 to cause CAR104 to be reset at T0 time. At T2 time, the address in WQ is set into CAR. When TR6C1 is in its ON state, a signal is also applied through line 562 (FIG. 6J) and OR gate 560 to line 558 to cause a write cycle of CCB at T3 time. The write instruction in CBR1–CBR3 is in this way stored in the address indicated in WQ in CCB. When trigger TR6C1 is in its ON state, a signal is also applied through line 1286 (FIG. 6M) to one input of AND gate 1282. At T8 time, a signal is applied to line 1290, fully conditioning AND gate 1282 to apply an increment signal to WQ through line 1280. Since, referring to FIG. 10, it is seen that a write command occupies only a single word in CCB, only a single address is required to store it. Also, when trigger TR6C1 is in its ON state, a signal is applied through line 2872 (FIG. 8A) and OR gate 2868 to condition X trigger 2862 to be set and a signal is applied through line 2312 and OR gate 2308 to line 2306 to condition cycle 1 trigger 2300 and C trigger 2392 to be reset and to condition cycle 2 trigger 1176 to be set. Finally, when trigger TR6C1 is in its ON state, a signal is applied to line 2788 (FIG. 8G) to condition WN trigger 1304 to be set. This indicates that there is at least one write instruction in the write queue.

*Cycles 2, 3, 4 and 5*

As indicated previously, cycle 2 trigger 1176 is conditioned to be set to its ON state when either trigger TR14C1, trigger TR3C1, trigger TR6C1, or trigger TR4C1 is in its ON state. There is one additional way in which cycle 2 trigger 1176 may be set. This occurs when cycle 1 trigger 2300 (FIG. 8B) is in its ON state, causing an output signal on line 2320 which partially conditions AND gate 2318 (FIG. 8C) but C trigger 2392 is in its OFF state meaning that there are no new instructions to be read into CCB and therefore that there is no need to perform a cycle 1 operation. Under these conditions, there is also an output signal on line 2322 from inverter 2324, fully conditioning AND gate 2318 to generate an output signal on line 2316 which signal is applied through OR gate 2304 and line 2302 to condition cycle 1 trigger 2300 to be reset and cycle 2 trigger 1176 to be set.

An RX trigger 2400–2403 (FIG. 8C) is set to its ON state when there is information in the corresponding RRX register 70–73 (FIG. 6H) respectively to be set into MBR. When cycle 2 trigger 1176 is in its ON state and R0 trigger 2300 is in its ON state, and X-ring inhibit trigger 2440 (FIG. 8A) is in its OFF state, AND gate 2350 (FIG. 8C) is fully conditioned to generate an output signal on cycle 2 line 2348. Referring to the appendix, it is seen that this is one of the conditions for switching trigger TR1C2 to its ON state.

During cycle 2, the record in RR0 register 70 is transferred to MBR and this record is then transferred from MBR to the address in the host core memory indicated in the second field of the original read instruction.

When trigger TR1C2 is in its ON state, a signal is applied through line 2883 (FIG. 8A) and OR gate 2880 to line 2878 to condition X trigger 2862 to be reset. A signal is also applied through line 1182 (FIG. 6L) to one input of AND gate 1170A. Since cycle 2 trigger 1176 is on its ON state at this time, there is an output signal on ON side output line 1171, fully conditioning AND gate 1170A to generate an output signal on line 1168A which is applied through OR gate 1166A and line 1184A to set the address FAR0 into CAR104 (FIG. 6K). From FIG. 9, it is seen that the address FAR0 is a fixed address in CCB. As will be seen later, during cycle 8 the address of the read instruction which caused the record to be stored in RR0 70 is set in FAR0. Finally, when trigger TR1C2 is in its ON state, a signal is applied through line 480 (FIG. 6J) and OR gate 478 to line 476 conditioning gate 472 and AND gates 490 and 492. At T3 time, a signal is applied to line 494, fully conditioning AND gate 490 to generate an output signal on line 496 which causes a read cycle of CCB and causes CBR1–CBR3 to be reset. This results in the instruction at address FAR0 being read out into sense lines 474. This instruction is passed through conditioned-gate 472 to data inputs 470 of CBR1–CBR3. At T6 time, a signal is applied to line 498, fully conditioning AND gate 492 to generate an output signal on line 500 which causes the read instruction applied to CBR1–CBR3 to be set into them. At T9 time, trigger TR1C2 is reset and trigger TR2C2 set.

When trigger TR2C2 is in its ON state, a signal is applied through line 370 (FIG. 6I) to condition gate 342 and AND gates 372, and 365. At T0 time, a signal is applied to line 367, fully conditioning AND gate 365 to apply a reset signal to MBR56. Since cycle 2 trigger 1176 (FIG. 8B) is in its ON state, there is a signal on line 1171 conditioning gate 380 (FIG. 6H) to apply the information stored in RR0 through lines 378, OR gates 368, lines 366, and conditioned-gate 342 to data input 340 of MBR56. At T2 time, a signal is applied to line 374, fully conditioning AND gate 372 to generate a set signal on line 376 causing the record in RR0 to be set into MBR56. When trigger TR2C2 is in its ON state, a signal is also applied through line 592 (FIG. 6I) and OR gate 588 to line 586, partially conditioning gate 574 and AND gate 598. At T0 time, a signal is applied to line 600, fully conditioning AND gate 598 to generate an output signal on line 602 which resets MAR62. Gate 574 being conditioned allows the contents of CBR2, at this time the address from the original read instruction telling where the retrieved record is to be stored in host core memory (see FIG. 10) to be applied through lines 596 as the data input to MAR. At T1 time, a signal is applied to line 604 to cause this address to be set into MAR. Finally, when trigger TR2C2 is in its ON state, a signal is applied through line 327 (FIG. 6H) to condition AND gate 325. At T4 time, a signal is applied to line 329, fully conditioning AND gate 325 to generate an output signal to the host CPU on line 322. This signal tells the host CPU that there is a full record in MBR56 and causes it to transfer this record into host-core memory 52 either at the address indicated in MAR if a bulk transfer is to be effected, or at a series of addresses starting with the address contained in MAR if the transfer from MBR is to be accomplished a word at a time. When the CPU has finished the transfer of the record from MBR to the host-core memory, it applies a signal to line 2283 which partially conditions AND gate 2336 (FIG. 8B). The other conditioning inputs to this AND gate are line 2338 which has a signal on it since TR2C2 is in its ON state and output line 1171 from cycle 2 trigger 1176. AND gate 2336 is therefore fully conditioned to generate an output signal on line 2334 which is applied to condition cycle 2 trigger 1176 to be reset, cycle 3 trigger 1177 to be set, and R0 trigger 2400 to be reset. The signal on line 1171 is also applied to partially condition AND gate 2780 (FIG. 8E), the other inputs to this AND gate being line 2786 which has a signal on it when trigger TR2C2 is in its ON state and read-finished line 2283 from the CPU. The resulting output signal on line 2776 is applied to condition RE0 trigger 2770 to be set. The RE0 trigger being set tells the system that the RR0 register is empty and that a new record may be read into it. Finally, when trigger TR2C2 is in its ON state, a signal is applied through 2874 (FIG. 8A) and OR gate 2868 to line 2864 to condition X trigger 2862 to be set.

If, when cycle 2 trigger 1176 was in its ON state, R0 trigger 2400 was in its OFF state indicating that there was no record to be transferred from register RR0 at this time, AND gate 2342 (FIG. 8C) would be fully conditioned to generate an output signal on line 2340 which is applied through OR gate 2332 and line 2330 to condition cycle 3 trigger 1177 to be switched to its ON state. From the appendix it can be seen that during cycle 3 triggers TR1C2 and TR2C2 are again switched to their ON states to cause any information stored in RR1 71 (FIG. 6H) to be transferred to the host-core memory. During cycles 4 and 5, the same operations are repeated to effect a transfer of information from RR2 72 to host-core memory and RR3 73 to host-core memory. If any of the RX triggers are in their OFF states, the corresponding cycle is by-passed in a manner already described. When cycle 5 is completed, all inputs to AND gate 2282 (FIG. 8B) are present causing an output signal on line 2280 which results in cycle 1 trigger 2300 again being conditioned to be set to its ON state. If cycle 5 is by-passed, a signal is applied through line 2286 and OR gate 2278 to condition cycle 1 trigger 2300 to be set. The X ring therefore operates in a cyclic manner.

*Cycle 6*

The Y ring operates continuously and for the most part concurrently with the X ring. The one exception to concurrent operation is during the time period when X-ring-inhibit trigger 2440 (FIG. 8A) is set to its ON state to prevent signals from being applied to cycle 1, 2, 3, 4, and 5, output lines 2384 (FIG. 8C), 2348, 2368, 2388, and 2294 respectively. The start signal from CPU50 (FIG. 6H) applied through line 2298 to OR gate 2278 (FIG. 8B) is also applied through OR gate 2478 (FIG. 8F) to line 2474. A signal on line 2474 is applied through OR gate 2498 and line 2500 to condition cycle 17 trigger 1114 to be reset and to condition cycle 6 trigger 2472 (FIG. 8D) to be set. As will be seen later, WE1 trigger 2754 (FIG. 8E) and WE2 trigger 2755 are set to their ON states when information to be written into the system has been transferred from MBR to WR1 (FIG. 6H) and WR2 respectively. When cycle 6 trigger 2472, WE1 trigger 2754, and WE2 trigger 2755 are all in their ON states, AND gate 2532 is fully conditioned to generate an output signal on cycle 6 line 2530. If either WE1 trigger 2754 or WE2 trigger 2755 is in its OFF state at this time indicating that a writing of information from the host-core memory into write register WR1 or WR2 has not been completed, AND gate 2532 is not fully conditioned and inverter 2528 generates an output signal on line 2526 which is applied through OR gate 2508 (FIG. 8D) and line 2506 to one input of AND gate 2504. Since cycle 6 trigger 2472 is in its ON state at this time, there is a signal on line 2534 which is applied through OR gate 2512 and line 2510 to fully condition AND gate 2504 to generate an output signal on line 2502 which is applied to condition cycle 6 trigger 2472 to be reset and to condition cycle 7 trigger 2540 to be set. Cycle 6 may in this way be by-passed.

Referring to the appendix, it is seen that when there is an output signal on cycle 6 line 2530 and Y trigger 2864 (FIG. 8A) is in its ON state and there is an HR0 not-busy signal on line 1188A (FIG. 6C) and a W1 not-busy signal on line 1495 and directory not-busy trigger 722 (FIG. 6B) is in its OFF state and there is a loop-in-write-station W1 signal on line 1493 and an X ring not-busy signal on line 2439 (FIG. 8C), then trigger TR1C6 is set to its ON state. Under ordinary conditions, all of the necessary signals will be available sometime when there is a cycle 6 indication on line 2530. During cycle 6, a determination is made as to whether there is anything in the write queue, if there is something in the write queue, the record to be written is transferred from the host-core memory into MBR and from MBR into WR1 and WR2, the address at which the record is to be written is read into WAR1 and WAR2; an entry is made in the directory for the new record; a record write command is issued to write station W1 and to hierarchy HR0; and a determination is made as to whether the loop in write station W1 is full and, if it is, a new loop is moved into write station W1.

When trigger TR1C6 is in its ON state, the first step of this operation is performed, namely a determination is made as to whether there is anything in the write queue. A signal is applied through line 2904 (FIG. 8A) and OR gate 2902 to line 2900 to condition Y trigger 2864 to be reset. Signals are also applied through line 1561 (FIG. 7A) and OR gate 1560 to line 1558 and through line 1688 (FIG. 7D) and OR gate 1686 to line 1684. This results in A register 180 and B register 182 being reset at T0 time and in the contents of W register 110 being set into the A register at T2 time and in the contents of WQ register 109 being set into the B register at T5 time. Finally, a signal is applied through line 2448 (FIG. 8A) and OR gate 2444 to line 2442 to condition X-ring-inhibit trigger 2440 to be set. This temporarily inhibits the operation of the X ring by preventing signals from being generated on cycle 1, 2, 3, 4 and 5 output lines 2326, 2348, 2368, 2388 and 2294 respectively. At T9 time, trigger TR1C6 is reset and either trigger TR2C6 or trigger TR3C6 is set.

Referring to the appendix, it is seen that trigger TR2C6 is switched to its ON state at this time if WN trigger 1304 (FIG. 8G) is in its OFF state and there is an equal indication from comparator 214 (FIG. 7B). The equal indication indicates that W is equal to WQ and as has been indicated before, this is interpreted to mean that the write queue is either full or empty. Since the WN trigger is in its OFF state, this means that the write queue is empty. When the write queue is empty, nothing further can be done in cycle 6. Therefore, when trigger TR2C6 is in its ON state, a signal is applied through line 2888 (FIG. 8A) and OR gate 2886 to line 2884 to condition Y trigger 2864 to be set and a signal is applied through line 2466 and OR gate 2462 to line 2460 to condition X-ring-inhibit trigger 2440 to be reset. At T9 time, trigger TR2C6 is reset and, since there is a signal applied through line 2524 (FIG. 8D) and OR gate 2516 to line 2514, triggers WE1 and WE2 are reset. The signal on line 2514 is also applied through OR gate 2508 and line 2506 to one input to AND gate 2504, the other input to this AND gate being the signal on line 2534 from cycle 6 trigger 2472 which is applied through OR gate 2512 and line 2510. The resulting output signal on line 2502 is applied to reset cycle 6 trigger 2472 and to set cycle 7 trigger 2540.

Referring again to the appendix, it is seen that if, at T9 time, trigger TR1C6 is in its ON state there is an equal indication from comparator 214 (FIG. 7B) and WN trigger 1304 (FIG. 8G) is in its ON state indicating that the write queue is full, or if at T9 time when trigger TR1C6 is in its ON state, there is an absence of an equal indication from comparator 214, trigger TR3C6 is set to its ON state. Under either of these conditions there is a write instruction in the write queue. The write instruction which is to be performed at this time is the one at the address indicated by W register 110 (FIG. 6M). Therefore, when trigger TR3C6 is in its ON state, a signal is applied through line 1330 (FIG. 6K) to condition gate 1326 to apply the contents of the W register to data input 1346 of CAR104. The signal on line 1330 is also applied through OR gate 852 to cause CAR104 to be reset at T0 time. At T2 time, a signal is applied to line 862 to cause the address in the W register to be set into CAR. At this time, a signal is also applied through line 481 (FIG. 6J) and OR gate 478 to line 476 causing CBR1-CBR3 to be reset and causing a read cycle to be performed on CCB84, the instruction at the address indicated by the W register thus being applied to sense lines 474, and causing this data to be set into CBR1–CBR3 at T6 time all in a manner previously described. A signal is also applied to line 1284 (FIG. 6M) at this time, partially conditioning AND gate 1278. At T8 time, a signal is applied to line 1288, fully conditioning AND gate 1278 to generate an output signal on line 1276 which increments W register 110. The W register thus contains the address of the next write instruction in the write queue. At T9 time, trigger TR3C6 is reset, and trigger TR4C6 set.

When trigger TR4C6 is in its ON state, a signal is applied through line 591 (FIG. 6I) and OR gate 588 to line 586, conditioning gate 574 to apply the address information in CBR2 through line 596 to the data input of MAR62 and conditioning AND gate 598 at T0 time to apply a reset signal to MAR. At T1 time this address is set into MAR. From FIG. 11, it can be seen that CBR2 at this time contains the address in host-core memory 52 from which the record to be written is to be taken. Where the record is several words long, this address is the address at which the record begins. A signal is also applied through line 330 (FIG. 6H) to one input of AND gate 326. At T4 time, a signal is applied to the other input of this AND gate causing an output signal to be generated on line 323 which is applied to CPU50 causing the CPU to start reading a record from host-core memory into MBR. Since when a full record has been transferred from host-core memory to MBR, the CPU generates a record-write finish signal on line 319 which is applied as one input to AND gate 317. The other conditioning input to this AND gate is line 318 which has a signal on it when trigger TR4C6 is in its ON state. AND gate 317 being fully conditioned causes the record stored in MBR56 (FIG. 6I) to be transferred through lines 332 to a data input of WR1 register 80 and WR2 register 81. These registers are reset at T0 time as the result of the signal on line 318. At T8 time, signals are applied to lines 336 and 338 causing the desired record to be set into WR1 and WR2.

When trigger TR4C6 is in its ON state, the circuit also begins to make an entry in the directory. A signal is applied through line 650 (FIG. 6A) and OR gates 648 to condition gate 572 and AND gate 658. At T0 time, a signal is applied to line 660, fully conditioning AND gate 658 to apply a reset signal to TF register 94. Gate 572 being conditioned allows the record name contained in CBR1 to be applied to data input 656 of the TF register. At T8 time, a signal is applied to line 664, allowing this record name to be set into the TF register. Finally, when trigger TR4C6 is in its ON state, a signal is applied through line 724 (FIG. 6B) to condition directory-busy trigger 722 to be set to its ON state. A signal applied to line 726 at T0 time causes this setting action to occur. If, at T9 time, a write-finished signal is present on line 319 from CPU50, trigger TR4C6 is reset and trigger TR5C6 set.

When trigger TR5C6 is in its ON state, the making of a directory entry is continued and a determination is made as to whether the write queue is now empty. When trigger TR5C6 is in its ON state, a signal is applied through line 2464 (FIG. 8A) and OR gate 2462 to line 2460 to condition X-ring-inhibit trigger 2440 to be reset and a signal is applied through line 670 (FIG. 6A) and OR gate 668 to line 666 to cause randomizer 140 to start operating on the record name contained in TF register 94. Signals are also applied through line 1562 (FIG. 7A) and OR gate 1560 to line 1558 and through line 1689 (FIG. 7D) and OR gate 1686 to line 1684. As indicated previously, this results in A register 180 and B register 182 being reset at T0 time, in the contents of W register 110 being set into A register 180 at T2 time, and in the contents of WQ register 109 being set into B register 182 at T5 time. If the contents of WQ register 109 and W register 110 are now equal, it means that the write queue is empty. Referring to the appendix, it is seen that when trigger TR5C6 is in its ON state and these quantities are equal, resulting in a signal on equal output line 1148 from compare circuit 214 (FIG. 7B) at T9 time, trigger TR6C6 is set and trigger TR5C6 reset.

When trigger TR6C6 is in its ON state, a signal is applied through line 2789 (FIG. 8G) to condition WN trigger 1304 to be reset. The resetting of the WN trigger indicates that the write queue is empty. At T9 time, trigger TR6C6 is reset and trigger TR7C6 set.

From the appendix it can be seen that trigger TR7C6 may be set to its ON state in two ways. One is the way just indicated, at T9 time, when trigger TR6C6 is in its ON state. The other is at T9 time when trigger TR5C6 is in its ON state and there is still information in the write queue so that comparator 214 (FIG. 7B) generates a not-equal output signal on line 1858. When trigger TR7C6 is in its ON state, the address at which the record is to be written is stored in WAR1 160 (FIG. 6D) and WAR2 162. This is accomplished by applying a signal through line 1356 to condition gate 1354 and AND gate 1358. At T0 time, a signal is applied through line 1360 to fully condition AND gate 1358 to apply a reset signal to WAR1 and WAR2. The contents of LAC2 are applied through lines 772 and conditioned gate 1354 to the data input of WAR1 and WAR2. This is the record address for the record to be stored. At T5 time, a signal is applied to lines 1364 and 1366 to cause the desired address to be set into registers 160 and 162. If there is a randomizer-finished signal on line 674 (FIG. 6R), at T9 time, trigger TR7C6 is reset and trigger TR8C6 set.

When trigger TR8C6 is in its ON state, the final preparation for making a directory entry is made and the writing of the record into W1 and HR0 is initiated. To accomplish this, a signal is applied through lines 686 (FIG. 6A) and OR gate 684 to line 682 to condition gates 678 and 680 and AND gate 694. At T0 time, a signal is applied through line 696 to reset DSR1 144A and DSR2 144B. The output from randomizer 140 is applied through lines 676 and conditioned gates 678 and 680 to data inputs 690 and 692 of DSR1 and DSR2 respectively. At T1 time, a signal is applied to lines 700 and 702 to cause the output from the randomizer to be set into DSR1 and DSR2. At this time, DSR1 contains a tag or record indentification and DSR2 contains the bucket address in the directory where the tag is to be stored. A signal is also applied through line 774 (FIG. 6B) to condition gates 708, 764, 768, and AND gate 750. At T0 time, a signal is applied through line 752 to the other input of AND gate 750 causing DBR1–DBR3 to be reset. At this time, DSR1 contains a tag or record identification. This is applied through conditioned-gate 708 to data input 760 of DBR1. The loop number contained in LAC1 is applied through lines 770 and conditioned-gate 764 to data input 762 of DBR2. The record address contained in LAC2 is applied through lines 772 and conditioned-gate 768 to data input 766 of DBR3. At T8 time, signals are applied to lines 756, 757, and 758 to cause the data inputs to DBR1–DBR3 to be set into these registers. The information to be set into the directory is in this manner set up in directory buffer register DBR1–DBR3. As a final operation, when trigger TR8C6 is in its ON state, a write signal is applied through line 1478 to HR0 (FIG. 6C) to cause the write operation to commence there, and a write signal is applied through line 1484 to write station W1. At T9 time, trigger TR8C6 is reset and trigger TR9C6 set.

When trigger TR9C6 is in its ON state, the directory entry is made and a determination is made as to whether a new loop is to be inserted into write station W1. When trigger TR9C6 is in its ON state, a write signal is applied through line 712 (FIG. 6B) to directory 148 to cause a write cycle which results in the directory entry in DBR1–DBR3 being written into the directory at the bucket address indicated in DSR2. A signal is also applied through line 1500 (FIG. 6D) to one input of AND gate 1496, the other input to this AND gate being line 1504 which has a signal applied to it at T8 time. The resulting output signal on line 1494 from AND gate 1496 is applied to increment LAC2. This brings the address of the next record to be written into LAC2. A signal is also applied through line 2889 (FIG. 8A) and OR gate 2886 to line 2884 to condition Y trigger 2864 to be set. Referring to FIG. 6D, it is seen that if LAC2 is equal to zero at this time, there is an output signal on line 1520 from inverter 1518 and if it is not equal to zero, there is an output signal on line 1516 from OR gate 1514. LAC2 being equal to zero at this time means that the last record written was the last record which could be written on the loop in write station W1 and that a new loop must be moved into this write station. Therefore, referring to the appendix, if there is a LAC2 equal-to-zero signal on line 1520 at T9 time, trigger TR9C6 is reset and trigger TR10C6 set. If, on the other hand, LAC2 is not equal to zero (i.e. there is an output signal on line 1516 at this time) AND gate 2520 (FIG. 8D) is fully conditioned to generate an output signal on line 2518 which is applied through OR gate 2516 and line 2514 to reset WE1 trigger 2754 and WE2 trigger 2755 and cycle 6 trigger 2472 and to set cycle 7 trigger 2540 in a manner similar to that previously described.

Assuming that the loop in write station W1 has been filled so that the contents of LAC2 are equal to zero, trigger TR10C6 is set to its ON state. When trigger TR10C6 is in its ON state, a signal is applied through line 1479 (FIG. 6C) to write station W1 to cause the loop in write station W1 to be moved to HR1 buffer cavity 260A (FIG. 5). A signal is also applied to lines 1498 (FIG. 6D) and 1510. The signal on line 1498 partially conditions AND gate 1492, this AND gate being fully conditioned at T0 time by a signal applied to line 1502. The resulting output signal on line 1490 is applied to increment LAC1 to the address of the new loop. The signal on line 1510 is applied to one input of AND gate 1508, the other input to this AND gate being line 1512 which has a signal applied to it at T0 time. The resulting output signal on line 1506 is applied to reset LAC2. If, at T9 time, the transfer of the loop from write station W1 to hierarchy HR1 buffer cavity 260A has been completed, trigger TR10C6 is reset and trigger TR11C6 set.

When trigger TR11C6 is in its ON state, a signal is applied to line 1480 (FIG. 6C) to cause a new loop to be loaded into write station W1 and a signal is applied to line 2760 (FIG. 8E) to condition new-loop trigger 2546 to be set. A signal is also applied through line 2525 (FIG. 8D) and OR gate 2516 to line 2514 to condition cycle 6 trigger 2472, WE1 trigger 2754, and WE2 trigger 2755 to be reset and to condition cycle 7 trigger 2540 to be set in a manner previously described.

*Cycle 7*

When cycle 7 trigger 2540 (FIG. 8D) is in its ON state, a signal is applied through line 2554 to one input of AND gates 2552 (FIG. 8E) and 2562. If, during cycle 6, it was found that a new loop had to be added to write station W1, new-loop trigger 2546 is in its ON state, fully conditioning AND gate 2562 to generate an output signal on cycle 7 line 2560. If, on the other hand, the loop in write station W1 was not filled during the preceding cycle 6, new loop trigger 2546 is in its OFF state and inverter 2558 is generating an output signal on line 2556 which fully conditions AND gate 2552 to generate an output signal on line 2550 which is applied through OR gate 2544 (FIG. 8D) and line 2542 to reset cycle 7 trigger 2560 and to set cycle 8 trigger 1088. Under this latter condition, cycle 7 is by-passed.

Assuming that there is a new loop to be applied to hierarchy level HR1, it is seen from the appendix that when there is an output signal on cycle 7 line 2560 and Y trigger 2864 (FIG. 8A) is in its ON state, that trigger TR1C7 is set to its ON state T9 time. The new loop is always inserted in hierarchy level HR1. If there are no empty positions in this hierarchy at this time, the oldest loop in hierarchy level HR1 is transferred to hierarchy level HR2 and the new loop stored in its position. A similar bumping operation occurs down the line. FIGS. 12A and 12B show the calculations which are involved in determining where in the hierarchy a given loop is to be stored. It is seen that the ratio in the equation for determining the position in the hierarchy in which the new loop is to be inserted is the same as the ratio calculated for the initialize operation. Therefore the same hardware is used for performing both operations. When trigger TR1C7 is in its ON state, a signal is applied through line 992 (FIG. 6F) and OR gate 998 to line 990 to condition H1 trigger 807 to be set to its ON state, and a signal is applied through line 2905 (FIG. 8A) and OR gate 2902 to line 2900 to condition Y trigger 2864 to be reset. To set the circuit for the calculation to follow, signals are applied to lines 2171 (FIG. 7E) and 2255 to condition TAR1 and TAR2 to be reset at T2 time and signals are applied to lines 2155 and 2171 to condition TAR1 and TAR2 to be incremented at T8 time. This brings the address of *l*H1 into TAR1 and TAR2. At T9 time, trigger TR1C7 is reset and trigger TR4C1 is set.

The circuit then proceeds to perform the operations indicated when triggers TR4C1, TR5C1, TR6C1, TR7C1, TR8C1, and TR9C1 are in their ON states. At the end of these operations, the quantity N1 is stored in the B register and the desired ratio is stored in the C1 register, the E register, and counter 222. At T9 time when trigger TR9C1 is in its ON state and there is a cycle 7 output from the Y ring on line 2560, trigger TR2C7 is set to its ON state.

From FIG. 12 it can be seen that different operations are performed if *d*H1 is equal to zero than if *d*H1 is not equal to zero. It will be remembered that if *d*H1 is not equal zero, there are storage positions in storage bin 264A (FIG. 5) which have not yet been utilized and there is no need to move a loop from this bin to bin 264B at this time. During the time period that triggers TR2C7 and TR3C7 are in their ON states, a determination is made as to whether *d*H1 is equal to zero. At this time, TAR1 and TAR2 contain the address at which *d*H1 is stored. When trigger TR2C7 is in its ON state, a signal is applied through line 2031 (FIG. 7G) and OR gate 2018 to line 2016 causing K register 174 to be reset, causing a read cycle of K memory 170, and causing the output from K memory 170 to be set into K register 174 at T1 time. The constant *d*H1 is in this manner set into K register 174. When TR2C7 is in its ON state, a signal is also applied through line 1619 (FIG. 7A) and OR gate 1612 to line 1610 causing A register 180 to be reset at T0 time and the quantity in the K register, in this case the value *d*H1, to be set into the A register at T2 time. A signal is also applied through line 1762 (FIG. 7D) and OR gate 1760 to line 1764 at this time, conditioning AND gate 1766 to reset B register 182 at T0 time. Nothing is set into the B register subsequent to this so that at T9 time when trigger TR2C7 is reset and trigger TR3C7 set, A register 180 has the quantity *d*H1 stored in it and B register 182 has the quantity zero stored in it.

At T9 time when trigger TR3C7 is in its ON state, trigger TR3C7 is reset and either trigger TR4C7 or trigger TR8C7 set to its ON state, depending on whether comparator 214 (FIG. 7B) is generating an output signal on high line 1852 or an output signal on equal line 1148. Assume first that there is space in storage bin 264A (FIG. 5) so that a loop need not be moved to a lower order storage bin. Under these circumstances, the value of *d*H1 is not equal to zero and comparator 214 is generating an output signal on line 1852 which, referring to the appendix, causes trigger TR4C7 to be set to its ON state at T9 time. Referring to FIG. 12, it is seen that the position in which the loop is to be stored is given by the previously computed ratio plus one. It will be remembered that when trigger TR9C1 was in its ON state that the ratio was stored in counter 222 (FIG. 7C). When trigger TR4C7 is in its ON state, a signal is applied through line 1964 (FIG. 7C) and OR gate 1962 to line 1960, partially conditioning AND gate 1954. At T0 time, a signal is applied to line 1975, fully conditioning AND gate 1954 to generate an output signal on line 1952 which is applied to increment the count in counter 222. This brings the address at which it is desired to store the new loop into counter 222. When trigger TR4C7 is in its ON state, a signal is also applied through line 910 (FIG. 6G) and OR gate 906 to line 904. From previous discussion, it will be remembered that a signal on line 904 causes the HAR1 registers 130A–133A and the HAR2 registers 130B–133B to be reset and causes the address in counter 222 to be set into the HAR1 register corresponding to the H trigger 806–809 which is in its ON state at this time. At this time, H1 trigger 807 is in its ON state. Therefore, the contents of CTR222 are set into HAR1 register 131A at T5 time. At T9 time, trigger TR4C7 is reset and trigger TR5C7 set.

When trigger TR5C7 is in its ON state, a signal is applied through line 1378 (FIG. 6C), OR gate 1377, and line 1375 to one input of AND gate 1371. The other input to this AND gate is output line 801 from the ON side of H1 trigger 807 AND gate 1371 being fully conditioned at this time generates an output signal on line 1431 which is applied to HR1 to activate the appropriate valves to cause a transfer of the loop stored in buffer cavity 260A (FIG. 5) (it was stored there during cycle 6) to the storage slot in bin 264A indicated in register HAR1 131A. At T9 time, trigger TR5C7 is reset and trigger TR6C7 set.

Since an empty slot in storage bin 264A has been filled, it is necessary to decrement the count for *d*H1 stored in K memory 170 by one. When trigger TR6C7 is in its ON state, a signal is applied through line 1933 (FIG. 7C) and OR gate 1930 to line 1928. The signal on line 1928 conditions gate 1926 to apply the contents of K register 174, at this time the value *d*H1, to data input 1924 of counter 222. The signal on line 1928 is also applied through line 1938 to one input of AND gates 1940 and 1942. At T5 time, a signal is applied to line 1946, fully conditioning AND gate 1942 to generate an output signal on line 1950 which resets counter 222. At T6 time, a signal is applied through line 1944 to AND gate 1940 causing an output signal on line 1948 which sets the value *d*H1 into counter 222. When trigger TR6C7 is in its ON state, a signal is also applied through line 1973, OR gates 1969, and line 1967 to one input of AND gate 1958. At T7 time, a signal is applied through line 1977 to the other input of AND gate 1958 causing an output signal on line 1956 which decrements the value in counter 222, at this time the value *d*H1, by one. It will be remembered that the Z register contains a count of the number of loops applied to the system. This register must therefore be incremented when a new loop is applied to the system. Therefore, when trigger TR6C7 is in its ON state, a signal is applied through line 1594 (FIG. 7A), OR gate 1592, and line 1590 to one input of AND gate 1588. A second input to this AND gate is output line 801 from the ON side of H1 trigger 807. Since, as will be seen later, the same circuitry is used for inserting loops in succeeding levels of the hierarchy where this is required, the input on line 801 is required to prevent multiple additions to the contents of the Z register when only a single loop has been added to the system. At T2 time, a signal is applied to line 1596, fully conditioning AND gate 1588 to generate an output signal on line 1586 which causes the Z register to be incremented. At T9 time, trigger TR6C7 is reset and trigger TR7C7 set.

When trigger TR7C7 is in its ON state, a signal is applied through line 2052 (FIG. 7F) to one input of gate 2003 and AND gate 2072. At T0 time, a signal is applied to line 2076, fully conditioning AND gate 2072 to generate an output signal which causes K register 174 to be reset. The conditioning of gate 2003 permits the contents of counter 222, in this case the naw value of *d*H1, to be applied to data input 1993 of the K register. At T6 time, a signal is applied to line 2074, fully conditioning AND gate 2070 to generate a set signal which permits the new value of *d*H1 to be set into the K register. When trigger TR7C7 is in its ON state, a signal is also applied through line 2123 (FIG. 7G) and OR gate 2116 to line 2114 to cause the value in the K register, in this case the new value of *d*H1, to be written into the appropriate storage position in K memory 170 at T7 time. Since, under this set of conditions, this is the final operation of cycle 7, various housekeeping functions must also be performed. A signal is applied through line 979 (FIG. 6F) and OR gate 974 to line 972 causing H triggers 806–809 to be reset. A signal is applied through line 2890 (FIG. 8A) and OR gate 2886 to line 2884 to condition Y trigger 2864 to be set. Trigger TR7C7 is reset at T9 time and a signal is applied through line 2549 (FIG. 8D) and OR gate 2544 to line 2542 to condition cycle 7 trigger 2540 and in new loop trigger 2546 to be reset and to condition cycle 8 trigger 1088 to be set.

Assume now that storage bin 264A (FIG. 5) is initially full so that, at T9 time, when trigger TR3C7 is in its ON state, it is found that *d*H1 is equal to zero and, referring to the appendix, trigger TR8C7 is set to its ON state. Under this set of conditions, the position in which the new loop to be stored is still the same and is given by the equation shown in FIG. 12. However, since there is already a loop in this position, it must be removed to buffer 260B (FIG. 5) for hierarchy level HR2.

When trigger TR8C7 is in its ON state, CTR222 (FIG. 7C) contains the modulo value of the ratio in FIG. 12A as indicated previously. A signal is therefore applied through line 1965 (FIG. 7C) and OR gate 1962 to line 1960 to cause this count to be incremented by one at T0 time to bring the address at which the new loop is to be stored into CTR222. Since the new loop is to be stored in hierarchy level HR2, constants for this level will be required and therefore a signal is also applied through line 2156 (FIG. 7E) and OR gate 2150 to line 2148 to cause TAR1 to be incremented at T8 time. A signal is also applied through line 816 (FIG. 6E) and OR gate 814 to line 812 to condition AND gate 625 to reset DAR1 at T0 time and to condition gate 798 to pass the setting of H trigger 806–809 (FIG. 6F) onto data input 796 of DAR1. Similarly, a signal is applied through line 794 (FIG. 6E) to condition AND gate 626 to reset DAR2 at T0 time and to condition gate 790 to apply the desired address stored in CTR222 to data input 788 of DAR2. At T1 time, signals are applied to lines 640 and 641 to cause the quantities applied to the data inputs of DAR1 and DAR2 to be set into these registers. Finally, when trigger TR8C7 is in its ON state, a signal is applied through line 911 (FIG. 6G) and OR gate 906 to line 904 to cause, in a manner previously described, the HAR1, and HAR2 registers to be reset and to cause the desired address stored in CTR222 to be set into HAR1, register 131A. At T9 time, trigger TR8C7 is reset and trigger TR9C7 set.

As indicated previously, there are fixed addresses FAL1–FAL3 in CCB84 at which the address of the last loop moved into the corresponding hierarchy level HAR1–HAR3 is stored. This information is used during cycles 9, 10, and 11. When trigger TR9C7 is in its ON state, the FAL record is made. As a preliminary step, a signal is applied through line 2449 (FIG. 8A) and OR gate 2444 to line 2442 to condition X-ring inhibit trigger 2440 to be set at T0 time. A signal is also applied through line 844 (FIG. 6E) and OR gate 842 to line 840 to partially condition AND gate 836. Since H1 trigger 807 was in its ON state when a transfer was made into DAR1, there is an output signal one line 540B from DAR1 at this time which fully conditions AND gate 836 to generate an output signal on line 848 causing the address of FAL1 to be set into CAR104 (FIG. 6K). A signal is also applied through line 532 (FIG. 6J) and OR gate 530 to line 534. The signal on line 534 conditions gate 536 to apply the contents of DAR1 to data input 544 of CBR2 and conditions gate 538 to apply the contents of DAR2 to data input 546 of CBR3. The signal on line 534 is also applied through OR gates 415 and 416 to cause CBR2 and CBR3 to be reset at T0 time and to cause the new data to be set into these registers at T1 time. A signal is also applied through line 563 and OR gate 560 to line 558, conditioning AND gate 556 to apply a write signal to CCB at T3 time. This results in the address at which the new loop is to be stored in HR1 being stored at the address FAL1 in CCB. At T9 time, trigger TR9C7 is reset and trigger TR10C7 set.

As a preliminary step, when trigger TR10C7 is in its ON state, a signal is applied through line 2465 (FIG. 8A) and OR gate 2462 to line 2460 to condition X-ring-inhibit trigger 2440 to be reset at T0 time. A signal is also applied through line 1395 (FIG. 6C) to AND gate 1391. Since H1 trigger 807 is in its ON state and generating an output signal on line 801 at this time, AND gate 1391 is fully conditioned to generate an output signal on line 1451 which is applied to HR1 to energize suitable valves to effect a transfer of the loop stored at the address indicated in HAR1 131A from storage bin 264A (FIG. 5) to HR2 buffer cavity 260B. If, at T9 time, there is an HRX not-busy signal on line 1487 (FIG. 6C), trigger TR10C7 is reset and trigger TR11C7 set.

When trigger TR11C7 is in its ON state, a signal is applied through line 1379 (FIG. 6C), OR gate 1377, and line 1375 to one input of AND gate 1371, the other input to this AND gate being output line 801 from the ON side of H1 trigger 807. The resulting output signal on line 1431 is applied to HR1 to energize suitable valves (not shown) to cause the loop stored in hierarchy level HR1 buffer cavity 260A (FIG. 5) to be moved into the storage position indicated in HAR1 register 131A in storage bin 274A. The new loop is in this manner stored in the appropriate storage position. As indicated previously, when a new loop is stored in hierarchy level 1 storage bin 264A, Z register 188 is incremented. Therefore, at this time a signal is applied through line 1595 (FIG. 7A), OR gate 1592, and line 1590 to one input of AND gate 1588. A second input to this AND gate is output line 801 from the ON side of H1 trigger 807. At T2 time, a signal is applied to line 1596 to fully condition this AND gate causing an output signal on line 1586 which increments Z register 188. Since H1 trigger 807 is in its ON state at this time, H3 trigger 809 is in its OFF state. There is therefore an output signal on line 1070 (FIG. 6F). From the appendix, it can be seen that under these conditions at T9 time, trigger TR11C7 is reset and trigger TR12C7 set.

It can be seen that the situation existing now is that there is a loop stored in hierarchy level 2 buffer cavity 260B. This is similar to the situation which existed at the beginning of the cycle when a loop was stored in hierarchy level 1 buffer cavity 260A. When trigger TR12C7 is in its ON state, a signal applied through line 1026 (FIG. 6F) to one input of AND gate 1018, the other input to this AND gate being output line 801 from the ON side of H1 trigger 807. The resulting output on line 1016 is applied through OR gate 1010 and line 1008 to condition H1 trigger 807 to be reset and through OR gate 1030 and line 1028 to condition H2 trigger 808 to be set. At T8 time, a signal is applied to line 964 to cause the desired reset and set operations to occur. Since trigger H2 is now in its ON state, at T9 time, trigger TR12C7 is reset and trigger TR28CI is set. This initiates a calculation of the ratio term in the position equation for hierarchy level 2. When this calculation is completed, trigger TR2C7 is set to its ON state and the circuit proceeds to determine if there is an empty storage position in hierarchy level HR2 in which to store the loop now stored in buffer cavity 260B. If such a position exists, the loop is stored in a manner similar to that already described. If such a position does not exist, the loop at the address computed is moved to buffer cavity 260C, the loop in buffer cavity 260B is moved into the computed position in hierarcry storage bin 264B, and a suitable entry is made in the FAL2 address of CCB. The circuit then proceeds to set trigger H3 to its ON state to repeat the above sequence of operations. If, at T9 time, with trigger TR11C7 in its ON state, it is found that H3 trigger 809 is in its ON state, it can be seen from the appendix that trigger TR13C7 rather than trigger TR12C7 is set to its ON state.

When trigger TR13C7 is in its ON state, a signal is applied through line 976 (FIG. 6F) and OR gate 974 to line 972 causing H triggers 806–809 to be reset. A signal is also applied through line 2891 (FIG. 8A) and OR gate 2886 to line 2884 to condition Y trigger 2864 to be set. Finally, a signal is applied through line 2548 (FIG. 8D) and OR gate 2544 to line 2542 to condition cycle 7 trigger 2540 and new-loop trigger 2546 to be reset and to condition cycle 8 trigger 1088 to be set. The circuit thus completes cycle 7 of its operation. The loop left in buffer 260D may be removed from the system in any suitable manner.

*Cycles 8, 9, 10 and 11*

During cycle 8, a read instruction in the queue in CCB for hierarchy level HR0 is executed and the resulting record read into register RR0 (FIG. 6H). During cycle 2, this record is then transferred to the host-core memory. During cyles 9, 10, and 11 read instructions in the queue for hierarchy levels HR1, HR2, and HR3 respectively are executed and the retrieved records stored in registers RR1, RR2, and RR3 respectively.

Referring now to FIG. 8E, it is seen that when cycle 8 trigger 1088 is in its ON state and RE0 trigger 2770 is in its ON state (RE0 trigger 2770 being in its ON state when RR0 register 70 is empty) AND gate 2588 is fully conditioned to generate an output signal on cycle 8 output line 2586. If, on the other hand, when cycle 8 trigger 1088 is in its ON state there is something in the RR0 register so that RE0 trigger 2770 is in its OFF state, inverter 2584 generates an output signal on line 2582 which fully conditions AND gate 2580 to generate an output signal on line 2578 which is applied through OR gate 2566 (FIG. 8D) and line 2564 to condition cycle 8 trigger 1088 to be reset and cycle 9 trigger 1096 to be set. This is the manner in which cycle 8 is by-passed when there is no work for it to perform.

Referring now to the appendix, it is seen that when there is a cycle 8 output on line 2586 from the Y ring and Y trigger 2864 (FIG. 8A) is in its ON state and there is an X ring not-busy indication on line 2439 (FIG. 8C), trigger TR1C8 is set to its ON state. When trigger TR1C8 is in its ON state, a signal is applied through line 2450 (FIG. 8A) and OR gate 2444 to line 2442 to condition X-ring-inhibit trigger 2440 to be set at T0 time, and a signal is applied through line 2906 and OR gate 2902 to condition Y trigger 2864 to be reset at T0 time. Signals are also applied through line 1578 (FIG. 7A) and OR gate 1576 to line 1574 and through line 1696 (FIG. 7D) and OR gate 1694 to line 1692 to cause A register 180 and B register 182 to be reset at T0 time and to cause the contents of RQ register 111 to be set into the A register at T2 time and to cause the contents of R0 register 113 to be set into the B register at T5 time. If the contents of R0 are equal to the contents of RQ, this means that the read queue is either fully or empty. At this point, it is assumed that the read queue is empty at this time and, if in fact this assumption is wrong, it is taken care of during cycle 13. If RX=RQ, there is an equal indication from comparator 214 (FIG. 7B) on line 1148. From the appendix, it can be seen that when this occurs, at T9 time, trigger TR1C8 is reset and trigger TR2C8 set.

Since trigger TR2C8 is set when the read queue is empty, this means that there is no work to be performed during this cycle and the circuit proceeds on to cycle 9. To accomplish this, a signal is applied through line 2892 (FIG. 8A) and OR gate 2886 to line 2884 to condition Y trigger 2864 to be set at T0 time and a signal is applied through line 2467 and OR gate 2462 to line 2460 to condition X-ring-inhibit trigger 2440 to be reset at T0 time. A signal is also applied through line 2576 (FIG. 8D) and OR gates 2574 to line 2572, partially conditioning AND gate 2570. The other input to this AND gate is output line 1084 from the ON side of cycle 8 trigger 1088. The resulting output signal on line 2568 is applied to condition RE0 trigger 2770 to be reset, to condition cycle 8 trigger 1088 to be reset, and to condition cycle 9 trigger 1096 to be set. The circuit is thus prepared to proceed to cycle 9 in the operation.

If, on the other hand, when trigger TR1C8 is in its ON state comparator 214 (FIG. 7B) causes a not-equal indication to be generated on output line 1858 from inverter 1856, there is an instruction in the rear queue to be performed at this time and, at T9 time, trigger TR3C8 is set to its ON state. It will be remembered that a read instruction cannot be performed until it has been transformed and the information contained in the second read word generated. This is done during cycle 13. Therefore, when trigger TR3C8 is in its ON state, a determination is made as to whether the word indicated by R0 register 113 has been transformed. To effect this, a signal is applied through line 1570 (FIG. 7A) and OR gate 1658 to line 1566 causing A register 180 to be reset at T0 time and causing the contents of the RT register 112 to be set into the A register at T2 time. It will be remembered that B register 182 contains the contents of R0 register 113 at this time. To prepare for a later operation, a signal is also applied through line 1210 (FIG. 6L) to gate 1206 and AND gate 1216 at this time. This causes RS register 1214 to be reset at T0 time and conditions gate 1206 to apply the contents of R0 register 113 to data input 1213 of RS register 1214. At T2 time, this value is set into the RS register. A determination is now made as to whether the contents of the R0 register are equal to the contents of RT register. If they are, then there is no work to be performed during this cycle and, referring to the appendix, it is seen that trigger TR2C8 is again set to its ON state and the circuit conditioned to return to cycle 9. If these quantities are not equal, at T9 time, trigger TR3C8 is reset and trigger TR4C8 set.

Referring to FIG. 9, it is seen that the address information for a read operation is contained in read word 2. Therefore, when trigger TR4C8 is in its ON state, a signal is applied through line 1121 (FIG. 6N) and OR gate 1120 to one input of AND gate 1078A. A second input to this AND gate is output line 1080A from OR gate 1082A, one input to this OR gate being output line 1084 from the ON side of cycle 8 trigger 1088 (FIG. 8D). At T0 time, a signal is applied through line 1130A to fully condition AND gate 1078A causing an output signal on line 1076A which is applied to increment R0 register 113 to the address of the second word of the read instruction being executed. A signal is also applied through line 1234 (FIG. 6K) and OR gate 1232 conditioning AND gate 856 to cause CAR104 to be reset at T0 time and conditioning gate 1208 to apply the address now in R0 register 113 to data input 1238 of CAR. At T2 time, a signal is applied to line 862 causing this address, the address of the second word of the read command being executed, to be set into CAR. Finally, when trigger TR4C8 is in its ON gate, a signal is applied through line 482 (FIG. 6J) and OR gate 478 to line 476 causing CBR1–CBR3 to be reset, causing a read-out of CCB at T3 time, in this case a read-out of the second word of the read command being executed, and causing this command to be set into CBR1–CBR3 at T6 time. At T9 time, trigger TR4C8 is reset and trigger TR5C8 set.

Because of the manner in which RX registers 113–116 are set, the position at which one of these registers is initially set is the address in CCB following the last address from which a read instruction for the particular hierarchy level was taken. Therefore, this CCB memory location might not contain a read instruction for the particular hierarchy level. When trigger TR5C8 is in its ON state, a determination is made as to whether the instruction being looked at is a read instruction for the hierarchy level being investigated during the particular cycle. When TR5C8 is in its ON state, a signal is applied through line 1554 (FIG. 7A) to condition gate 1542 to apply the hierarchy number information contained in CBR2 to data input 1532 of A register 180 and to condition AND gate 1644 to reset the A register at T0 time. The hierarchy level is set into the A register at T2 time when a signal is applied to line 1650. A signal is also applied through line 1678 (FIG. 7D) to condition gate 1663 to apply information as to the hierarchy level presently being investigated through lines 1080A–1080D (FIG. 6P) to data input 1663 of B register 182 and to condition AND gate 1766 to cause the B register to be reset at T0 time. At T5 time, the hierarchy level information is set into the B register. The contents of the A register are compared with the contents of the B register and, if these quantities are not equal, meaning that the instruction presently being looked at is not an instruction for hierarchy level HR0, an output is obtained on output line 1858 (FIG. 7B) from inverter 1856 and at T9 time, trigger TR5C8 is reset and trigger TR6C8 set.

When trigger TR6C8 is set, the next read instruction in the hierarchy is investigated to determine if it is an instruction for the cycle presently being performed. A signal is first applied through line 1122 (FIG. 6N) and OR gate 1120 to line 1118, partially conditioning AND gate 1078A. At T0 time, a signal is applied to line 1130A, fully conditioning this AND gate to generate an output signal on line 1076A which causes R0 register 113 to be incremented to the address of the first read word of a new read instruction. A signal is then applied through line 1579 (FIG. 7A) and OR gate 1576 to line 1574 causing A register 180 to be reset at T0 time and causing the contents of RQ register 111 to be applied to data input 1536 of the A register. At T2 time, this quantity is set into the A register. A signal is also applied through line 1697 and OR gate 1694 to line 1692 to cause B register 182 to be reset at T0 time and to cause the contents of R0 register 113 to be applied to data input 1756 of B register 182. At T5 time, this quantity is set into the B register. A comparison is then made to determine if R0 is equal to RQ, or, in other words, if the read queue is empty of instructions for hierarchy level HR0. If compare circuit 214 (FIG. 7B) generates an equal output on line 1148 at this time, one input to AND gate 1146 (FIG. 6P) is conditioned. Since trigger TR6C8 is in its ON state, a signal is applied through line 1156 and OR gate 1152 to the other input 1150 of AND gate 1146, fully conditioning this AND gate to generate an output signal on line 1144 which is applied as one conditioning input to AND gate 1140A. Since cycle 8 trigger 1088 is in its ON state at this time, a signal is being applied through OR gate 1082A and line 1080A to the other input of AND gate 1140A causing an output signal on line 1158A which is applied to condition RN0 trigger 1160A (FIG. 8G) to be reset. At T9 time, trigger TR6C8 is reset and, if there is an equal output from comparator 214 (i.e. the queue is empty) or if there is an X ring busy indication on line 2436 (FIG. 8C) trigger TR2C8 is set to its ON state. When trigger TR2C8 is in its ON state, it will be remembered that the circuit is set to proceed to the next cycle. If, on the other hand, at T9 time there is an X ring not-busy indication on line 2439 and a not-equal indication out of inverter 1856 (FIG. 7B) indicating that there still may be a read instruction and the queue for the hierarchy level presently being investigated, trigger TR3C8 is set to its ON state. The circuit then proceeds through the operations performed when triggers TR3, TR4, and TR5C8 are in their ON states, first investigating to determine if RX is equal to RT and then determining whether the read instruction being worked on is for the proper hierarchy level for the cycle being performed.

Assume now that at T9 time when trigger TR5C8 is in its ON state it is found that the read instruction being looked at is for the hierarchy level for the cycle being performed so that there is an equal output from comparator 214 (FIG. 7B). Under these conditions, trigger TR5C8 is reset and trigger TR7C8 set. One final test must be performed before a record retrieval operation can be initiated. A transform operation is performed on a read instruction in the read queue during cycle 13. This transformed instruction may stay in the read queue for several complete cycles of the Y ring before it is executed. During cycle 7 of one of these cycles of the Y ring, the particular loop on which it is indicated that the desired record is stored may be moved to a new hierarchy level. It will be remembered that when this is done, the loop address is stored in the fixed address FALX, in CCB. Since hierarchy level HR0 contains no loops, this problem does not arise during cycle 8. However, the same circuitry is employed during cycles 9, 10, and 11 and therefore these operations are performed during cycle 8 as well even though they have no significance during this cycle.

As a preliminary step, a signal is applied through line 846 (FIG. 6E) and OR gate 842 to line 840 to condition one input of AND gate 835, the other input to this AND gate being output line 1084 from the ON side of cycle 8 trigger 1088. Output line 847 from AND gate 835 is connected to set the address FAL0 into CAR104 (FIG. 6K). It will be remembered that this address always contains the invalid address all 1's. Before a read-out operation of CCB is performed, a signal is applied through line 1556 (FIG. 7A) to one input of AND gate 1543 to cause the loop number presently in CBR3 (the loop number which was obtained as a result of the transform) to be applied to data input 1533 of A register 180 and to AND gate 1644 to cause the A register to be reset at T0 time. At T2 time this loop number is set into the A register. A signal is also applied through line 606 (FIG. 6E) to condition registers DAR1, DAR2, and DAR3 to be reset at T0 time and to cause the contents of CBR1 to be applied to data input 612 of DAR3, the contents of CBR2 to be applied to data input 610 of DAR1 and the contents of CBR3 to be applied to the data input 611 of DAR2. At T1 time, signals are applied to lines 640–642 to cause the data inputs to DAR1–DAR3 to be set into these registers. A signal is also applied through line 483 (FIG. 6J) and OR gate 478 to line 476, conditioning AND gate 490 to cause CBR1–CBR3 to be reset at T3 time, causing the invalid loop number stored in FAL0 to be read out of CCB at T3 time and causing this address to be set into CBR3 at T6 time. At T9 time, trigger TR7C8 is reset and trigger TR8C8 set.

When trigger TR8C8 is in its ON state, a signal is applied through line 1676 (FIG. 7D) to cause B register 182 to be reset at T0 time and to condition gate 1662 to pass the contents of CBR3 to data inputs 1752 of the B register. At T5 time, this address, the invalid address initially stored in FAL0, is set into the B register. Since the contents of the B register at this time is an invalid address, there will be a mismatch in compare circuit 214 (FIG. 7B) causing an output from inverter 1856 on line 1858 which, at T9 time, results in trigger TR8C8 being reset and trigger TR9C8 being set.

Before proceeding, it should be noted that with hierarchy levels other than hierarchy level HR0, the address applied to CBR3 by FALX may be equal to the loop number generated by the transform, meaning that the loop has been moved to a new hierarchy level and that a new transform must be performed in order to obtain the proper absolute address for the desired record. Under these conditions, when TR8C8 is in its ON state, at T9 time, trigger TR14C8 is set to its ON state. When trigger TR14C8 is in its ON state, a signal is applied through line 1228 (FIG. 6K) to cause CAR to be reset at T0 time and to condition gate 1226 to apply the address in RS register 1214 (FIG. 6L), the address of word 1 of the read instruction being looked at, to data input 1240 of CAR. At T2 time, this address is set into CAR. A signal is also applied through lines 486 (FIG. 6J) and OR gate 478 to line 476 causing CBR1–CBR3 to be reset at T3 time, causing the contents of the address indicated in CAR to be read out at T3 time and causing the contents of this address to be stored in CBR1–CBR3 at T6 time. A signal is also applied through line 651 (FIG. 6A) and OR gate 648 to line 646, conditioning AND gate 658 to cause TF register 94 to be reset at T0 time and conditioning gate 572 to cause the record name contained in CBR1 to be applied to data input 656 of the TF register. At T8 time, a signal is applied to line 664 to cause this record name to be set into the TF register. At T9 time, trigger TR14C8 is reset and trigger TR23C13 is set. The setting of trigger TR23C13 results, as will be seen later, in a new transform operation being performed on the record name and in the new absolute address of this record being stored in the second read word of the instruction.

The transform operation is normally completed when trigger TR19C13 is in its ON state. At T9 time, when this trigger is in its ON state, since a cycle 8, 9, 10 or 11 output is being obtained from the Y ring, trigger TR15C8 is set to its ON state. When trigger TR15C8 is in its ON state, a signal is applied through line 2451 (FIG. 8A), OR gate 2444, and line 2442 to set X-ring-inhibit trigger 2440 to its ON state. At T9 time, trigger TR15C8 is reset and trigger TR9C8 set.

Before describing what occurs when trigger TR9C8 is in its ON state, one other possible condition should be considered. If, during the new transform operation, it is found that the record being sought is no longer in the system, trigger TR30C13 will ultimately be set to its ON state. At T9 time, when this trigger is in its ON state, since a cycle 8, 9, 10 or 11 output is being obtained from the Y ring, and since, unless the record has just been transformed from hierarchy level HR3 out of the system, T trigger 1063 (FIG. 6F) is in its OFF state, trigger TR16C8 is set to its ON state. When trigger TR16C8 is in its ON state, a signal is applied through line 1124 (FIG. 6N) and OR gate 1120 to line 1118 to cause the appropriate RX register 113–116 to be incremented, bringing the address of the first word of the next read instruction into this register, and, at T9 time, trigger TR16C8 is reset and trigger TR2C8 set. It will be remembered that when trigger TR2C8 is in its ON state, the circuit completes the cycle which it is presently in and sets the appropriate triggers to enter the following cycle.

Assume now that at T9 time, when trigger TR8C8 is in its ON state there is a not-equal indication from inverter 1856 (FIG. 7B), meaning that the loop number for the record to be retrieved is different from that stored in FALX and therefore that the address given in the second word of the instruction is correct. Referring to the appendix, it is seen that under these conditions, at T9 time, trigger TR9C8 is set to its ON state. This trigger may also be set to its ON state at T9 time when trigger TR15C8 is in its ON state. The first operation to be performed under these conditions is to store the first word of the read instruction in the address FARX. This is accomplished by initially providing a signal through line 1136 (FIG. 6N) to condition AND gates 1134A–1134D. Assuming that the circuit is still in cycle 8, a second conditioning input is applied to AND gate 1134A through line 1080A. at T0 time, a signal is applied to line 1138A, fully conditioning AND gate 1134A to generate an output signal on line 1132A, which decrements R0 register 113 to the address of the first word of the read instruction. A signal is also applied through line 1236 (FIG. 6K) and OR gate 1232 to line 1230 to cause CAR104 to be reset at T0 time and to cause the address contained in R0 to be set into CAR at T2 time. A signal is also applied through line 484 (FIG. 6J) and OR gate 478 to line 476 causing CBR1–CBR3 to be reset at T3 time, causing a read-out of the first word of the read command at T3 time from CCB, and causing this word to be stored in CBR1–CBR3 at T6 time. At T9 time, trigger TR9C8 is reset and trigger TR10C8 set.

When trigger TR10C8 is in its ON state, a signal is applied through line 1162 (FIG. 6P) to condition AND gate 1142A. Assuming that the circuit is in cycle 8, AND gate 1142A is fully conditioned at this time, generating an output signal on line 1164A which is applied through OR gate 1166A and line 1184A to cause the address FAR0 to be set into CAR. A signal is also applied through lines 565 (FIG. 6J) and OR gate 560 to line 558 to cause a write cycle CCB at T3 time. This results in the first word of the read instruction being stored at the address FAR0. When trigger TR10C8 is in its ON state, the RX register is incremented to the address of the next read instruction in the queue. Since two words make up a read instruction, it is necessary to increment the RX register twice in order to effect this objective. Therefore, when trigger TR10C8 is in its ON state, signals are applied to lines 1123 (FIG. 6N) and 1116. The signal applied to line 1123 is applied through OR gate 1120 and line 1118 to condition AND gate 1078A. Assuming the circuit is in cycle 8, AND gate 1078A is conditioned by a signal applied to line 1080A. At T0 time, a signal is applied to line 1130A, fully conditioning this AND gate to generate an output signal which increments R0 register 113 for the first time. The signal applied to line 1116 partially conditions AND gate 1074A, the other inputs to this AND gate being the beforementioned line 1080A and line 1128A which has a signal applied to it at T8 time. Therefore, at T8 time, a signal is applied to line 1072A causing R0 register 113 to be incremented for the second time. It now contains the desired address. At T9 time, trigger TR10C8 is reset and trigger TR11C8 set.

A determination must now be made as to whether the read queue is empty or full. To effect this, when trigger TR11C8 is in its ON state, a signal is applied through line 1580 (FIG. 7A) and OR gate 1576 to line 1574 to cause A register 180 to be reset at T0 time and to cause the contents of RQ register 111 to be set into the A register at T2 time. A signal is also applied through line 1698 (FIG. 7D) and OR gate 1694 to line 1692 to cause B register 182 to be reset at T0 time and to cause the contents of R0 register 113 to be set into the B register at T5 time. A signal is also applied through line 1154 (FIG. 6P), OR gate 1152, to one input of AND gate 1146. If RX is equal to RQ at this time, there is an output signal on line 1148 from comparator 214 (FIG. 7B) at this time, fully conditioning AND gate 1146 to generate an output signal on line 1144 which is applied as one input to AND gates 1140. Assuming again that the circuit is in cycle 8, AND gate 1140A is fully conditioned at this time to generate an output signal on line 1158A which is applied to condition RN0 trigger 1160A (FIG. 8G) to be reset. If the contents of R0 register 113 are not equal to the contents of the RQ register at this time, the RN trigger is left in its ON state. Finally, when trigger TR11C8 is in its ON state, a signal is applied through line 2468 (FIG. 8A) and OR gate 2462 to line 2460 to condition X-ring-inhibit trigger 2440 to be reset at T0 time. If, at T9 time, there is an HRX not-busy signal on line 1194 (FIG. 6P), trigger TR11C8 is reset and trigger TR12C8 set.

When trigger TR12C8 is in its ON state, the address, of the record to be retrieved is applied to the hierarchy address registers. A signal is applied through line 870 (FIG. 6G) to condition HAR1 and HAR2 registers 130–133 to be reset at T0 time and to condition gates 956 and 960 to pass the contents of DAR2 to the data input of HAR1 registers and the contents of DAR3 to the data input of the HAR2 registers respectively. Assuming still that the circuit is operating in cycle 8 at T0 time, AND gate 895 is fully conditioned to generate an output signal on line 930 which is applied to reset registers 130A and 130B and, at T5 time, AND gate 890 is fully conditioned by a signal applied to line 913 to generate an output signal on line 925 which causes the address in DAR2 to be set into HAR1 register 130A and the address in DAR3 to be set into HAR2 register 130B. The address in HAR1 is the loop position and the address in HAR2 is the record address on the loop. At T9 time, trigger TR12C8 is reset and trigger TR13C8 set.

When trigger TR13C8 is in its ON state, a signal is applied through line 828 (FIG. 6E) to one input of AND gate 822, the other input to this AND gate being derived from output line 540A from DAR1. When the circuit is in cycle 8, there will be an output on line 540A at this time. The resulting output signal on output line 830 from AND gate 822 is applied to cause a read operation at hierarchy state HR0 and to cause the record read to be stored in RR0 register 70 (FIG. 6H). Since this is the end of cycle 8, various housekeeping operations must also be performed. A signal is therefore applied through line 2893 (FIG. 8A) and OR gate 2886 to line 2884 to condition Y trigger 2864 to be set at T0 time. A signal is also applied through line 2577 (FIG. 8D) and OR gate 2574 to line 2572. This line is applied as one conditioning input to AND gates 2570, 2594, 2614, and 2634. When the circuit is in cycle 8, a signal appears on line 1084, fully conditioning AND gate 2570 to generate an output signal on line 2568 which is applied to condition cycle 8 trigger 1088 and RE0 trigger 2770 to be reset and to condition cycle 9 trigger 1096 to be set.

In the previous description, it has been assumed that the circuit was operating in cycle 8. However, with certain obvious differences, the circuit operates in exactly the same way to retrieve a record from hierarchy levels HR1, HR2, and HR3 during cycles 9, 10, and 11 respectively. Further description of these cycles is not believed necessary. When the circuit is operating in cycle 11 and either trigger TR2C8 or trigger TR13C8 is in its ON state so that there is a signal on line 2572 (FIG. 8D), AND gate 2634 is fully conditioned to generate an output signal on line 2632 which is applied to condition cycle 11 trigger 1112 and RE3 trigger 2773 to be reset and to condition cycle 12 trigger 2538 (FIG. 8F) to be set. It should be noted, that if, when cycle 11 trigger 1112 is in its ON state, RE3 trigger 2773 is in its OFF state, AND gate 2652 (FIG. 8E) is fully conditioned to generate an output signal on line 2650 which is applied through OR gate 2630 (FIG. 8F) to line 2628 to condition cycle 11 trigger 1112 to be reset and cycle 12 trigger 2538 to be set, thereby by-pasing cycle 11.

*Cycle 12*

Cycle 12 is needed due to an idiosyncrasy of the circuit whereby, if during cycle 6 it is determined that the write queue is empty, triggers WE1 and WE2 (FIG. 8E) are reset and there is no way to set these triggers again. Therefore, after information has been applied to the write queue during a cycle 1 operation, there is no way to get back into cycle 6. Cycle 12 provides this means. It will be remembered from previous discussion that WN trigger 1304 (FIG. 8G) is set to its ON state when there is information in the write queue. Therefore, when cycle 12 trigger 2538 (FIG. 8F) and WN trigger 1304 are in their ON states, AND gate 2684 (FIG. 8G) is fully conditioned to generate an output signal on cycle 12 line 2682. If, on the other hand, when cycle 12 trigger 2538 is in its ON state, WN trigger 1304 is in its OFF state indicating that nothing has been added to the write queue, there is no need to perform cycle 12, and AND gate 2676 (FIG. 8G) is fully conditioned, generating an output signal on line 2674 which is applied through OR gate 2668 (FIG. 8F) and line 2666 to cause cycle 12 trigger 2538 to be reset and to cause cycle 13 trigger 2670 to be set. Cycle 12 is in this manner by-passed.

When there is an output on cycle 12 output line 2682 from the Y ring and Y trigger 2864 is in its ON state, trigger TR1C12 is set to its ON state at T9 time (see appendix). When trigger TR1C12 is in its ON state, a signal is applied through line 2907 and OR gate 2902 to line 2900 to condition Y trigger 2864 to be reset at T0 time. At T9 time, a determination is made as to whether there is an X ring not-busy indication on line 2439 (FIG. 8C) and WE1 trigger 2754 (FIG. 8E) and WE2 trigger 2755 are in their OFF states and there is an HR0 not-busy indication on line 1188A (FIG. 6C) and a write station W1 not-busy indication on line 1495. If all of these conditions exist concurrently, then the problem for which cycle 12 is inserted exists and the circuit should return to cycle 6. Therefore, at T9 time, if all these conditions are present, trigger TR1C12 is reset and trigger TR2C12 set.

When trigger TR2C12 is in its ON state, a signal is applied through line 2452 (FIG. 8A) and OR gate 2444 to line 2442 to condition X-ring-inhibit trigger 2440 to be set a T0 time. At T9 time, when trigger TR2C12 is in its ON state, trigger TR2C12 is reset and trigger TR3C6 set. With trigger TR3C6 in its ON state, the circuit proceeds to perform a write instruction.

If, on the other hand, one of the conditions indicated as being necessary for the setting of trigger TR2C12 to its ON state at T9 time when trigger TR1C12 is in its ON state is missing, trigger TR3C12 is set to its ON state at T9 time. Under these conditions, the circuit proceeds to cycle 13. In accomplishing this, a signal is applied through line 2894 (FIG. 8A) and OR gate 2886 to line 2884 to condition Y trigger 2864 to be set at T0 time and a signal is applied through line 2672 (FIG. 8F) and OR gate 2668 to line 2666 to condition cycle 12 trigger 2538 to be reset and cycle 13 trigger 2670 to be set at T9 time.

*Cycle 13*

When cycle 13 trigger 2670 (FIG. 8F) is in its ON state, it generates an output signal on line 2696 which is applied as one input to AND gates 2704 and 2694. If directory 148 (FIG. 6B) is not busy at this time, there is an output signal on line 728 from the OFF side of directory-busy trigger 722 which is applied to fully condition AND gate 2704 to generate an output signal on cycle 13 line 2702. If, on the other hand, the directory-busy trigger is in its ON state at this time, inverter 2700 generates an output signal on line 2698, fully conditioning AND gate 2694 to generate an output signal on line 2692 which is applied through OR gate 2688 (FIG. 8F) to line 2686 to condition cycle 13 trigger 2670 to be reset and cycle 14 trigger 1090 to be set. The effect of the operation just described is to by-pass cycle 13.

Cycle 13 is the cycle during which a transform is performed to obtain the absolute address (i.e. to fill in the second word in the read command) of a desired record. When there is a cycle 13 output on line 2702 (FIG. 8G) from the Y ring and Y trigger 2864 (FIG. 8A) is in its ON state, trigger TR20C13 is set to its ON state. The first thing to be determined during cycle 13 is whether there are any read instructions to be transformed. When trigger TR20C13 is in its ON state, as a preliminary step, a signal is applied to line 2908 (FIG. 8A) and OR gate 2902 to line 2900 to cause Y trigger 2864 to be reset at T0 time. Signals are also applied through line 1571 (FIG. 7A) and OR gate 1568 to line 1566 and through line 1674 (FIG. 7D) to cause A register 180 and B register 182 to be reset at T0 time, to cause the contents of RT register 112 to be set into A register 180 at T2 time, and to cause the contents of RQ register 111 to be set into B register 182 at T5 time. If the contents of the RT register are equal to the contents of the RQ register, there are no read instructions in the queue to be transformed, and, at T9 time, trigger TR20C13 is reset and, there being an equal indication on output line 1148 from comparator 214 (FIG. 7B) trigger TR21C13 is set.

When trigger TR21C13 is set, this means that there is nothing further to be done during cycle 13 and, therefore, a signal is applied through line 2895 (FIG. 8A) and OR gate 2886 to line 2884 to condition Y trigger 2864 to be set at T0 time, and a signal is applied through line 2690 (FIG. 8F) and OR gate 2688 to line 2686 to condition cycle 13 trigger 2670 to be reset and cycle 14 trigger 1090 to be set at T9 time. Trigger TR21C13 is also reset at T9 time. The circuit then proceeds on to cycle 14.

If, on the other hand, at T9 time when trigger TR20C13 is in its ON state, there is an output on output line 1858 (FIG. 7B) from inverter 1856 indicating that the contents of the RT register are not equal to the contents of the RQ register and that there is work to be performed during cycle 13, then trigger TR22C13 is set to its ON state. When trigger TR22C13 is in its ON state, a signal is applied through line 2545 (FIG. 8A) and OR gate 2444 to line 2442 to condition X-ring-inhibit trigger 2440 to be set at T0 time. A signal is also applied through line 1342 (FIG. 6K) and OR gate 1340 to line 1338 to cause CAR register 104 to be reset at T0 time and to cause the contents of RT register 112 to be set into CAR at T2 time. A signal applied through line 485 (FIG. 6J) and OR gate 478 to line 476 at this time causes CBR1–CBR3 to be reset at T3 time; a read cycle of CCB to be performed at T3 time causing the first instruction word of a read instruction contained at the address indicated by the RT register to be read out of CCB and this instruction word to be set into CBR1–CBR3 at T6 time. Finally, when trigger TR22C13 is in its ON state, a signal is applied through line 652 (FIG. 6A) and OR gate 648 to line 646, conditioning AND gate 658 to cause TF register 94 to be reset at T0 time and conditioning gate 572 to cause the record name now stored in CBR1 to be set into the TF register at T8 time. At T9 time, trigger TR22C13 is reset and trigger TR23C13 set.

When trigger TR23C13 is in its ON state, a signal is applied through line 2469 (FIG. 8A) and OR gate 2462 to line 2460, conditioning X-ring-inhibit trigger 2440 to be reset at T0 time. A signal is also applied through line 671 (FIG. 6A) and OR gate 668 to line 666 to cause randomizer 140 to start operating on the record name contained in TF register 94. At T9 time, if there is a randomizer-finished signal on line 674, trigger TR23C13 is reset and trigger TR24C13 set.

When trigger TR24C13 is in its ON state, a signal is applied through line 687 (FIG. 6A) and OR gate 684 to line 682, conditioning AND gate 694 to cause DSR1 and DSR2 144A and 144B respectively to be reset at T0 time and conditioning gates 678 and 680 to cause the output from randomizer 140 to be set into these registers at T1 time. At T9 time, trigger TR24C13 is reset and trigger TR25C13 set.

When trigger TR25C13 is in its ON state, a read signal is applied through line 710 (FIG. 6B) to directory 148 causing a read cycle of this directory which results in the entry having a tag matching that in DSR1 stored at the bucket address indicated in DSR2 being read out onto lines 732. At T9 time, if a directory-finished signal appears on line 730, trigger TR25C13 is reset and trigger TR28C13 set.

When trigger TR28C13 is in its ON state, a signal is applied through line 740 (FIG. 6B) to condition AND gate 750 to reset DBR1–DBR3 at T0 time and to condition gates 734–736 to cause the output from directory 148 on lines 732 to be set into DBR1–DBR3 at T8 time. At T9 time, trigger TR28C13 is reset, and trigger TR1C13 set.

It should be noted that at this time a relative address for the record to be retrieved is stored in DBR1–DBR3. However, in order to retrieve the record, this relative address must be converted into an absolute address, specifying the hierarchy number, loop position and record address on the loop at which the record is presently stored. To obtain this information, the circuit goes into what may be referred to as the record retrieval sub-cycle of cycle 13. FIG. 12 shows the calculations which are performed during the sub-cycle in order to obtain the necessary quantities. In these equations, the character Y represents the relative loop number which is stored in DBR2 at this time.

When trigger TR1C13 is in its ON state, a signal is applied to line 966 (FIG. 6F) to condition H0 trigger 806 to be set to its ON state at T8 time and a signal is applied to line 2170 (FIG. 7E) to condition TAR1 and TAR2 to be reset at T2 time. It will be remembered that LAC1 register 156A (FIG. 6D) contains the relative address of the loop presently being stored. At this time, a signal is applied through line 1552 (FIG. 7A) to cause the A register to be reset at T0 time and to cause the contents of LAC1 to be set into the A register at T2 time. A signal is also applied through line 1737 (FIG. 7D) and OR gate 1734 to line 1732 to cause B register 182 to be reset at T0 time and to cause the contents of DBR2, in this case the relative address of the loop on which a desired record is stored, to be set into the B register at T5 time. At T9 time, trigger TR1C13 is reset, and trigger TR2C13 set.

By substracting the relative address of a loop on which a desired record is stored from the relative address at which new loops are being stored, and absolute loop address can be obtained. Therefore, when trigger TR2C13 is in its ON state, a signal is applied through line 1798 (FIG. 7B) and OR gate 1796 to line 1794 causing C1 register 194 to be reset at T0 time and causing the difference of these two quantities now stored in subtractor 210 to be set into the C1 register at T5 time. A signal is also applied through line 1710 (FIG. 7D) and OR gate 1708 to line 1706 to cause E register 196 to be reset at T0 time and to cause the difference just set into the C1 register to be set into the E register at T8 time. At T9 time, trigger TR2C13 is reset and trigger TR3C13 set.

Referring to FIG. 12, it is seen that the first test to be performed is a test to determine if the quantity just stored in the E register is less than N0, the number of loops which can be stored in hierarchy level HR0. It will be remembered that TAR1 and TAR2 were initially reset. Referring to FIG. 11, it is seen that when the registers are in this condition, they bear the address at which the value of N0 is stored. When trigger TR3C13 is in its ON state, a signal is applied through line 2024 (FIG. 7G) and OR gate 2018 to line 2016 causing K register 174 to be reset, causing a read cycle of K memory at T0 time which results in the value N0 being read out onto lines 2010, and causing this value to be set into K register 174 at T1 time. Signals are also applied through lines 1614 (FIG. 7A) and OR gate 1612 to line 1610 and through line 1726 (FIG. 7D) and OR gate 1724 to line 1722, resulting in the A and B registers being reset at T0 time, in the value of N0 in the K register being set into the A register at T2 time, and in the quantity stored in the E register being set into the B register at T5 time. At T9 time, trigger TR3C13 is reset and trigger TR4C13 set.

When trigger TR4C13 is in its ON state, a signal is applied through line 2222 (FIG. 7E) to one input of AND gate 2216, the other input to this AND gate being output line 1852 from compare circuit 214 (FIG. 7B). A signal appears on line 1852 when the contents of the A register are higher than the contents of the B register or, in this instance, when N0 is greater than the quantity in the E register. From FIG. 12, it can be seen that when this occurs, it is an indication that the record is stored in hierarchy level HR0. Output line 2214 from AND gate 2216 is connected through OR gate 2206 to line 2204. This causes TAR2 to be incremented at T8 time. Before considering what happens, if N0 is greater than the quantity stored in the E register, assume that a low or equal indication is obtained at T9 time from comparator 214 on output line 1020 (FIG. 7B) from OR gate 1022. From the appendix it can be seen that under these conditions, trigger TR4C13 is reset and trigger TR5C13 set.

From FIG. 12, it can be seen that when trigger TR5C13 is set to its ON state, it means that the record is not in hierarchy level HR0 and that a test should be performed to determine if it is in hierarchy level HR1. In this test, a determination is made whether N1, which is the total number of loop positions in hierarchy level H1, minus *d*H1, which is the number of empty positions in this hierarchy level, is greater than the quantity stored in the Z register which is the loop number of the last loop stored in the system minus Y, which is, at this time, the loop number stored in DAR2. When trigger TR5C13 is in its ON state, a signal is applied through line 986 (FIG. 6F) to fully condition AND gate 984 to generate an output signal on line 982 which is applied to condition H0 trigger 806 to be reset and to condition H1 trigger 807 to be set at T8 time. This indicates that it is hierarchy level HR1 which is being investigated at this time. A signal is also applied through line 2152 (FIG. 7E) and OR gate 2150 to cause TAR1 to be incremented at T8 time for the same reason. Signals are applied through line 1602 (FIG. 7A) and OR gate 1600 to line 1598 and through line 1736 (FIG. 7D) and OR gate 1734 to line 1732 to cause A register 180 and B register 182 to be reset at T0 time, to cause the contents of the Z register to be set into the A register at T2 time and to cause the contents of DBR2 to be set into the B register at T5 time. At T9 time, trigger TR5C13 is reset and trigger TR6C13 set.

When trigger TR6C13 is in its ON state, a signal is applied through line 1799 (FIG. 7B) and OR gate 1796 to line 1794 causing C1 register 194 to be reset at T0 time and causing the difference, contents of A register minus contents of B register, stored in subtractor 210 to be set into the C1 register at T5 time. This difference is the quantity $Z-Y$. A signal is also applied through line 1711 (FIG. 7D) and OR gate 1708 to line 1706 to cause E register 196 to be reset at T0 time and to cause the difference now stored in the C1 register to be set into the E register at T8 time. At T9 time, trigger TR6C13 is reset and trigger TR7C13 set.

TAR1 and TAR2 now contain the address at which the constant N1 is stored. When trigger TR7C13 is in its ON state, a signal is applied through line 2025 (FIG. 7G) and OR gate 2018 to line 2016 to cause K register 174 to be reset, to cause a read-out of the value N1 from K memory at T0 time, and to cause this value to be set into the K register at T1 time. At the same time, a signal is applied through line 1615 (FIG. 7A) and OR gate 1612 to line 1610 to cause the A register to be reset at T0 time and the value N1 stored in the K register to be set into the A register at T2 time. A signal is also applied through line 2234 (FIG. 7E) and OR gate 2232 to line 2230 to cause TAR2 to be incremented at T2 time. This brings the address at which *d*H1 is stored into TAR1 and TAR2. A signal is also applied through line 2040 (FIG. 7G) and OR gate 2022 to line 2020 causing K register 174 to again be reset causing a read-out of K memory at T3 time, in this case causing the value *d*H1 to be applied to lines 2010, and causing this value to be set into the K register at T4 time. Finally, a signal is applied through line 1744 (FIG. 7D) and OR gate 1742 to line 1740 causing B register 182 to be reset at T0 time and causing the value in K register 174, in this case to value *d*H1, to be set into the B register at T5 time. The values N1 and *d*H1 are therefore set into the A and B register respectively. At T9 time, trigger TR7C13 is reset and trigger TR8C13 set.

When trigger TR8C13 is in its ON state, a signal is applied through line 1800 (FIG. 7B) and OR gate 1796 to line 1794 to cause C1 register 194 to be reset at T0 time and to cause the difference $N1-dH1$ contained in subtracter 210 to be set into the C1 register at T5 time. Referring to FIG. 12, it can be seen that additional calculations are required when a test is being made to determine whether the record is in hierarchy HR2 or HR3 over and above the calculations required to determine if the record is in hierarchy HR1. These additional tests are performed when triggers TR9C13 and TR10C13 are in their ON states. Since, at this time, H1 trigger 807 is in its ON state, from the appendix, it can be seen that at T9 time, trigger TR11C13 is set to its ON state. The functions performed when triggers TR9C13 and TR10C13 are in their ON states will be described later.

When trigger TR11C13 is in its ON state, a signal is applied through line 1897 (FIG. 7C) and OR gate 1894 to line 1892 to cause C2 register 202 to be reset at T5 time and to cause the contents of the C1 register, in this case the value $N1-dH1$, to be set into C2 register 202. Signals are also applied through line 1626 (FIG. 7A) and OR gate 1624 to line 1622 and through line 1727 (FIG. 7D) and OR gate 1724 to line 1722 to cause the A and the B register to be reset at T0 time and to cause the contents of the C1 register, in this case the value $N1-dH1$, to be set into the A register at T2 time, and to cause the contents of the E register, in this case the quantity $Z-Y$, to be set into the B register at T5 time. At T9 time, trigger TR11C13 is reset and trigger TR12C13 set.

What occurs when trigger TR12C13 is in its ON state depends on whether the comparison made between the contents of the A register and the contents of the B register generates a low-or-equal indication, a high indication, or whether with the low-or-equal indication the H3 trigger is in its ON state. When trigger TR12C13 is in its ON state, a signal is applied through line 1024 (FIG. 6F) to one input of AND gates 1014, 1044, and 1062. A second input to these AND gates is low-or-equal output line 1020 from OR gate 1022 (FIG. 7B). If the H1 trigger is in its ON state at this time, as it has been assumed so far, AND gate 1014 is fully conditioned to generate an output signal on line 1012 which is applied to condition the H1 trigger to be reset and to condition the H2 trigger to be set. It can be seen that if the H2 trigger were ON at this time, AND gate 1044 would be fully conditioned to generate an output signal on line 1040 which would cause the H2 trigger to be conditioned to be reset and the H3 trigger to be conditioned to be set. Finally, if the H3 trigger has been in its ON state, AND gate 1062 would be fully conditioned to generate an output signal on line 1060 which is applied to reset H3 trigger 809 and is applied to condition T trigger 1062 to be set at T7 time. A signal on line 1060 is interpreted to mean that the desired record is not in the files and has been transferred out to some sort of archive storage. Referring to the appendix, it can be seen that if, when the low or equal indication is obtained on output line 1020 from OR gate 1022, either the H1 or the H2 trigger is in its ON state, trigger TR7C13 is set to its ON state at T9 time. Under these same conditions, a signal is applied through line 2157 and OR gate 2150 to line 2148 to cause TAR1 to be incremented at T8 time and a signal is applied to AND gate 2258 to cause TAR2 to be reset at T8 time, bringing the address for the proper set of constants into these registers. The circuit then proceeds through the operations performed when triggers TR7C13 and TR8C13 are in their ON states, ending up with the quantity $N2-dH2$ in the C1 register. Since the H2 trigger is now in its ON state, at T9 time, trigger TR8C13 is reset and trigger TR9C13 set.

It will be remembered that when trigger TR11C13 was previously in its ON state, the quantity $N1-dH1$ was stored in the C2 register. When trigger TR9C13 is in its ON state, signals are applied through line 1627 (FIG. 7A) and OR gate 1624 to line 1622 and through line 1682 (FIG. 7D) to cause the A and B registers to be reset at T0 time, to cause the value $N2-dH2$ stored in the C1 register to be set into the A register and to cause the value $N1-dH1$ stored in the C2 register to be set into the B register. At T9 time, trigger TR9C13 is reset, and trigger TR10C13 set.

When trigger TR10C13 is in its ON state, a signal is applied through line 1782 (FIG. 7B) and OR gate 1780 to line 1778 to cause the C1 register to be reset at T0 time and to cause the sum of the contents of the A and B registers, in this case the left-hand term in the test equation for heirarchy level HR2 (FIG. 12B) to be set into the C1 register at T5 time. At T9 time, trigger TR10C13 is reset and trigger TR11C13 set. The circuit then proceeds as indicated previously to store the value just stored in the C1 register in the C2 register and to determine if this quantity is greater than $Z-Y$ when trigger TR12C13 is in its ON state. If a low or equal indication is again obtained, the circuit repeats the operation as just described with H3 trigger 809 now in its ON state. If, on the other hand, a high indication is obtained on output line 1852 from the comparator at this time, at T9 time, trigger TR13C13 is set to its ON state.

Whether trigger TR13C13 is set to its ON state when trigger TR4C13 is in its ON state indicating that the desired record is stored in HR0, or whether it is set to its ON state when TR12C13 is in its ON state indicating that the desired record is in hierarchy level HR1, HR2, or HR3, depending on which HX trigger is in its ON state at that time, the operations which are subsequently performed are the same. These operations involve the computing of the modulo position ratio, as shown in FIGS. 12A and 12B. It will be remembered that the last operation performed before trigger TR13C13 is set to its ON state is the incrementing of TAR2. This brings the address of DX into TAR1 and TAR2. From FIG. 12A it can be seen that there is no D0 term in the position equation for hierarchy 0. The reason for this is that both D0 and YH0 (FIG. 11) are both equal to zero. These terms, which are only provided so that the same circuitry may be used for all hierarchy levels, therefore cancel each other in the position equation for this reason and are not shown. When trigger TR13C13 is in its ON state, a signal is applied through line 2026 (FIG. 7G) and OR gate 2018 to line 2016, causing K register 174 to be reset, causing a read-out of DX from K memory at T0 time, and causing the setting of this quantity into the K register at T1 time. Signals are also applied through line 1616 and OR gate 1612 to line 1610 and through line 1738 (FIG. 7D) and OR gate 1734 to line 1732 causing the A and B registers to be reset at T0 time, causing the value of DX stored in the K register to be set into the A register at T2 time, and causing the value stored in DBR2 to be set into the B register at T5 time. At T9 time, trigger TR13C13 is reset and trigger TR14C13 set.

When trigger TR14C13 is in its ON state, a signal is applied through line 1783 (FIG. 7B) and OR gate 1780 to line 1778 to cause C1 register 194 to be reset and to cause the sum $DX+Y$ stored in adder 208 to be set into the C1 register at T5 time. A signal is also applied through line 2235 (FIG. 7E) and OR gate 2232 to line 2230 to cause TAR2 to be incremented at T2 time. This brings the address in which YHX is stored into TAR1 and TAR2. At T9 time, trigger TR14C13 is reset and trigger TR15C13 set.

When trigger TR15C13 is in its ON state, a signal is applied through line 2027 (FIG. 7G) and OR gate 2018 to line 2016 to cause the K register to be reset, to cause a read-out of the value YHX from the K memory at T0 time, and to cause this value to be set into the K register at T1 time. Signals are also applied through line 1629 (FIG. 7A) and OR gate 1624 to line 1622 and through line 1745 (FIG. 7D) and OR gate 1742 to line 1740 to cause the A and B registers to be reset at T0 time, to cause the value $Y+D1$ stored in the C1 register to be set into the A register at T2 time, and to cause the value YHX stored in the K register to be set into the B register at T5 time. At T9 time, trigger TR15C13 is reset and trigger TR16C13 set.

When trigger TR16C13 is in its ON state, a signal is applied through line 1801 (FIG. 7B) and OR gate 1796 to line 1794 to cause C1 register 194 to be reset and to cause the quantity, contents of A register minus contents of B register, in this case the numerator of the position equation (FIGS. 12A and 12B) to be set into the C1 register at T5 time. The next operation is to find the denominator for the position equation. Referring to FIG. 11 and remembering that the last term retrieved was YHX, it is seen that for all hierarchy levels except the H0 level, the constant NX is obtained by incrementing TAR2. For hierarchy level HR0, it is necessary to increment TAR2 twice to move from YH0 to N0. Therefore, when trigger TR16C13 is in its ON state, a signal is applied through line 2212 (FIG. 7E) and OR gate 2232 to line 2230 to cause TAR2 to be incremented at T2 time. The signal on line 2212 is also applied to one input of AND gate 2210, the other input to this AND gate being output line 800 from the ON side of H0 trigger 806 (FIG. 6F). If AND gate 2210 is fully conditioned, it generates an output signal on line 2208 which is applied through OR gate 2206 to line 2204 to cause TAR2 to be incremented a second time at T8 time. In this manner, the position of the quantity NX is placed in TAR2. At T9 time, trigger TR16C13 is reset and trigger TR17C13 set.

When trigger TR17C13 is in its ON state, a signal is applied through line 2028 (FIG. 7G) and OR gate 2018 to line 2016 to cause the K register to be reset, to cause a read-out of the value NX from K memory at T0 time, and to cause this value to be set into the K register at T1 time. When trigger TR17C13 is in its ON state, a signal is also applied through line 1628 (FIG. 7A) and OR gate 1624 to line 1622 and through line 1748 (FIG. 7D) and OR gate 1742 to line 1740 to cause the A and B registers to be reset at T0 time, to cause the numerator of the position equation contained in C1 register 194 to be set into the A register at T2 time, and to cause the value NX, the denominator of the position equation, to be set into the B register at T5 time. At T9 time, trigger TR17C13 is reset and trigger TR18C13 set.

When trigger TR18C13 is in its ON state, a signal is applied through line 1822 (FIG. 7B) and OR gate 1820 to line 1818 to cause the C1 register to be reset and to cause the remainder of the equation, contents of A register divided by contents of B register (in this case the remainder of the position equation shown in FIGS. 12A and 12B) to be set into the C1 register at T5 time. The loop position is therefore set into the C1 register at this time. When trigger TR18C13 is in its ON state, a signal is also applied through line 817 (FIG. 6E) and OR gate 814 to line 812 to condition AND gate 625 to reset DAR1 at T0 time and to condition gate 798 to apply the contents of H triggers 860–809 to data input 796 of DAR1. At T1 time, a signal is applied to line 640 causing this hierarchy position information to be set into DAR1. At T9 time, trigger TR18C13 is reset and trigger TR19C13 set.

When trigger TR19C13 is in its ON state, a signal is applied through line 778 (FIG. 6E) to one input of AND gates 626 and 627 to cause DAR2 and DAR3 to be reset at T0 time. The signal on line 778 is also applied to condition gate 782 to apply the loop position information in C1 register 194 to data input 786 of DAR2 and to condition gate 776 to apply the record position information contained in DBR3 to data input 780 of DAR3. At T1 time, signals are applied to lines 641 and 642 to cause the loop position and record position information applied to the data inputs of DAR2 and DAR3 respectively to be set into these registers. The above operations complete what is referred to as the record retrieval portion of cycle 13 and therefore necessitates certain housekeeping operations being performed. As a result, a signal is applied through line 977 (FIG. 6F) and OR gate 974 to line 972 to condition H0–H3 triggers 806–809 to be reset at T8 time. At T9 time, trigger TR19C13 is reset and, if the circuit is in cycle 13, trigger TR26C13 is set to its ON state. It will be remembered, however, that during cycles 8, 9, 10, and 11, a situation occurred where a loop had been moved since a transform was performed on it and it was therefore necessary to perform a new transform for this record. Under these conditions, when the circuit is in cycles 8, 9, 10 and 11, when the transform is completed, trigger TR15C8 is set to its ON state.

Referring back to trigger TR12C13, it is seen that there is one possible condition which could occur at T9 time when this trigger is in its ON state which has not yet been discussed. This is the situation which occurs when there is a low or equal output on line 1020 (FIG. 7B) and H3 trigger 809 (FIG. 6F) is in its ON state so that AND gate 1062 (FIG. 6F) is fully conditioned to generate an output signal on not-in-files line 1060. The signal on line 1060 is applied to set T trigger 1062 to its ON state. Under these conditions, referring to the appendix, it is seen that at T9 time, trigger TR12C13 is reset and trigger TR29C13 set. Under these conditions, it is desired to inform the host CPU of the record name and of the fact that this record is not in the system. Therefore, when trigger TR29C13 is in its ON state, as a preliminary step, a signal is applied through line 2446 (FIG. 8A) and OR gate 2444 to line 2442 to cause X-ring-inhibit trigger 2440 to be set at T0 time. A signal is also applied through line 820 (FIG. 6E) and OR gate 615 to line 620 causing DAR1 to be reset at T0 time. This indicates that the record is in none of the hierarchy levels. Finally, a signal is applied through line 520 (FIG. 6J) to condition gate 516 to apply the record name in TF register 94 (FIG. 6A) to data input 514 of CBR1 and to condition AND gate 435 to reset this register at T0 time. The signal on line 520 also conditions AND gate 430 to cause the record name to be set into CBR1 at T1 time. At T9 time, trigger TR29C13 is reset and trigger TR30C13 set.

When trigger TR30C13 is in its ON state, a signal is applied through line 321 (FIG. 6H) to CPU50 to inform the host CPU that a record cannot be found in the hierarchy, and a signal is applied to line 406 (FIG. 6I) to condition gate 349 to pass the name of the record store in CRR1 to MBR. From MBR the record name is applied to the host CPU. When the host CPU has properly recorded this information, it applies a signal through line 1064 to condition T trigger 1062 (FIG. 6F) to be reset at T7 time. At T9 time, when the T trigger has been reset, trigger TR30C13 is reset and trigger TR26C13 is set, provided the circuit is in cycle 13. If the circuit is in cycles 8, 9, 10 and 11 at this time, for reasons previously indicated, at T9 time, trigger TR30C13 is reset and trigger TR16C8 set. The operations performed when this trigger is set have been previously described.

As has been previously indicated, when the record transform has been completed and the hierarchy level loop position and record position information stored in DBR1–DBR3 respectively or when a determination has been made that the record is not in the hierarchy, trigger TR26 C13 is set to its ON state. It is now desired to write the information stored in DAR1–DAR3 into the second read word of the read instruction being operated upon. As a preliminary step in effecting this, a signal is applied, when trigger TR26C13 is in its ON state, through line 2447 (FIG. 8A) and OR gate 2444 to line 2442 to cause X-ring-inhibit trigger 2440 to be set at T0 time. A signal is also applied through line 1320 (FIG. 6M) and OR gate 1318 to line 1316 to condition AND gate 1314 to generate an output signal on line 1312 at T0 time causing RT register 112 to be incremented. This brings the address of the second word of the read instruction being operated upon into RT register 112. A signal is then applied through line 1344 (FIG. 6K) and OR gate 1340 to line 1338 to cause CAR104 to be reset at T0 time and to cause the address now stored in the RT register to be set into CAR at T2 time. The address at which it is desired to store the information in DAR1–DAR3 is in this manner set into CAR. A signal is also applied through line 528 (FIG. 6J) to cause CBR1–CBR3 to be reset at T0 time, to condition gate 524 to apply the record address information in DAR3 to data input 522 of CBR1, to condition gate 536 to apply the hierarchy number information stored in DAR1 to data input 544 of CBR2, and to condition gate 538 to apply the loop position number stored in DAR2 to data input 546 of CBR3. At T1 time, AND gates 430–432 are fully conditioned to set the information applied to the data inputs of CBR1–CBR3 into these registers. When trigger TR26C13 is in its ON state, a signal is also applied through line 564 and OR gate 560 to line 558 to condition AND gate 556 to generate an output signal on line 554 at T3 time causing a write cycle of CCB which results in the record address, hierarchy number, and loop positions stored in CBR1–CBR3 respectively being set into the second word of the read instruction in CCB. As a further housekeeping operation, a signal is applied through line 2800 (FIG. 8G) to condition AND gates 2796–2799. Depending on the hierarchy level in which the transformed record is stored, DAR1 is generating an output signal on a line 540A–540D at this time, fully conditioning a corresponding AND gate 2796–2799 to generate an output signal on the corresponding output line 2790–2793 to condition RN0–RN3 triggers 1160A–1160D respectively to be set at T9 time. Also at T9 time, trigger TR26C13 is reset and trigger TR27C13 set.

When trigger TR27C13 is in its ON state, a signal is applied through line 1322 (FIG. 6M) and OR gate 1318 to line 1316 to cause RT register 112 to be incremented to the first word of the next read instruction to be transformed. Since TR27C13 is the last trigger of cycle 13, various housekeeping operations are performed at this time. A signal is applied through line 2896 (FIG. 8A) and OR gate 2886 to line 2884 to condition Y trigger 2864 to be set at T0 time and a signal is applied through line 2470 and OR gate 2462 to line 2460 to condition X-ring-inhibit trigger 2440 to be reset at T0 time. A signal is also applied through line 2691 (FIG. 8F) and OR gate 2688 to line 2686 to condition cycle 13 trigger 2670 to be reset and cycle 14 trigger 1090 to be set at T9 time. At T9 time, trigger TR27C13 is also reset.

*Cycles 14, 15, 16 and 17*

Cycles 14, 15, 16 and 17 are required for substantially the same reason as cycle 11. During cycles 8, 9, 10, and 11, when it is found that the queue is empty of read instructions for a particular level of the hierarchy, the REX trigger 2770–2773 (FIG. 8E) for that level of the hierarchy is reset. This trigger being reset causes the corresponding cycles 8, 9, 10, and 11 to be by-passed from that point on. In order to get back into that level of the hierarchy once a read instruction for that hierarchy level has been applied to the system, cycles 14, 15, 16, and 17 are required.

When cycle 14 trigger 1090 is in its ON state, and RN0 trigger 1160A is in its ON state indicating that there is a read instruction for hierarchy level 0 in the system, AND gate 2835 (FIG. 8G) is fully conditioned to generate an output signal on cycle 14 line 2840. If RN0 trigger 1160A is not in its ON state when cycle 14 trigger 1090 is in its ON state, AND gate 2720 is fully conditioned to generate an output signal on line 2718 which is applied through OR gate 2712 (FIG. 8F) to line 2710 to condition cycle 14 trigger 1090 to be reset and to condition cycle 15 trigger 1098 to be set. This is the manner in which a cycle 14 by-pass operation is performed.

Referring now to the appendix, it is seen that when Y trigger 2864 is in its ON state and there is either a cycle 14, cycle 15, cycle 16, or cycle 17 output signal on lines 2840, 2841, 2842, or 2494 respectively from the Y ring, trigger TR1C14 is set to its ON state. Assume, for example, that the circuit is in cycle 14. When trigger TR1C14 is in its ON state during this cycle, a test is made to determine whether the circuit should return to cycle 8. As a preliminary step, a signal is applied through line 2909 (FIG. 8A) and OR gate 2902 to condition Y trigger 2864 to be reset at T0 time. If when the circuit is in cycle 14 it is found that there is an HR0 not-busy indication on line 1188A (FIG. 6C), and an RE0 in its OFF state indication on line 2864, AND gate 2920 (FIG. 8A) is fully conditioned to generate an output signal on line 2926 which is applied through OR gate 2930 to line 2932. At T9 time, if there is a signal on line 2932 and an X ring not-busy indication on line 2436 (FIG. 8C), trigger TR2C14 is set to its ON state and trigger TR1C14 reset.

When trigger TR2C14 is in its ON state, a signal is applied through line 2453 (FIG. 8A) and OR gate 2444 to line 2442 to condition X-ring-inhibit trigger 2440 to be set to its ON state at T0 time. At T9 time, trigger TR2C14 is reset and trigger TR3C8 is set. TR3C8 in its ON state causes the read instruction for the given level in the hierarchy, for the chosen example HR0, to be executed. Cycle 14 trigger 1090 remains in its ON state while the read instruction is being executed. When trigger TR2C8 or TR13C8 is in its ON state meaning that either the read instruction cannot be executed or that the read instruction has been executed, there is a signal on line 2644 (FIG. 8F) which partially conditions AND gate 2638. The signal on output line 1086 from the ON side of cycle 14 trigger 1090 is applied through OR gate 2642 and line 2640 to fully condition AND gate 2638. The resulting output signal on line 2636 is applied to reset cycle 14 trigger 1090 and set cycle 12 trigger 2538.

If, on the other hand, when trigger TR1C14 is in its ON state and the circuit is in cycle 14, one of the inputs to AND gate 2920 (FIG. 8A) is missing, there is no output on line 2932 from OR gate 2930 and inverter 2934 generates an output signal on line 2936. Under these conditions, at T9 time, trigger TR1C14 is reset and trigger TR3C14 is set. When trigger TR3C14 is in its ON state, a signal is applied through line 2897 (FIG. 8A) and OR gate 2886 to line 2884 to condition Y trigger 2864 to be set at T0 time and a signal is applied through line 2484 (FIG. 8F) to one input of AND gate 2716, 2732, 2748, and 2482. Depending on whether the circuit is in cycle 14, 15, 16, or 17 respectively, one of these AND gates will be fully conditioned at this time. If the circuit is in cycle 14, AND gate 2716 is fully conditioned at this time to generate an output signal on line 2714 which is applied through OR gate 2712 to line 2710 to condition cycle 14 trigger 1090 to be reset and cycle 15 trigger 1098 to be set at T9 time. At T9 time, trigger TR3C14 is also reset.

The same sequence of operations as that described for cycle 14 also occurs during cycles 15, 16, and 17, the only difference being that a determination is made as to whether there is now a read instruction to be performed for hierarchy levels HR1, HR2, or HR3 respectively. When cycle 17 has been completed, AND gate 2482 (FIG. 8F) is fully conditioned to generate an output signal on line 2480 which is applied through line 2474 to condition cycle 17 trigger 1114 to be reset at T9 time and to condition cycle 6 trigger 2472 to be set. A new cycle of the Y ring is thus initiated.

ALTERNATIVE EMBODIMENTS

In the embodiment of the invention described so far, all records have been arranged in the system on an empirical basis based on their relative activity. However, the are some situations such as, for example, payroll where the system user knows when a record is placed in a system when it is going to be used again. In these situations, when write station W1 (FIG. 1) is finished writing a record, it is desirable that the system have the capacity to place the new loop in any level 21–23 of the hierarchy. Referring to FIG. 5, this would mean that not only would output tube 38 from write station W1 feed into buffer cavity 260A, but it would also feed into hierarchy 2 buffer cavity 260B and hierarchy 3 buffer cavity 260C. In order for a modified system of this type to operate effectively, some changes must be made in the record storage, retrieval, and initialize circuitry shown in FIGS. 2, 3, and 4. The principal change involves the substitution of the two-table circuit shown in FIG. 13 for the linear transform circuit shown in FIG. 3. Referring to FIG. 13, it is seen that it includes two random access memories 3000 and 3002 and a bank of registers 3011–3013. Storage device 3000 contains a table which is ordered by loop number and contains for each loop number the hierarchy level in which it is stored and the position in the storage bin for the hierarchy level in which the loop is stored. The table stored in memory 3000 is referred to as table X. Memory 3002 contains what is referred to as table Y. This table contains an address position for each possible position in each level of the hierarchy. It is addressed by supplying a hierarchy number and position. For each hierarchy number and position, there is stored the loop number which is contained in that position at the given instant. Register 3004 is the address register for the storage device 3000 and register 3006 is the buffer register for this memory. Register 3008 is the address register for memory 3002 and register 3010 is the buffer register for this memory. Information is transferred from directory-buffer register (DBR) 124 (FIG. 2) to table X address register 3004 through lines 3016. This information is applied to memory 3000 through lines 3018. A new loop number from LAC156 is transferred from LAC156 (FIG. 2) to loop register 3020 through lines 3022. Information as to the level in the hierarchy at which a given loop is to be stored is transferred from, for example, CBR66 (FIG. 2) where it is placed with the write instruction to hierarchy register 3024 through lines 3026. This information is applied through lines 3028 to decoder 3030 which generates an output signal on one of three output lines 3032 to cause the device and position number contained in the appropriate one of the registers 3011–3013 to be applied through lines 3034 to table Y address register 3008. Registers 3011–3013 contain, at all times, the position for the respective hierarchy at which the next loop is to be stored. The address information contained in register 3008 is applied to memory 3002 through lines 3036. The device and position information contained in register 3008 is also applied to table X buffer register 3006 through lines 3038. Information is transferred between table X buffer register 3006 and memory 3000 through lines 3040 and information is transferred from register 3006 to DAR98 (FIG. 2) through lines 3042. Information is transferred between table Y buffer register 3010 and memory 3002 through lines 3044 and from register 3010 to register 3020 through lines 3046. Loop numbers are transferred between loop register 3020 and table X address register 3004 through line 3048 and between table X address register 3004 and table Y buffer register 3010 through lines 3050.

In operation, when it is desired to insert a new loop in the system, the new loop number contained in LAC156

(FIG. 2) is gated through line 3022 to loop register 3020. The hierarchy in which it is desired to store the loop is gated from CBR66 (FIG. 2) through lines 3026 to hierarchy register 3024. The hierarchy number placed in register 3024 is then applied through lines 3028 to decoder 3030 and the decoded output applied through lines 3032 to cause the setting of the appropriate H trigger 807–809 (FIG. 6F). When these operations have been completed, a signal is applied to energize suitable valves to cause the loop stored in W1 register 34 (FIG. 5) to be transferred to the buffer cavity 260 for the hierarchy level indicated by decoder 3030. The operations described so far are performed only once during a new loop insert cycle. The operations to follow may be repeated where it is necessary to move an old loop out of the storage bin 264 (FIG. 5) in order to place the new loop in.

After the preliminary operations as described above have been completed, the new loop number contained in loop registers 3020 is gated through lines 3048 into table X address register 3004 and the device and position at which this loop is to be stored is gated out of the appropriate register 3011–3013 under control of output line 3032 from decoder 3030 through lines 3034 to table Y address register 3008. The device and position numbers in register 3008 are then gated through lines 3038 into table X buffer register 3006. The hierarchy number and position number transferred into buffer register 3006 are then gated through lines 3042 to DAR98 (FIG. 2) and from DAR98 through lines 136 to the appropriate hierarchy address register 131–133. At the same time, a signal is applied under control of decoder output lines 3032 to increment the address in the appropriate one of the registers 3011–3013. The next operation is to transfer the loop number indicated by the hierarchy address register 131–133 into the buffer cavity 260B–260D (FIG. 5) for the next level of the hierarchy.

When these operations have been completed, a write signal is applied to memory 3000 causing the device and position number stored in buffer register 3006 to be stored in table X at the address indicated by the loop number in register 3004. At the same time, a read signal is applied to memory 3002 causing the loop number which was stored at the position in the given hierarchy which a new loop is being entered into to be read out into table Y buffer register 3010. This information is then gated through lines 3046 to loop-buffer register 3020. While these operations are being performed, a signal is applied to the hierarchy to cause the loop stored in the buffer cavity 260A–260C for the given hierarchy level to be stored in the hierarchy level at the position indicated by the HAR registers 131–133.

It is now desired to store the new loop number which is in the given position of the selected hierarchy level in table Y. To accomplish this, the loop number contained in register 3004 is transferred through lines 3050 to table Y buffer register 3010. A write signal is then applied to memory 3002 causing this loop number to be stored in the Y table at the position indicated by the hierarchy level and position number in address register 3008.

A situation now exists which is analogous to that which existed after the preliminary operations previously mentioned were completed. The tables all contain the proper information for the loops presently stored in the system and there is a loop in a buffer cavity 260B–260D which must be stored in the system. In order to determine the next step, it is necessary to know whether the loop just stored was stored in the lowest level of the hierarchy so that the loop is now in buffer cavity 260D for the archive storage, or whether the previous loop was stored in some higher level of the hierarchy so that additional storage operations must be performed. Therefore, at this time, a test is made to determine if H3 trigger 809 is in its ON state. If it is in its ON state, then the loop insert cycle is completed and H*x* triggers 806–809 (FIG. 6F) are reset. If H1 trigger 807 or H2 trigger 808 is in its ON state at this time the trigger which is set is reset and the next higher number trigger is set. The circuit then returns to the point indicated previously. This is the point after the initial operations have been completed.

To retrieve a record with the embodiment of the invention shown in FIG. 13, the record name is applied to TF register 94 (FIG. 2), randomized in randomizer 140, and applied to directory 148 in the same manner as for the embodiment of the invention previously described. The output from the directory which is stored in DBR contains a loop number and a record address on the loop. As before, the record address is transferred directly to DAR98. The loop number is applied through line 3016 (FIG. 13) to table X address register 3004. A read signal is then applied to memory 3000 causing the hierarchy number and position number stored in the table for the given loop number to be read out through lines 3040 to table X buffer register 3006. This information is then transferred through lines 3042 to complete the position designation in DAR98. The information in DAR may then be transferred through CBR to be stored as the second read-instruction word in CCB in the manner previously described.

An initialize operation with the embodiment of the invention shown in FIG. 13 involves the increasing of the base value for the appropriate one of the counters 3011–3013 and the making of appropriate changes in the capacity and addresses in tables X and Y.

While the two-table scheme illustrated in FIG. 13 has been employed where information is to be read into all levels of the hierarchy, this scheme could also be employed where information is being read only into the first loop level of the hierarchy as shown in FIG. 1.

In the embodiment of the invention described so far, it has been assumed that all records are a fixed length and no specific provision has been made for chain addressing. With variable length records, a write instruction would have to include information as to the length of the record and a test would have to be made before starting to store a record on a loop to be sure that there was sufficient space left on the loop to store the record. If there were not sufficient space on the loop to store the complete record, a new loop would be moved into write station W1. Also, with variable length records, it might not be feasible to store a complete record in read buffer registers 70–73 (FIG. 6H) or in write buffer registers WR1 and WR2 (80 and 81). Under these conditions, information would be transferred to these registers a word at a time and a register provided in which the initial count of the number of words in the record is stored. This register could, for example, be decremented each time a word is transferred through the buffer register and an indication obtained that a complete record has been transferred when this register is decremented to 0.

Chain addressing can take two forms. The system described so far performs chain addressing by having the CPU place in a record the loop number and record position at which the previous version of this record is stored. For example, if the record is the insurance record of a particular individual, in this record would be contained the relative position in the hierarchy at which the last record concerning this individual is stored. The CPU can, by use of these addresses, obtain a complete record of transactions involving the particular individual.

Another form of chain addressing which the system does not presently have the capacity to perform, but which the system could easily be adapted to perform, is that in which each read or write instruction contains an address in the host-core memory from which the next read or write instruction is to be taken. Under these conditions, circuitry would be provided for sampling the field in which this information is stored before returning to the read or write queue in CCB and, if there is a host-core memory address in this field, bringing the instruction across and executing it.

It should be noted that, while read-write magnetic tape loops have been employed for hierarchy levels HR1–HR3, these levels are operated in a read-only mode. Therefore, any suitable storage media, either read-write or read only, could be used for these levels. Also, while for purposes of illustrating the invention, the record is shown as being read simultaneously into only two hierarchy levels, the higher of these levels being a magnetic drum, other devices such as magnetic core matrix arrays and magnetic discs, may be placed ahead of hierarchy level HR1 and as many hierarchy levels of these devices as is required may be employed. An input record would generally be placed simultaneously in all hierarchy levels ahead of level HR1.

It should also be noted that while the preceding description has considered only the problem of adding capacity to a selected hierarchy level, the capacity of a selected hierarchy level could similarly be reduced by repositioning loops and altering parameters in K memory 170 (FIG. 7G). Finally, it should be noted that, while in the illustrative embodiments, records have been shown as being physically moved from higher to lower levels, the drifting back of records may be accomplished electronically or by any other suitable means. An effective drifting back is accomplished by storing the record in two or more hierarchy levels of unequal capacity. As new records are applied to the system, the record is found only in the higher capacity level.

| Trigger No. | Set at T9 Time if Following Conditions Exist | Reset at T9 Time if Following Conditions Exist | Functions Performed While On | Next Trigger(s) to be Set |
|---|---|---|---|---|
| TR1CI | TR1CI in its ON state AND initialize indication on line 582 from decoder 90 (FIG. 6J). | TR1CI in its ON state | Cause contents of CBR2 (FIG. 6J) to be set into MAR (FIG. 6I).<br>Apply read signal to host-core memory.<br>Set output of host-core memory into MBR.<br>Condition TR1CI to be turned off.<br>Condition TR2CI to be turned on. | TR2CI. |
| TR2CI | TR1CI being in its ON state | TR2CI being in its ON state | Reset CBR1-CBR2 (FIG. 6J) and set MBR into CRB1-CBR2.<br>Reset TAR1 (FIG. 7E).<br>Reset TAR2.<br>Apply 3rd and 4th bits in CBR2 to TAR2.<br>Apply first two bits in CBR2 to TAR1.<br>Reset K register (FIG. 7F).<br>Set contents of CBR1 into K register.<br>Condition TR2CI to be reset, and condition TR3CI to be set. | TR3CI. |
| TR3CI | TR2CI being in its ON state | TR3CI being in its ON state | Cause a write cycle to be performed in K memory.<br>Set HX (FIG. 6F) trigger conditional on receiving appropriate output from decoder 1000 (FIG. 7E).<br>Partially condition triggers TR4CI and TR28CI and TR31CI to be switched to their ON states and condition TR3CI to be switched to its OFF state. | TR4CI. or TR28CI. or TR31CI. |
| TR4CI | TR3CI in its ON state AND trigger H1 (FIG. 6F) set or TR1C7 being in its ON state. | TR4CI being in its ON state | Increment TAR2 by one (FIG. 7E).<br>Cause a read-out of K memory (FIG. 7G).<br>Set K memory output into K register.<br>Transfer contents of Z (FIG. 7A) register to A register, and transfer contents of K register to B register.<br>Condition TR4CI to be reset, and condition TR5CI to be set. | TR5CI. |
| TR5CI | TR4CI being in its ON state or TR30CI being in its ON state. | TR5CI being in its ON state | Cause the sum of the contents of registers A and B to be read out from adder 208 (FIG. 7B) into C1 register.<br>Increment TAR2 (FIG. 7E) at T2 time.<br>Switch TR5CI to its OFF state.<br>Switch TR6CI to its ON state. | TR6CI. |
| TR6CI | TR5CI being in its ON state | TR6CI being in its ON state | Cause a read-out of K memory (FIG. 7G), and set the output from the K memory into the K register.<br>Reset the A register (FIG. 7A) and set the contents of C1 register into it.<br>Reset the B (FIG. 7D) register and set the contents of the K register into it.<br>Reset TR6CI and set TR7CI. | TR7CI. |
| TR7CI | TR6CI being in its ON state | TR7CI being in its ON state | Reset the C1 register, and transfer the difference of the contents of the A register minus the contents of the B register in subtracter 210 (FIG. 7B) to the C1 register.<br>Reset TR7CI and partially condition TR8CI and TR26CI and TR27CI to be set. | TR8CI. or TR26CI. or TR27CI. |
| TR8CI | TR26CI or TR27CI or TR7CI and cycle 9 initialize condition from Y ring. | TR8CI being in its ON state | Increment TAR2<br>Read out contents of K memory.<br>Reset K register.<br>Set output of K memory into K register.<br>Reset A register and set contents of C1 register into it.<br>Reset B register and set contents of K register into it.<br>Reset TR8CI and set TR9CI. | TR9CI. |

| Trigger No. | Set at T9 Time if Following Conditions Exist | Reset at T9 Time if Following Conditions Exist | Functions Performed While On | Next Trigger(s) to be Set |
|---|---|---|---|---|
| TR9CI | TR8CI being in its ON state | TR9CI being in its ON state | Reset C1 (FIG. 7C) register. Cause remainder of quantity, contents of the A register divided by the contents of the B register stored in divider 212 (FIG. 7B), to be set into C1 register. Reset CTR (FIG. 7C) and set the contents of C1 into CTR. Increment TAR2 at T2 time. Reset the E register and set the contents of the C1 register into it. Reset TR9CI and partially condition TR10CI to be set and partially condition TR2C12 to be set. | TR10CI. or TR2C7. |
| TR10CI | TR9CI in its ON state AND initialize output from decoder 90 (FIG. 6J). | TR10CI being in its ON state | Cause a read-out of K memory (FIG. 7G), reset K register, and set output from K memory into K register. Reset A register (FIG. 7A) and read contents of K register into it. Reset TR10CI and set TR11CI. | TR11CI. |
| TR11CI | TR10CI being in its ON state | TR11CI being in its ON state | Reset C1 and cause the sum of the contents of registers A and B stored in adder 208 (FIG. 7B) to be set into the C1 register. Reset C2 register (FIG. 7C) and set the contents of the C1 register into the C2 register. Decrement TAR2 (FIG. 7E). Turn off TR11CI and turn on TR12CI. | TR12CI. |
| TR12CI | TR11CI being in its ON state | TR12CI being in its ON state | Partially condition TR13CI and TR15CI to be switched to their ON states and switch TR12CI to its OFF state. | TR13CI. or TR15CI. |
| TR13CI | TR12CI being in its ON state AND a signal from inverter 1983 (FIG. 7C) indicating that the contents of CTR222 are equal to zero. | TR13CI being in its ON state | Reset K register (FIG. 7F) and set contents of C1 register into it. Apply a write signal to the K memory. Reset the A register (FIG. 7A) and set the contents of the C1 register into it. Increment TAR2 (FIG. 7E) at T8 time. | TR14CI. |
| TR14CI | TR13CI being in its ON state or TR25CI being in its ON state. | TR14CI being in its ON state | Reset C1 register and set the sum of the contents of the A and the B registers contained in adder 208 (FIG. 7B) into C1 register. Reset triggers H0 (FIG. 6F), H1, H2, and H3 to their OFF states. Increment TAR2 (FIG. 7E) at T2 time. Switch X trigger (FIG. 8A) to its ON state. Reset K register (FIG. 7F) and set contents of register C1 into it. Cause a write cycle of K memory. Reset TR14CI. Inhibit setting of TR1C1. Reset the C trigger (FIG. 8B) to its OFF state. Reset trigger 2300 of the X ring to its OFF state and set trigger 1176 of the X ring to its ON state. Reset decoder 90 (FIG. 6J). | Trigger 1176 of the X ring. |
| TR15CI | TR12CI in its ON state AND an output from OR gate 1979 (FIG. 7C) indicating that the contents of CTR222 are not equal to zero. | TR15CI in its ON state | Read out the contents of K memory (FIG. 7G), reset the K register, and set the output from the K memory into K register at T1 time. Reset CTR222 (FIG. 7C) and set the contents of the K register into it. Reset A register (FIG. 7A) and set contents of K register into A register. Reset the B register (FIG. 7A) and set the contents of the E register into B register. Reset TR15CI to its OFF state and switch TR16CI to its ON state. | TR16CI. |
| TR16CI | TR15CI being in its ON state | HRXNB on a line 1487 (FIG. 6C) and TR16CI being in its ON state. | Reset C1 and set the difference stored in subtracter 210 (FIG. 7B), the contents of the A register minus the contents of the B register, into C1. Increment TAR2 (FIG. 7E) at T2 time. Partially condition the turning off of TR16CI, the turning on of TR17CI, and the turning off of TR22CI. | TR17CI. |
| TR17CI | HRXNB on a line 1487 (FIG. 6C) AND either TR16CI being in its ON state or TR22CI being in its ON state | TR17CI being in its ON state | Reset HAR1X (FIG. 6G) and HAR2X registers and set contents of CTR (FIG. 7C) into HAR1X. Decrement contents of CTR by one. Set contents of CTR into C1. Set contents of C1 into C2 and set contents of C2 into CTR. Reset TR17CI and set TR18CI. | TR18CI. |

| Trigger No. | Set at T9 Time if Following Conditions Exist | Reset at T9 Time if Following Conditions Exist | Functions Performed While On | Next Trigger(s) to be Set |
|---|---|---|---|---|
| TR18CI | TR17CI being in its ON state | TR18CI being in its ON state AND HRX ready for next command (i.e. HX and a signal on line 1406, 1407, or 1408 (FIG. 6C) which results in an HR xRFNC signal on line 1467.) | Move loop for selected hierarchy from storage to read cavity. Partially condition TR18CI to be reset and TR19CI to be set. | TR19CI. |
| TR19CI | TR18CI being in its ON state AND HRX ready for next command (i.e. signal on line 1467) (FIG. 6C). | TR19CI in its ON state | Reset HAR1X and HAR2X (FIG. 6G) and set CTR into HAR1X. Decrement CTR (FIG. 6C) by one at T8 time. Set contents of CTR into C1. Set contents of C1 into C2. Set contents of C2 into CTR. Reset TR19CI to its OFF state and set TR20CI to its ON state. | TR20CI. |
| TR20CI | TR19CI being in its ON state | TR20CI being in its ON state | Move loop in cavity to storage (apply conditioning input to AND gates 1381–1383 (FIG. 6C), the other conditioning inputs to which are lines HX). Switch TR20CI to its OFF state and switch TR21CI to its ON state. | TR21CI. |
| TR21CI | TR20CI being in its ON state | TR21CI being in its ON state | Decrement CTR (FIG. 7C) by one at T8 time. Reset TR21CI. Partially condition TR22CI and TR-23CI to be set totheir ON states. | TR22CI or TR23CI. |
| TR22CI | TR21CI in its ON state AND an output from OR gate 1979 (FIG. 7C) indicating that CTR222 is not equal to zero. | HRXNB signal on line 1467 (FIG. 6C) AND TR22CI being in its ON state. | Set contents of C1 (FIG. 7C) register into C2 register. Set contents of C2 register into CTR and set contents of CTR into C1 register. Partially condition TR17CI to be switched to its ON state. | TR17CI. |
| TR23CI | TR21CI being in its ON state AND an output from inverter 1983 (FIG. 7C) indicating that CTR-222 is equal to zero. | TR23CI in its ON state | Reset K register (FIG. 7F). Cause a read-out of K memory and set the output from the K memory into the K register at T3 time. Reset the B register (FIG. 7D) and set the contents of K register into it. Turn off TR23CI and turn on TR24CI. | TR24CI. |
| TR24CI | TR23CI being in its ON state | TR24CI being in its ON state | Reset C1 register and set the sum of the contents of registers A and B in adder 208 (FIG. 7B) into C1 register. Decrement TAR2 (FIG. 7E) at T2 time. Reset TR24CI and set TR25CI. | TR25CI. |
| TR25CI | TR24CI being in its ON state | TR25CI being in its ON state | Increment TAR2 (FIG. 7E) at T8 time. Reset the K register (FIG. 7F) and set the contents of the C1 register into it at T6 time. Write into K memory (FIG. 7G). Reset A register (FIG. 7A) and set the contents of the C1 register into it. Reset the B register (FIG. 7D) and set the contents of the E register into it. Reset TR25CI and set TR14CI. | TR14CI. |
| TR26CI | An initialize command output from decoder 90 (FIG. 6J) AND TR7CI being in its ON state AND either trigger H2 (FIG. 6F) or trigger H3 being in its ON state. | TR26CI being in its ON state | Reset K register (FIG. 7F) and set contents of C2 register into it at T6 time. Write into K memory. Reset TR26CI and turn on TR8CI. | TR8CI. |
| TR27CI | An initialize command output from decoder 90 (FIG. 6J) AND TR7CI being in its ON state AND trigger H1 (FIG. 6F) being in its ON state. | TR27CI being in its ON state | Reset K register and set contents of Z register (FIG. 7A) into K register at T6 time. Write into K memory (FIG. 7G). Reset TR27CI and set TR8CI to its ON state. | TR8CI. |
| TR28CI | Either trigger H2 (FIG. 6F) being in its ON state AND TR3CI being in its ON state or Trigger H2 being in its ON state AND TR12C7 being in its ON state. | TR28CI being in its ON state | Decrement TAR1 (FIG. 7E) and TAR2 at T2 time. Reset K register. Read out of K memory (FIG. 7G) and set output from K memory into K register at T4 time. Reset A register (FIG. 7A) and set contents of Z register into A register. Reset B register (FIG. 7D) and set contents of K resigter into B register. Reset TR28CI and set TR29CI. | TR29CI. |
| TR29CI | TR28CI being in its ON state or TR33CI being in its ON state. | TR29CI being in its ON state | Increment TAR1 (FIG. 7E) at T8 time and TAR2 at T2 time. Reset C1 register and set the difference, contents of A register minus contents of B register, stored in subtracter 210 (FIG. 7B) into the C1 register. Reset TR29CI and set TR30CI. | TR30CI. |

| Trigger No. | Set at T9 Time if Following Conditions Exist | Reset at T9 Time if Following Conditions Exist | Functions Performed While On | Next Trigger(s) to be Set |
|---|---|---|---|---|
| TR30CI | TR29CI being in its ON state | TR30CI being in its ON state | Reset C2 register (FIG. 7C) and set contents of C1 register into C2 register at T8 time.<br>Increment TAR2 (FIG. 7E) at T2 time.<br>Reset K register (FIG. 7F).<br>Read out of K memory and set output of K memory into K register at T4 time.<br>Reset A register (FIG. 7A) and set contents of C1 register into A register.<br>Reset B register (FIG. 7D) and set contents of K register into B register.<br>Reset TR30CI and set TR5CI to its ON state. | TR5CI. |
| TR31CI | Either H3 (FIG. 6F) trigger being in its ON state AND TR3CI being in its ON state<br>or<br>H3 trigger (FIG. 6F) being in its ON state and TR12C12 being in its ON state. | TR31CI being in its ON state | Decrement TAR1 (FIG. 7E) and TAR2 at T2 time.<br>Reset K register (FIG. 7F).<br>Read out of K memory and set contents of K memory into K register at T4 time.<br>Reset A register (FIG. 7A) and set contents of Z register into A register.<br>Reset B register (FIG. 7D) and set contents of K register into B register.<br>Reset TR31CI and set TR32CI. | TR32CI. |
| TR32CI | TR31CI being in its ON state | TR32CI being in its ON state | Reset C1 register and set difference, contents of A register minus contents of B register, stored in subtractor 210 (FIG. 7B) into C1 register.<br>Decrement TAR1 at T2 time.<br>Reset TR32CI and set TR33CI. | TR33CI. |
| TR33CI | TR32CI being in its ON state | TR33CI being in its ON state | Perform read cycle on K memory (FIG. 7G), reset K register, and set output from K memory into K register at T4 time.<br>Reset A register (FIG. 7A) and set contents of C1 register into A register.<br>Reset B register (FIG. 7D) and set contents of K register into B register.<br>Increment TAR1 (FIG. 7E) at T8 time.<br>Reset TR33CI and set TR29CI. | TR29CI. |
| TR1C1 | Neither TR14CI, TR3C1, TR4C1, nor TR6C1 in its ON state AND a cycle 1 output from X ring (i.e. C trigger (FIG. 8B) and trigger 2300 in their ON states and X-ring-inhibit trigger (FIG. 8A) in its OFF state) and X trigger (FIG 8A) in its ON state. | Either TR1C1 in its ON state AND initialize indication output on line 582 from decoder 90 (FIG. 6J)<br>or<br>TR1CI and a write output from decoder 90<br>or<br>TR1C1 in its ON state and a read output from decoder 90. | Switch X trigger (FIG. 8A) to its OFF state.<br>Reset CBR1–CBR3 (FIG. 6J).<br>Set contents of instruction register in CPU into CBR1–CBR3.<br>Partially condition TR1CI to be set.<br>Reset TR1C1.<br>Partially condition TR2C1 to be set and partially condition TR5C1 to be set. | TR1CI.<br>or<br>TR2C1.<br>or<br>TR5C1. |
| TR2C1 | TR1C1 being in its ON state AND a read output from decoder 90 (FIG. 6J). | Either TR2C1 being in its ON state AND an RX-not-equal-to-RQ output from inverter 1266 (FIG. 6N)<br>or<br>TR2C1 being in its ON state AND R0, R1, R2, and R3-equals-RQ indication from OR gate 1262 (FIG. 6N). | Turn off TR2C1.<br>Partially condition TR3C1 to be turned on.<br>Partially condition TR4C1 to be turned on. | TR3C1.<br>or<br>TR4C1. |
| TR3C1 | TR2C1 in its ON state AND an RX-not-equal-to-RQ output from inverter 1266 (FIG. 6N). | TR3C1 being in its ON state | Reset CAR (FIG. 6K) and set the contents of RQ (FIG. 6N) into CAR.<br>Perform a write cycle on CCB (FIG. 6J).<br>Increment RQ by two.<br>Reset TR3C1.<br>Switch X trigger (FIG. 8A) to its ON state.<br>Reset C trigger (FIG. 8C) and cycle 1 trigger 2300 and set cycle 2 trigger 1176.<br>Inhibit setting of TR1C1 to its ON state. | TR5C1. |
| TR4C1 | Either TR2C1 AND an R0, R1, R2, and R3-equals-RQ indication from OR gate 1262 (FIG. 6N)<br>or<br>TR5C1 in its ON state AND a W-equals-WQ indication from AND gate 1300 (FIG. 6M). | TR4C1 in its ON state | Switch X trigger to its ON state.<br>Inhibit the switching of TR1C1 to its ON state.<br>Switch F trigger in the X ring to its ON state.<br>Reset cycle 1 trigger 2300 and set cycle 2 trigger 1176 in the X ring. | Trigger 1176 in the X ring. |
| TR5C1 | TR1C1 in its ON state AND a write output from decoder 90 (FIG. 6J). | TR5C1 in its ON state AND a W-equals-WQ indication from AND gate 1300 (FIG. 6M)<br>or<br>TR6C1 in its ON state AND a W-not-equal-WQ indication from inverter 1308 (FIG. 6M). | Partially condition TR4C1 to be set.<br>Partially condition TR6C1 to be set.<br>Reset a TR5C1. | TR4C1.<br>or<br>TR6C1. |

| Trigger No. | Set at T9 Time if Following Conditions Exist | Reset at T9 Time if Following Conditions Exist | Functions Performed While On | Next Trigger(s) to be Set |
|---|---|---|---|---|
| TR6C1 | TR5C1 in its ON state AND a W-not-equal-WQ indication from inverter 1308 (FIG. 6M). | TR6C1 in its ON state | Reset CAR (FIG. 6K) and set the contents of WQ (FIG. 6M) into CAR.<br>Increment WQ at T8 time.<br>Perform a write cycle on CCB (FIG. 6J).<br>Reset TR6C1.<br>Set X trigger (FIG. 8A) to its ON state.<br>Inhibit the turning on of TR1C1.<br>Reset the C trigger and cycle 1 trigger 2300 and set cycle 2 trigger 1176 and WN trigger 1304. | Cycle 2 trigger 1176 in the X ring. |
| TR1C2 | TR2C2 being in its OFF state AND X trigger 2862 (FIG. 8A) being in its ON state AND either a cycle 2 output from the X ring (trigger 1176 AND R0 in their ON states AND X-ring-inhibit trigger in its OFF state)<br>or<br>A cycle 3 output from the X ring (trigger 1177 (FIG. 8B) and R1 in their ON states AND X-ring-inhibit trigger in its OFF state)<br>or<br>A cycle 4 indication from the X ring (i.e. triggers 1178 and R2 in their ON states and X-ring-inhibit trigger in its OFF state)<br>or<br>A cycle 5 output from the X ring (i.e. triggers 1179 and R3 in their ON states AND X-ring-inhibit trigger in its OFF state). | TR1C2 in its ON state | Switch X trigger (FIG. 8A) to its OFF state.<br>Set the address FAR0, FAR1, FAR2, or FAR3 into CAR (FIG. 6K), depending on whether are in cycle 2, 3, 4, or 5.<br>Perform a read cycle on CCB (FIG. 6J), reset CBR1-CBR3, and set the contents of CCB into CBR1-CBR3.<br>Reset TR1C2 and set TR2C2. | TR2C2. |
| TR2C2 | TR1C2 being in its ON state | TR2C2 being in its ON state AND a read-finished signal on line 2283 from the host CPU (FIG. 6H). | Reset MAR (FIG. 6I) and transfer the contents of CBR2 to MAR. Reset MBR and set contents of RRX (FIG. 6H) into MBR at T2 time.<br>Apply read signal to CPU (FIG. 6H) through line 322.<br>Reset TR2C2.<br>Inhibit the setting of TR1C2.<br>Partially condition triggers 1177 (FIG. 8B), 1178, 1179, or 2300 to be set, triggers R0, R1, R2, or R3 to be reset, triggers 1176, 1177, 1178, or 1179 to be reset, and F trigger (FIG. 8C) to be reset.<br>Switch X trigger (FIG. 8A) to its ON state.<br>Set REX. | Triggers 1177, 1178, 1179, or 2300 in the X ring. |
| TR1C6 | A cycle 6 indication from the Y ring (i.e. triggers 2472 (FIG. 8D) and WE1 and WE2 in their ON states) AND Y trigger (FIG. 8A) in its ON state AND HR0 not-busy signal on line 1188A (FIG. 6C) AND a W1 not-busy signal on line 1495 AND directory not-busy trigger (FIG. 6B) in its OFF state AND loop in write station W1 signal on line 1493 AND an X ring not-busy indication on line 2439 (FIG. 8C) AND TR2C6 in its OFF state AND TR9C6 in its OFF state AND TR11C6 in its OFF state. | TR1C6 in its ON state | Inhibit X ring.<br>Reset A register (FIG. 7A) and set contents of W register (FIG. 6M) into A register.<br>Reset B register (FIG. 8D) and set contents of WQ register (FIG. 6M) into B register.<br>Switch Y trigger (FIG. 8A) to its OFF state.<br>Reset TR1C6 and partially condition TR2C6 and TR3C6 to be set. | TR2C6. or TR3C6. |
| TR2C6 | TR1C6 in its ON state AND WN trigger (FIG. 8G) in its OFF state AND an equal indication from comparator 214 (FIG. 7B). | TR2C6 in its ON state | Switch Y trigger (FIG. 8A) to its ON state.<br>Reset X-ring-inhibit trigger.<br>Inhibit the setting of TR1C6.<br>Reset TR2C6.<br>Reset WE1 (FIG. 8E), WE2, and partially condition resetting of cycle 6 trigger 2472 and cycle 12 trigger 2662 and the setting of cycle 7 trigger 254. | Cycle 7 trigger 2540 (FIG. 8D). |
| TR3C6 | Either TR2C12 in its ON state<br>or<br>TR1C6 in its ON state AND either WN in its ON state AND an equal indication from comparator 214 OR absence of an equal indication from comparator 214. | TR3C6 in its ON state | Perform a read cycle on CCB (FIG. 6J), reset CBR1-CBR3, and set the output from CCB into CBR1-CBR3.<br>Reset CAR104 and set the contents of W register into CAR.<br>Increment W register (FIG. 6M).<br>Reset TR3C6 and set TR4C6. | TR4C6. |
| TR4C6 | TR3C6 in its ON state | TR4C6 in its ON state AND a record-write-finished signal on line 319 from CPU (FIG. 6H). | Reset MAR (FIG. 6I) and set contents of CBR2 into MAR.<br>Apply record-write signal to CPU (FIG. 6H) through line 323.<br>Reset WR1 and WR2 and set contents of MBR into WR1 and WR2.<br>Set contents of CBR1 into TF (FIG. 6A).<br>Set directory-busy trigger (FIG. 6B).<br>Reset TR4C6 and set TR5C6. | TR5C6. |

| Trigger No. | Set at T9 Time if Following Conditions Exist | Reset at T9 Time if Following Conditions Exist | Functions Performed While On | Next Trigger(s) to be Set |
|---|---|---|---|---|
| TR5C6 | TR4C6 in its ON state AND a record-write-finished signal on line 319 from the CPU (FIG. 6H). | TR5C6 in ts ON state | Reset X-ring-inhibit trigger (FIG. 8A). Start the randomizer (FIG. 6A). Reset A register (FIG. 7A) and set the contents of W register into A register. Reset B register (FIG. 7D) and set contents of WQ register into B register. Reset TR5C6. Partially condition TR6C6 to be set and TR7C6 to be set. | TR6C6. or TR7C6. |
| TR6C6 | TR5C6 in its ON state AND an equal output from comparator 214 (FIG. 7B). | TR6C6 in its ON state | Switch WN trigger (FIG. 8G) to its OFF state. Reset TR6C6 and set TR7C6. | TR7C6. |
| TR7C6 | HR0 not-busy signal on line 1188A (FIG. 6C) AND TR6C6 in its ON state or TR5C6 in its ON state AND a not-equal output from comparator 214 (FIG. 7B). | TR7C6 in its ON state | Reset WAR1 (FIG. 6D) and WAR2 and set contents of LAC2 into WAR1 and WAR2. Reset TR7C6 and set TR8C6. | TR8C6. |
| TR8C6 | TR7C6 in its ON state AND a randomizer-finished signal on line 674 (FIG. 6A). | TR8C6 in its ON state | Reset DSR1 (FIG. 6A) and DSR2 and set output from randomizer into DSR1 and DSR2. Reset DBR1 (FIG. 6B), DBR2, and DBR3 and set the contents of DSR1 into DBR1. Set the contents of LAC1 into DBR2 and set the contents of LAC2 into DBR3. Apply write signal to W1 and HR0. Reset TR8C6 and set TR9C6. | TR9C6. |
| TR9C6 | TR8C6 in its ON state | TR9C6 in its ON state | Increment LAC2. Set Y trigger to its ON state. Apply a write signal through line 712 to the directory (FIG. 6B). Reset TR9C6 and partially condition setting of TR10C6. Inhibit the setting of TR1C12 and the setting of TR1C6. If LAC2 not equal to zero, reset WE1 (FIG. 8E) and WE2 and partially condition to resetting of cycle 6 triggers 2472 and the setting of cycle 7 trigger 2540. | Cycle 7 trigger 2540. or TR10C6. |
| TR10C6 | TR9C6 in its ON state AND an equal zero output on line 1520 from inverter 1518 (FIG. 6D) AND W1 not-busy indication on line 1493 (FIG. 6C). | TR10C6 in its ON state AND HR1 buffer full signal on line 1489 (FIG. 6C). | Apply signal to line 1479 (FIG. 6C) to move loop from W1 to HR1 buffer. Increment LAC1 (FIG. 6D). Reset LAC2. Partially condition TR10C6 to be reset and TR11C6 to be set. | TR11C6. |
| TR11C6 | TR10C6 in its ON state AND HR1 buffer full signal on line 1489 (FIG. 6C). | TR11C6 in its ON state AND a new loop in W1 (FIG. 6C) indication on line 1495. | Set NL (FIG. 8E) trigger Load new loop into W1. Reset TR11C6. Reset WE1 and WE2 and partially condition resetting cycle 6 and cycle 12 of triggers 2472 and 2538 and setting of cycle 7 trigger 2540. | Cycle 7 trigger 2540. |
| TR1C7 | Y trigger in its ON state AND a cycle 7 signal on line 2560 (i.e. triggers 2540 and NL being in their ON state) AND TR7C7 being in its OFF state AND TR13C7 being in its OFF state. | TR1C7 in its OFF state. | Switch H1 trigger (FIG. 6F) to its ON state. Reset TAR1 (FIG. 7E) and TAR2 at T2 time. Increment TAR1 at T8 time and increment TAR2 at T8 time. Reset Y trigger (FIG. 8A) to its OFF state. Set TR4CI. | TR4CI. |
| TR2C7 | TR9CI in its ON state AND a cycle 7 output from the Y ring (i.e. triggers 2540 and NL in their ON states). | TR2C7 in its ON state AND an HRX not-busy signal on line 1487 (FIG. 6C). | Reset K register (FIG. 7F). Perform a read cycle on K memory and set the output from K memory into K register at T1 time. Reset A register (FIG. 7A) and set contents of K register into A register. Reset B register (FIG. 7D). Partially condition TR2C7 to be reset and TR3C7 to be set. | TR3C7. |
| TR3C7 | TR2C7 in its ON state AND an HRX not-busy indication on line 1487 (FIG. 6C). | TR3C7 in its ON state | Reset TR3C7 and partially condition TR4C7 and TR8C7 to be set. | TR4C7. or TR8C7. |
| TR4C7 | TR3C7 in its ON state AND a high indication from comparator 214 (FIG. 7B). | TR4C7 in its ON state | Increment CTR222 (FIG. 7C) at T0 time. Reset one of the registers HAR1 0-HAR1 3 (FIG. 6G) and one of the registers HAR2 0-HAR2 3 and set the contents of CTR into the reset of the register HAR1 0-HAR1 3. Reset TR4C7 and set TR5C7. | TR5C7. |
| TR5C7 | TR5C7 in its ON state | TR5C7 in its ON state | Transfer loop in appropriate hierarchy position from buffer to store (i.e. apply signal to line 1378 (FIG. 6C). Reset TR5C7 and set TR6C7. | TR6C7. |
| TR6C7 | TR5C7 in its ON state | TR6C7 in its ON state | Reset CTR222 (FIG. 7C) and set contents of K register into CTR. Decrement CTR at T8 time. Increment Z register (FIG. 7A) at T2 time if H1 trigger is set. Reset TR6C7 and set TR7C7. | TR7C7. |

| Trigger No. | Set at T9 Time if Following Conditions Exist | Reset at T9 Time if Following Conditions Exist | Functions Performed While On | Next Trigger(s) to be Set |
|---|---|---|---|---|
| TR C7 | TR6C7 in its ON state | TR7C7 in its ON state | Reset H0 (FIG. 6F), H1, H2, and H3 triggers to their OFF states.<br>Reset K register (FIG. 7F) and set contents of CTR into K register.<br>Perform a write cycle on K memory.<br>Reset TR7C7.<br>Inhibit the setting of TR1C7.<br>Set Y trigger (FIG. 8A) to its ON state.<br>Reset cycle 7 trigger 2540 and NL trigger 2546 and set cycle 8 trigger 1088. | Cycle 8 trigger 1088. |
| TR8C7 | TR3C7 in its ON state AND an equal signal on line 1148 (FIG. 7B) from comparator 214. | TR8C7 in its ON state AND an X-ring-not-busy indication on line 2439 (FIG. 8C). | Increment CTR222 (FIG. 7C) at T2 time.<br>Reset DAR1 (FIG. 6E) and read the contents of triggers H0–H3 into DAR1.<br>Reset DAR2 and set contents of CTR into DAR2.<br>Reset HAR1 0–HAR1 3 (FIG. 6G) and HAR2 0–HAR2 3 and read the contents of CTR into HAR1 0–HAR1 3.<br>Increment TAR1 (FIG. 7E) at T8 time.<br>Reset TR8C7 and partially condition TR9C7 to be set. | TR9C7. |
| TR9C7 | TR8C7 in its ON state AND an X-ring-not-busy indication on line 2439 (FIG. 8C). | TR9C7 in its ON state | Set X-inhibit trigger (FIG. 8A) to its ON state.<br>Set FAL1, FAL2, or FAL3 into CAR (FIG. 6K) under control of DAR1.<br>Reset CBR2 (FIG. 6J) and CBR3 and read the contents of DAR1 into CBR2 and the contents of DAR2 into CBR3.<br>Perform a write cycle on CCB.<br>Reset TR9C7 and set TR10C7. | TR10C7. |
| TR10C7 | TR9C7 in its ON state | TR10C7 in its ON state AND an HRX not-busy indication on line 1487 (FIG. 6C). | Reset X-ring-inhibit trigger (FIG. 8A) to its OFF state.<br>Move loop in hierarchy level X from storage to buffer (i.e. apply signal to line 1395) (FIG. 6C).<br>Partially condition TR10C7 to be reset and TR11C7 to be set. | TR11C7. |
| TR11C7 | TR10C7 in its ON state AND an HRX not-busy indication on line 1487 (FIG. 6C). | TR11C7 in its ON state | Increment Z register (FIG. 8A) at T2 time.<br>Move loop from buffer to storage in level HX (i.e. apply signal to line 1379) (FIG. 6C).<br>Reset TR11C7 and partially condition TR12C7 and TR13C7 to be set. | TR12C7.<br>or<br>TR13C7. |
| TR12C7 | TR11C7 in its ON state AND H3 trigger in its OFF state. | TR12C7 in its ON state | Reset H1 trigger to its OFF state and set H2 trigger to its ON state<br>or<br>Reset H2 trigger to its OFF state and set H3 trigger to its ON state.<br>Partially condition TR28CI and TR31CI to be set.<br>Reset TR12C7. | TR28CI.<br>or<br>TR31CI. |
| TR13C7 | TR11C7 in its ON state AND H3 trigger in its ON state. | TR13C7 in its ON state | Reset H0–H3 triggers (FIG. 6F). Set Y trigger (FIG. 8A) to its ON state.<br>Inhibit the setting of TR1C7.<br>Reset cycle 7 triggers 2540 and NL trigger 2546 and set cycle 8 trigger 1088. | Cycle 8 trigger 1088. |
| TR1C8 | Y trigger in its ON state AND X-ring-not-busy AND either a cycle 8 OR a cycle 9 OR a cycle 10, OR a cycle 11 output on line 2586, 2664, 2624, or 2658 from the Y ring AND TR2C8 in its OFF state AND TR13C8 in its OFF state. | TR1C8 in its ON state | Set X-ring-inhibit trigger (FIG. 8A).<br>Reset Y trigger to its OFF state.<br>Reset A register (FIG. 7A) and set contents of RQ into A register.<br>Reset B register (FIG. 7D) and set contents of RX into B register.<br>Reset TR1C8 and partially condition TR2C8 and TR3C8 to be set. | TR2C8.<br>or<br>TR3C8. |
| TR2C8 | Either TR16C8 in its ON state<br>or<br>TR3C8 in its ON state AND an equal indication from compare circuit 214 (FIG. 7B)<br>or<br>An equal indication from compare circuit 214 (FIG. 7B) and TR1C8 in its ON state<br>or<br>TR6C8 in its ON state AND an equal indication from comparator 214 OR an X-ring-busy indication on line 2436. | TR2C8 in its ON state | Set Y trigger (FIG.)8A to its ON state.<br>Inhibit the setting of TR1C8 to its ON state.<br>Reset X-ring-inhibit trigger to its OFF state.<br>Inhibit the setting of TR1C14 to its ON state.<br>Reset TR2C8 to its OFF state.<br>Reset REX cycle 8–11 triggers depending on cycle and set cycle 9–12 triggers depending on cycle. | Cycle 9–cycle 12 triggers. |
| TR3C8 | Either TR2C14 in its ON state<br>or<br>TR1C8 in its ON state AND a not-equal indication from inverter 1856 (FIG. 7B)<br>or<br>TR6C8 in its ON state AND an X ring not-busy indication on line 2439 and a not-equal indication out of inverter 1856. | TR3C8 in its ON state | Reset A register (FIG. 7A) and transfer contents of RT to A register.<br>Reset RS register (FIG. 6L) and set contents of RX reigster into RS register.<br>Reset TR3C8 and partially condition TR2C8 and TR4C8 to be set. | TR2C8.<br>or<br>TR4C8. |

| Trigger No. | Set at T9 Time if Following Conditions Exist | Reset at T9 Time if Following Conditions Exist | Functions Performed While On | Next Trigger(s) to be Set |
|---|---|---|---|---|
| TR4C8 | TR3C8 in its ON state AND a not-equal indication out of inverter 1856 (FIG. 7B). | TR4C8 in its ON state | Increment RX (FIG. 6N) register at T0 time.<br>Reset CAR (FIG. 6K) and set contents of RX into CAR.<br>Perform a read cycle on CCB (FIG. 6J), reset CBR1-CBR3 and set the output from CCB into CBR1-CBR3.<br>Reset TR4C8 and set TR5C8. | TR5C8. |
| TR5C8 | TR4C8 in its ON state | TR5C8 in its ON state | Reset A register (FIG. 7A) and set contents of CBR2 into A register.<br>Reset B register (FIG. 7D) and set hierarchy information on lines 1080A-1080D (FIG. 6P) into B register. | TR6C8.<br>or<br>TR7C8. |
| | | | Reset TR5C8 and partially condition TR6C8 and TR7C8 to be set. | |
| TR6C8 | TR5C8 in its ON state AND a not-equal indication from inverter 1856 (FIG. 7B). | TR6C8 in its ON state | Increment RX register (FIG. 6N) at T0.<br>Reset RNX (FIG. 8G) if RX equals RQ (i.e. apply signal to line 1156 (FIG. 6P).<br>Reset A register (FIG. 7A) and set contents of RQ into A register.<br>Reset B register (FIG. 7D) and set contents of RX register into B register.<br>Reset TR6C8.<br>Partially condition TR2C8 and TR3C8 to be set. | TR2C8.<br>or<br>TR3C8. |
| TR7C8 | TR5C8 in its ON state AND an equal output from comparator 214 (FIG. 7B). | TR7C8 in its ON state | Set FALX into CAR (FIG. 6K).<br>Reset DAR1 (FIG. 6E), DAR2, and DAR3 and set the contents of CBR2, CBR3, and CBR1 into DAR1, DAR2, and DAR3 respectively.<br>Reset A register (FIG. 7A) and set contents of CBR3 into A register.<br>Perform a read cycle on CCB.<br>Reset CBR1-CBR3 and set the output from CCB into CBR1-CBR3.<br>Reset TR7C8 and set TR8C8. | TR8C8. |
| TR8C8 | TR7C8 in its ON state | Either TR8C8 in its ON state AND a not-equal indication from inverter 1856 (FIG. 7B)<br>or<br>TR8C8 in its ON state AND an equal indication from comparator 214 AND a directory not-busy indication on line 728 (FIG. 6B), (i.e. directory-busy trigger in its OFF state). | Reset B register (FIG. 7D) and set contents of CBR3 into B register.<br>Reset TR8C8 and partially condition TR9C8 and TR14C8 to be set. | TR9C8.<br>or<br>TR14C8. |
| TR9C8 | Either TR8C8 in its ON state AND a not-equal indication from inverter 1856 (FIG. 7B)<br>or<br>TR15C8 in its ON state. | TR9C8 in its ON state | Decrement RX (FIG. 6N) register.<br>Reset CAR (FIG. 6K) and set contents of RX into CAR.<br>Perform a read cycle on CCB (FIG. 6J), reset CBR1-CBR3, and set the output from CCB into CBR1-CBR3. | TR10C8. |
| | | | Reset TR9C8 and set TR10C8. | |
| TR10C8 | TR9C8 in its ON state | TR10C8 in its ON state | Set FARX into CAR (FIG. 6K).<br>Perform a write cycle on CCB (FIG. 6J).<br>Increment RX register (FIG. 6N) at T0 time and again at T8 time.<br>Reset TR10C8 and set TR11C8. | TR11C8. |
| TR11C8 | TR10C8 in its ON state | TR11C8 in its ON state AND an HRX not-busy signal on line 1194 (FIG. 6P). | Reset X-ring-inhibit trigger (FIG. 8A).<br>Reset A register (FIG. 7A) and set contents of RQ into A register.<br>Reset B register (FIG. 7D) and set contents of RX into B register.<br>Reset RNX (FIG. 8G) if RX=RQ.<br>Partially condition TR11C8 to be reset and TR12C8 to be set. | TR12C8. |
| TR12C8 | TR11C8 in its ON state AND an HRX not-busy indication on line 1194 (FIG. 6P.). | TR12C8 in its ON state | Reset one of the registers HAR1 0-HAR1 3 (FIG. 6G) and one of the registers HAR2 0-HAR2 3 and set the contents of DAR2 into the reset register HAR1 0-HAR1 3 and the contents of DAR3 into the reset register HAR2 0-HAR2 3.<br>Reset TR12C8 and set TR13C8. | TR13C8. |
| TR13C8 | TR12C8 in its ON state | TR13C8 in its ON state | Set Y trigger (FIG. 8A) to its ON state.<br>Apply read signal to HRX (FIG. 6C) under control of DAR1.<br>Reset TR13C8.<br>Inhibit the setting of TR1C8.<br>Inhibit the setting of TR1C14.<br>Partially condition triggers 1090 (FIG. 8F), 1098, 1106, and 1114 to be reset.<br>Reset REX and triggers 1088, 1096, 1104, or 1112 depending on cycle and set triggers 1096, 1104, 1112, or 2538 depending on cycle. | Triggers 1096, 1104, 1112, or 2538. |

| Trigger No. | Set at T9 Time if Following Conditions Exist | Reset at T9 Time if Following Conditions Exist | Functions Performed While On | Next Trigger(s) to be Set |
|---|---|---|---|---|
| TR14C8 | TR8C8 in its ON state AND an equal indication from comparator 214 (FIG. 7B) AND directory-busy trigger 722 (FIG. 6B) in its OFF state (i.e. a directory not-busy indication on line 728). | TR14C8 in its ON state | Reset CAR (FIG. 6K) and set contents of RS into CAR. Perform read cycle on CCB (FIG. 6J). Reset CBR1-CBR3 and set output of CCB into CBR1-CBR3. Reset TF (FIG. 6A) register and set contents of CBR1 into TF register. Reset TR14C8 and set TR23C13 to its ON state. | TR23C13. |
| TR15C8 | An output on cycle 8, 9, 10, or 11 line from the Y ring AND TR19C13 in its ON state AND an X ring not-busy indication on line 2439. | TR15C8 in its ON state | Reset TR15C8 and set TR9C8 and set X-ring-inhibit trigger to its ON state. | TR9C8. |
| TR16C8 | A cycle 8, 9, 10 or 11 output from the Y ring on line 2586, 2604, 2624 or 2658. TR30C13 in its ON state AND T trigger in its OFF state. | TR16C8 in its ON state | Increment RX. Reset TR16C8. Set TR2C8 to its ON state. | TR2C8. |
| TR1C12 | Y trigger (FIG. 8A) in its ON state AND a cycle 12 output on line 2682 from the Y ring (i.e. cycle trigger 2538 and WN trigger 1304 in their ON states) AND TR3C12 in its OFF state AND TR9C6 in its OFF state. | Either TR1C12 in its ON state AND an X ring not-busy indication on line 2439 (FIG. 8C) AND WE1 trigger (FIG. 8E) in its OFF state AND WE2 trigger in its OFF state AND an HR0 not-busy indication on line 1188A (FIG. 8C) and a W1 not-busy indication on line 1495 or TR1C12 in its ON state AND the absence of the following condition: WE1 trigger in its OFF state AND WE2 trigger in its OFF state AND an HR0 not-busy indication on line 1188A AND a W1 not-busy indication on line 1495. | Reset Y trigger (FIG. 8A) to its OFF state. Reset TR1C12 and partially condition TR2C12 and TR3C12 to be set. | TR2C12. or TR3C12. |
| TR2C12 | TR1C12 in its ON state AND an X ring not-busy indication on line 2436 (FIG. 8C) AND WE1 trigger (FIG. 8E) in its OFF state AND WE2 trigger in its OFF state AND HR0 not-busy indication on line 1188A (FIG. 6C) AND a W1 not-busy indication on line 1483. | TR2C12 in its ON state | Set X-ring-inhibit trigger (FIG. 8A) to its ON state. Reset TR2C12. Set TR3C6. | TR3C6. |
| TR3C12 | TR1C12 in its ON state AND the absence of the following condition: WE1 trigger in its OFF state AND WE2 trigger in its OFF state AND an HR0 not-busy indication on line 1188A (FIG. 8C) AND a W1 not-busy indication on line 1495. | TR3C12 in its ON state | Set Y trigger (FIG. 8A) to its ON state. Reset TR3C12 to its OFF state. Inhibit the setting of TR1C12 to its ON state. Reset cycle 12 trigger 2538 and set cycle 13 trigger 2670. | Cycle 13 trigger 2670. |
| TR1C13 | TR28C13 in its ON state | TR1C13 in its ON state | Set H0 trigger (FIG. 6F) to its ON state. Reset TAR1 (FIG. 7E) and TAR2. Reset A register (FIG. 7A) and set contents of LAC1 into A register. Reset B register (FIG. 7D) and set contents of DBR2 into B register. Reset TR1C13 and set TR2C13. | TR2C13. |
| TR2C13 | TR1C13 in its ON state | TR2C13 in its ON state | Reset C1 register and set difference, contents of A register minus contents of B register, contained in subtracter 210 (FIG. 7B) into C1 register. Reset E register (FIG. 7D) and set contents of C1 register into E register. Reset TR2C13 and set TR3C13. | TR3C13. |
| TR3C13 | TR2C13 in its ON state | TR3C13 in its ON state | Perform a read cycle in K memory (FIG. 7G). Reset K register. Set output from K memory into K re-register at T1 time. Reset A register (FIG. 7A) and set contents of K register into A register. Reset B register (FIG. 7D) and set contents of E register into B register. Reset TR3C13 and set TR4C13. | TR4C13. |
| TR4C13 | TR3C13 in its ON state | TR4C13 in its ON state | Reset TR4C13. Partially condition TR5C13 to be set. Partially condition TR13C13 to be set. Partially condition TAC2 to be incremented at T8 time. | TR5C13. or TR13C13. |
| TR5C13 | TR4C13 in its ON state AND a low or equal indication from comparator 214 (FIG. 7B) via OR gate 1022 and line 1020. | TR5C13 in its ON state | Partially condition the H0 trigger (FIG. 6F) to be reset and the H1 trigger to be set. Increment TAR1 (FIG. 7E) at T0 time. Reset A register (FIG. 7A) and set contents of Z register into A register. Reset B register (FIG. 7D) and set contents of DBR2 into B register. Reset TR5C13 and set TR6C13. | TR6C13. |

| Trigger No. | Set at T9 Time if Following Conditions Exist | Reset at T9 Time if Following Conditions Exist | Functions Performed While On | Next Trigger(s) to be Set |
|---|---|---|---|---|
| TR6C13 | TR5C13 in its ON state | TR6C13 in its ON state | Reset C1 register and set difference, contents of A register minus contents of B register, contained in subtracter 210 (FIG. 7B) into C1 register.<br>Reset E register (FIG. 7D) and set contents of C1 register into E register.<br>Reset TR6C13 and set TR7C13. | TR7C13. |
| TR7C13 | Either TR6C13 in its ON state<br>or<br>TR12C13 in its ON state AND a low or equal indication on output line 1020 (FIG. 7B) from OR gate 1022 and H3 trigger (FIG. 6F) in its OFF state. | TR7C13 in its ON state | Increment TAR2 (FIG. 7E) at T2 time.<br>Perform a read cycle in K memory (FIG. 7G) at T0 and T3 time.<br>Reset K register at T0 and T3 time.<br>Set output from K memory into K register at T1 time and T4 time.<br>Reset A register (FIG. 7A) and set contents of K register into A register at T2 time.<br>Reset B register (FIG. 7D) and set contents of K register into B register at T5 time.<br>Reset TR7C13 and set TR8C13. | TR8C13. |
| TR8C13 | TR7C13 in its ON state | TR8C13 in its ON state | Reset C1 register and set the difference, contents of A register minus contents of B register, contained in subtracter 210 _FIG. 7B) into C1 register.<br>Reset TR8C13 and partially condition TR9C13 and TR11C13 to be set. | TR9C13.<br>or<br>TR11C13. |
| TR9C13 | TR8C13 in its ON state AND either H2 trigger (FIG. 6F) in its ON state or H3 trigger in its ON state. | TR9C13 in its ON state | Reset A register (FIG. 7A) and set the contents of C1 register into A register.<br>Reset B register (FIG. 7D) and set the contents of C2 register into B register.<br>Reset TR9C13 and set TR10C13. | TR10C13. |
| TR10C13 | TR9C13 in its ON state | TR10C13 in its ON state | Reset C1 register and set sum of the contents of the A register and the B register contained in adder 208 (FIG. 7B) into the C1 register.<br>Reset TR10C13 and set TR11C13. | TR11C13. |
| TR11C13 | Either TR10C13 in its ON state<br>or<br>TR8C13 in its ON state AND H1 trigger (FIG. 6F) in its ON state. | TR11C13 in its ON state | Reset C2 register (FIG. 7C) and set contents of C1 register into C2 register.<br>Reset A register (FIG. 7A) and set contents of C1 register into A register.<br>Reset B register (FIG. 7D) and set contents of E register into B register.<br>Reset TR11C13 and set TR12C13. | TR12C13. |
| TR12C13 | TR11C13 in its ON state | Either TR12C13 in its ON state AND a low or equal indication from OR gate 1022 (FIG. 7B) AND H3 trigger (FIG. 6F) in its OFF state<br>or<br>TR12C13 in its ON state AND a high output from comparator 214 (FIG. 7B)<br>or<br>Not-in-file indication on line 1060 (FIG. 6F) and X ring not-busy indication on line 2439. | Either reset H1 trigger (FIG. 6F) and set H2 trigger or reset H2 trigger and set H3 trigger or reset H3 trigger and generate a not-in-file output signal on line 1060 to set T trigger to its ON state.<br>Partially condition TAR1 and TAR2 (FIG. 7E) to be incremented at T8 time.<br>Partially condition TR12C13 to be reset, TR13C13 to be set, TAR1 to be incremented at T8 time, TR713C to be set, reset TAR2 at T8 time. | TR13C13.<br>or<br>TR7C13.<br>or<br>TR29C13 (i.e. not-in-file signal sets TR29C13). |
| TR13C13 | Either TR12C13 in its ON state AND a comparator high signal on line 1852 (FIG. 7B) or TR4C13 in its ON state AND a comparator high signal on line 1852. | TR13C13 in its ON state | Perform a read cycle in K memory (FIG. 7G).<br>Reset K register.<br>Set output from K memory into K register at T1 time.<br>Reset A register (FIG. 7A) and set contents of K register into A register.<br>Reset B register (FIG. 7D) and set contents of DBR2 into B register.<br>Reset TR13C13 and set TR14C13. | TR14C13. |
| TR14C13 | TR13C13 in its ON state | TR14C13 in its ON state | Reset C1 register and set sum of the contents of the A register and the B register contained in adder 208 (FIG. 7B) into C1 register.<br>Increment TAR2 (FIG. 7E) at T2 time.<br>Reset TR14C13 and set TR15C13. | TR15C13. |
| TR15C13 | TR14C13 in its ON state | TR15C13 in its ON state | Reset K register.<br>Perform a read cycle on K memory (FIG. 7G) and set the output from K memory into K register at T1 time.<br>Reset A register (FIG. 7A) and set contents of C1 register into A register.<br>Reset B register (FIG. 7D) and set contents of K register into B register.<br>Reset TR15C13 and set TR16C13. | TR16C13. |

| Trigger No. | Set at T9 Time if Following Conditions Exist | Reset at T9 Time if Following Conditions Exist | Functions Performed While On | Next Trigger(s) to be Set |
|---|---|---|---|---|
| TR16C13 | TR15C13 in its ON state | TR16C13 in its ON state | Reset C1 register and set difference, contents of A register minus contents of B register, stored in subtracter 210 (FIG. 7B) into C1 register. Increment TAR2 (FIG. 7E) at T2 time. Increment TAR2 at T8 time if H0 set. Reset TR16C13 and set TR17C13. | TR17C13. |
| TR17C13 | TR16C13 in its ON state | TR17C13 in its ON state | Perform a read cycle on K memory (FIG. 7G). Reset K register and set the output from K memory into K register at T1 time. Reset the A register (FIG. 7A) and set contents of C1 register into A register. Reset the B register (FIG. 7D) and set contents of K register into B register. Reset TR17C13 and set TR18C13. | TR18C13. |
| TR18C13 | TR17C13 in its ON state | TR18C13 in its ON state | Reset C1 register and set the remainder of the fraction, contents of A register divided by contents of B register, in divider 212 (FIG. 7B) into the C1 register. Reset DAR1 (FIG. 6E) and set DAR1 under control of triggers H0–H3. Reset TR18C13 and set TR19C13. | TR19C13. |
| TR19C13 | TR18C13 in its ON state | Either TR19C13 in its ON state AND an X ring not-busy signal on line 2439 and a signal on cycle 13 output line from Y ring or TR19C13 in its ON state and an X ring not-busy indication on line 2439 and a signal on a cycle 8, 9, 10, or 11 output line from the Y ring. | Reset triggers H0–H3 (FIG. 6F) to their OFF states. Reset DAR2 (FIG. 6E) and set contents of C1 register into DAR2. Reset DAR3 and set contents of DBR3 into DAR3. Partially condition TR15C8 to be switched to its ON state and TR19C13 to be switched to its OFF state, TR26C13 to be set to its ON state. | TR15C8. or TR26C13. |
| TR20C13 | Y trigger in its ON state. A signal on cycle 13 output line from the Y ring (i.e. cycle 13 trigger 2670 in its ON state and a directory not-busy indication on line 728). TR21C13 in its OFF state AND TR27C13 in its OFF state. | Either TR20C13in its ON state AND an equal signal on output line 1148 from comparator 214 (FIG. 7B) or TR20C13 in its ON state AND a not-equal indication from comparator 214 (FIG. 7B) via inverter 1856 and an X ring not-busy indication on line 2439. | Reset Y trigger (FIG. 8A) to its OFF state. Reset A register (FIG. 7A) and set contents of RT register into A register. Reset B register (FIG. 7D) and set contents of RQ register into B register. Reset TR20C13 and partially condition TR21C13 and TR22C13 to be set. | TR21C13. or TR22C13. |
| TR21C13 | TR20C13 in its ON state AND an equal indication on output line 1148 from comparator 214 (FIG. 7B). | TR21C13 in its ON state | Set Y trigger (FIG. 8A) to its ON state. Reset TR21C13 to its OFF state. Inhibit the setting of TR20C13 to its ON state. Reset cycle B trigger 2607 and set cycle 14 trigger 1090. | Cycle 14 trigger 1090. |
| TR22C13 | TR20C13 in its ON state AND a comparator not-equal signal on output line 1858 (FIG. 7B) from inverter 1856 and an X ring not-busy signal on line 2439. | TR22C13 in its ON state | Set X-ring-inhibit (FIG. 8A) trigger to its ON state. Reset CAR (FIG. 6K) and set contents of RT register into CAR. Perform a read cycle on CCB (FIG. 6J). Reset CBR1–CBR3 and set output from CCB into CBR1–CBR3 at T6 time. Reset TF register (FIG. 6A) and set contents of CBR1 into TF register. Reset TR22C13 and set TR23C13. | TR23C13. |
| TR23C13 | Either TR22C13 in its ON state or TR17C13 in its ON state. | TR23C13 in its ON state AND a randomizer-finished signal on line 674 (FIG. 6A). | Apply a start signal through OR gate 668 (FIG. 6A) to randomizer 140. Reset X-ring-inhibit trigger (FIG. 8A) to its OFF state. Partially condition TR23C13 to be reset and TR24C13 to be set. | TR24C13. |
| TR24C13 | TR23C13 in its ON state AND a randomizer-finished signal on line 674 (FIG. 6A). | TR24C13 in its ON state | Reset DSR1 (FIG. 6A) and DSR2 and set the output from the randomizer into DSR1 and DSR2. Reset TR24C13 and set TR25C13. | TR25C13. |
| TR25C13 | TR24C13 in its ON state | TR25C13 in its ON state AND a directory-finished signal on line 730 (FIG. 6B). | Apply a read signal through line 710 (FIG. 6B) to directory 148. Partially condition TR25C13 to be reset and TR28C13 to be set. | TR28C13. |
| TR26C13 | Either TR19C13 in its ON state AND an X ring not-busy indication on line 2439 (FIG. 8C) AND cycle 13 trigger 2670 in its ON state or T trigger in its OFF state AND cycle 13 trigger 2670 in its ON state AND TR30C13 in its ON state AND an X ring not-busy indication on line 2439. | TR26C13 in its ON state | Set X-ring-inhibit trigger (FIG. 8A) to its ON state, and set trigger RNX (FIG. 8G). Increment RT (FIG. 6M) register at T0 time. Reset CAR (FIG. 6K) and set contents of RT register into CAR. Reset CBR2 (FIG. 6J) and CBR3 and CBR1 and set the contents of DAR1 into CBR2 and DAR2 into CBR1 at T1 time. Perform a write cycle on CCB. Reset TR26C13 and set TR27C13. | TR27C13. CBR3 and DAR3 |

| Trigger No. | Set at T9 Time if Following Conditions Exist | Reset at T9 Time if Following Conditions Exist | Functions Performed While On | Next Trigger(s) to be Set |
|---|---|---|---|---|
| TR27C13 | TR26C13 in its ON state | TR27C13 in its ON state | Reset X-ring-inhibit trigger (FIG. 8A). Increment RT register (FIG. 6M). Reset TR27C13. Inhibit the setting of TR20C13. Set Y trigger (FIG. 8A) to its ON state. Reset cycle 13 trigger 2670 and set cycle 14 trigger 1090. | Cycle 14 trigger 1090. |
| TR28C13 | TR25C13 in its ON state, AND a directory-finished indication on line 730 (FIG. 6B). | TR28C13 in its ON state | Reset DBR1-DBR3 (FIG. 6B) and set the output from directory 148 into DBR1-DBR3. Reset TR28C13 and set TR1C13. | TR1C13. |
| TR29C13 | TR12C13 in its ON state AND an X ring not-busy indication on line 2439 AND a not-in-file ind cation on line 1060 (FIG. 6F). | TR29C13 in its ON state | Set X-ring-inhibit trigger (FIG. 8A) to its ON state. Reset DAR1 (FIG. 6E). Reset CBR1 (FIG. 6J). Set contents of TF register (FIG. 6A) into CBR1 at T1 time. Reset TR29C13 and set TR30C13. | TR30C13. |
| TR30C13 | TR29C13 in its ON state | T trigger (FIG. 6F) in its OFF state AND cycle 13 trigger 2670 in its ON state AND TR30C13 in its ON state. | Apply a signal through line 321 to CPU50 (FIG. 6H) (i.e. inform host CPU that a record cannot be found in hierarchy; supply name of record from CBR1 to host CPU. Host CPU resets T trigger after noting above information). Partially condition TR26C13 to be set, TR30C13 to be reset, and TR16C8 to be set. | TR16C8. or TR26C13. |
| TR1C14 | Y trigger (FIG. 8A) in its ON state AND TR3C14 in its OFF state AND TR2C8 in its OFF state AND TR13C8 in its OFF state AND either a cycle 14, cycle 15, cycle 16, or cycle 17 indication from the Y ring on line 2840, 2841, 2842, or 2494 respectively. | Either TR1C14 in its ON state AND an X ring not-busy indication on line 2439 AND an HRX not-busy signal on line 1194 (FIG. 6P) AND an REX in its OFF state indication on line 2932 (FIG. 8A) from OR gate 2930 or TR1C14 in its ON state and a not (HRX not-busy AND REX in its OFF state) signal on output line 2936 (FIG. 8A) from inverter 2934. | Reset Y trigger (FIG. 8A) to its OFF state. Reset TR1C14 and partially condition TR2C14 and TR3C14 to be set. | TR2C14. or TR3C14. |
| TR2C14 | TR1C14 in its ON state AND X ring not-busy indication on line 2439 AND an HRX not-busy AND REX in its OFF state indication on output line 2932 (FIG. 8A) from OR gate 2930. | TR2C14 in its ON state | Reset TR2C14 and set TR3C8 and set X-ring-inhibit trigger (FIG. 8A) to its ON state. | TR3C8. |
| TR3C14 | TR1C14 in its ON state AND a not (HRX not-busy AND REX in its OFF state) indication on output line 2936 (FIG. 8A) from inverter 2934. | TR3C14 in its ON state | Set Y trigger (FIG. 8A) to its ON state. Reset TR3C14 to its OFF state Inhibit the setting of TR1C14 to its ON state. Reset cycle 14 trigger 1090, set cycle 15 trigger 1098 or Reset cycle 15 trigger 1098 and set cycle 16 trigger 1106 or Reset cycle 16 trigger 1106 and set cycle 17 trigger 1114 or Reset cycle 17 trigger 1114 and set cycle 6 trigger 2472. | Trigger 1098. or Trigger 1106. or Trigger 1114. or Trigger 2472. |

While the invention has been particularly shown and described with reference to preferred embodiments thereof, it will be understood by those skilled in the art that the foregoing and other changes in form and details may be made therein without departing from the spirit and scope of the invention.

What is claimed is:

1. A hierarchy storage system comprising:
a plurality of storage levels each having a plurality of record storage positions;
means for storing a record in a selected one of said levels;
means for empirically ordering records in said levels;
means for determining, at any given time, in which record storage position of which level a desired record is stored; and
means responsive to said position determining means for accessing said desired record.

2. A hierarchy storage system comprising:
a plurality of storage levels each having a plurality of record storage positions;
means for storing a record in a selected one of said levels;
means for continuously reordering said records in said levels on the basis of their relative activity;
means for determining, at any given time, in which record storage position of which level a desired record is stored; and
means responsive to said position determining means for accessing said desired record.

3. A hierarchy storage system comprising:
a plurality of storage levels each having plurality of record storage positions;
means for storing a record in a selected one of said levels;
means for causing said record to drift back to progressively lower storage levels as new records are applied to said system;
means for determining, at any given time, in which record storage position of which level a desired record is stored;
and means responsive to said position determining means for accessing said desired record.

4. A hierarchy storage system comprising:
first and second storage levels each having a plurality of record storing positions;

means for storing records in said first storage level;
means responsive to an attempt to store a record in said first level and to an indication that said first level is full for transferring the oldest record from said first level to said second level;
means responsive to an attempt to transfer a record into said second level and to an indication that said second level is full for transferring the oldest record out of said second level;
means for determining, at any given time, in which record storage position of which level a desired record is stored;
and means responsive to said position determining means for accessing said desired record.

5. A hierarchy storage system comprising:
a plurality of storage levels each having a plurality of record storage positions;
means for storing a record in one or more of the higher of said levels;
means for causing said record to drift back, as new records are applied to the system, from the lowest storage level in which it is initially stored to progressively lower storage levels;
means for determining, at any given time, in which record storage position of which level a desired record is stored; and
means responsive to said position determining means for accessing said desired record.

6. A hierarchy storage system comprising:
a plurality of storage levels each having a plurality of record storage positions;
means for storing a record in a plurality of said levels;
means for causing said record to drift back, as new records are applied to the system, to progressively lower storage levels;
means for determining, at any given time, in which record storage position of which level a desired record is stored; and
means responsive to said position determining means for accessing said desired record.

7. A hierarchy storage system comprising:
a plurality of storage levels each having a plurality of record storage positions;
means for storing a record in one or more of the higher of said levels;
means for causing said record to drift back, as new records are applied to the system, from the lowest storage level in which it is initially stored to progressively lower storage levels;
directory means for storing a relative address for each record stored in said hierarchy storage system;
linear transform means for converting the relative address for a record which it is desired to retrieve into the address of a storage position in said hierarchy system; and
means for accessing the record stored at said storage position.

8. A hierarchy storage system comprising:
a plurality of storage levels each having a plurality of record storage positions;
means for storing a record in one or more of the higher of said levels;
means for causing said record to drift back, as new records are applied to the system, from the lowest storage level in which it is initially stored to progressively lower storage levels;
directory means for storing a relative address for each record stored in said hierarchy storage system;
means for storing the relative address to be assigned to the next record to be stored;
means for storing the capacity of each of said storage levels;
means for calculating from the stored relative address for a desired record, the stored relative address to be assigned to the next record to be stored, and the number of storage positions in each storage level, the present position in the hierarchy system of the desired record; and
means for accessing the record stored at said calculated position.

9. A hierarchy storage system comprising:
a plurality of storage levels each having a plurality of record storage positions;
means for storing a record in one or more of the higher of said levels;
means responsive to an attempt to store a record in the lowest level in which records are initially stored and to an indication that said level is full for transferring the oldest record from said lowest level in which records are initially stored to the next lower level in the hierarchy;
means responsive to an attempt to transfer a record into said next lower level or to any level below it and to an indication that said level is full for transferring the oldest record in said level to the level below it in the system;
means responsive to an attempt to transfer a record into the lowest level of the system and to an indication that said lowest level is full for transferring the oldest record in said lowest level out of the system;
means for determining, at any given time, in which record storing position of which level a desired record is stored; and means responsive to said position determining means for accessing said desired record.

10. A hiearchy storage system comprising:
a plurality of storage levels each having a plurality of record storage positions;
means for storing a record in one or more of the higher of said levels;
means responsive to an attempt to store a record in the lowest level in which records are initially stored and to an indication that said level is full for transferring the oldest record from said lowest level in which records are initially stored to the next lower level in the hierarchy;
means responsive to an attempt to transfer a record into said next lower level or to any level below it and to an indication that said level is full for transferring the oldest record in said level to the level below it in the system;
means responsive to an attempt to transfer a record into the lowest level of the system and to in indication that said lowest level is full for transferring the oldest record in said lowest level out of the system;
directory means for storing a relative address for each record stored in said hierarchy storage system;
linear transform means for converting the relative address for a record which it is desired to retrieve into the address of a storage position in said hierarchy system; and
means for accessing the record stored at said storage position.

11. A hiearchy storage system comprising:
a plurality of storage levels each having a plurality of record storage positions;
means for storing a record in one or more of the higher of said levels;
means responsive to an attempt to store a record in the lowest level in which records are initially stored and to an indication that said level is full for transferring the oldest record from said lowest level in which records are initially stored to the next lower level in the hierarchy;
means responsive to an attempt to transfer a record into said next lower level or to any level below it and to an indication that said level is full for transferring the oldest record in said level to the next level below it in the system;
means responsive to an attempt to transfer a record into the lowest level of the system and to an indication that said lowest level is full for transferring the oldest record in said lowest level out of the system;
directory means for storing a relative address for each record stored in said hierarchy storage system;
means for storing the relative address to be assigned to the next record to be stored;
means for storing the capacity of each of said storage levels;
means for calculating from the stored relative address for a desired record, the stored relative address to be assigned to the next record to be stored, and the number of storage positions in each storage level, the present position in the hierarchy system of the desired record; and
means for accessing the record stored at said calculated position.

12. A hierarchy storage system comprising:
a plurality of storage levels each having a plurality of record storage positions;
means for storing a record in one or more of said levels;
means for causing said record to drift back, as new records are applied to the system, from the lowest storage level in which it is initially stored to progressively lower storage levels;
directory means for storing a relative address for each record stored in said hierarchy storage system;
a table indicating the storage position in the hierarchy at which the record bearing each relative address is stored;
means responsive to a request for a record from said hierarchy system for first causing an access to said directory to obtain the relative address of said record and for then accessing said table to obtain the storage position of the record; and
means for accessing the record stored at said storage position.

13. A hierarchy storage system comprising:
a plurality of storage levels each having a plurality of record storage positions;
means for applying read and write instructions to said system;
directory means for storing a relative address for each record stored in said hierarchy storage system;
a location address counter for storing the relative address to be assigned to the next record to be stored;
memory means for storing a predetermined number of said read and write instructions;
means for periodically checking said memory means to determine if there is a write instruction to be executed;
means responsive to the detection of a write instruction in said memory means for causing the record indicated by said write instruction to be stored in one or more of the higher levels in said hierarchy system and for causing an entry to be made in said directory means, said entry including an identifier for said record and the relative address contained in said location address counter;
means for causing said record to drift back, with time, from the lowest storage level in which it is initially stored to progressively lower storage levels;
means for periodically scanning the read portion of said memory means to determine if it contains a read instruction for a given one of said hierarchy levels;
means responsive to the detection of a read instruction for a given level in the hierarchy for causing the record identifier for the record indicated by said read instruction to be applied to said directory means and for operating upon the relative address read out from said directory means to obtain the storage position in the hierarchy at which the desired record is presently stored; and
means for retrieving the record stored at said storage position.

14. A hierarchy storage system comprising:
a plurality of storage levels each having a plurality of record storage positions;
means for applying read and write instructions to said system;
directory means for storing a relative address for each record stored in said hierarchy storage system;
a location address counter for storing the relative address to be assigned to the next record to be stored;
memory means for storing a predetermined number of said read and write instructions;
means for periodically checking said memory means to determine if there is a write instruction to be executed;
means responsive to the detection of a write instruction in said memory means for causing the record indicated by said write instruction to be stored in one or more of the higher levels in said hierarchy system and for causing an entry to be made in said directory means, said entry including an identifier for said record and the relative address contained in said location address counter;
means for causing said record to drift back, with time, from the lowest storage level in which it is initially stored to progressively lower storage levels;
means for periodically scanning the read portion of said memory means to determine if it contains an untransformed read instruction;
means responsive to the detection of an untransformed read instruction in said memory means for causing the record identifier for the record indicated by said read instruction to be applied to said directory means, for causing the relative address for the record, which is obtained from said directory means, to be operated upon to obtain a storage position in the hierarchy at which the indicated record is presently stored and for storing the obtained storage position in said memory means with the read instruction;
means for periodically scanning the read portion of said memory means to determine if it contains a transformed read instruction for a given one of the hierarchy levels; and
means responsive to the detection of a transformed read instruction for a given level in the hierarchy for causing the record at the position in the hierarchy stored with the read instruction to be retrieved.

15. A hierarchy storage system comprising:
a plurality of storage levels each having a plurality of storage positions;
means for forming records applied to said system into record blocks;
means for storing a record block in a selected one of said levels;
means for causing said record block to drift back to progressively lower storage levels as new record blocks are formed;
means for determining, at any given time, in which storage position of which level a desired record is stored; and
means responsive to said position determining means for accessing said desired record.

16. A hierarchy storage system comprising:
a plurality of storage levels each having a plurality of storage positions;
means for storing a record in one or more of the higher of said levels;
means for forming records applied to the lowest storage level to which records are initially applied into record blocks;
means for causing said record blocks to drift back, as new record blocks are formed, from the storage level in which they are initially stored to progressively lower storage levels;
directory means for storing a relative address for each record stored in the hierarchy storage system;

linear transform means for converting the relative address for a record which it is desired to retrieve into the address of a storage position and block position in said hierarchy system; and means for accessing a record stored at said storage and block position.

17. A hierarchy storage system comprising:

a plurality of storage levels each having a plurality of record storage positions, this number being capable of being varied;

means for storing a record in one or more of the higher of said levels;

means for causing said record to drift back, with time, from the lowest storage level in which it is initially stored to progressively lower storage levels;

directory means for storing a relative address for each record stored in said hierarchy storage system;

linear transform means for converting the relative address for a record which it is desired to retrieve into the address of a storage position in said hierarchy system;

means for accessing the record stored at said storage position;

means for applying an initialize instruction to said storage system indicating that the capacity of a hierarchy level has been varied and the extent of the variation; and means responsive to an initialize instruction for altering stored values in said linear transform means whereby records may still be retrieved from said hierarchy storage system without causing any alteration in the stored relative addresses.

18. A hierarchy storage system comprising:

a plurality of storage levels each having a plurality of storage positions, this number being capable of being varied;

means for storing a record in one or more of the higher of said levels;

means for forming records applied to the lowest storage level to which records are initially applied into record blocks;

means for causing said record blocks to drift back, with time, from the storage level in which they are initially stored to progressively lower storage levels;

directory means for storing a relative address for each record stored in the hierarchy storage system;

linear transform means for converting the relative address for a record which it is desired to retrieve into the address of a storage position and block position in said hierarchy system;

means for accessing a record stored at said storage and block position;

means for applying an initialize instruction to said storage system indicating that the capacity of a hierarchy level has been varied and the extent of the variation;

first means responsive to said initialize instruction for repositioning record blocks in said hierarchy level in a manner such that the newly created vacant block positions appear at the place where new record blocks are to be stored in the hierarchy; and second means responsive to said initialize instruction for altering stored values in said linear transform means whereby records may still be retrieved from said hierarchy storage system without causing any alteration in the stored relative addresses.

No references cited.

ROBERT C. BAILEY, *Primary Examiner.*

R. ZACHE, *Assistant Examiner.*